US006480285B1

(12) United States Patent
Hill

(10) Patent No.: US 6,480,285 B1
(45) Date of Patent: *Nov. 12, 2002

(54) MULTIPLE LAYER CONFOCAL INTERFERENCE MICROSCOPY USING WAVENUMBER DOMAIN REFLECTOMETRY AND BACKGROUND AMPLITUDE REDUCTION AND COMPENSATION

(75) Inventor: Henry A. Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,847

(22) Filed: Mar. 16, 2000

Related U.S. Application Data

(63) Continuation-in-part of application No. 09/089,105, filed on Jun. 2, 1998, now Pat. No. 6,091,496, which is a continuation-in-part of application No. 08/789,885, filed on Jan. 28, 1997, now Pat. No. 5,760,901.
(60) Provisional application No. 60/125,057, filed on Mar. 18, 1999.

(51) Int. Cl.$^7$ .................................................. G01B 9/02
(52) U.S. Cl. ...................................... 356/492; 356/497
(58) Field of Search ................................ 356/492, 497, 356/508, 511, 450, 491

(56) References Cited

U.S. PATENT DOCUMENTS

| 4,213,706 A | 7/1980 | Hill et al. ................... 356/353 |
| 4,304,464 A | 12/1981 | Hill et al. ................... 350/321 |

(List continued on next page.)

OTHER PUBLICATIONS

"Three–Dimensional Analysis of Biological Specimens Utilizing Image Processing Techniques" by D. A. Agard and J. W. Sedat, Proc. Soc. PhotoOpt. Instrum. Eng., SPIE, vol. 264, pp. 110–117, 1980.

(List continued on next page.)

Primary Examiner—Samuel A. Turner
(74) Attorney, Agent, or Firm—Cahill, Sutton & Thomas PLLC

(57) ABSTRACT

An in-focus image of an information-bearing region within and/or on a substance is discriminated from an out-of-focus image so as to reduce errors in image information of the substance by producing a probe beam and a reference beam from a wideband point source, producing antisymmetric spatial properties in the reference beam, converting the probe beam to a beam focused to a line in the region, producing an in-focus return probe beam, and producing antisymmetric spatial properties in the in-focus return probe beam. Then the in-focus return probe beam is spatially filtered and focused to a line image in a detector plane of a detector system. The reference beam is spatially filtered and focus to a line image in the detector plane. A beam from an out-of focus image point is spatially filtered. The line image of the spatially filtered reference beam is interfered with the spatially filtered beam from the out-of-focus image point and the line image of the spatially filtered in-focus return probe beam. A complex amplitude of the spatially filtered in-focus return probe beam is detected as an interference term between line image of the spatially filtered reference beam and the line image of the spatially filtered in-focus return probe beam by means of the detector system. An amplitude of an interference term between the spatially filtered out-of-focus image beam and the line image of the spatially filtered reference beam is thereby substantially reduced, and reduces statistical and systematic errors in data produced by the detector system to represent the image information of the region. The image information is acquired as either one-dimensional or two-dimensional data arrays wherein the elements of the arrays are obtained substantially simultaneously. The substance is scanned to generate images of dimensionalities greater than the one-dimensional or two-dimensional data arrays.

92 Claims, 58 Drawing Sheets

U.S. PATENT DOCUMENTS

| | | | |
|---|---|---|---|
| 4,818,110 A | | 4/1989 | Davidson ..................... 356/358 |
| 5,112,129 A | | 5/1992 | Davidson et al. ........... 356/359 |
| 5,192,980 A | | 3/1993 | Dixon et al. ................. 356/326 |
| 5,248,876 A | | 9/1993 | Kerstens et al. ............ 250/561 |
| 5,321,501 A | | 6/1994 | Swanson et al. ............ 356/345 |
| 5,483,343 A | | 1/1996 | Iwamoto et al. ............ 356/351 |
| 5,537,247 A | | 7/1996 | Xiao ........................... 359/368 |
| 5,565,986 A | | 10/1996 | Knuttel ....................... 356/346 |
| 5,760,901 A | * | 6/1998 | Hill ............................. 356/450 |
| 6,091,496 A | * | 7/2000 | Hill ............................. 356/450 |

OTHER PUBLICATIONS

"Quantitative Analysis of Electrophoretograms: A Mathematical Approach to Super–Resolution" by D. A. Agard, R. A. Steinberg, and R.M. Stroud, Anal. Biochem. 111, 257–268, 1981.

"Flourescence Microscopy in Three Dimensions" by D. A. Agard, Y. Hiraoka, P. Shaw, and J. W. Sedat, Methods Cell Biol. vol 30, pp. 353–377, 1989.

"Optical Sectioning Microscopy: Cellular Architecture in Three Dimensions" by D. A. Agard, Annu. Rev. Biophys. Bioeng. 13, pp. 191–219, 1984.

"The Use of a Charge–Coupled Device for Quantitative Optical Microscopy of Biological Structures"by Y. Hiraoka, J.W. Sedat, and D. A. Agard, Science, vol. 238, pp. 36–41, 1987.

"Two–Photon Laser Scanning Fluorescence Microcopy" by W. Denk, J. H. Strickler, and W. W. Webb, Science vol. 248, pp. 73–76, 1990.

"Charge–coupled Devices in Astronomy" by J. Kristian and M. Blouke Sci. Am. vol. 247, pp. 67–74, 1982.

"Laser Computed–Tomography Microscope" by S. Kawata, O. Nakamura, T. Noda, H. Ooki, K Ogino, Y. Kuroiwa, and S. Minami, Applied Optics, vol 29, No. 26, pp. 3805–3809, 1990.

"Tandem–Scanning Reflected–Light Microscope" by M. Pétran and M. Hadravsky, Journal of the Optical Society of America, vol. 58, No. 5, pp. 661–664, May, 1968.

"Reel–Time Confocal Scanning Optical Microscope" by G. Q. Xiao, T. R. Corle, and G. S. Kino, Appl. phys. Lett. vol. 53, No. 8, pp. 716–718, Aug. 22, 1988.

"Three–Dimensional Analysis by a Microlens–Array Confocal Arrangement" by H. J. Tiziani and H.–M. Uhde, Applied Optics, vol. 33, No. 4, pp. 567–572, Feb. 1, 1994.

"Confocal Laser Microscope For Submicron Structure Measurement" by T. Zapf and R. W. Wijnaendts–van–Resandt, Microelectronic Engineering 5, pp. 573–580, 1986.

"Scanned Laser Imaging for Integrated Circuit Metrology" by J. T. Lindow, S. D. Bennett, and I. R. Smith, SPIE, vol. 565, pp. 81–87, 1985.

"Working with the Confocal Scanning UV–Laser Microscope: Specific DNA Localization at High Sensitivity and Multiple–Parameter Fluorescence" by M. Montag, J. Kululies, R. Jörgens, H. Gundlach, M. F. Trendelenburg, and H. Spring, Journal of Microscopy, vol. 163 Pt. 2, pp. 201–210, Aug. 1991.

"Spatial and Dynamic Changes in Intracellular $Ca^{2+}$ Measured by Confocal Laser–Scanning Microscopy in Bullfrog Sympatetic Ganglion Cells" by K. Kuba, S.–Y. Hua, and M. Nohmi, Neuroscience Research, 10, pp. 245–259, 1991.

"Optical Modifications Enabling Simultaneous Confocal Imaging With Dyes Excited by Ultraviolet– and Visible–Wavelength Light" by C. Bliton, J. Lechleiter and D. E. Clapham, Journal of Microscopy, vol. 169, Pt. 1, pp. 15–26, Jan. 1993.

"Fundamental and Practical Limits in Confocal Light Microscopy" by J. B. Pawley, Scanning, vol. 13, pp. 184–198, 1991.

"Quantitative Fluorescence Microscopy Using Photomultiplier Tubes and Imaging Detectors" by J. E. Wampler and K. Kutz, Methods in Cell Biology, vol. 29, pp. 239–267, 1989.

"Validation of an Imaging System: Steps to Evaluate and Validate a Microscope Imaging System for Quantitative Studies" by Z. Jericevic, B. Wiese, J. Bryan, and I. C. Smith, Methods in Cell Biology, vol. 30, pp. 47–83, 1989.

"Optical Coherence–Domain Reflectometry: A New Optical Evaluation Technique" by R. C. Youngquist, S. Carr, and D. E. N. Davies, Optic Letters vol. 12, No. 3, pp. 158–160, Mar. 1987.

"New Measurement System for Fault Location in Optical Waveguide Devices Based on an Interferometric Technique" by K. Takada, I. Yokohama, K. Chida, and J. Noda, Applied Optics, vol. 26, No. p, pp. 1603–1606, May 1, 1987.

"Guided–Wave Reflectometry with Micrometer Resolution" by B. L. Danielson and C. D. Whittenberg, Applied Optics, vol. 26, No. 14, pp. 2836–2842, Jul. 15, 1987.

"Characterization of Silica–Based Waveguides with a Interferometric Optical Time–Domain Reflectometry System Using a 1.3–$\mu$m–Wavelength Superluminescent Diode" by K. Takada, N. Takato, J. Noda, and Y. Noguchi, Optoc Letters, vol. 14, No. 13, pp. 706–708, Jul. 1, 1989.

"Measurement of the Thickness of Fundus Layers by Partial Coherence Tomography" by W. Drexler, C. K. Hitzenberger, H. Sattmann, and A. F. Fercher, Optical Engineering. vol. 34, No. 3, pp. 701–710, Mar. 1995.

"In Vivo Retinal Imaging by Optical Coherence Tomography"by E. A. Swanson, J. A. Izatt, M. R. Hee, D. Huang, C. P. Lin, J. S. Schuman, C. A. Puliafito, and J. G. Fujimoto, Optics Letters, vol. 18, No. 21, pp. 1864–1866, Nov. 1, 1993.

"High–Speed Noncontact Profiler Based on Scanning White–Light Interferometry" by L. Deck and P. de Groot, Applied Optics, vol. 33, No. 31, pp. 7334–7338, Nov. 1, 1994.

"An Application of Interference Microscope to Integrated Circuit Inspection and Metrology" by M. Davidson, K. Kaufman, I. Mazor, and F. Cohen, SPIE, vol. 775, pp. 233–247, 1987.

"Parallel Three–Dimensional Sensing by Color–Coded Triangulation" by G. Häusler and D. Ritter, Applied Optics, vol. 32, No. 35, pp. 7164–7169, Dec. 10, 1993.

"Dispersive Interferometric Profilometer" by J. Schwider and L. Zhou, Optic Letters, vol. 19, No. 13, pp. 995–997, Jul. 1, 1994.

"Absolute Distance Measurement With Synchronously Sampled White–Light Channelled Spectrum Interferometry" by U. Schnell, E. Zimmermann, and R. Dändliker Pure Appl. Opt. 4, pp. 643–651, 1995.

"Real–time Confocal Scanning Optical Microscope" by G. Q. Xiao, T. R. Corle, and G. S. Kino, Appl. Phys. Lett., 53(8), pp. 716–718, Aug. 22, 1988.

"Three–Dimensional Image Sensing by Chromatic Confocal Microscopy" by H. J. Tiziani and H.–M. Uhde Applied Optics, Vol. 33, No. 10, pp. 1838–1843, Apr. 1, 1994.

"Mirau Correlation Microscope" by G. S. Kino and S. C. Chim, Applied Optics, vol. 29, No. 26, 3775–3783, Sep. 10, 1990.

"Three–Dimensional Image Realization in Interference Microscopy" by S. S. C. Chim and G. S. Kino, Applied Optics, vol. 31, No. 14, pp. 2550–2553, May 10, 1992.

"A Confocal Interference Microscope" by D. K. Hamilton and C. J. R. Sheppard, Optica Acta, vol. 29, No. 12, pp. 1573–1577, 1982.

"Differential Interferometer Arrangements for Distance and Angle Measurements: Principles, Advantages, and Applications" by C. Zanoni, VDI Berichte NR. 749, pp. 93–106, 1989.

Semiconductor Industry Roadmap, p82, 1997.

"Microlithography: Science and Technology" by J. R. Sheats and B. W. Smith, Marcel Dekker, Inc., New York, 1998.

"Three–dimensional Imaging In Confocal Microscopy" by C. J. R. Sheppard and C. J. Cogswell, Confocal Microscopy, pp. 143–169, 1990.

"Scanning optical microscopy" by C. J. R. Sheppard, Advanced in Optical and Electron Microscopy, vol. 10, 1987.

"Image Formation in the Scanning Microscope" by C. J. R. Sheppard and A. Choudhury, Optica Acta, vol. 24, No. 10, pp. 1051–1073, 1977.

"Three–Dimensional Image Formation in Confocal Microscopy" by C. J. R. Sheppard and C. J. Cogwell, Journal of Microscopy, vol. 159, Pt. 2, pp. 179–194, Aug. 1990.

"Depth of Field in the Scanning Microscope" by C. J. R. Sheppard and T. Wilson, Optics Letters, vol. 3, No. 3, pp. 115–117, Sep. 1978.

"Optical Microscopy with Extended Depth of Field" by C. J. R. Sheppard, D. K. Hamilton, and I. J. Cox, Proc. R. Soc. Lond., A 387, pp. 171–186, 1993.

"Effects of Defocus and Primary Spherical Aberration on Three–Dimensional Coherent Transfer Functions in Confocal Microscopes" by M. Gu and C. J. R. Sheppard, Applied Optics, vol. 31, No. 14, pp. 2541–2549, May 10, 1992.

"Three–Dimensional Imaging in a Microscope" by C. J. R. Sheppard and X. Q. Mao, J. Opt. Soc. Am. A, vol. 6, No. 9, pp. 1260–1269, Sep. 1989.

"Three–Dimensional Structure Determination of Semi–Transparent Objects From Holographic Data" by E. Wolf, Optics Communications, vol. 1, No. 1, pp. 153–156, Sep./Oct. 1969.

"Error Function and Fresnel Integrals" edited by Abramowitz and Stegun, Handbook of Mathematical Functions With Formulas, Graphs, and Mathematical Tables, National Bureau of Standards, Applied Mathematics Series 55, pp. 300–302, Jun. 1964.

* cited by examiner

MULTIPLE LAYER CONFOCAL INTERFERENCE MICROSCOPY USING WAVENUMBER DOMAIN REFLECTOMETRY AND BACKGROUND AMPLITUDE REDUCTION AND COMPENSATION

RELATED APPLICATIONS

This is a continuation in part of the commonly owned, by H. A. Hill entitled "Multiple Layer, Multiple Track Optical Disk Access By Confocal Interference Microscopy Using Wavenumber Domain Reflectometry And Background Amplitude Reduction And Compensation", Ser. No. 09/089,105 filed Jun. 2, 1998, now U.S. Pat. No 6,091,496, which is a continuation in part of the commonly owned copending application entitled "Method And Apparatus For Confocal Interference Microscopy With Background Amplitude Reduction And Compensation", Ser. No. 08/789,885 filed Jan. 28, 1997, issued as U.S. Pat. No 5,760,901 on Jun. 2, 1998, both of which are incorporated herein by reference.

This application claims the benefit of prior filed, copending U.S. Provisional Application Serial No. 60/125,057, filed Mar. 18, 1999, by Henry A. Hill entitled "Multiple Layer, Multiple Track Optical Disk Access By Confocal Interference Microscopy Using Wavenumber Domain Reflectometry And Background Amplitude Reduction And Compensation".

FIELD OF THE INVENTION

This invention is related to optical and acoustical imaging, including utilizing such images to perform optical data storage and retrieval, precision measurements on biological samples, wafers, integrated circuits, optical disks, and other samples, and to perform optical biopsies.

BACKGROUND OF THE INVENTION

The invention relates to techniques for rapidly, accurately producing an in-focus image of an object, or a cross-section thereof, wherein the effect of light signals from out-of-focus foreground and/or background light sources are mostly eliminated with regard to both statistical and systematic errors. Confocal and confocal interference microscopy are finding many applications in, for example, the life sciences, the study of biological samples, industrial inspection, and semiconductor metrology. This is because of the unique three-dimensional imaging capability of these instruments.

Perhaps the most difficult multi-dimensional imaging is encountered when the background from out-of-focus images is significantly larger than the signal from the in-focus images. Such circumstances arise frequently in the study of thick samples, particularly when working in the reflection mode in contrast to the transmission mode of confocal systems.

There are two general approaches for determining the volume properties of three-dimensional microscopic specimens. Such approaches are based on conventional microscopy and confocal microscopy. Generally, the conventional microscopy approach requires less time to acquire the data but more time to process the data for a three-dimensional image, compared to the confocal microscopy approach.

In a conventional imaging system, when a part of the object to be imaged is axially displaced from its best focus location, the image contrast decreases but the brightness remains constant so that displaced, unfocused parts of the image interfere with the view of focused parts of object.

If the system's point-spread function is known and images are obtained for each independent section of the object, known computer algorithms can be applied to such images to effectively remove the signal contributed by the out-of-focus light and produce images that contain only in-focus data. Such algorithms are of several distinct types, are referred to as "computer deconvolutions," and generally require expensive computer equipment and considerable computing time and considerable amounts of data to obtain the desired statistical accuracy.

The wide field method (WFM) (D. A. Agard and J. W. Sedat, "Three-Dimensional Analysis of Biological Specimens Utilizing Image Processing Techniques," *Proc. Soc. PhotoOpt. Instrum. Eng., SPIE,* 264, 110–117, 1980; D. A. Agard, R. A. Steinberg, and R. M. Stroud, "Quantitative Analysis of Electrophoretograms: A Mathematical Approach to Super-Resolution," *Anal. Biochem.* 111, 257–268, 1981; D. A. Agard, Y. Hiraoka, P. Shaw, and J. W. Sedat, "Fluorescence Microscopy in Three Dimensions," *Methods Cell Biol.* 30, 353–377, 1989; D. A. Agard, "Optical Sectioning Microscopy: Cellular Architecture in Three Dimensions," *Annu. Rev. Biophys. Bioeng.* 13, 191–219, 1984; Y. Hiraoka, J. W. Sedat, and D. A. Agard, "The Use of a Charge-Coupled Device for Quantitative Optical Microscopy of Biological Structures," *Sci.* 238, 36–41, 1987; W. Denk, J. H. Strickler, and W. W. Webb, "Two-Photon Laser Scanning Fluorescence Microscopy," *Sci.* 248, 73–76, 1990) uses a conventional microscope to sequentially acquire a set of images of adjacent focus planes throughout the volume of interest. Each image is recorded using a cooled charge-coupled device (CCD) image sensor (J. Kristian and M. Blouke, "Charge-coupled Devices in Astronomy," *Sci. Am.* 247, 67–74, 1982) and contains data from both in-focus and out-of-focus image planes.

The technique of laser computed tomography is implemented using a conventional microscope. The system discussed by S. Kawata, O. Nakamura, T. Noda, H. Ooki, K Ogino, Y. Kuroiwa, and S. Minami, "Laser Computed-Tomography Microscope," *Appl. Opt.* 29, 3805–3809 (1990) is based on a principal that is closely related to the technique of X-ray computed tomography, but uses three-dimensional volume reconstruction rather than two-dimensional slice reconstruction. Projected images of a thick three-dimensional sample are collected with a conventional transmission microscope modified with oblique illumination optics, and the three-dimensional structure of the interior of the sample is reconstructed by a computer. Here, the data is acquired in a time short compared to that required to process data for a three-dimensional image. In one experiment by Kawata et al., ibid., the 80×80×36-voxel reconstruction required several minutes to collect all projections and send them to a minicomputer. Approximately thirty minutes then were required for digital reconstruction of the image, in spite of utilizing a vector processor at a speed of 20 million floating point operations per second (MFLOPS).

In a conventional point or pinhole-confocal microscope, light from a point source is focused within a very small space, known as a spot. The microscope focuses light reflected from, scattered by, or transmitted through the spot onto a point detector. In a reflecting point-confocal microscope the incident light is reflected or back-scattered by that portion of the sample in the spot. Any light which is reflected or back-scattered by the sample outside of the spot is not well focused onto the detector, thus it is spread out so the point detector receives only a small portion of such reflected or back-scattered light. In a transmitting point-confocal microscope, incident light is transmitted unless it is scattered or absorbed by that portion of the sample in the spot. Generally, the point source and point detector are approximated by placing masks containing a pinhole in front of a conventional light source and a conventional detector, respectively.

Similarly, in a conventional slit-confocal microscope system, light from a line source is focused into a very narrow elongated space, which is also known as a spot. The slit-confocal microscope focuses light reflected from, scattered by or transmitted through the spot onto a line detector. The line source and line detector can be approximated using a mask with a slit in front of a conventional light source and row of conventional detectors, respectively. Alternately, a line source can be approximated by sweeping a focused laser beam across the object to be imaged or inspected.

Since only a small portion of the object is imaged by the confocal microscope, either the object to be imaged must be moved, or the source and detector must be moved, in order to obtain sufficient image data to produce a complete two-dimensional or three-dimensional view of the object. Previous slit-confocal systems have moved the object linearly in a direction perpendicular to the slit to obtain successive lines of two-dimensional image data. On the other hand, point-confocal systems having only one pinhole have to be moved in a two-dimensional manner in order to acquire two-dimensional image data and in a three-dimensional manner in order to acquire a three-dimensional set of image data. The raw image data are typically stored and later processed to form a two-dimensional cross-section or a three-dimensional image of the object that was inspected or imaged. The reduced sensitivity to out-of-focus images relative to conventional microscopy leads to improved statistical accuracy for a given amount of data and the processing operation is considerably simpler in comparison to that required when processing data obtained in conventional microscopy approach.

In a system known as the Tandem Scanning Optical Microscope (TSOM), a spiral pattern of illumination and detector pinholes are etched into a Nipkow disk so, as the disk rotates, the entire stationary object is scanned in two dimensions [cf. M. Pétran and M. Hadravsky, "Tandem-Scanning Reflected-Light Microscope," *J. Opt. Soc. A.* 58(5), 661–664 (1968); G. Q. Xiao, T. R. Corle, and G. S. Kino, "Real-Time Confocal Scanning Optical Microscope," *Appl. Phys. Lett.* 53, 716–718 (1988)]. In terms of the optical processing, the TSOM is basically a single point confocal microscope with a means for efficiently scanning a two-dimensional section one point at a time.

Examples of two techniques implemented to reduce the amount of scanning required to obtain a two-dimensional image with a confocal arrangement are found in the work of H. J. Tiziani and H.-M. Uhde, "Three-Dimensional Analysis by a Microlens-Array Confocal Arrangement," *Appl. Opt.* 33(4), 567–572 (1994) and in the patent of P. J. Kerstens, J. R. Mandeville, and F. Y. Wu, "Tandem Linear Scanning Confocal Imaging System with Focal Volumes at Different Heights," (U.S. Pat. No. 5,248,876 issued September 1993). The microlens-array confocal arrangement of Tiziani and Uhde ibid. has out-of-focus image discrimination that is the same as using a multi-pinhole source and multi-element detector in a confocal configuration. Such a system allows for a number of points to be examined simultaneously but at a compromise in discrimination against out-of-focus images. The higher the density of microlenses, the poorer the ability of the system to discriminate against out-of-focus images, and consequently, an increase in complexity and cost of the computer deconvolutions required to produce a three-dimensional image. Further, the Tiziani and Uhde ibid. system has serious limitations in axial range. This range cannot exceed the focal length of the microlens, which is proportional to the diameter of the microlens for a given numerical aperture. Therefore, as the density of the microlenses is increased, there is an associated decrease in the permitted axial range.

The Kerstens et al., ibid. system incorporates a number of pinholes and matching pinpoint detectors in a confocal arrangement to allow for a number of points to be examined simultaneously. However, as noted in the preceding paragraph, this gain is at a compromise in discrimination against out-of-focus images and as a result an increase in complexity and cost of required subsequent computer deconvolutions. The higher the density of pinholes, the poorer the ability of the system to discriminate against out-of-focus images. The highest discrimination would be achieved when using only one pinhole.

Application of confocal microscopes to inspection of electronics was suggested in T. Zapf and R. W. Wijnaendts-van-Resandt, "Confocal Laser Microscope For Submicron Structure Measurement," *Microelectronic Engineering* 5, 573–580 (1986) and J. T. Lindow, S. D. Bennett, and I. R. Smith, "Scanned Laser Imaging for Integrated Circuit Metrology," *SPIE,* 565, 81–87 (1985). The axial discrimination provided by confocal systems make them useful in the semi-conductor manufacturing environment. For example, such systems could provide for improved inspection of height dependent features such as delamination, blisters, and thickness of structures and coatings. However, there are some problems associated with using confocal imaging systems for inspection of electronics. For example, single pinhole systems require too much time for scanning the object in two directions. Optical systems for scanning a laser beam over the object are too complex; and the spinning disk approach used in the previous TSOM resulted in alignment and maintenance problems.

The number of different depth slices required (and therefore the amount of image data collected) depends upon the range of height that must be measured, and also upon the desired height resolution and performance of the optical system. For typical electronics inspection, images of 10 to 100 different depth slices would be required. Furthermore, data in several color bands may be required to differentiate materials. In confocal imaging systems, a separate two-dimensional scan is required for each desired elevation. If data for multiple color bands is desired, then multiple two-dimensional scans at each elevation are required. By shifting the focus level, similar data can be obtained from adjacent planes and a three-dimensional intensity data set can be acquired.

Thus, none of the prior art confocal microscopy systems can be configured for rapid and/or reliable three-dimensional tomographic imaging, especially in the field of inspection or imaging.

Although the confocal approach is more straightforward and works better, for example in confocal fluorescence work, when the concentration of stained structure is high, the conventional microscopy approach still has several practical advantages. The most important of these is that the latter can utilize dyes that are excited in the ultraviolet (UV) range and these often seem more robust and efficient than those excited in the visible range. Although, a UV laser can be incorporated as the light source of a confocal microscope [M. Montag, J. Kululies, R. Jörgens, H. Gundlach, M. F. Trendelenburg, and H. Spring, "Working with the Confocal Scanning UV-Laser Microscope: Specific DNA Localization at High Sensitivity and Multiple-Parameter Fluorescence," *J. Microsc*(Oxford) 163 (Pt. 2), 201–210, 1991; K. Kuba, S.-Y. Hua, and M. Nohmi, "Spatial and Dynamic Changes in Intracellular $Ca^{2+}$ Measured by Confocal Laser-Scanning Microscopy in Bullfrog Sympatetic Ganglion Cells," *Neurosci. Res.* 10, 245–259, 1991; C. Bliton, J. Lechleiter and D. E. Clapham, "Optical Modifications Enabling Simultaneous Confocal Imaging With Dyes Excited by Ultraviolet- and Visible-Wavelength Light," *J. Microsc.* 169(Pt. 1), 15–26, 1993], or UV dyes can be excited with infrared (IR) light using the "two photon" technique (W. Denk, et al., ibid.), these techniques involve considerable expense and practical difficulty.

Furthermore, the cooled CCD detectors used in conventional microscopy systems collect the data in parallel rather than serially, as does the photomultiplier (PMT) in a confocal microscopy system. As a result, if the CCD can be made to read out more rapidly without degrading its performance, the three-dimensional data recording rate of the conventional microscopy system may prove to be significantly higher than that of the confocal microscopy system, even though the time needed for computer deconvolution computations means that there might be an additional delay before the data could be actually viewed as three-dimensional image.

The signal-to-noise ratio in relation to statistical accuracy must also be considered when making a choice between a CCD detector used to record in parallel a two-dimensional data array and a slit or pinhole confocal microscope. The well capacity of a two-dimensional CCD pixel is of the order of 200,000 electrons. This limits the statistical accuracy that can be achieved in a single exposure as compared to that achievable with other photoemissive detectors such as PMT's or photovoltaic devices. Consequently, for those applications where the out-of-focus background contributions are significantly larger than the in-focus image signals, consideration of the signal-to-noise ratio may lead to the conclusion that a one-dimensional parallel recording of data in a slit confocal microscope will perform better than a two-dimensional recording of data in a standard microscope configuration or a point by point recording of data in a single pinhole confocal microscope will perform better than a one-dimensional parallel recording of data in a slit confocal microscope, all other considerations being equal.

When the consideration of statistical accuracy as measured by the signal-to-noise ratio influences the selection of a system such as a slit confocal microscope over a standard microscope, or a single pinhole confocal microscope over a slit confocal microscope, the residual signals from the out-of-focus images for the system chosen can be comparable to or larger than the in-focus signals. Such is the case for example when examining deep into biological samples at optical wavelengths where scattering of optical radiation dominates over absorption. In this case, one is left with the need for a lengthy computer deconvolution, i.e. long compared to the time required to acquire the data. Note that this is in general true for the single pinhole confocal microscope as well as the slit confocal microscope when looking for an in-focus image signal that is much smaller than the residual out-of-focus image signals.

Although it is easier to accurately digitize the signal from a CCD detector than from a PMT (J. B. Pawley, "Fundamental and Practical Limits in Confocal Light Microscopy," *Scanning* 13, 184–198, 1991), the PMT is a single device that can be accurately characterized, whereas the CCD is actually a large array of discrete detectors and additional noise is associated with correcting for the pixel-to-pixel variations in sensitivity and offset that characterize its operation (Y. Hiraoka, et al., ibid.; J. E. Wampler and K. Kutz, "Quantitative Fluorescence Microscopy Using Photomultiplier Tubes and Imaging Detectors," *Methods Cell Biol.* 29, 239–267, 1989; Z. Jericevic, B. Wiese, J. Bryan, and L. C. Smith, "Validation of an Imaging System: Steps to Evaluate and Validate a Microscope Imaging System for Quantitative Studies," *Methods Cell Biol.* 30, 47–83, 1989).

It should be noted that the above distinction between the photodetectors used in the two methods of three-dimensional microscopy should not be considered to be complete, because the cooled CCD detector is the most suitable photodetector for those confocal microscopes that accomplish the scanning function by using holes in a spinning disk (Petran, et al., ibid.; Xiao, et al., ibid.).

Another technique known as "optical coherence-domain reflectometry" (OCDR) has been used to obtain information about the three-dimensional properties of a system. This method is described in the following articles: (1) "Optical Coherence-Domain Reflectometry: A New Optical Evaluation Technique," by R. C. Youngquist, S. Carr, and D. E. N. Davies, *Opt. Lett.* 12(3), 158–160 (1987); (2) "New Measurement System for Fault Location in Optical Waveguide Devices Based on an Interferometric Technique," K. Takada, I. Yokohama, K. Chida, and J. Noda, *Appl. Opt.* 26(9), pp. 1603–1606 (1987); (3) "Guided-Wave Reflectometry with Micrometer Resolution," B. L. Danielson and C. D. Whittenberg, *Appl. Opt.* 26(14), 2836–2842 (1987). The OCDR method differs from the coherent optical time domain reflectometry (OTDR) technique in that instead of a pulsed light source one uses a broadband continuous-wave source with a short coherence length. The source beam enters an interferometer in which one arm has a movable mirror, with the reflected light from this mirror providing a reference beam, and the other arm contains the optical system being tested. The interference signal in the coherently mixed reflected light from the two arms is detected by the usual heterodyne method and yields the desired information about the optical system.

The heterodyne detection of the backscattered signals in the OCDR technique is accomplished by the method of "white-light interferometry," in which the beam is split into the two arms of an interferometer, reflected by the adjustable mirror and the backscattering site, and coherently recombined. This method utilizes the fact that interference fringes will appear in the recombined beam only when the difference in the optical path length between the two arms is less than the coherence length of the beam. The OCDR systems described in references (1) and (3) above make use of this principle, and reference (3) shows interferograms of fiber gaps in test systems obtained by scanning the adjustable mirror and measuring the strength of the recombined signal. Reference (1) also describes a modified method in which the mirror in the reference arm oscillates at a controlled frequency and amplitude, causing a Doppler shift in the reference signal, and the recombined signal is fed into a filtering circuit to detect the beat frequency signal.

Another variation of this technique is illustrated in reference (2), in which the reference arm mirror is at a fixed position and the difference in optical path lengths in the two arms may exceed the coherence length. The combined signal is then introduced into a second Michelson interferometer with two mirrors, one fixed in position and the other being moveable. This moveable mirror is scanned and the difference in path length between the arms of the second interferometer compensates for the delay between the backscattered and reference signals at discrete positions of the moveable mirror corresponding to the scattering sites. In practice, an oscillating phase variation at a definite frequency is imposed on the signal from the backscattering site by means of a piezoelectric transducer modulator in the fiber leading to this site. The output signal from the second Michelson interferometer is fed to a lock-in amplifier, which detects the beat frequency signal arising from both the piezoelectric transducer modulation and the Doppler shift caused by the motion of the scanning mirror. This technique has been used to measure irregularities in glass waveguides with a resolution as short as 15 $\mu$m ["Characterization of Silica-Based Waveguides with a Interferometric Optical Time-Domain Reflectometry System Using a 1.3-$\mu$m-Wavelength Superluminescent Diode," K. Takada, N. Takato, J. Noda, and Y. Noguchi, *Opt. Lett.* 14(13), 706–708 (1989)].

Another variation of the OCDR is the dual-beam partial coherence interferometer (PCI) which has been used to measure the thickness of fundus layers in the eye ["Measurement of the Thickness of Fundus Layers by Partial Coherence Tomography," by W. Drexler, C. K. Hitzenberger, H. Sattmann, and A. F. Fercher, *Opt. Eng.* 34(3), 701–710 (1995)]. In the PCI used by Drexler, et al., an external Michelson interferometer splits a light beam of high spatial coherence but very short coherence length of 15 $\mu$m into two parts: the reference beam (1) and the measurement beam (2). At the interferometer exit, these two components are combined again to form a coaxial dual beam. The two beam components, which have a path difference of twice the interferometer arm length difference, illuminate the eye and are reflected at several intraocular interfaces, which separate media of different refractive index. Therefore each beam component (1 and 2) is further split into subcomponents by reflection at these interfaces. The reflected subcomponents are superimposed on a photodetector. If the optical distance between two boundaries within the eye equals twice the interferometer arm length difference, there are two subcomponents that will travel over the same total path length and will consequently interfere. Each value of the interferometer arm length difference where an interference pattern is observed, is equal to an intraocular optical distance. Provided that there is no other strong reflection nearby, the absolute position of these interfaces can be determined in vivo with a precision of 5 $\mu$m. However, the PCI suffers from limitations due to motion of the object during the time required for the 3-D scanning.

Another variation of the OCDR called optical coherent tomography (OCT) has been reported for in vivo retinal imaging by E. A. Swanson, J. A. Izatt, M. R. Hee, D. Huang, C. P. Lin, J. S. Schuman, C. A. Puliafito, and J. G. Fujimoto, "In Vivo Retinal Imaging by Optical Coherence Tomography," *Opt. Lett.* 18(21), 1864–1866 (1993), and E. A. Swanson, D. Huang, J. G. Fujimoto, C. A Puliafito, C. P. Lin, and J. S. Schuman, "Method and Apparatus for Optical Imaging with Means for Controlling the Longitudinal Range of the Sample," U.S. Pat. No. 5,321,501, issued Jun. 14, 1994. The above referenced patent describes a method and apparatus for performing optical imaging on a sample wherein longitudinal scanning or positioning in the sample is provided by either varying relative optical path lengths for an optical path leading to the sample and to a reference reflector, or by varying an optical characteristic of the output from an optical source applied to the apparatus. Transverse scanning in one or two-dimensions is provided on the sample by providing controlled relative movement between the sample and a probe module in such direction and/or by steering optical radiation in the probe module to a selected transverse position. The reported spatial resolution is <20 $\mu$m with a high sensitive (100 dB dynamic range). However the OTC suffers from limitations due to motion of the object during the time required for the three-dimensional scanning.

Optical interferometric profilers are widely used for three-dimensional profiling of surfaces when noncontact methods are required. These profilers typically use phase-shifting interferometric (PSI) techniques and are fast, accurate, and repeatable, but suffer from the requirement that the surface be smooth relative to the mean wavelength of the light source. Surface discontinuities greater than a quarter-wavelength (typically 150 nm) cannot be unambiguously resolved with a single-wavelength measurement because of the cyclic nature of the interference. Multiwavelength measurements can extend this range, but the constraints imposed on wavelength accuracy and environmental stability can be severe (U.S. Pat. No. 4,340,306 issued Jul. 20, 1982 to N. Balasubramanian entitled "Optical System for Surface Topography Measurement.")

Profilers based on scanning white-light interferometry (SWLI) overcome many of the limitations of conventional PSI profilers for the measurement of rough or discontinuous surfaces. A number of articles describe this technique in detail [cf. Refs. 2–7 in L. Deck and P. de Groot, *Appl. Opt.* 33(31), 7334–7338 (1994)]. Typically these profilers record the position of a contrast reference feature (i.e., peak contrast or peak fit) for each point in the field of view while axially translating one arm of an equal-path interferometer illuminated with a broadband source. A common problem with this technique is the enormous amount of computation required for calculating the contrast for each point in real time. Often the contrast calculation alone is insufficiently precise because of the discrete sampling interval, forcing either an increase in the sampling density or incorporating an interpolation technique, both of which further slow the acquisition process. The Coherence Probe Microscope (CPM) is an example of this class of profiler [U.S. Pat. No. 4,818,110 issued Apr. 4, 1989 to M. Davidson entitled "Method and Apparatus of Using a Two Beam Interference Microscope for Inspection of Integrated Circuits and the Like"; M. Davidson, K. Kaufman, I. Mazor, and F. Cohen, "An Application of Interference Microscope to Integrated Circuit Inspection and Metrology," *SPIE*, 775, 233–247 (1987); U.S. Pat. No. 5,112,129 issued May 12, 1992 to M. Davidson, K. Kaufman, and I. Mazor entitled "Method of Image Enhancement for the Coherence Probe Microscope with Applications to Integrated Circuit Metrology."]. Profilers in general and the CPM in particular are not able to work with three-dimensional objects, have the background typical of a conventional interference microscopy, are sensitive to vibrations, and require computer intensive analysis.

Profilers based on triangulation also overcome many of the limitations of conventional PSI profilers but suffer from reduced height and lateral space resolution and have a large background form out-of-images. An application of this technique is found in the paper entitled "Parallel Three-Dimensional Sensing by Color-Coded Triangulation" by G. Hausler and D. Ritter, *Appl. Opt.*, 32(35), 7164–7169 (1993). The method used by Häusler and Ritter, ibid., is based on the following principle: a color spectrum of a white-light source is imaged onto the object by illumination from one certain direction. The object is observed by a color TV camera from a direction of observation which is different from the direction of illumination. The color (hue) of each pixel is a measure of its distance from a reference plane. The distance can be evaluated by the three(red-green-blue) output channels of a charge coupled device (CCD) camera and this evaluation can be implemented within TV real time. However, the resolution in height and in one lateral spatial dimension is considerably reduced below that achieved with PSI and SWLI, there is a large background, and the triangulation profiler has the noise characteristics of non-interferometric measurement techniques. In addition, the triangulation profiler is limited to surface profiling.

One of the problems encountered in white-light interferometry (WLI) is the problem of phase ambiguities. A profilometry method that has been received attention with respect to the phase ambiguity problem is the dispersive interferometric profilometer (DIP) proposed by J. Schwider and L. Zhou in a paper entitled "Dispersive Interferometric Profilometer," *Opt. Lett.* 19(13), 995–997 (1994). A similar approach for WLI has also been reported by U. Schnell, E. Zimmermann, and R. Dandliker in an article entitled "Absolute Distance Measurement With Synchronously Sampled White-Light Channelled Spectrum Interferometry," *Pure Appl. Opt.* 4, 643–651 (1995).

In general, the phase ambiguity problem can be completely avoided with the use of DIP. In the DIP apparatus, a parallel beam of a white-light source perpendicularly impinges upon the real wedge of a Fizeau interferometer in front of an apochromatic microscope objective. The Fizeau interferometer is formed by the inner surface of the reference plate and the object surface. Then the light is reflected back onto the slit of a grating spectrometer, which disperses the so far invisible fringe pattern and projects the spectrum onto a linear array detector. On the detector each point of the surface selected by the slit of the spectrometer furnishes a dispersed spectrum of the air gap in the Fizeau interferometer. The fringe patterns can be evaluated by use of Fourier-transform and filtering methods to obtain the phase information from the intensity distribution of a wedge-type interferogram.

Although the phase ambiguity problem can be avoided with the use of DIP, DIP is not suitable in applications requiring the examination of three-dimensional objects. This is a consequence of the intrinsic relatively large background produced in DIP from out-of-focus images. The background problem is comparable to the background problem faced when trying to produce three-dimensional images using standard interference microscopy.

An apparatus and method for making spectrally-resolved measurements of light reflected, emitted or scattered from a specimen was disclosed by A. E. Dixon, S. Damaskinos, and J. W. Bowron in U.S. Pat. No. 5,192,980 issued Mar. 9, 1993 and entitled "Apparatus and Method for Spatially- and Spectrally-Resolved Measurements". In one set of embodiments of the apparatus and method of Dixon et al., properties of a specimen are characterized in terms of the intensity of light reflected, emitted or scattered from the specimen wherein the apparatus and method are comprised of non interferometric, non confocal type with a dispersive element preceding the detector. This set of embodiments of Dixon et al. have a large background from out-of-focus images intrinsic to the standard microscope, the set of embodiments being of the non confocal type.

The apparatus and method of Dixon et al. also includes a non interferometric confocal embodiment which permits measurements with reduced background. However the limitation to making intensity measurements for the confocal embodiment as well as for the non confocal embodiments, a consequence of using a non interferometric technique, poses serious limitations on the information about the specimen that can be acquired from reflected or scattered light. Intensity measurements yield information about the square of the magnitude of an amplitude of light reflected or scattered by the specimen with the consequence that information about the phase of the amplitude of reflected or scattered light is lost. The apparatus and method of Dixon et al. further includes an embodiment which incorporates a Fourier Transform spectrometer in a non confocal imaging system. The Fourier Transform spectrometer embodiment of Dixon et al. has the disadvantage of a large background from out-of-focus images intrinsic to nonconfocal imaging systems.

Apparatus for making simultaneous multiple wavelength measurements with a non-interferometric, confocal imaging system has been disclosed by G. Xiao in U.S. Pat. No. 5,537,247 issued July 1996 and entitled "Single Aperture Confocal Imaging System". The apparatus of Xiao is comprised of a confocal scanning imaging system which utilizes only one aperture for both the incident light from the light source and return light from the object and a series of beam splitters and optical wavelength filters to selectively direct return light of differing wavelengths to a series of detectors, respectively. The Xiao apparatus has an advantage of making simultaneous measurements at different wavelengths and the merits of a confocal imaging system with respect to reduced background from out-of-focus images. However the limitation to making intensity measurements, a consequence of using a non interferometric technique, poses serious limitations on the information about the specimen that can be acquired from reflected or scattered light. Intensity measurements yield information about the square of the magnitude of an amplitude of light reflected or scattered by the specimen with the consequence that information about the phase of the amplitude of reflected or scattered light is lost.

It was pointed out in a paper by G. Q. Xiao, T. R. Corle, and G. S. Kino entitled "Real-time Confocal Scanning Optical Microscope," *Appl. Phys. Lett.*, 53(8), 716–718 (1988) that when using white light in a confocal microscope, the chromatic aberrations of the objective lens ensures that images from different heights in the specimen are all present and all in focus but at different colors. Xiao et al. demonstrated this by producing images of a silicon integrated circuit at four different wavelengths. H. J. Tiziani and H.-M. Uhde described in a paper entitled "Three-Dimensional Image Sensing by Chromatic Confocal Microscopy," *Appl. Opt.*, 33(10), 1838–1843 (1994) a white light, non interferometric, confocal microscope in which chromatic aberration was deliberately introduced into the microscope objective for the purpose of obtaining height information without physically scanning the object. A camera with black-and-white film sequentially combines, with three selected chromatic filters, intensity and tone of color of each object point. Although confocal microscopes are used in both of the works described by Xiao et al. and Tiziani and Uhde and therefore have reduced background from out-of-focus images, they are limited to making intensity measurements. The limitation to making intensity measurements, a direct consequence of using a non interferometric technique, poses serious limitations on the information about the specimen that can be acquired from reflected or scattered light as noted in reference to the patents by Dixon et al. and Xiao.

An interference microscope has been described in papers by G. S. Kino and S. C. Chim, "Mirau Correlation Microscope," *Appl. Opt.*, 26(26), 3775–3783 (1990) and S. S. C. Chim and G. S. Kino, "Three-Dimensional Image Realization in Interference Microscopy," *Appl. Opt.*, 31(14), 2550–2553 (1992) which is based on a Mirau interferometer configuration. The apparatus of Kino and Chim employs an interferometric, non confocal microscope with a spatially and temporally incoherent light source and uses as the detected output the correlation signal between the beams reflected from the object and from a mirror, respectively. It is possible with the apparatus of Kino and Chim to measure both amplitude and phase of the beam reflected from the object. However, the interferometric apparatus of Kino and Chim has the disadvantage of a serious background problem, the level of background from out-of-focus images being typical of that found in a standard interference, nonconfocal microscopy system.

An interferometric apparatus has been disclosed by A. Knüttel in U.S. Pat. No. 5,565,986 issued Oct. 15, 1996 and entitled "Stationary Optical Spectroscopic Imaging in Turbid Objects by Special Light Focusing and Signal Detection of Light with Various Optical Wavelengths" to obtain a spectroscopic image of an object, displaying both spatial resolution in a lateral direction and a field of view in a depth direction. The apparatus described by Knuttel has a nonconfocal imaging system and typically includes a dispersive optical element in an arm of an interferometer and a chromatic object lens. The dispersive element makes it possible to record information about the scattered light amplitude at different optical wavelengths, the use of an interferometer makes it possible to record information about the magnitude and phase of the amplitude of reflected or scattered light, and the use of a chromatic object lens makes it possible to record information about a field of view in a depth direction. However, the interferometric apparatus of Knüttel has a serious background problem, the level of the background being typical of that found in a standard interference, nonconfocal microscopy system.

One of the primary objectives of an embodiment of the apparatus of Knüttel was to be able to image simultaneously two regions of an object separated in a depth dimension by using two different orders of a chromatic object lens comprised in part of a zone plate. As a consequence, the signals recorded by the detector of this embodiment are comprised of superimposed images from the two separated depth positions in the object. Therefore, in addition to the presence of a high background from out-of-focus images as previously noted, a complex inversion calculation must be performed by the computer to extract the image for a given depth from the superimposed in focus images. There is a serious problem encountered with the type of inversion calculation required for superimposed images as acquired with the referenced embodiment of Knüttel: the results of the inversion calculations are relatively accurate near the surface of the object but rapidly degrade as the depth in the sample increases. This problem is generally not encountered in inversion calculations where there is only one point of the object in-focus at the detector.

The above cited background problem encountered in interference microscopy is reduced in an interference version of the confocal microscope described by D. K. Hamilton and C. J. R. Sheppard in an article entitled "A Confocal Interference Microscope", *Optica Acta*, 29(12), 1573–1577 (1982). The system is based on the confocal microscope in which the object is scanned relative to a focused laser spot, the laser spot being arranged to coincide with the back-projected image of a point detector. An interference form of the reflection confocal microscope is based on a Michelson interferometer in which one beam is focused onto the object. This system has the important property of a reduced background from out-of-focus images intrinsic to confocal microscopy systems. However, the confocal interference microscope of Hamilton and Sheppard, ibid., measures the reflected signal at only one point at a time in a three-dimensional object. The scanning of the object one point at a time also makes the system sensitive to sample motion unrelated to the scan during the required data acquisition.

A major component that is important in the effective utilization of high-performance computers is memory. Because of the huge data storage requirements of these instruments, compact, low-cost, very high-capacity, high-speed memory devices are needed to handle the high data volume afforded by parallel computing. Such data storage requirements may be provided by a three-dimensional memory.

In a two-dimensional memory, the maximum theoretical storage density (proportional to $1/\lambda^2$) is of the order of $3.5 \times 10^8$ bits/cm$^2$ for $\lambda=532$ nm, whereas in a three-dimensional memory the maximum storage density is of the order of $6.5 \times 10^{12}$ bits/cm$^3$. These maximum values represent upper limits to the storage capacity when using a single bit binary format at each memory site. These upper limits can be increased by using a recording medium where different levels of amplitude or amplitude and phase information are recorded. Holographic recording in phase-recording media is an example of the latter mode.

In the different modes of recording, the mode of single bit binary format, amplitude in base N format or amplitude and phase in (base N)×(base M) format, at each memory site, the size of a voxel at a memory site that can be used, and therefore storage density, is limited by the signal-to-noise ratio that can be obtained, the signal-to-noise ratio generally being inversely proportional to the volume of the voxel. In particular, for the amplitude or amplitude and phase recording modes, the number of independent pieces of information that can be stored in a voxel is also limited by the signal-to-noise ratio that can be obtained.

What is needed is a system that combines a sensitivity of image data to out-of-focus images that is reduced below that inherent in prior art confocal and confocal interference microscopy, the reduced sensitivity of the image data to out-of-focus images being with respect to both systematic and statistical errors; a reduced requirement of computer deconvolutions associated with reduced sensitivity to out-of-focus images; the potential for high signal-to-noise ratios intrinsic to confocal interference microscopy systems; capacity to record in parallel the data for an axial or transverse direction; and the potential to measure the complex amplitude of the scattered and/or the reflected light beam.

SUMMARY OF THE INVENTION

Accordingly, it is an object of the invention to furnish method and apparatus for reading information from locations at different depths within an optical disk.

It is an object of the invention to furnish method and apparatus for reading information from locations at multiple depths within an optical disk.

It is an object of the invention to furnish method and apparatus for reading information simultaneously from locations at multiple depths within an optical disk.

It is an object of the invention to furnish method and apparatus for reading information from locations at multiple tracks on or within an optical disk.

It is an object of the invention to furnish method and apparatus for reading information simultaneously from locations at multiple tracks on or within an optical disk.

It is an object of the invention to furnish method and apparatus for reading information simultaneously from locations at multiple tracks and multiple locations on the tracks on or within an optical disk.

It is an object of the invention to furnish method and apparatus for reading information simultaneously from locations at multiple depths and multiple tracks within an optical disk.

It is an object of the invention to furnish method and apparatus for writing information to locations at multiple depths within an optical disk.

It is an object of the invention to furnish method and apparatus for writing information simultaneously to locations at multiple depths within an optical disk.

It is an object of the invention to furnish method and apparatus for writing information to locations at multiple tracks on or within an optical disk.

It is an object of the invention to furnish method and apparatus for writing information simultaneously to locations at multiple tracks on or within an optical disk.

It is an object of the invention to furnish method and apparatus for writing information simultaneously to locations at multiple depths and multiple tracks within an optical disk.

It is an object of the invention to furnish method and apparatus for writing information to locations at multiple depths within an optical disk with a higher density.

It is an object of the invention to furnish method and apparatus for writing information simultaneously to locations at multiple depths within an optical disk with a higher density.

It is an object of the invention to furnish method and apparatus for writing information to locations at multiple tracks on or within an optical disk with a higher density.

It is an object of the invention to furnish method and apparatus for writing information simultaneously to locations at multiple tracks on or within an optical disk with a higher density.

It is an object of the invention to furnish method and apparatus for writing information simultaneously to locations at multiple depths and multiple tracks within an optical disk with a higher density.

It is an object of the invention to provide rapid, reliable one-dimensional, two-dimensional, and three-dimensional tomographic complex amplitude imaging.

It is an object of the invention to provide an improved tomographic complex amplitude imaging technique that avoids the shortcomings of the above described prior art.

It is another object of the invention to provide a tomographic complex amplitude imaging technique that conveniently reduces or eliminates the statistical error effects of light from out-of-focus image points.

It is another object of the invention to provide an improved technique for tomographic complex amplitude imaging wherein systematic error effects of out-of-focus light images are greatly reduced or eliminated.

It is another object of the invention to provide a tomographic complex amplitude imaging technique that allows substantially simultaneous imaging of an object at multiple image points.

It is another object of the invention to provide a convenient technique for tomographic complex amplitude imaging in one, two, and three dimensions with the means to obtain a signal-to-noise ratio for the images that is achievable with an interferometric system.

It is another object of the invention to provide a tomographic complex amplitude imaging system and technique which avoids the computation difficulties of solving nonlinear differential equations.

It is another object of the invention to provide a convenient technique for tomographic complex amplitude imaging of a line section or two-dimensional section in an object despite movement thereof.

The embodiments and variants thereof described hereinafter fall into five groups of embodiments.

Certain ones of the embodiments and variants thereof of the first group of embodiments generate one-dimensional images that are substantially orthogonal to the one-dimensional images generated by corresponding ones of embodiments and variants thereof of the second group of embodiments, information in the one-dimensional images being acquired simultaneously with background reduction and compensation. Certain other ones of the embodiments of the first group of embodiments generate two-dimensional images that are substantially orthogonal to the two-dimensional images generated by corresponding ones of the embodiments and variants thereof of the second group of embodiments, information in the two-dimensional images being acquired simultaneously with background reduction and compensation.

Certain ones of the embodiments and variants thereof of the third group of embodiments generate one-dimensional images that are substantially orthogonal to the one-dimensional images generated by corresponding ones of embodiments and variants thereof of the fourth group of embodiments, information in the one-dimensional images being acquired simultaneously without background reduction and compensation. Certain other ones of the embodiments and variants thereof of the third group of embodiments generate two-dimensional images that are substantially orthogonal to the two-dimensional images generated by corresponding ones of the embodiments and variants thereof of the fourth group of embodiments, information in the two-dimensional images being acquired simultaneously without background reduction and compensation.

The embodiments and variants thereof of the fifth group of embodiments generate multi-dimensional images as a sequence of single point images, the single points images being acquired with background reduction and compensation.

Briefly described, and in accordance with one embodiment thereof, I provide a method and apparatus from the first group of embodiments for discriminating the complex amplitude of an in-focus image from the complex amplitude of an out-of-focus image by focusing optical radiation from a broadband spatially incoherent point source onto a source pinhole. Rays emanating from the source pinhole are collimated and directed to a first phase shifter. The phase of a first portion of the collimated rays is shifted by the phase shifter to produce a first quantity of phase-shifted rays, and the phase of a second portion of the collimated rays is shifted by the phase shifter to produce a second quantity of phase-shifted rays. The first and second quantities of phase-shifted rays are focused to a first spot.

Rays of the first quantity of phase-shifted rays emanating from the first spot are collimated and directed to a beam splitter. A first portion of the collimated rays passes through the beam splitter to form a first quantity of a probe beam and a second portion of the collimated rays is reflected by the beam splitter to form a first quantity of a reference beam. Rays of the second quantity of phase-shifted rays emanating from the first spot are collimated and directed to the beam splitter. A first portion of the collimated rays passes through the beam splitter to form a second quantity of the probe beam and a second portion of the collimated rays is reflected by the beam splitter to form a second quantity of the reference beam.

The rays of the first and second quantities of the probe beam are directed to a second phase-shifter. The rays of the first quantity of the probe beam are phase shifted to form a third quantity of the probe beam and rays of the second quantity of the probe beam are phase shifted to form a fourth quantity of the probe beam, the net phase shifts produced by the first and second phase shifters for the third and fourth quantities of the probe beam being the same. The third and fourth quantities of the probe beam are focused by a first probe lens to form a line image in an object material to thereby illuminate the object material. The line image is aligned proximally along the optical axis of the first probe lens and the length of the line image along the optical axis is determined by a combination of factors such as the depth of focus and chromatic aberration of the first probe lens which can be adjusted and the optical bandwidth of the source.

Rays of the first and second quantities of the reference beam are directed to a third phase-shifter. Rays of the first quantity of the reference beam are phase shifted to form a third quantity of the reference beam and rays of the second quantity of the reference beam are phase shifted to form a fourth quantity of the reference beam, the net phase shifts produced by the first and third phase shifters for the third and fourth quantities of the reference beam being the same. The third and fourth quantities of the reference beam are focused by a reference lens onto a spot on a reference mirror.

Reflected and/or scattered rays of the third and fourth quantities of the probe beam emanating from the illuminated object in the direction of the probe lens form a scattered probe beam and are collimated and directed by the probe lens to the second phase shifter. The phase of a first portion of the collimated rays is shifted to produce a first scattered probe beam quantity of phase-shifted rays, and the phase of a second portion of the collimated rays is shifted to produce a second scattered probe beam quantity of phase-shifted rays. Rays of the first and second scattered probe beam quantities are directed to the beam splitter. A portion of the first and a portion of the second scattered probe beam quantities are reflected by the beam splitter to form third and fourth quantities of the scattered probe beam, respectively. The collimated rays of the third and fourth quantities of the scattered probe beam are focused by a spatial filter lens onto a spatial filter pinhole.

Reflected rays emanating from the spot on the reference mirror in the direction of the reference lens form a reflected reference beam and are collimated and directed by the reference lens to the third phase shifter. The phase of a first portion of the collimated rays is shifted to produce a first reflected reference beam quantity of phase-shifted rays and the phase of a second portion of the collimated rays is shifted to produce a second reflected reference beam quantity of phase-shifted rays. Rays of the first and second reflected reference beam quantities are directed to the beam splitter. A portion of the first and second reflected reference beam quantities are transmitted by the beam splitter to form third and fourth quantities of the reflected reference beam, respectively. Collimated rays of the third and fourth quantities of the reflected reference beam are focused by the spatial filter lens onto the spatial filter pinhole.

A portion of the third and a portion of the fourth quantities of the scattered probe beam pass through the spatial filter pinhole to form spatially-filtered third and fourth quantities of scattered probe beam, respectively. The spatially-filtered third and fourth quantities of scattered probe beam are collimated and directed by a dispersive element lens to a dispersive element, preferably a reflecting diffraction grating.

A portion of the third and a portion of the fourth quantities of the reflected reference beam pass through the spatial filter pinhole to form spatially-filtered third and fourth quantities of reflected reference beam, respectively. The spatially-filtered third and fourth quantities of reflected reference beam are collimated and directed by the dispersive element lens to the dispersive element.

A portion of each of the spatially-filtered third and fourth quantities of scattered probe beam emanating from the dispersive element passes through a detector lens to form wavenumber-filtered, spatially-filtered third and fourth quantities of scattered probe beam, respectively. The wavenumber-filtered, spatially-filtered third and fourth quantities of scattered probe beam are focused by the detector lens to form a line image on a plane containing a linear array of detector pinholes. A portion of each of the spatially-filtered third and fourth quantities of reflected reference beam emanating from the dispersive element passes through the detector lens to form wavenumber-filtered, spatially-filtered third and fourth quantities of reflected reference beam, respectively. The wavenumber-filtered, spatially-filtered third and fourth quantities of reflected reference beam are focused by the detector lens to form a line image of wavenumber-filtered, spatially-filtered third and fourth quantities of reflected reference beam on the plane containing the linear array of pinholes.

Intensities of portions of superimposed wavenumber-filtered, spatially-filtered third and fourth quantities of scattered probe beam and the wavenumber-filtered, spatially-filtered third and fourth quantities of reflected reference beam transmitted by the detector pinholes are measured by a multi-pixel detector comprised of a linear array of pixels as a first array of measured intensity values. The phases of the wavenumber-filtered, spatially-filtered third and fourth quantities of reflected reference beam are shifted by $\pi$ radians by a fourth phase shifter to form a first phase-shifted, wavenumber-filtered, spatially-filtered third and fourth quantities of reflected reference beam. Intensities of portions of superimposed wavenumber-filtered, spatially-filtered third and fourth quantities of scattered probe beam and the first phase-shifted, wavenumber-filtered, spatially-filtered third and fourth quantities of reflected reference beam transmitted by the detector pinholes are measured by the multi-pixel detector as a second array of measured intensity values.

The phases of the wavenumber-filtered, spatially-filtered third and fourth quantities of reflected reference beam are shifted by an additional $-\pi/2$ radians by the fourth phase shifter to form a second phased-shifted, wavenumber-filtered, spatially-filtered third and fourth quantities of reflected reference beam, respectively. Intensities of portions of superimposed wavenumber-filtered, spatially-filtered third and fourth quantities of scattered probe beam and the second phase-shifted, wavenumber-filtered, spatially-filtered third and fourth quantities of reflected reference beam transmitted by the detector pinholes are measured by the multi-pixel detector as a third array of measured intensity values.

The phases of the wavenumber-filtered, spatially-filtered third and fourth quantities of reflected reference beam are shifted by an additional π radians by the fourth phase shifter to form a third phase-shifted, wavenumber-filtered, spatially-filtered third and fourth quantities of reflected reference beam, respectively. Intensities of portions of superimposed wavenumber-filtered, spatially-filtered third and fourth quantities of scattered probe beam and the third phase-shifted, wavenumber-filtered, spatially-filtered third and fourth quantities of reflected reference beam transmitted by the detector pinholes are measured by the multi-pixel detector as a fourth array of measured intensity values.

In a next step, the first, second, third, and fourth arrays of measured intensity values are sent to a computer for processing. Elements of the second array of measured intensity values are subtracted from the corresponding elements of the first array of measured intensity values by the computer to yield a measurement of a first array of component values of a complex amplitude of the scattered probe beam that is in focus at the plane of the detector pinholes with the effects of light from out-of-focus images substantially canceled out. Elements of the fourth array of measured intensity values are subtracted from the corresponding elements of the third array of measured intensity values by the computer to yield a measurement of a second array of component values of the complex amplitude of the scattered probe beam that is in focus at the plane of the detector pinholes with the effects of light from out-of-focus images substantially canceled out.

The first and second arrays of component values of the amplitude of the scattered probe beam are values of orthogonal components and as such, give within a complex constant an accurate measurement of the complex amplitude of the scattered probe beam that is in-focus in the plane of the detector pinholes with the effects of light from out-of-focus images substantially canceled out. Using the computer and computer algorithms known to those skilled in the art, an accurate one-dimensional representation of a line section of the object material is obtained with no scanning of the object material required. The direction of the line section is in the direction of the optical axis of the probe lens. The line section may cut through one or more surfaces of the object material or lie in a surface of the object material. Using the computer and computer algorithms known to those skilled in the art, accurate two-dimensional and three-dimensional representations of the object material are obtained from two-dimensional and three-dimensional arrays, respectively, of the first, second, third, and fourth arrays of measured intensity values acquired through scanning of the object material in one and two dimensions, respectively. The two-dimensional and three-dimensional representations of the object material may include one or more surfaces of the object material. The scanning of the object material is achieved by systematically moving the object material in one and two dimensions, respectively, with a translator which is controlled by the computer. The computer algorithms may include computer deconvolutions and integral equation inversion techniques which are known to those skilled in the art should correction for out-of-focus images be desired beyond the compensation achieved in the first and second arrays of component values of the amplitude of the scattered probe beam by the apparatus of the present invention.

In accordance with a second embodiment thereof, I provide a method and apparatus for discriminating the complex amplitude of an in-focus image from the complex amplitude of an out-of-focus image by imaging optical radiation from a broadband, spatially extended, spatially incoherent line source onto a linear array of source pinholes comprising the apparatus and electronic processing means of the previously described embodiment wherein the source pinhole of the first embodiment has been replaced by the linear array of source pinholes, the spatial filter pinhole of the first embodiment has been replaced by a linear array of spatial filter pinholes, and the linear array of detector pinholes and the multi-pixel detector of the first embodiment have been replaced by a two-dimensional array of detector pinholes and a multi-pixel detector comprised of a two-dimensional array of pixels, respectively. The directions of the linear array of source pinholes and the linear array of spatial filter pinholes are perpendicular to the plane defined by the dispersive element. The two-dimensional arrays of detector pinholes and detector pixels are orientated with the image of the linear array of source pinholes in the in-focus plane at the multi-pixel detector.

Elements of measured arrays of first and second component values of amplitude of wavenumber-filtered, spatially-filtered scattered probe beam are values of orthogonal components and as such, give within a complex constant an accurate measurement of the complex amplitude of the scattered probe beam that is in-focus at the plane of the two-dimensional linear array of detector pinholes with the effects of light from out-of-focus images substantially canceled out. Using computer algorithms known to those skilled in the art, an accurate two-dimensional representation of a two-dimensional section of the object material is obtained with substantially no scanning required. The two-dimensional section is selected by the respective orientations of the linear array of source pinholes and of the optical axis of the probe lens. The two-dimensional section may cut through one or more surfaces of the object material or lie in a surface of the object material. Using computer algorithms known to those skilled in the art, accurate three-dimensional representations of the object are obtained from three-dimensional arrays of the first, second, third, and fourth intensity values acquired through scanning of the object in substantially one dimension. The three-dimensional representation of the object material may include representations of one or more surfaces of the object material. The computer algorithms may include computer deconvolutions and integral equation inversion techniques which are known to those skilled in the art should correction for out-of-focus images be desired beyond the compensation achieved in the first and second arrays of component values of the amplitude of the scattered probe beam by the apparatus of the present invention.

In accordance with a variant of the second embodiment thereof, I provide a method and apparatus for discriminating an in-focus image from an out-of-focus image by imaging optical radiation from a broadband spatially-extended, spatially-incoherent line source onto a source slit comprising the apparatus and electronic processing means of the previously described second embodiment where the linear array of source pinholes of the second embodiment has been replaced by the source slit and the linear array of spatial filter pinholes of the second embodiment has been replaced by a spatial filter slit. The directions of the source slit and the spatial filter slit are perpendicular to the plane defined by the dispersive element.

Elements of measured arrays of first and second component values of the amplitude of the wavenumber-filtered, spatially-filtered scattered probe beam are values of orthogonal components and as such, give within a complex constant an accurate measurement of the complex amplitude of the wavenumber-filtered, spatially-filtered scattered probe beam that is in-focus in the plane of the two-dimensional array of detector pinholes with the effects of light from out-of-focus images substantially canceled out. Using computer algorithms known to those skilled in the art, an accurate two-dimensional representation of a two-dimensional section of the object material is obtained with no scanning required. The two-dimensional section is selected by the respective orientations of the source slit and of the optical axis of the probe lens. Using the computer and computer algorithms known to those skilled in the art, accurate three-dimensional representations of the object material are obtained from three-dimensional arrays of the first, second, third, and fourth intensity values acquired through scanning of the object material in one-dimension. The scanning of the object material is achieved by systematically moving the object material in one dimension with a translator controlled by the computer. The computer algorithms may include computer deconvolutions and integral equation inversion techniques which are known to those skilled in the art should correction for out-of-focus images be desired beyond the compensation achieved by the apparatus of the present invention.

Alternative embodiments to the first and second preferred embodiments of the invention include the ability to improve and/or optimize the signal-to-noise ratio using additional optical means and substantially the same electronic processing means as are employed in the primary apparatus of the first and second preferred embodiments of the invention. The additional optical means comprises modified paths for the reference and probe beams whereby the amplitude of wavenumber-filtered, spatially-filtered reflected reference beam focused on a selected detector pinhole for either the first embodiment or the second embodiment can be adjusted relative to the amplitude of the wavenumber-filtered, spatially-filtered scattered probe beam imaged on the selected detector pinhole of either the first embodiment or the second embodiment, respectively.

In accordance with a third embodiment thereof, I provide a method and apparatus for discriminating the complex amplitude of an in-focus image from the complex amplitude of an out-of-focus image with means to adjust or improve and/or optimize the signal-to-noise ratio comprising the apparatus of the previously described first embodiment and an optical means to adjust the amplitude of a wavenumber-filtered, spatially-filtered reflected reference beam focused on a selected detector pinhole relative to the amplitude of a wavenumber-filtered, spatially-filtered scattered probe beam imaged on the selected detector pinhole. Rays from a broadband spatially incoherent point source are focused onto a source pinhole. Rays emanating from the source pinhole are collimated and directed to a first phase shifter. The phase of a first portion of the collimated rays is shifted to produce a first quantity of phase-shifted rays, and the phase of a second quantity of the collimated rays is shifted to produce a second quantity of phase-shifted rays.

The first and second quantities of phase-shifted rays impinge on a first beam splitter. A first portion of the first quantity of phase-shifted rays passes through the first beam splitter to form a first quantity of a probe beam and a second portion of the first quantity of phase shifted rays is reflected by the first beam splitter to form a first quantity of the reference beam. A first portion of the second quantity of phase-shifted rays passes through the first beam splitter to form a second quantity of the probe beam and a second portion of the second quantity of phase-shifted rays is reflected by the first beam splitter to form a second quantity of the reference beam. The first and second quantities of the probe beam are focused to a first probe beam spot. The first and second quantities of the reference beam are focused to a first reference beam spot.

Rays of the first quantity of the probe beam emanating from the first probe beam spot are collimated and directed to a second beam splitter. A portion of the collimated rays passes through the second beam splitter to form a third quantity of the probe beam. Rays of the second quantity of probe beam emanating from the first probe beam spot are collimated and directed to the second beam splitter. A portion of the collimated rays passes through the second beam splitter to form a fourth quantity of the probe beam. The rays of the third and fourth quantities of the probe beam are directed to a second phase shifter. The rays of the third quantity of the probe beam pass through the second phase shifter and are phase shifted to form a fifth quantity of the probe beam. The rays of the fourth quantity of the probe beam pass through the second phase shifter and are phase shifted to form a sixth quantity of the probe beam, the net phase shifts produced by the first and second phase shifters for the fifth and sixth quantities of the probe beam being the same.

Rays of the first quantity of the reference beam emanating from the first reference beam spot are collimated, directed to a third phase shifter, and emerge as a third quantity of the reference beam. Rays of the second quantity of the reference beam emanating from the first reference beam spot are collimated, directed to the third phase shifter, and emerge as a fourth quantity of the reference beam, the net phase shifts produced by the first and third phase shifters for the third and fourth quantities of the reference beam being the same. A portion of the third quantity of the reference beam is reflected by a third beam splitter to form a fifth quantity of the reference beam. A portion of the fourth quantity of the reference beam is reflected by the third beam splitter to form a sixth quantity of the reference beam. The collimated fifth and sixth quantities of the reference beam are focused by a reference lens onto a second reference beam spot on a reference mirror.

The collimated fifth and sixth quantities of the probe beam are focused by a probe lens to form a line image in an object material to thereby illuminate the object material. The line image is aligned proximally along the optical axis of the probe lens and the length of the line image along the optical axis is determined by a combination of factors such as the depth of focus and chromatic aberration of the probe lens and the optical bandwidth of the source.

Reflected and/or scattered rays of the fifth and sixth quantities of the probe beam emanating from the illuminated object in the direction of the probe lens form a scattered probe beam. The scattered probe beam is collimated by the probe lens and directed to the second phase shifter. The phase of a first portion of the collimated rays is shifted to produce a first scattered probe beam quantity of phase-shifted rays, and the phase of a second portion of the collimated rays is shifted to produce a second scattered probe beam quantity of phase-shifted rays. Rays of the first and second scattered probe beam quantities are directed to the second beam splitter. A portion of the first and second scattered probe beam quantities are reflected by the second beam splitter to form third and fourth quantities of the scattered probe beam, respectively. Collimated rays of the third and fourth quantities of the scattered probe beam are focused by a spatial filter lens onto a spatial filter pinhole.

Reflected rays emanating from the second reference beam spot on the reference mirror in the direction of the reference lens form a reflected reference beam and are collimated and directed by the reference lens to the third beam splitter. A portion of the reflected reference beam is transmitted by the third beam splitter and impinges on a fourth phase shifter.

The phase of a first portion of the transmitted beam is shifted to produce a first reflected reference beam quantity of phase-shifted rays and the phase of a second portion of the transmitted beam is shifted to produce a second reflected reference beam quantity of phase-shifted rays. Rays of the first and second reflected reference beam quantities are directed to the second beam splitter. A portion of the first and second reflected reference beam quantities are transmitted by the second beam splitter to form third and fourth quantities of the reflected reference beam, respectively. Collimated rays of the third and fourth quantities of the reflected reference beam are focused by the spatial filter lens onto the spatial filter pinhole.

A portion of each of the third and fourth quantities of the scattered probe beam passes through the spatial filter pinhole to form a spatially-filtered third and fourth quantities of scattered probe beam, respectively. The spatially-filtered third and fourth quantities of scattered probe beam are collimated and directed by a dispersion element lens to a dispersive element, preferably a reflecting diffraction grating.

A portion of each of the third and fourth quantities of the reflected reference beam passes through the spatial filter pinhole to form a spatially-filtered third and fourth quantities of reflected reference beam, respectively. The spatially-filtered third and fourth quantities of reflected reference beam are collimated and directed by the dispersion element lens to the dispersive element.

A portion of each of the spatially-filtered third and fourth quantities of scattered probe beam emanating from the dispersive element passes through a detector lens to form wavenumber-filtered, spatially-filtered third and fourth quantities of scattered probe beam, respectively. The wavenumber-filtered, spatially-filtered third and fourth quantities of scattered probe beam are focused by the detector lens to form a line image on a plane containing a linear array of detector pinholes. A portion of each of the spatially-filtered third and fourth quantities of reflected reference beam emanating from the dispersive element passes through the detector lens to form wavenumber-filtered, spatially-filtered third and fourth quantities of reflected reference beam, respectively. The wavenumber-filtered, spatially-filtered third and fourth quantities of reflected reference beam are focused by the detector lens to form a line image on the plane containing the linear array of detector pinholes.

Intensities of portions of superimposed wavenumber-filtered, spatially-filtered third and fourth quantities of scattered probe beam and the wavenumber-filtered, spatially-filtered third and fourth quantities of reflected reference beam transmitted by the detector pinholes are measured by a multi-pixel detector comprised of a linear array of pixels as a first array of measured intensity values. The phases of the wavenumber-filtered, spatially-filtered third and fourth quantities of reflected reference beam are shifted by $\pi$ radians by a fifth phase shifter to form a first phase-shifted, wavenumber-filtered, spatially-filtered third and fourth quantities of reflected reference beam. Intensities of portions of superimposed wavenumber-filtered, spatially-filtered third and fourth quantities of scattered probe beam and first phase-shifted, wavenumber-filtered, spatially-filtered third and fourth quantities of reference beam transmitted by the detector pinholes are measured by the multi-pixel detector as a second array of measured intensity values.

The phases of the wavenumber-filtered, spatially-filtered third and fourth quantities of reflected reference beam are shifted by an additional $-\pi/2$ radians by the fifth phase shifter to form a second phase-shifted, wavenumber-filtered, spatially-filtered third and fourth quantities of reflected reference beam, respectively. Intensities of portions of superimposed wavenumber-filtered, spatially-filtered third and fourth quantities of scattered probe beam and of the second phase-shifted, wavenumber-filtered, spatially-filtered third and fourth quantities of reflected reference beam transmitted by the detector pinholes are measured by the multi-pixel detector as a third array of measured intensity values.

The phases of the wavenumber-filtered, spatially-filtered third and fourth quantities of reflected reference beam are shifted by an additional $\pi$ radians by the fifth phase shifter to form a third phase-shifted, wavenumber-filtered, spatially-filtered third and fourth quantities of reflected reference beam, respectively. Intensities of portions of superimposed wavenumber-filtered, spatially-filtered third and fourth quantities scattered probe beam and third phase-shifted, wavenumber-filtered, spatially-filtered third and fourth quantities of reflected reference beam transmitted by the detector pinholes are measured by the multi-pixel detector as a fourth array of measured intensity values.

In a next step, the first, second, third, and fourth arrays of measured intensity values are sent to a computer for processing. Elements of the second array of measured intensity values are subtracted from the corresponding elements of the first array of measured intensity values by the computer to yield a measurement of a first array of component values of a complex amplitude of the scattered probe beam that is in focus at the plane of the detector pinholes with the effects of light from out-of-focus images substantially canceled out. Elements of the fourth array of measured intensity values are subtracted from the corresponding elements of the third array of measured intensity values by the computer to yield a measurement of a second array of component values of the complex amplitude of the scattered probe beam that is in focus at the plane of the detector pinholes with the effects of light from out-of-focus images substantially canceled out.

Elements of first and second arrays of component values of the amplitude of wavenumber-filtered, spatially-filtered scattered probe beam are values of orthogonal components and as such, give within a complex constant an accurate measurement of the complex amplitude of the scattered probe beam that is in-focus in the plane of the detector pinholes with the effects of light from out-of-focus images substantially canceled out. Using the computer and computer algorithms known to those skilled in the art, an accurate one-dimensional representation of a line section of the object material is obtained with no scanning of the object material required. The direction of the line section is in the direction of the optical axis of the probe lens. Using the computer and computer algorithms known to those skilled in the art, accurate two-dimensional and three-dimensional representations of the object material are obtained from two-dimensional and three-dimensional arrays, respectively, of the first, second, third, and fourth arrays of measured intensity values acquired through scanning of the object material in one and two dimensions, respectively. The scanning of the object material is achieved by systematically moving the object material in one and two dimensions, respectively, with a translator which is controlled by the computer. The computer algorithms may include computer deconvolutions and integral equation inversion techniques which are known to those skilled in the art should correction for out-of-focus images be desired beyond the compensation achieved in the first and second arrays of component values of the amplitude of the scattered probe beam by the apparatus of the present invention.

The signal-to-noise ratio can be adjusted or improved and/or optimized in the third embodiment with respect to measuring the desired complex amplitudes. The optimization is accomplished by adjusting the ratio of the amplitude of the wavenumber-filtered, spatially-filtered third and fourth quantities of the scattered probe beam focused on a selected detector pinhole and of the amplitude of the wavenumber-filtered, spatially-filtered third and fourth quantities of the reflected reference beam focused on the selected detector pinhole by altering the reflection-transmission properties of the first, second, and third beam splitters.

In accordance with a fourth embodiment thereof, I provide a method and apparatus for discriminating the complex amplitude of an in-focus image from the complex amplitude of an out-of-focus image with means to adjust or improve and/or optimize the signal-to-noise ratio by imaging optical radiation from a broadband, spatially extended, spatially incoherent line source onto a linear array of source pinholes comprising the apparatus and electronic processing means of the previously described third embodiment wherein the source pinhole of the third embodiment has been replaced by the linear array of source pinholes, the spatial filter pinhole of the third embodiment has been replaced by a linear array of spatial filter pinholes, and the linear array of detector pinholes and the multi-pixel detector of the third embodiment have been replaced by a two-dimensional array of detector pinholes and a multi-pixel detector comprised of a two-dimensional array of pixels, respectively. The directions of the linear array of source pinholes and of the linear array of spatial filter pinholes are perpendicular to the plane defined by the dispersive element. The two-dimensional linear arrays of detector pinholes and detector pixels are orientated with the image of the linear array of source pinholes in the in-focus plane at the multi-pixel detector.

Elements of measured arrays of first and second component values of amplitude of wavenumber-filtered, spatially-filtered quantities of scattered probe beam are values of orthogonal components and as such, give within a complex constant an accurate measurement of the complex amplitude of the scattered probe beam that is in-focus at the plane of the two-dimensional linear array of detector pinholes with the effects of light from out-of-focus images substantially canceled out. Using the computer and computer algorithms known to those skilled in the art, an accurate two-dimensional representation of a two-dimensional section of the object material is obtained with substantially no scanning required. The two-dimensional section is selected by orientations of the linear array of source pinholes and of the optical axis of the probe lens. Using the computer and computer algorithms known to those skilled in the art, accurate three-dimensional representations of the object are obtained from three-dimensional arrays of the first, second, third, and fourth intensity values acquired through scanning of the object material in substantially one dimension. The computer algorithms may include computer deconvolutions and integral equation inversion techniques which are known to those skilled in the art should correction for out-of-focus images be desired beyond the compensation achieved in the first and second arrays of component values of the amplitude of the scattered probe beam by the apparatus of the present invention.

The signal-to-noise ratio obtained in the fourth embodiment can be adjusted or improved and/or optimized with respect to measuring the desired complex amplitudes. The adjustment or improvement and/or optimization is accomplished by adjusting the ratio of the amplitude of the wavenumber-filtered, spatially-filtered third and fourth quantities of the scattered probe beam focused on a selected detector pinhole and of the amplitude of the wavenumber-filtered, spatially-filtered third and fourth quantities of the reflected reference beam focused on the selected detector pinhole by altering the reflection-transmission properties of the first, second, and third beam splitters.

In accordance with a variant of the fourth embodiment thereof, I provide a method and apparatus for discriminating an in-focus image from an out-of-focus image by imaging optical radiation from a broadband spatially-extended, spatially-incoherent line source onto a source slit comprising the apparatus and electronic processing means of the previously described fourth embodiment where the linear array of source pinholes of the fourth embodiment has been replaced by the source slit and the linear array of spatial filter pinholes of the fourth embodiment has been replaced by a spatial filter slit. The directions of the source slit and the spatial filter slit are perpendicular to the plane defined by the dispersive element.

Elements of measured arrays of first and second component values of the amplitude of the wavenumber-filtered, spatially-filtered scattered probe beam are values of orthogonal components and as such, give within a complex constant an accurate measurement of the complex amplitude of the wavenumber-filtered, spatially-filtered scattered probe beam that is in-focus in the plane of the two-dimensional array of detector pinholes with the effects of light from out-of-focus images substantially canceled out. Using computer algorithms known to those skilled in the art, an accurate two-dimensional representation of a two-dimensional section of the object material is obtained with no scanning required. The two-dimensional section is selected by respective orientations of the source slit and of the optical axis of the probe lens. Using the computer and computer algorithms known to those skilled in the art, accurate three-dimensional representations of the object material are obtained from three-dimensional arrays of the first, second, third, and fourth intensity values acquired through scanning of the object material in one-dimension. The scanning of the object material is achieved by systematically moving the object material in one dimension with a translator controlled by the computer. The computer algorithms may include computer deconvolutions and integral equation inversion techniques which are known to those skilled in the art should correction for out-of-focus images be desired beyond the compensation achieved by the apparatus of the present invention.

In accordance with the above first, second, third, and fourth embodiments and their variants, the apparatus of the present invention employs a probe lens which may have an extended range in focus as a function of wavelength while maintaining a high lateral spatial resolution for each frequency component. The range in focus may be extended beyond the region defined by the numerical aperture of the probe lens for a single wavelength by employing a lens whose focal length is designed to be dependent upon wavelength. The wavelength dependence may be designed into the lens by using techniques known to those skilled in the art. Such techniques include the design of lens multiplets comprised of refractive materials of differing dispersion. The lens design may also include zone plates. If zone plates are used, the probe lens unit is preferable designed so that most of an optical beam component at a given wavelength is in focus in one order of the zone plates. The zone plates may be generated by holographic techniques. To take advantage of the extended range in focus, the beam from the source must be comprised of properties to match the properties of the probe lens, i.e. have a wavelength bandwidth matched to the range in wavelength of the probe lens.

The first, second, third, and fourth embodiments and variants thereof comprise the first group of embodiments. The second group of embodiments comprise the fifth, sixth, seventh, and eighth embodiments and variants thereof. The fifth, sixth, seventh, and eighth embodiments and variants thereof correspond to certain modified configurations of the first, second, third, and fourth embodiments and variants thereof, respectively, wherein the first probe lens of the first group of embodiments having an axial or longitudinal chromatic aberration is replaced with a probe lens having a lateral chromatic aberration. The probe lens with lateral chromatic aberration generates for the embodiments and variants thereof of the second group of embodiments a line image in the object material that is aligned proximally perpendicular to the optical axis of the respective probe lens and image points of the line image are acquired substantially simultaneously.

The length of the line image perpendicular to the optical axis of the respective probe lens is determined by a combination of factors such as the focal length of the respective probe lens and the magnitude of the lateral chromatic aberration of the respective probe lens, both of which can be adjusted, and the optical bandwidth of the source.

The third group of embodiments comprise the ninth, tenth, eleventh, and twelfth embodiments and variants thereof. The ninth, tenth, eleventh, and twelfth embodiments and variants thereof correspond to certain other modified configurations of the first, second, third, and fourth embodiments and variants thereof, respectively, wherein the multi-element phase shifters have not been incorporated. The omission of the multi-element phase shifters reduces the degree of reduction and compensation of background from out-of-focus images for the third group of embodiments. The probe lens for the third group of embodiments, the probe lens having axial chromatic aberration, generates a line image in an object material. The line image is aligned proximally along the optical axis of the probe lens having axial chromatic aberration and image points of the line image are acquired substantially simultaneously.

The fourth group of embodiments comprise the embodiments 13, 14, 15, and 16 and variants thereof. The embodiments 13, 14, 15, and 16 and variants thereof correspond to certain modified configurations of the fifth, sixth, seventh, and eighth embodiments and variants thereof, respectively, wherein the multi-element phase shifters have not been incorporated. The omission of the multi-element phase shifters reduces the degree of reduction and compensation of background from out-of-focus images for the fourth group of embodiments. The probe lens for the fourth group of embodiments, the probe lens having lateral chromatic aberration, generates a line image in an object material. The line image is aligned proximally orthogonal to the optical axis of the probe lens having lateral chromatic aberration and image points of the line image are acquired substantially simultaneously.

The fifth group of embodiments comprise embodiments 17, 18, 19, and 20 and variants thereof. The embodiments 17, 18, 19, and 20 and variants thereof correspond to a second set of certain other modified configurations of the first, second, third, and fourth embodiments and variants thereof, respectively, wherein the probe lens having axial chromatic aberration is replaced with a probe lens substantially free of axial chromatic aberration. The image generated in an object material by embodiments of the fifth group is nominally a point image. The degree of reduction and compensation for background from out-of-focus images for embodiments and variants thereof of the fifth group of embodiments is the same as the degree of reduction and compensation for background from out-of-focus images for corresponding embodiments and variants thereof of the first group of embodiments. The image points for the embodiments and variants thereof of the fifth group of embodiments are acquired sequentially in time.

In accordance with the embodiments and variants thereof of the first four groups of embodiments, the signal-to-noise ratio may be also adjusted and/or optimized for multiple optical frequency components of the source. This is achieved by placing a wavelength filter in the paths of the reference and/or reflected reference beams, preferably, and/or in the paths of the probe and/or scattered probe beams and constructing the transmission of the wavelength filter to have a specific wavelength dependence to adjust and/or optimize the ratio of the wavenumber-filtered, spatially-filtered reflected reference beam and the wavenumber-filtered, spatially-filtered scattered probe beam transmitted through respective detector pinholes for different wavelengths. This feature can be particularly valuable when there is a strong attenuation of the probe and scattered probe beams in passing through the object material.

For each of the embodiments and variants thereof of the five groups of embodiments, there is a corresponding embodiment or variant for writing information to an object material comprising a recording medium. Each embodiment and variant thereof for writing information comprises method and apparatus of a corresponding embodiment or variant except for the following changes in configuration: the source and reference mirror subsystems are interchanged and the detector and detector pinholes are replaced by a mirror wherein the mirror directs the light from the source impinging on the mirror substantially back on itself with a temporally and spatially dependent degree of reflectivity and a temporally and spatially dependent phase shift introduced by the mirror arranged in conjunction with a phase-shifting procedure to produce the desired images in the object material. The phase-shifting procedure performs a function analogous to the procedure of introducing a sequence of phase shifts in the wavenumber-filtered, spatially-filtered reflected reference beam to obtain first, second, third, and fourth measured intensity values for the embodiments and variants thereof of the five groups of embodiments.

For certain ones of the writing embodiments and variants thereof described herein, a single bit binary format is used to store information at a given location in the object material. In certain other ones of the embodiments and variants thereof described herein, a higher density of information storage than that achievable in the certain ones of the embodiments and variants thereof is obtained by recording in a base N format for amplitude or (base N)×(base M) format for amplitude and phase information at each data storage site in an amplitude or amplitude and phase recording medium.

It should be appreciated by those skilled in the art that the procedure of introducing a sequence of phase shifts in the wavenumber-filtered, spatially-filtered reflected reference beam to obtain the first, second, third, and fourth measured intensity values for the cited embodiments and variants may also be implemented with phase-sensitive detection and heterodyne detection techniques without departing from the scope and spirit of the present invention. For example, the phase shifting procedure comprised of four discrete phase shift values of 0, π, −π/2, and π radians may be replaced by a sinusoidal phase variation of amplitude β at frequency ω. The first and second component values of the complex amplitude of wavenumber-filtered, spatially filtered scattered probe beam are detected by phase-sensitive detection as the first and second harmonics of ω, respectively. The amplitude β is chosen so that there is a high sensitivity for detection of both the first and second harmonics. In a second example, the frequency of the reference beam is shifted with respect to the frequency of the probe beam, for example by an acousto-optical modulator, and the first and second component values of the complex amplitude of wavenumber-filtered, spatially filtered scattered probe beam are acquired by heterodyne detection.

It should be appreciated by those skilled in the art that the embodiments and variants thereof for writing information to optical disks may write information at memory sites in single bit binary format. It will be further appreciated by those skilled in the art that the embodiments and variants thereof for writing information to optical disks may write information in the form of base N format for amplitude or (base N)×(base M) format for amplitude and phase at a memory site or as transforms in (base N)×(base M) format of information to be stored, transforms such as Fourier transforms or Hilbert transforms.

It should be appreciated by those skilled in the art that information may be stored in a medium by the magneto-optical effect and that the information stored is retrieved by measuring changes in the polarization state of a probe beam scattered or transmitted by the object material.

It should be appreciated by those skilled in the art that the desired scanning of the object material in embodiments and variants thereof of the five groups of embodiments and the associated writing embodiments and variants thereof may also be achieved by scanning the image of the respective source pinhole, the linear array of source pinholes or the source slit in the object material with the object material remaining stationary.

It should be appreciated that the "enabling technology" of the invention applies for any electromagnetic radiation, electron beams as used for example in electron microscopes, or even acoustic waves for which suitable collimating lenses, imaging lenses, phase shifters, and recording mediums can be provided. For applications wherein the amplitude of the beam is detected instead of the intensity, the function of producing the square of the amplitude must be done in the electronic processing following the detector.

It should also be appreciated that the length of the line image in the object material can be altered by changing for example the depth of focus and/or the axial chromatic aberration of the probe lens or the lateral chromatic aberration of the probe lens with the requisite corresponding changes in the optical bandwidth of the source.

The line source need not be spatially incoherent in the direction of the line source in the case of either the second or fourth preferred embodiments or their respective variants to achieve a reduced systematic error although the systematic error will generally be lower when a spatially incoherent line source is used.

An advantage of certain ones of the first and third groups of embodiments with respect to reading a multiple-layer, multiple-track optical disk is the substantially simultaneous imaging of a line section in the depth direction of the optical disk with significantly reduced statistical errors and with a background from out-of-focus images significantly reduced compared to or the same as that obtained in a sequence of measurements with prior art single-pinhole confocal interference microscopy or holography. The simultaneous imaging of a line section in the depth direction of the optical disk can be used to greatly reduce sensitivity to motion of the optical disk in the depth direction generated by rotation of the optical disk, non-flatness of the optical disk, and/or vibrations of the optical disk. The simultaneous imaging of a line section in the depth direction of the optical disk can further be used to identify a reference surface in the optical disk with information acquired simultaneously from multiple layers, the reference layer serving registration purposes.

An advantage of certain ones of the first and third groups of embodiments with respect to providing a tomographic complex amplitude image of a wafer used in the fabrication of integrated circuits is the substantially simultaneous imaging of a line section in the depth direction of the wafer with significantly reduced statistical errors and with a background from out-of-focus images significantly reduced compared to or the same as that obtained in a sequence of measurements with prior art single-pinhole confocal interference microscopy or holography. The simultaneous imaging of a line section in the depth direction of the wafer can be used to greatly reduce sensitivity to motion of the wafer in the depth direction generated by for example by translations, scanning, or vibrations of the wafer. The simultaneous imaging of a line section in the depth direction of the wafer can further be used to identify a surface of and/or in the wafer with information acquired simultaneously from multiple depths.

An advantage of certain ones of the first and third groups of embodiments with respect to providing a tomographic complex amplitude image of a biological specimen in vivo, an image which can be used for example in a non-invasive biopsy of the biological specimen, is the substantially simultaneous imaging of a line section in the depth direction of the biological specimen with significantly reduced statistical errors and with a background from out-of-focus images significantly reduced compared to or the same as that obtained in a sequence of measurements with prior art single-pinhole confocal interference microscopy or holography. The simultaneous imaging of a line section in the depth direction of the biological specimen can be used to greatly reduce sensitivity to motion of the biological specimen in the depth direction generated by for example by translations, scanning, or vibrations of the biological specimen. The simultaneous imaging of a line section in the depth direction of the biological specimen can further be used to identify a surface of and/or in the biological specimen with information acquired simultaneously from multiple depths.

Another advantage of certain other ones of the first and third groups of embodiments with respect to reading a multiple-layer, multiple-track optical disk is the substantially simultaneous imaging of a two-dimensional section of the optical disk significantly reduced statistical errors and with a background from out-of-focus images significantly reduced compared to or the same as that obtained in a sequence of measurements with prior art single-pinhole and slit confocal interference microscopy or holography. One axis of the two-dimensional section of the optical disk is parallel to the depth direction of the optical disk and the orthogonal axis of the two-dimensional section of the optical disk may be either parallel to radial direction of the optical disk or parallel to a tangent to a track in the optical disk. The simultaneous imaging of a two-dimensional section of the optical disk can be used to greatly reduce sensitivity to motion of the optical disk in the depth and radial directions generated by rotation of the optical disk, non-flatness of the optical disk, and/or vibrations of the optical disk. The simultaneous imaging of a two-dimensional section in the optical disk can further be used to identify a reference surface, i.e. reference layer, and a reference track in or on the optical disk or used for track identification with information acquired simultaneously at multiple layers and multiple tracks, the reference layer and reference track serving registration purposes.

Another advantage of certain other ones of the first and third groups of embodiments with respect to providing a tomographic complex amplitude image of a wafer used in the fabrication of integrated circuits is the substantially simultaneous imaging of a two-dimensional section of the wafer with significantly reduced statistical errors and with a background from out-of-focus images significantly reduced compared to or the same as that obtained in a sequence of measurements with prior art single-pinhole and slit confocal interference microscopy or holography. One axis of the two-dimensional section of the wafer is parallel to the depth direction of the wafer. The simultaneous imaging of a two-dimensional section of the wafer can be used to greatly reduce sensitivity to motion of the wafer in the depth and transverse directions generated by translation, scanning, and/or vibrations of the wafer. The simultaneous imaging of a two-dimensional section in the wafer can further be used to identify a surface or internal surface of the wafer with information acquired simultaneously at other locations, the surface and/or internal surface possibly serving registration purposes.

Another advantage of certain other ones of the first and third groups of embodiments with respect to providing a tomographic complex amplitude image of a biological specimen in vivo, an image which can be used for example in a non-invasive biopsy of the biological specimen, is the substantially simultaneous imaging of a two-dimensional section of the biological specimen with significantly reduced statistical errors and with a background from out-of-focus images significantly reduced compared to or the same as that obtained in a sequence of measurements with prior art single-pinhole and slit confocal interference microscopy or holography. One axis of the two-dimensional section of the biological specimen is parallel to the depth direction of the wafer. The simultaneous imaging of a two-dimensional section of the wafer can be used to greatly reduce sensitivity to motion of the biological specimen in the depth and transverse directions generated by translation, scanning, and/or vibrations of the biological specimen. The simultaneous imaging of a two-dimensional section in the biological specimen can further be used to identify a surface or internal surface of the biological specimen with information acquired simultaneously at other locations, the surface and/or internal surface possibly serving registration purposes.

An advantage of certain ones of the second and fourth groups of embodiments with respect to reading a multiple-layer, multiple-track optical disk is the substantially simultaneous imaging of a line section tangent to a layer in or on the optical disk with significantly reduced statistical errors and with a background from out-of-focus images significantly reduced compared to or the same as that obtained in a sequence of measurements with prior art single-pinhole confocal interference microscopy or holography. The simultaneous imaging of a line section tangent to a layer in or on the optical disk can be used to greatly reduce sensitivity to motion of the optical disk generated by rotation of the optical disk and/or vibrations of the optical disk. The simultaneous imaging of a two-dimensional section tangent to a layer in or on the optical disk can further be used to identify a reference track in the optical disk with information acquired simultaneously from multiple tracks, the reference track serving registration purposes.

An advantage of certain ones of the second and fourth groups of embodiments with respect to providing a tomographic complex amplitude image of a wafer used in the fabrication of integrated circuits is the substantially simultaneous imaging of a line section tangent to a surface of the wafer or on a surface in the wafer with significantly reduced statistical errors and with a background from out-of-focus images significantly reduced compared to or the same as that obtained in a sequence of measurements with prior art single-pinhole confocal interference microscopy or holography. The simultaneous imaging of a line section tangent to a surface of the wafer or on a surface in the wafer can be used to greatly reduce sensitivity to motion of the wafer generated by translations, scanning, and/or vibrations of the wafer. The simultaneous imaging of a two-dimensional section tangent to a surface in or on the wafer can further be used to identify a reference location in or/on the wafer with information acquired simultaneously from locations, the reference location serving registration purposes.

An advantage of certain ones of the second and fourth groups of embodiments with respect to providing a tomographic complex amplitude image of a biological specimen in vivo, an image which can be used for example in a non-invasive biopsy of the biological specimen, is the substantially simultaneous imaging of a line section tangent to a surface in or on the specimen with significantly reduced statistical errors and with a background from out-of-focus images significantly reduced compared to or the same as that obtained in a sequence of measurements with prior art single-pinhole confocal interference microscopy or holography. The simultaneous imaging of a line section tangent to a surface in or on the specimen can be used to greatly reduce sensitivity to motion of the specimen generated by translation, scanning, and/or vibrations of the specimen. The simultaneous imaging of a two-dimensional section tangent to a surface in or on the specimen can further be used to identify a reference location in the specimen with information acquired simultaneously from multiple locations, the reference location serving registration purposes.

Another advantage of certain other ones of the second and fourth groups of embodiments with respect to reading a multiple layer, multiple-track optical disk is the substantially simultaneous imaging of a two-dimensional section of the optical disk with significantly reduced statistical errors and with a background from out-of-focus images significantly reduced compared to or the same as that obtained in a sequence of measurements with prior art single-pinhole and slit confocal interference microscopy or holography. One axis of the two-dimensional section of the optical disk may be parallel to the radial direction of the optical disk and the orthogonal axis of the two-dimensional section of the optical disk may be parallel to a tangent to a track in or on the optical disk. The simultaneous imaging of a two-dimensional section of the optical disk can be used to greatly reduce sensitivity to motion of the optical disk in the radial direction generated by rotation of the optical disk and/or vibrations of the optical disk. The simultaneous imaging of a two-dimensional section in or on the optical disk can further be used to identify a reference track for track identification and for read errors for a given track with information acquired simultaneously at multiple tracks and multiple positions on the multiple tracks, the reference track serving registration purposes.

An advantage of the fifth group of embodiments with respect to reading a multiple-layer, multiple-track optical disk is the generation of an one-dimensional, two-dimensional or three-dimensional image of a multiple-layer, multiple-track optical disk with a background from out-of-focus images significantly reduced compared to that obtained in a sequence of measurements with prior art single-pinhole confocal interference microscopy or holography.

An advantage of the fifth group of embodiments with respect to providing a tomographic complex amplitude image of a wafer used in the fabrication of integrated circuits is the generation of an one-dimensional, two-dimensional, or three-dimensional image of a wafer with a background from out-of-focus images significantly reduced compared to that obtained in a sequence of measurements with prior art single-pinhole confocal interference microscopy or holography.

An advantage of the fifth group of embodiments with respect to providing a tomographic complex amplitude image of a biological specimen in vivo, an image which can be used for example in a non-invasive biopsy of the biological specimen, is the generation of an one-dimensional, two-dimensional, or three-dimensional image of the specimen with a background from out-of-focus images significantly reduced compared to that obtained in a sequence of measurements with prior art single-pinhole confocal interference microscopy or holography.

An advantage of the first four groups of embodiments of the invention is the substantially simultaneous imaging of a line section with a background from out-of-focus images significantly reduced compared to or the same as that obtained in a sequence of measurements with prior art single-pinhole confocal interference microscopy. The substantially simultaneous imaging feature is made possible by the introduction of the technique called "optical wavenumber domain reflectometry" (OWDR). The reduction of the background is made possible by the adaptation of the basic principal of pinhole confocal microscopy to an interferometric measuring system. The substantially simultaneous imaging feature makes it possible to generate one-dimensional, two-dimensional, and three-dimensional images with greatly reduced sensitivity to motion of the object during the measurement process. The problem of motion can pose serious limitations in technologies currently employed in the case of in vivo measurements of biological systems. In PSI and SCLI where the technology disclosed herein is not incorporated, serious limitations are encountered due to motion caused by vibrations. The problem of untracked motion can also pose serious limitations in the reading and/or writing to a multiple-layer, multiple-track optical disk.

Another advantage of the invention is the substantially simultaneous imaging of a two-dimensional section with a background from out-of-focus images significantly reduced compared to that obtained in a sequence of measurements with prior art slit confocal interference microscopy. The substantially simultaneous imaging feature is made possible by the introduction of the OWDR technique. The reduction of the background is made possible by the adaptation of the basic principal of slit confocal microscopy to an interferometric measuring system. The substantially simultaneous imaging feature makes it possible to generate two-dimensional and three-dimensional images with greatly reduced sensitivity to motion of the object during the measurement process. As already noted, the problem of motion can pose serious limitations in technologies currently employed in the case of in vivo measurements of biological systems, in PSI and SCLI due to motion caused by vibrations, and in reading and/or writing to a multiple-layer, multiple-track optical disks due to untracked motion.

An advantage of certain ones of the embodiments and variants thereof for writing to a multiple-layer, multiple-track optical disk, embodiments and variants thereof corresponding to certain ones of the first and third groups of embodiments, is the substantially simultaneous imaging of a line section in the depth direction in the optical disk with significantly reduced statistical errors and with a background from out-of-focus images significantly reduced compared to or the same as that generated in a sequence of images with prior art single-pinhole confocal interference microscopy or holographic imaging. The simultaneous imaging of a line section in the depth direction in the optical disk can be used to greatly reduce sensitivity to motion of the optical disk in the depth direction generated by rotation of the optical disk, non-flatness of the optical disk, and/or vibrations of the optical disk. The simultaneous imaging of a line section in the depth direction in the optical disk can further be used to generate a reference surface in the optical disk simultaneously with the writing of information at multiple layers, the reference layer serving registration purposes.

Another advantage of certain other ones of the embodiments and variants thereof for writing to a multiple-layer, multiple-track optical disk, embodiments and variants thereof corresponding to certain other ones of the first and third groups of embodiments, is the substantially simultaneous imaging of a two-dimensional section in the optical disk with significantly reduced statistical errors and with a background from out-of-focus images significantly reduced compared to or the same as that generated in a sequence of images with prior art single-pinhole and slit confocal interference microscopy or holography. One axis of the two-dimensional section in the optical disk is substantially parallel to the depth direction of the optical disk and the orthogonal axis of the two-dimensional section in the optical disk may be either substantially parallel to a radial direction of the optical disk, substantially parallel to a tangent to a track in the optical disk, or any the directions in between. The simultaneous imaging of a two-dimensional section in the optical disk can be used to greatly reduce sensitivity to motion of the optical disk in the depth and orthogonal directions generated by rotation of the optical disk, non-flatness of the optical disk, and/or vibrations of the optical disk. The simultaneous imaging of a two-dimensional section in the optical disk can further be used to generate a reference surface, i.e. reference layer, and a reference track in or on the optical disk simultaneously with information being imaged at multiple layers and multiple tracks, the reference layer and reference track serving registration purposes.

An advantage of certain ones of the embodiments and variants thereof for writing to a multiple-layer, multiple-track optical disk, embodiments and variants thereof corresponding to certain ones of the second and fourth groups of embodiments is the substantially simultaneous imaging of a line section tangent to a layer in or on the optical disk with significantly reduced statistical errors and with a background from out-of-focus images significantly reduced compared to or the same as that generated in a sequence of images with prior art single-pinhole confocal interference microscopy or holography. The simultaneous imaging of a line section tangent to a layer in or on the optical disk can be used to greatly reduce sensitivity to motion of the optical disk generated by rotation of the optical disk and/or vibrations of the optical disk.

Another advantage of certain other ones of the embodiments and variants thereof for writing to a multiple layer, multiple-track optical disk, embodiments and variants thereof corresponding to certain other ones of the second and fourth groups of embodiments, is the substantially simultaneous imaging of a two-dimensional section of the optical disk with significantly reduced statistical errors and with a background from out-of-focus images significantly reduced compared to or the same as that generated in a sequence of images with prior art single-pinhole and slit confocal interference microscopy or holography. One axis of the two-dimensional section of the optical disk may be substantially parallel to a radial direction on the optical disk and the orthogonal axis of the two-dimensional section on the optical disk may be substantially parallel to a tangent to a track in or on the optical disk. The simultaneous imaging of a two-dimensional section of the optical disk can be used to greatly reduce sensitivity to motion of the optical disk in the radial directions generated by rotation of the optical disk and/or vibrations of the optical disk. The simultaneous imaging of a two-dimensional section in or on the optical disk can further be used to generate a reference track for track identification simultaneously with writing information at multiple tracks and multiple positions on the multiple tracks, the reference track serving registration purposes.

An advantage of embodiments and variants thereof for writing to a multiple-layer, multiple-track optical disk, embodiments and variants thereof corresponding to the fifth group of embodiments, is the generation of an one-dimensional, two-dimensional, or three-dimensional image on a multiple-layer, multiple-track optical disk with a background from out-of-focus images significantly reduced compared to that generated in a sequence of images with prior art single-pinhole confocal interference microscopy or holography.

An advantage of the invention is that the complex scattering amplitude of the object is obtained instead of the magnitude of the scattering amplitude as in the case of PCI and OCT. This is particularly important with respect to the amount of computer analysis required to obtain a given type of one-dimensional, two-dimensional or three-dimensional images of the object material.

Another advantage is that the computer processing required to obtain the complex scattering amplitude in one-dimensional, two-dimensional, and three-dimensional imaging is greatly reduced compared to that required in prior art confocal systems currently employed.

Another advantage is that if it is necessary to correct for out-of-focus images which are already greatly reduced in the apparatus of the present invention, the computer processing required to achieve a given level of correction with the apparatus of the present invention is significantly reduced compared to the computer processing required in prior art scanning single-pinhole and scanning slit confocal and scanning single-pinhole and scanning slit confocal interference microscopy.

Another advantage is that for the single source pinhole, the contribution of background radiation to the statistical noise in the measured complex scattering amplitude over a given transverse distance in the object material for a given measurement interval of time can be reduced in the respective embodiments and variant of the present invention below that obtainable for the same interval of time in prior art scanning single-pinhole confocal interference microscopy by a factor which is substantially proportional to the square root of the number of independent measurement positions over the axial image distance where independent is with respect to the measured complex scattering amplitude. A similar advantage is also present with respect to slit confocal interference microscopy where the corresponding reduction factor is substantially proportional to the square root of the number of independent measurement positions over an imaged two-dimensional section of the object material.

Another advantage is that the contribution of background radiation to the statistical noise in the measured complex scattering amplitude over a given imaged axial distance for a given measurement interval of time can be reduced to that which derives principally from the size of the complex scattering amplitude itself, a particularly important advantage for the case where the amplitude of the background radiation is relatively large compared to the size of the complex scattering amplitude. This is not achievable in prior art scanning single-pinhole or slit confocal microscopy.

Another advantage is that for certain embodiments and variants thereof of the first four groups of embodiments, a scan substantially in only one dimension is required to produce a two-dimensional image and only a scan substantially in two dimensions is required to produce a three-dimensional image.

Another advantage is that for certain other embodiments and variants thereof of the first four groups of embodiments, a scan substantially in only one dimension is required to produce a three-dimensional image.

The apparatus of the instant invention can, in summary, be operated to (1) reduce systematic error, (2) reduce statistical error, (3) reduce dynamic range requirements for detector, processing electronics, and recording medium, (4) increase the density of data stored in optical disks, (5) reduce the computer processing required to generate either a one-dimensional, two-dimensional, or three-dimensional images, (6) reduce the computer processing required to correct for systematic error effects of out-of-focus images, and/or (7) can be operative when imaging through a turbid medium. Generally, one or more of these features can be implemented for operation in parallel.

BRIEF DESCRIPTION OF THE DRAWINGS

In the drawings, wherein like reference characters denote similar elements throughout the several views:

FIG. 1b illustrates subsystem 80 where the plane of FIG. 1b is perpendicular to the plane of FIG. 1a;

FIG. 1c illustrates subsystem 81 where the plane of FIG. 1c is perpendicular to the plane of FIG. 1a;

FIG. 1d illustrates subsystem 82 for the case of probe beam entering subsystem 82 where the plane of FIG. 1d is perpendicular to the plane of FIG. 1a;

FIG. 1e illustrates subsystem 83 for the case of reference beam entering subsystem 83 where the plane of FIG. 1e is perpendicular to the plane of FIG. 1a;

FIG. 1f illustrates subsystem 82 for the case of probe beam exiting subsystem 82 where the plane of FIG. 1f is perpendicular to the plane of FIG. 1a;

FIG. 1g illustrates subsystem 83 for the case of reference beam exiting subsystem 83 where the plane of FIG. 1g is perpendicular to the plane of FIG. 1a;

FIG. 1h illustrates subsystem 81a for the case of probe beam entering subsystem 81a where the plane of FIG. 1h is perpendicular to the plane of FIG. 1a;

FIG. 1i illustrates subsystem 81a for the case of reference beam entering subsystem 81a where the plane of FIG. 1i is perpendicular to the plane of FIG. 1a;

FIG. 1j illustrates subsystem 84 for the case of probe beam entering subsystem 84 where the plane of FIG. 1j is perpendicular to the plane of FIG. 1a;

FIG. 1k illustrates subsystem 84 for the case of reference beam entering subsystem 84 where the plane of FIG. 1k is perpendicular to the plane of FIG. 1a;

FIG. 1l illustrates subsystem 82 for the case of an out-of-focus beam in subsystem 82 originating from scattering and/or reflection of light in subsystem 82 where the plane of FIG. 1l is perpendicular to the plane of FIG. 1a;

FIG. 1m illustrates subsystem 81a for the case of an out-of-focus beam in subsystem 81a originating from scattering and/or reflection of light in subsystem 82 where the plane of FIG. 1m is perpendicular to the plane of FIG. 1a;

FIG. 1n illustrates subsystem 84 for the case of a background light beam entering subsystem 84 where the plane of FIG. 1n is perpendicular to the plane of FIG. 1a;

FIGS. 1aa–1ai taken together illustrate in conjunction with certain ones of FIGS. 1a–1n, in schematic form, the presently preferred fifth embodiment of the present invention from the second group of embodiments with FIG. 1aa showing optical paths between beam splitter 100 and subsystem 82aa, beam splitter 100 and subsystem 83aa, subsystems 82aa and 85, and subsystems 83aa and 95, and paths of the electronic signals 132 and 133 to translator 116 and to phase shifter 44 in subsystem 83aa, respectively;

FIG. 1ab illustrates subsystem 82aa for the case of probe beam entering subsystem 82aa and where the plane of FIG. 1ab is perpendicular to the plane of FIG. 1aa;

FIG. 1ac illustrates subsystem 85 for the case of probe beam entering subsystem 85 and where the plane of FIG. 1ac is perpendicular to the plane of FIG. 1aa;

FIG. 1ad illustrates subsystem 83aa for the case of reference beam entering subsystem 83aa and where the plane of FIG. 1ad is perpendicular to the plane of FIG. 1aa;

FIG. 1ae illustrates subsystem 95 for the case of reference beam entering subsystem 95 and where the plane of FIG. 1ae is perpendicular to the plane of FIG. 1aa;

FIG. 1af illustrates subsystem 85 for the case of scattered probe beam exiting subsystem 85 and where the plane of FIG. 1af is perpendicular to the plane of FIG. 1aa;

FIG. 1ag illustrates subsystem 82aa for the case of scattered probe beam exiting subsystem 82aa and where the plane of FIG. 1ag is perpendicular to the plane of FIG. 1aa;

FIG. 1ah illustrates subsystem 95 for the case of reflected reference beam exiting subsystem 95 and where the plane of FIG. 1ah is perpendicular to the plane of FIG. 1aa;

FIG. 1ai illustrates subsystem 83aa for the case of reflected reference beam exiting subsystem 83aa and where the plane of FIG. 1ai is perpendicular to the plane of FIG. 1aa;

FIG. 2b illustrates subsystem 80a where the plane of FIG. 2b is perpendicular to the plane of FIG. 2a and the direction of the line source and the linear array of pinholes 8a lie in the plane of FIG. 2a;

FIG. 2c illustrates subsystem 81b for the case of probe beam entering subsystem 81b, where the plane of FIG. 2c is perpendicular to the plane of FIG. 2a, and the linear array of pinholes 18b lie in the plane of FIG. 2a;

FIG. 2d illustrates subsystem 81b for the case of reference beam entering subsystem 81b, where the plane of FIG. 2d is perpendicular to the plane of FIG. 2a, and the linear array of pinholes 18b lie in the plane of FIG. 2a;

FIG. 2e illustrates subsystem 84a for the case of probe beam entering subsystem 84a where the plane of FIG. 2e is perpendicular to the plane of FIG. 2a;

FIG. 2f illustrates subsystem 84a for the case of reference beam entering subsystem 84a where the plane of FIG. 2f is perpendicular to the plane of FIG. 2a;

FIG. 2aa illustrates in conjunction with certain ones of FIGS. 2a–2f, in schematic form, the presently preferred sixth embodiment of the present invention from the second group of embodiments with FIG. 2aa showing optical paths between beam splitter 100 and subsystem 82aa, beam splitter 100 and subsystem 83aa, subsystems 82aa and 85, and subsystems 83aa and 95, and paths of the electronic signals 132 and 133 to translator 116 and to phase shifter 44 in subsystem 83aa, respectively;

FIGS. 3a–3l taken together illustrate, in schematic form, the presently preferred third embodiment of the present invention with FIG. 3a showing optical paths between subsystems 80 and 81, 80 and 81c, 81 and 82, 81c and 83a, 82 and 81a, 83a and 81a, and 81a and 84; paths of the electronic signals from computer 118 to translator 116 and to phase shifter 44 in subsystem 83a; and path of electronic signal from detector 114 in subsystem 84 to computer 118;

FIG. 3b illustrates subsystem 80 where the plane of FIG. 3b is perpendicular to the plane of FIG. 3a;

FIG. 3c illustrates subsystem 81 where the plane of FIG. 3c is perpendicular to the plane of FIG. 3a;

FIG. 3d illustrates subsystem 82 for the case of probe beam entering subsystem 82 where the plane of FIG. 3d is perpendicular to the plane of FIG. 3a;

FIG. 3e illustrates subsystem 81c where the plane of FIG. 3e is parallel to the plane of FIG. 3a;

FIG. 3f illustrates subsystem 83a for the case of reference beam entering subsystem 83a where the plane of FIG. 3f is parallel to the plane of FIG. 3a and phase shifters 34 and 34a are shown rotated 90 degrees about the axes 3a and 3c, respectively, for illustrative purposes only;

FIG. 3g illustrates subsystem 82 for the case of probe beam exiting subsystem 82 where the plane of FIG. 3g is perpendicular to the plane of FIG. 3a;

FIG. 3h illustrates subsystem 83a for the case of reference beam exiting subsystem 83a where the plane of FIG. 3h is perpendicular to the plane of FIG. 3a and phase shifters 34 and 34a shown rotated 90 degrees about the axes 3a and 3c, respectively, for illustrative purposes only;

FIG. 3i illustrates subsystem 81a for the case of probe beam entering subsystem 81a where the plane of FIG. 3i is perpendicular to the plane of FIG. 3a;

FIG. 3*j* illustrates subsystem 81*a* for the case of reference beam entering subsystem 81*a* where the plane of FIG. 3*j* is perpendicular to the plane of FIG. 3*a*;

FIG. 3*k* illustrates subsystem 84 for the case of probe beam entering subsystem 84 where the plane of FIG. 3*k* is perpendicular to the plane of FIG. 3*a*;

FIG. 3*l* illustrates subsystem 84 for the case of reference beam entering subsystem 84 where the plane of FIG. 3*l* is perpendicular to the plane of FIG. 3*a*;

FIGS. 3*aa* and 3*ab* illustrate in conjunction with certain ones of FIGS. 3*a*–3*l*, in schematic form, the presently preferred seventh embodiment of the present invention from the second group of embodiments with FIG. 3*aa* showing optical paths between beam splitter 100 and subsystem 82*aa*, beam splitter 100 and subsystem 83*ab*, subsystems 82*aa* and 85, and subsystems 83*ab* and 95 and paths of the electronic signals 132 and 133 to translator 116 and to phase shifter 44 in subsystem 83*ab*, respectively;

FIG. 3*ab* illustrates subsystem 83*ab* for the case of reflected reference beam exiting subsystem 83*ab* where the plane of FIG. 3*ab* is parallel to the plane of FIG. 3*aa* and phase shifters 34 and 34*a* are shown rotated 90 degrees about the axes 3*b* and 3*f*, respectively, for illustrative purposes only;

FIG. 4*b* illustrates subsystem 80*a* where the plane of FIG. 4*b* is perpendicular to the plane of FIG. 4*a*;

FIG. 4*c* illustrates subsystem 81*b* for the case of scattered probe beam entering subsystem 81*b* where the plane of FIG. 4*c* is perpendicular to the plane of FIG. 4*a*;

FIG. 4*d* illustrates subsystem 81*b* for the case of reflected reference beam entering subsystem 81*b* where the plane of FIG. 4*d* is perpendicular to the plane of FIG. 4*a*;

FIG. 4*e* illustrates subsystem 84*a* for the case of scattered probe beam entering subsystem 84*a* where the plane of FIG. 4*e* is perpendicular to the plane of FIG. 4*a*;

FIG. 4*f* illustrates subsystem 84*a* for the case of reflected reference beam entering subsystem 84*a* where the plane of FIG. 4*f* is perpendicular to the plane of FIG. 4*a*;

FIG. 4*aa* illustrates in conjunction with certain ones of FIGS. 4*a*–4*f*, in schematic form, the presently preferred eighth embodiment of the present invention from the second group of embodiments with FIG. 4*aa* showing optical paths between beam splitter 100 and subsystem 82*aa*, beam splitter 100 and subsystem 83*ab*, subsystems 82*aa* and 85, and subsystems 83*ab* and 95 and paths of the electronic signals 132 and 133 to translator 116 and to phase shifter 44 in subsystem 83*ab*, respectively;

FIG. 8*a* is a schematic drawing of a lithography exposure system employing the confocal interference microscopy system. FIGS. 8*b* and 8*c* are flow charts describing steps in manufacturing integrated circuits.

DETAILED DESCRIPTION OF THE INVENTION

The present invention permits the separation of the complex amplitude of reflected and/or scattered light by a volume element of three-dimensional object material space from the complex amplitude of background light produced by superimposed out-of-focus images of structures before, behind, and to the side of the volume element under examination. The described tomographic technique can separate a desired complex amplitude signal in an image plane from "background" and "foreground" complex amplitude signals generated by various mechanisms. Such background and foreground complex amplitude signals may be (1) out-of-focus images of sections of an object material other than a line section or two-dimensional section being imaged, (2) scattering of a desired amplitude signal, (3) scattering of signals originating from sources other than the line section or two-dimensional section being imaged, and/or (4) thermal radiation. Scattering sites and thermal radiation sources may be located in the space before, to the side, and/or behind a line section or two-dimensional section of an object under examination.

The technique of the present invention is implemented with either of two different levels of discrimination against out-of-focus images. In the first level (Level 1), the impulse response functions of imaging subsystems of the apparatus of the present invention are manipulated in either of two orthogonal planes by introducing one-dimensional patterns of phase changes, respectively, at pupils of the respective imaging subsystems. In the second level (Level 2), the impulse response functions of imaging subsections of the apparatus of the present invention are manipulated in both of two orthogonal planes by introducing two-dimensional patterns of phase changes at pupils of the respective imaging subsystems. A Level 2 discrimination leads to a more effective discrimination of out-of-focus images from in-focus images, with respect to both systematic and statistical errors, than a Level 1 discrimination. Level 1 and Level 2 discriminations may be implemented for any of the preferred embodiments that are described.

The enabling technology of the present invention which is common to each of the preferred embodiments of the instant invention configured with either of the Level 1 or Level 2 discriminations is described herein only for the preferred embodiments with a Level 1 discrimination. The Level 1 discrimination is based on a particular orientation of an orthogonal plane in which the impulse response functions of imaging subsystems are manipulated. The choice of the orientation of the orthogonal plane in which the impulse response functions of imaging subsystems are manipulated impacts on the degree of reduction of the effects of background beams on statistical errors achieved in apparatus of the present invention.

Figure 1A:
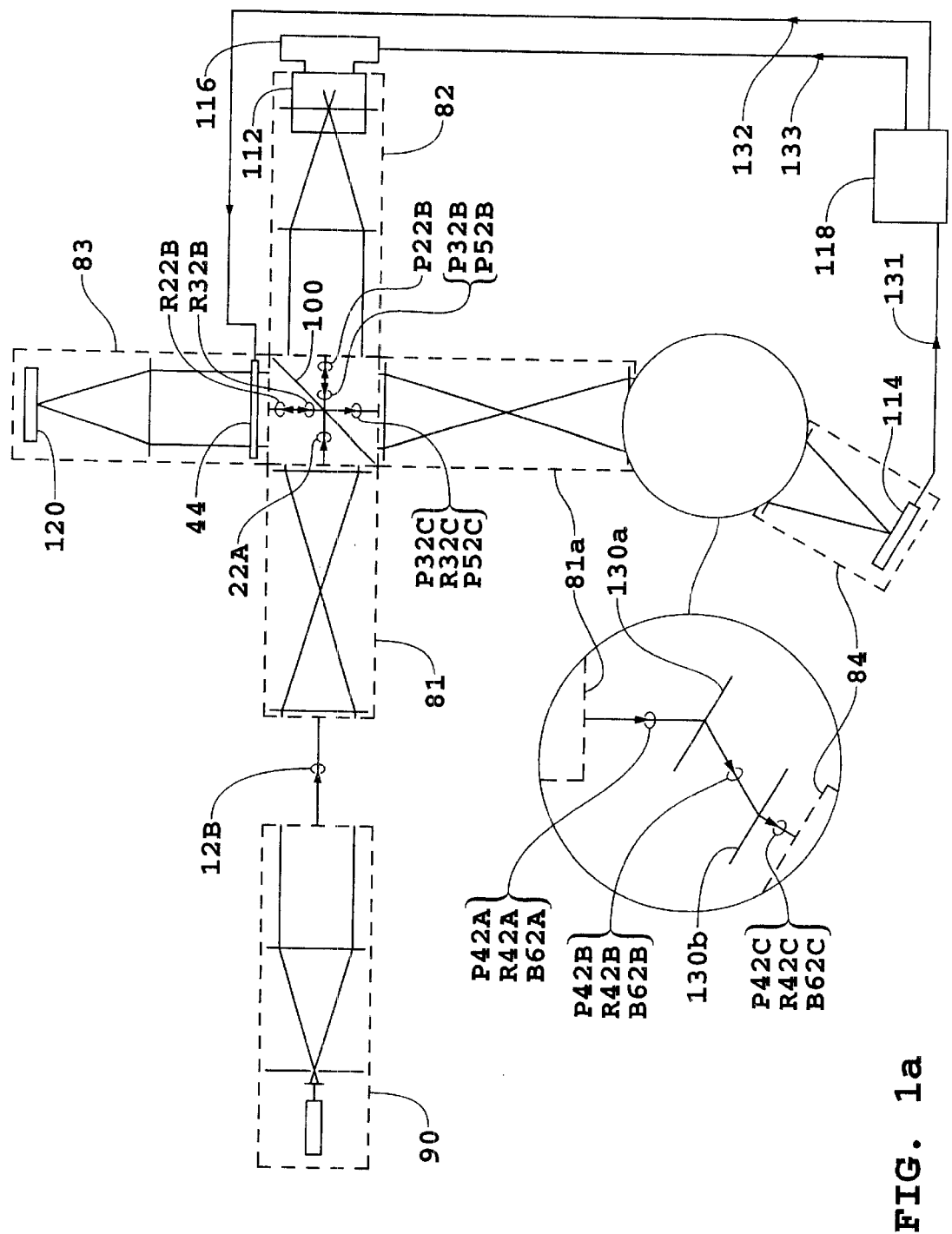
FIGS. 1a–1n taken together illustrate, in schematic form, the presently preferred first embodiment of the present invention from the first group of embodiments with FIG. 1a showing optical paths between subsystems 80 and 81, 81 and 82, 81 and 83, 82 and 81a, 83 and 81a, and 81a and 84; paths of the electronic signals from computer 118 to translator 116 and to phase shifter 44 in subsystem 83; and path of electronic signal from detector 114 in subsystem 84 to computer 118.
Figure 1B:
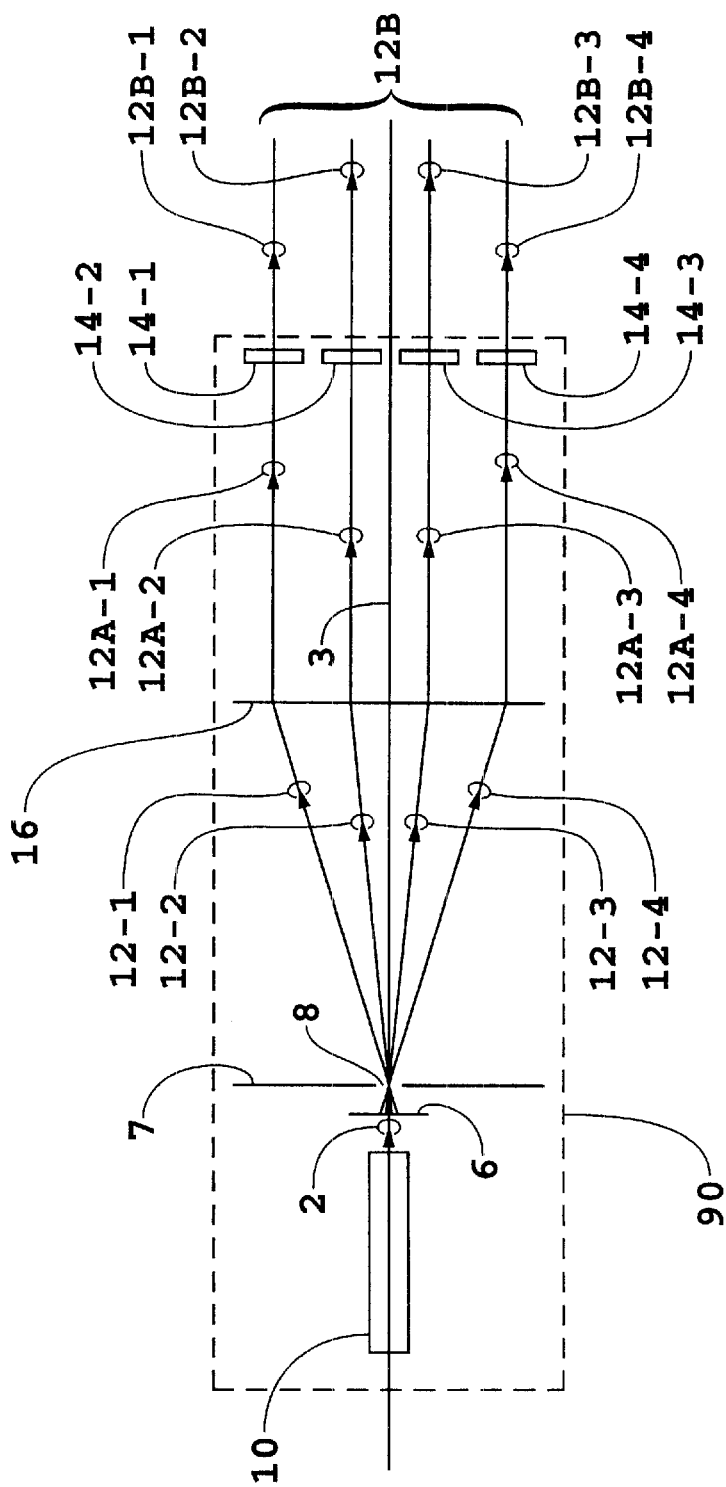
Figure 1C:
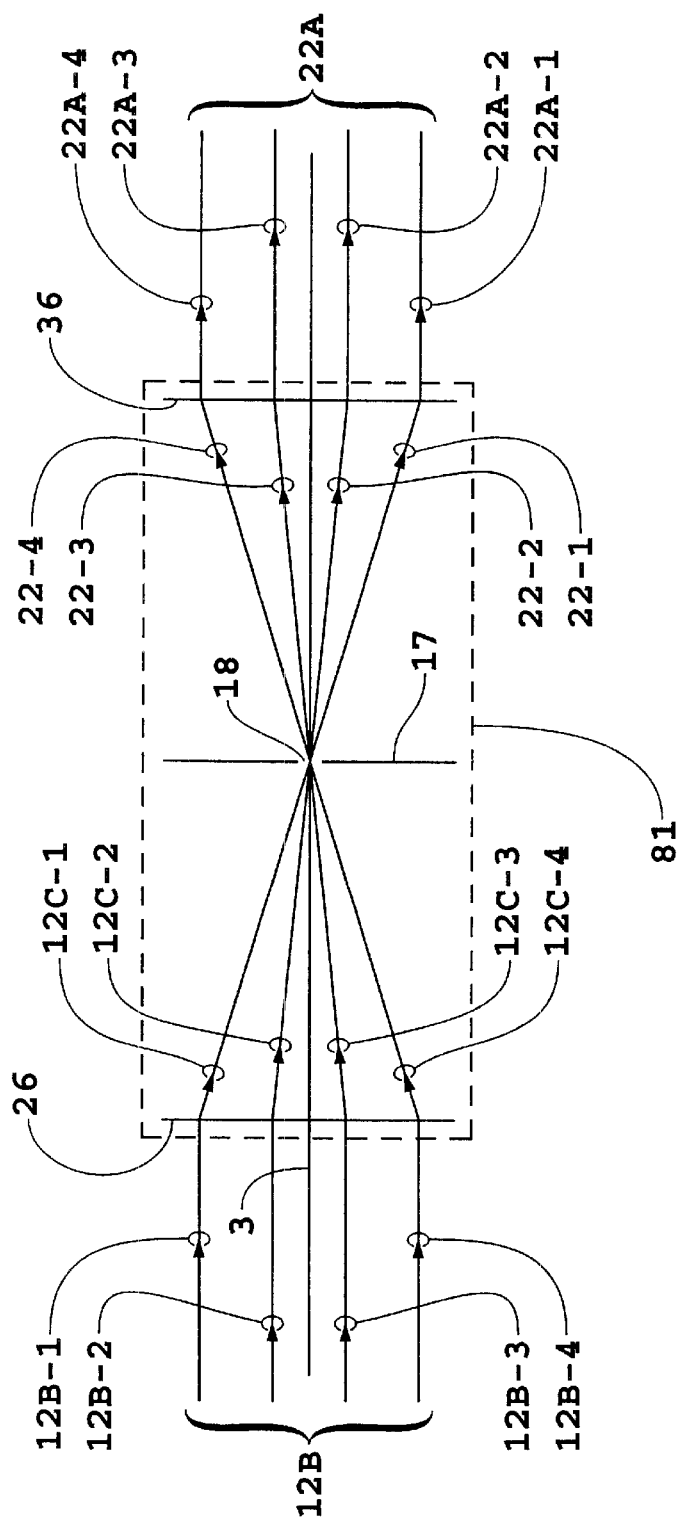
Figure 1D:
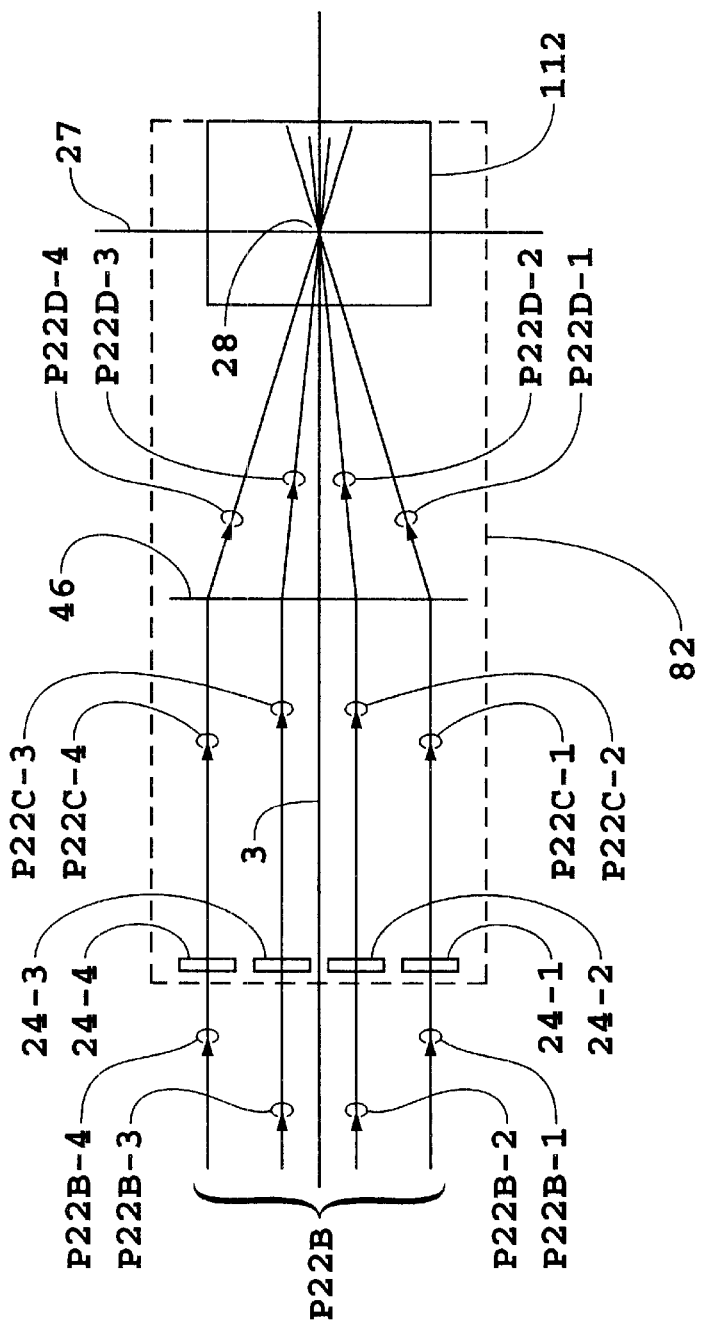
Figure 1E:
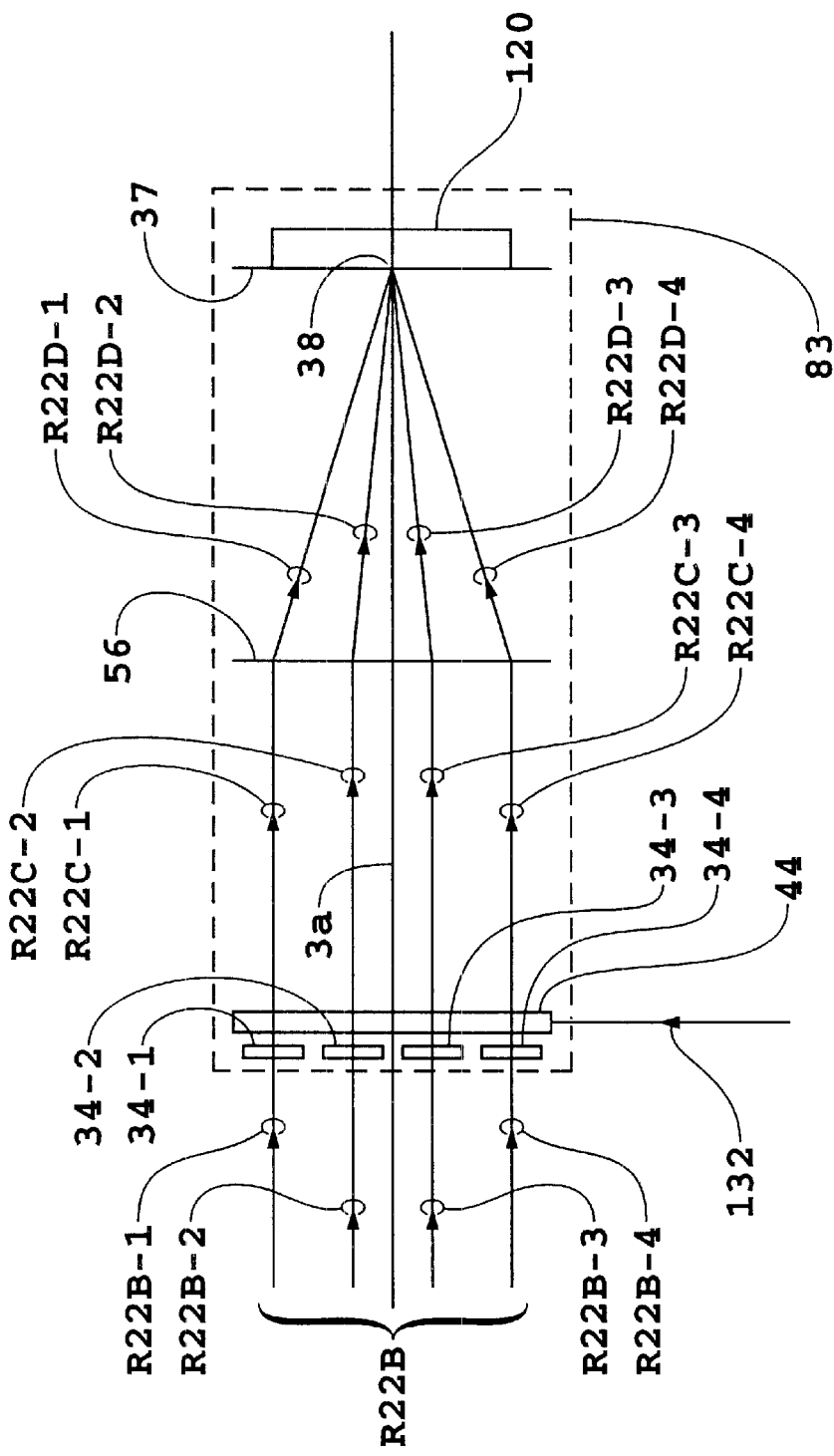
Figure 1F:
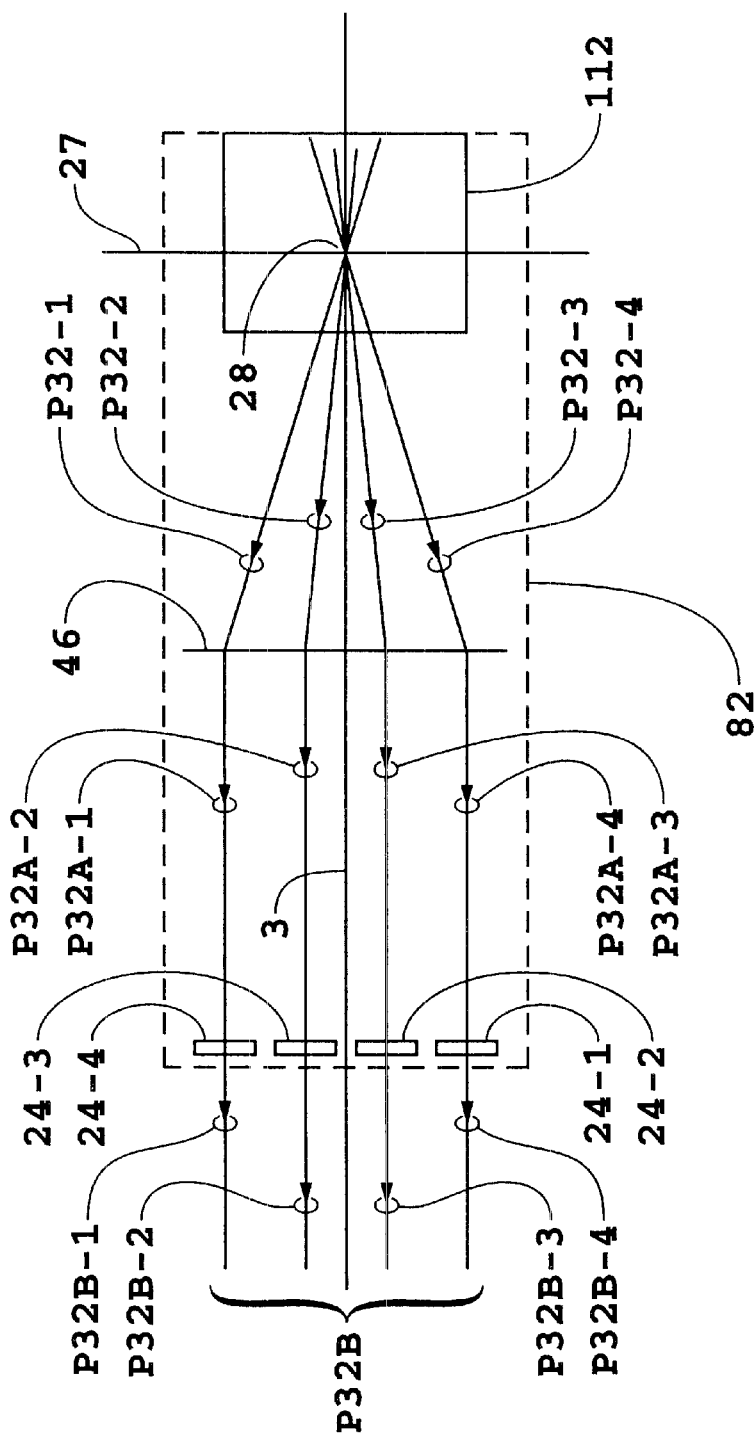
Figure 1G:
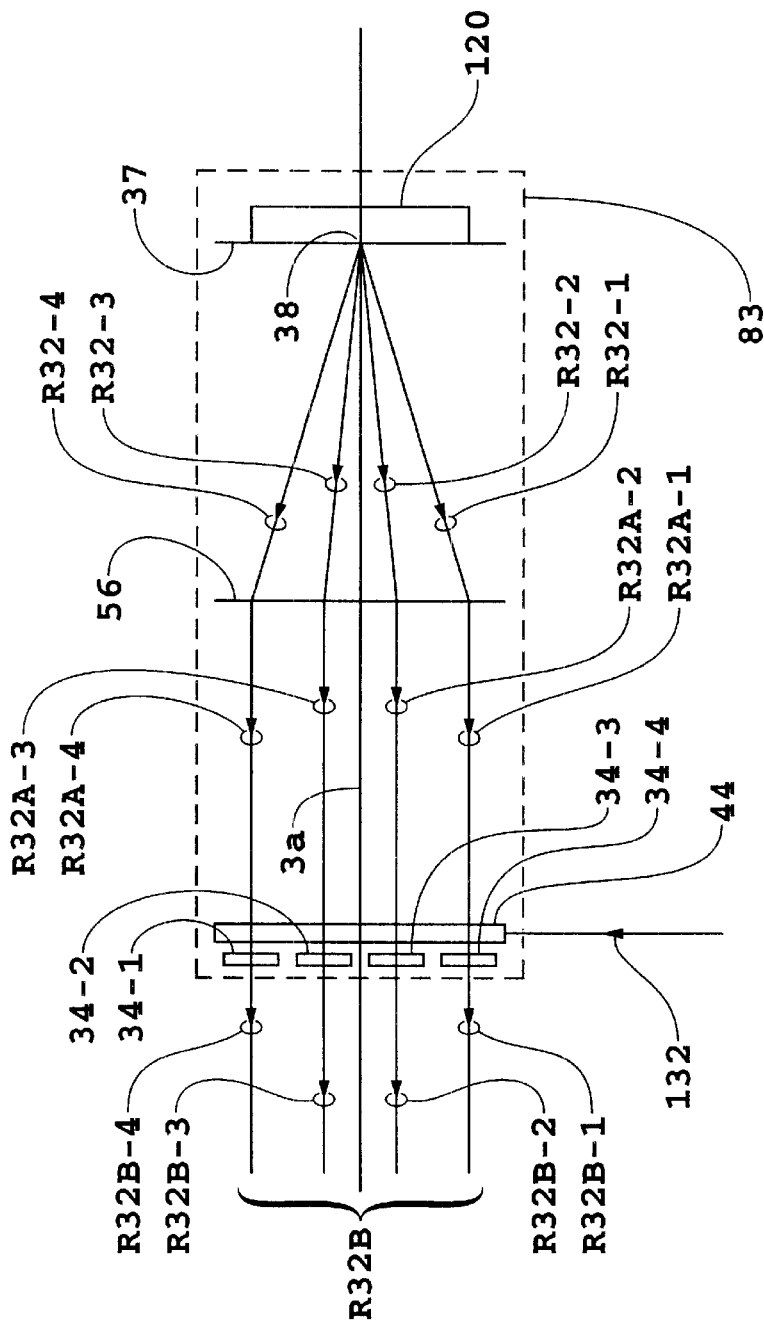
Figure 1H:
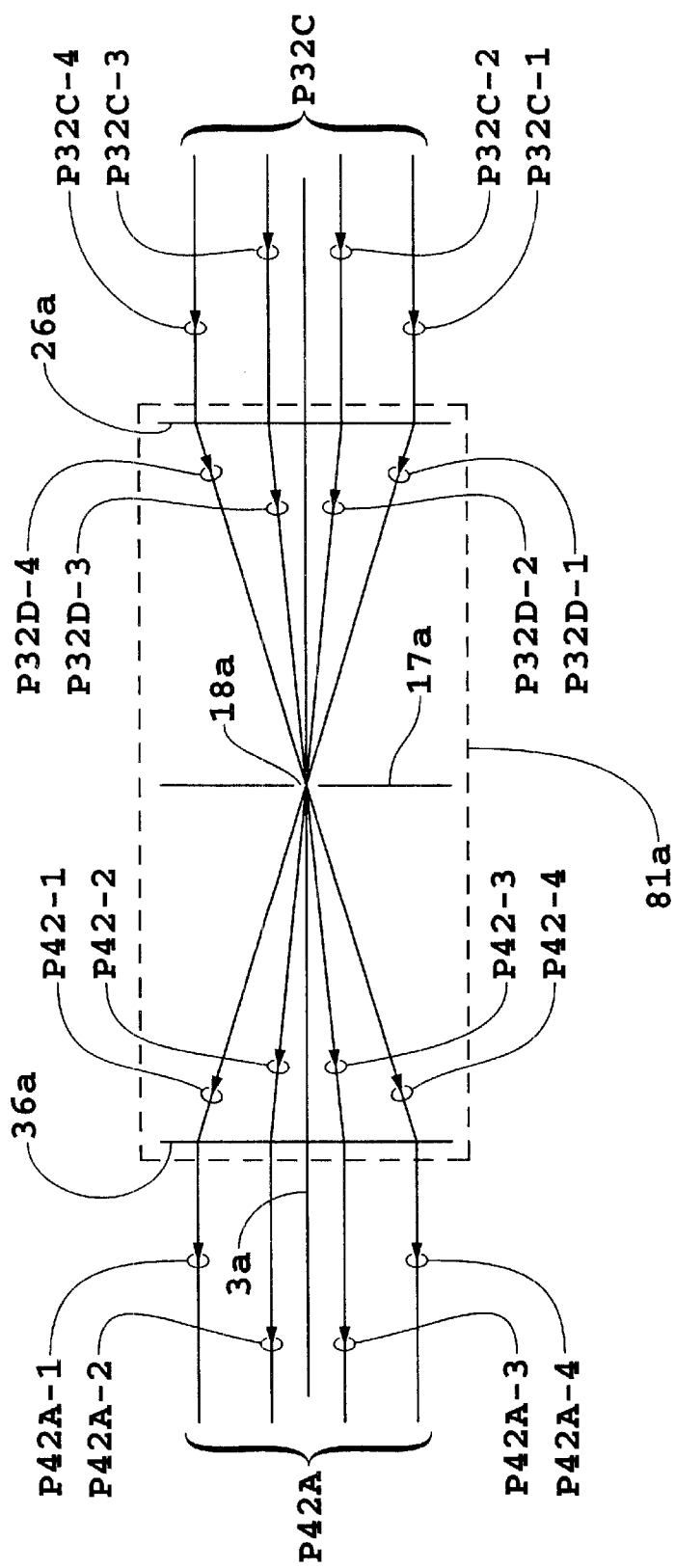
Figure 1I:
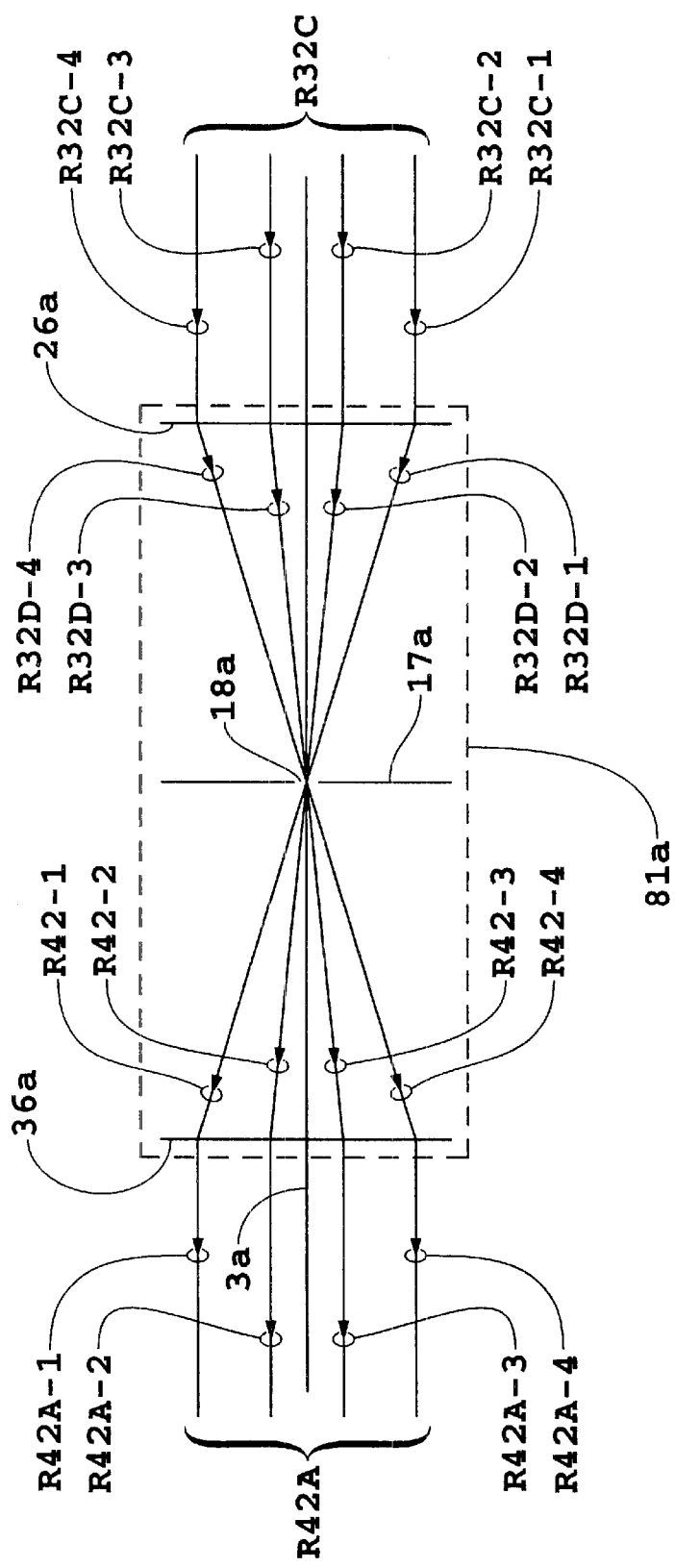
Figure 1J:
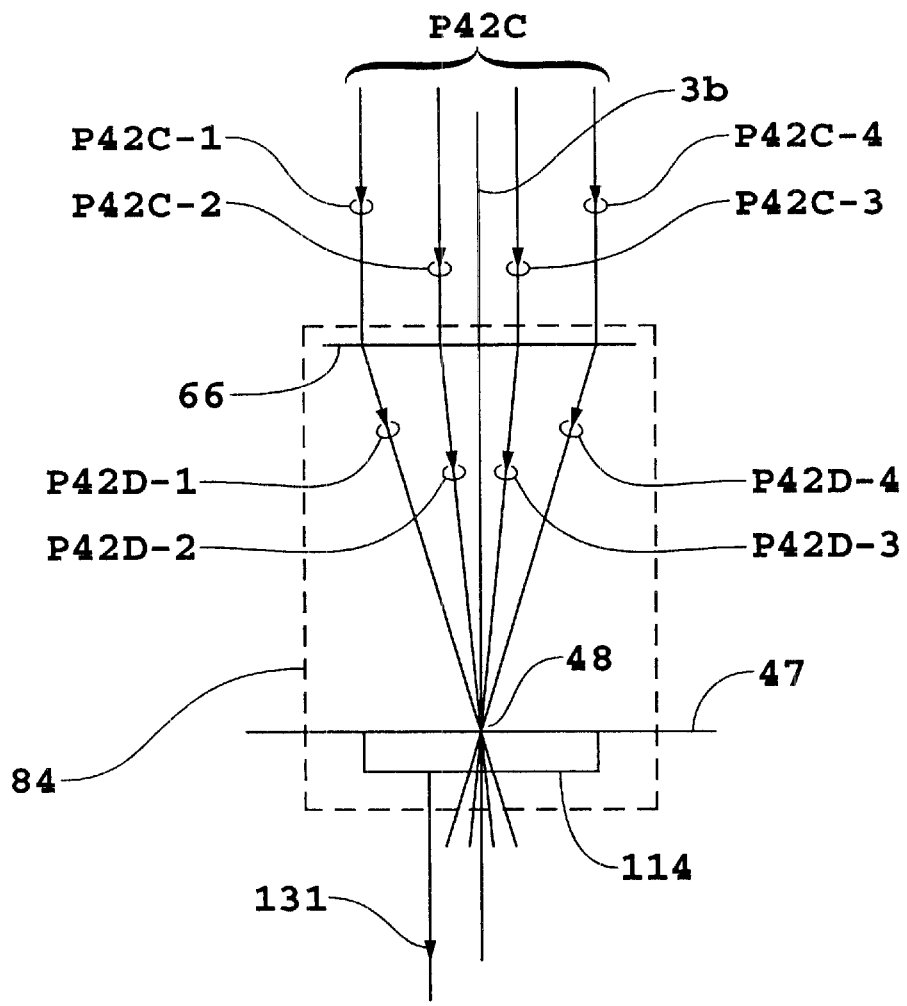
Figure 1K:
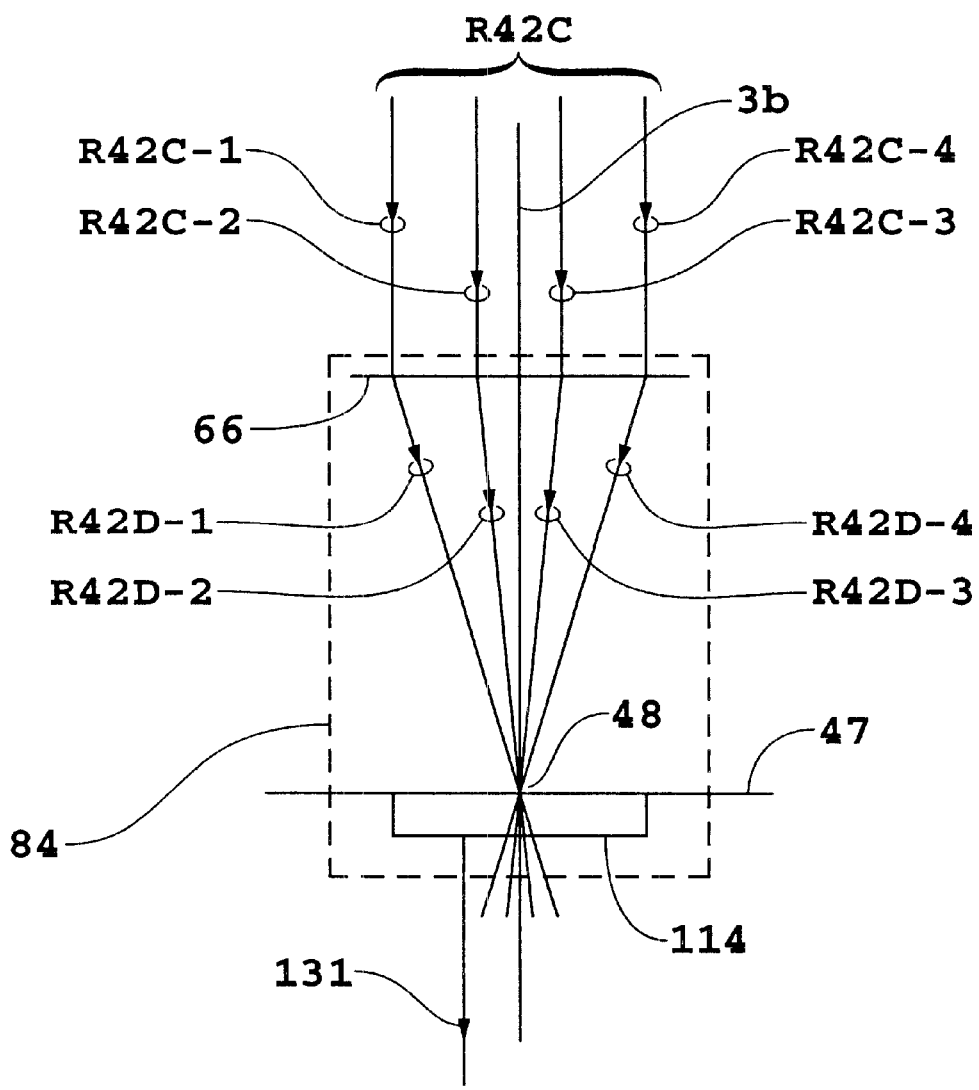
Figure 11:
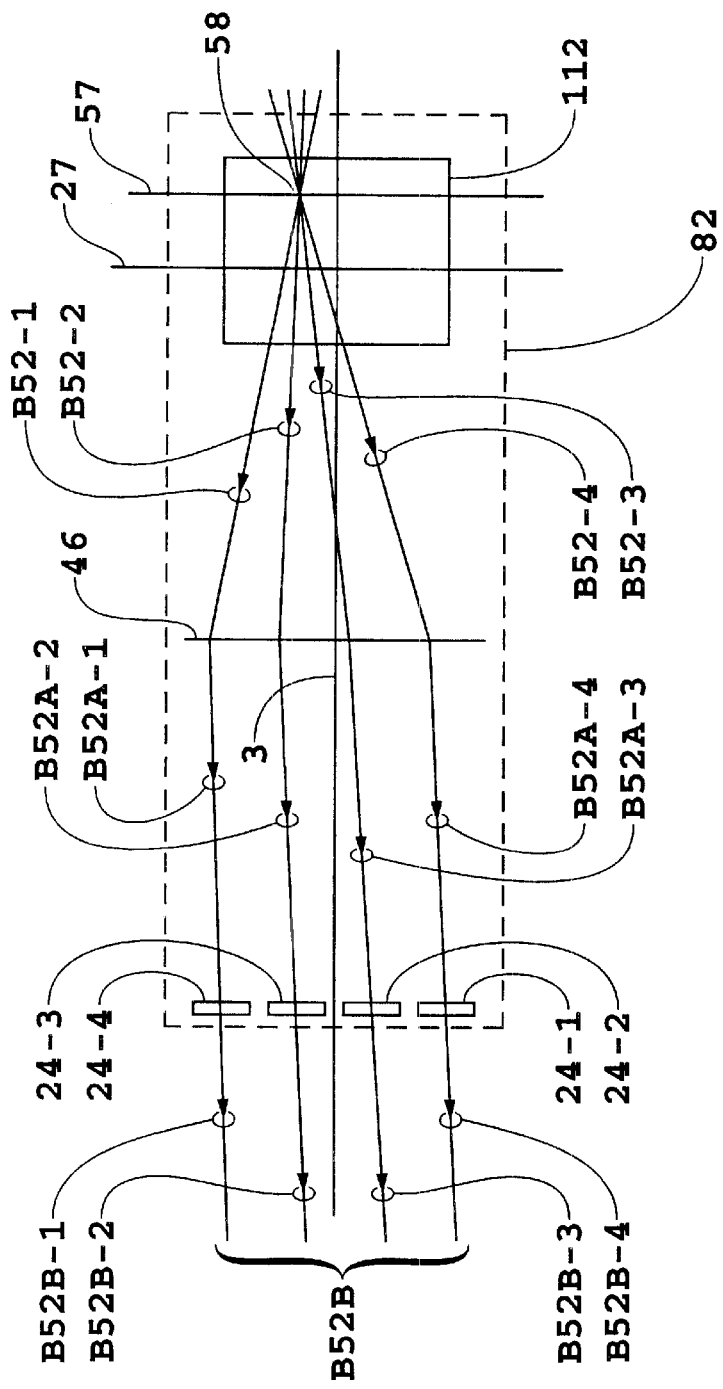
Figure 1M:
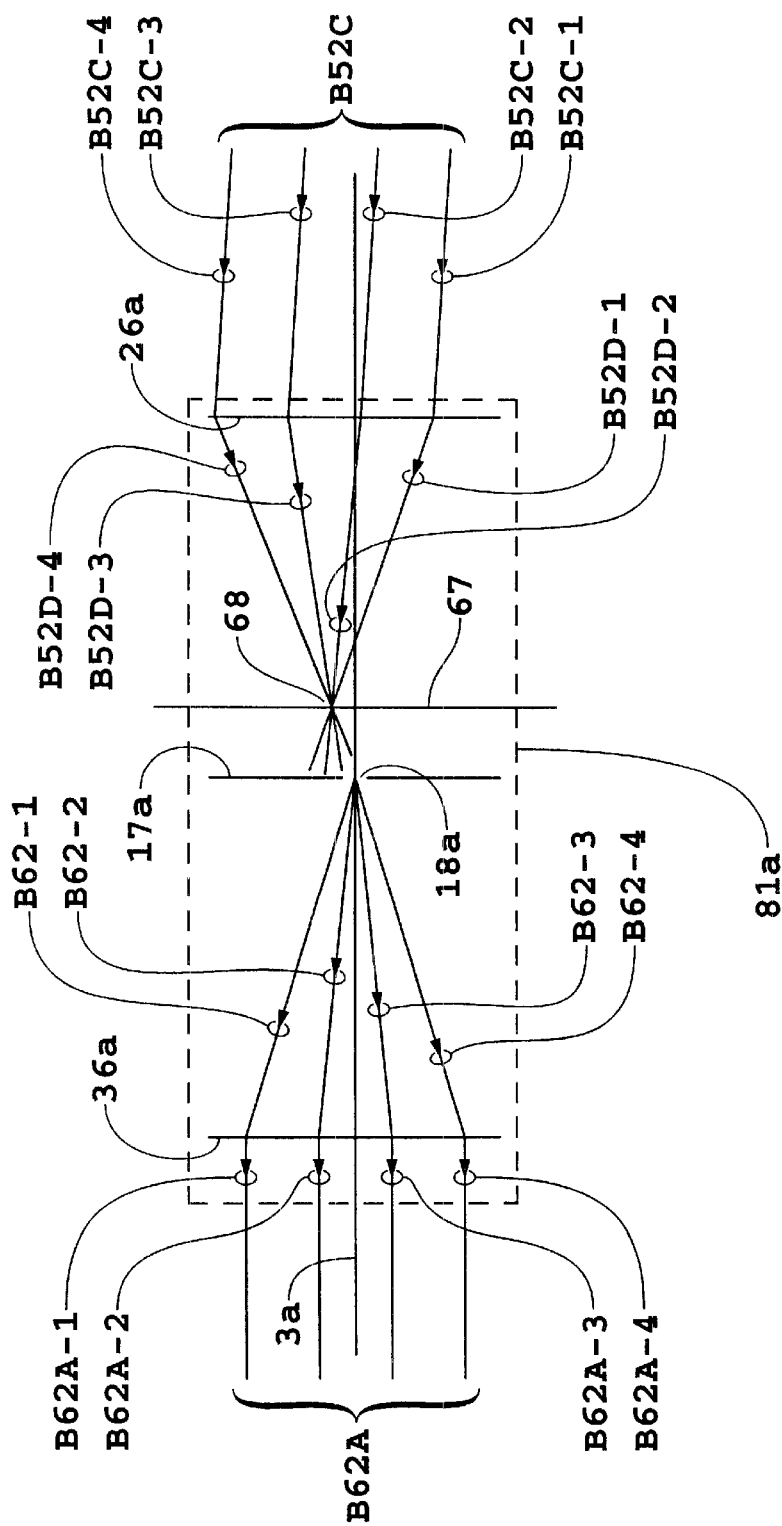
Figure 1N:
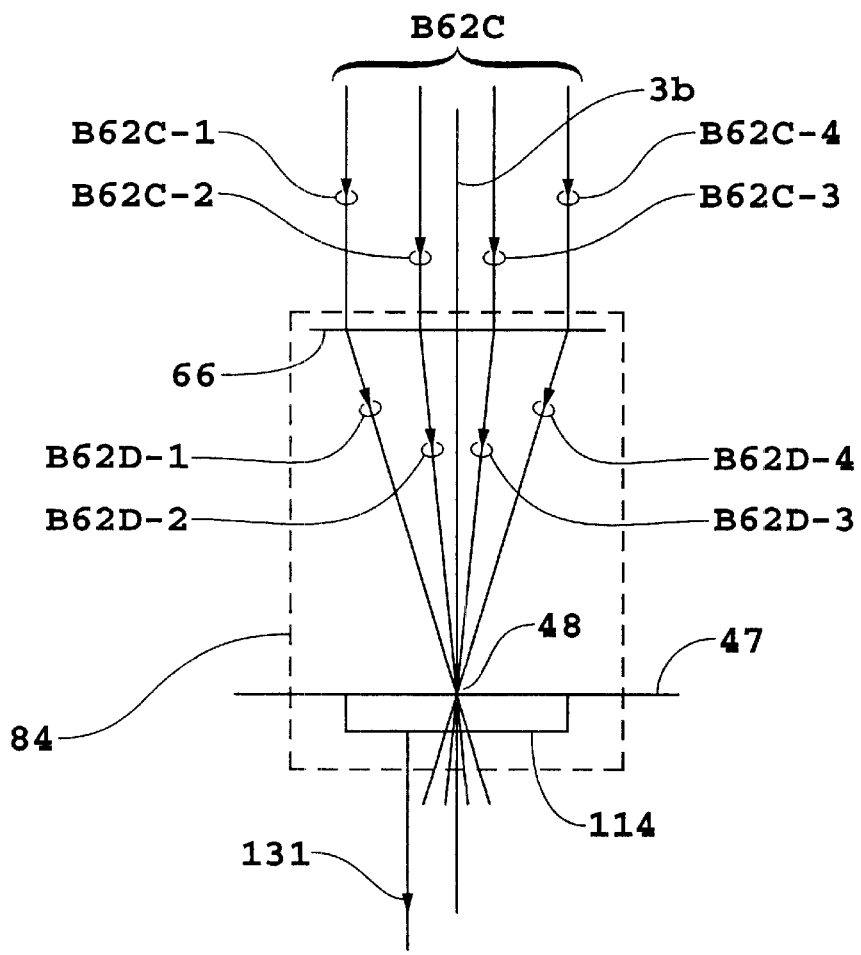
Figure 1A:
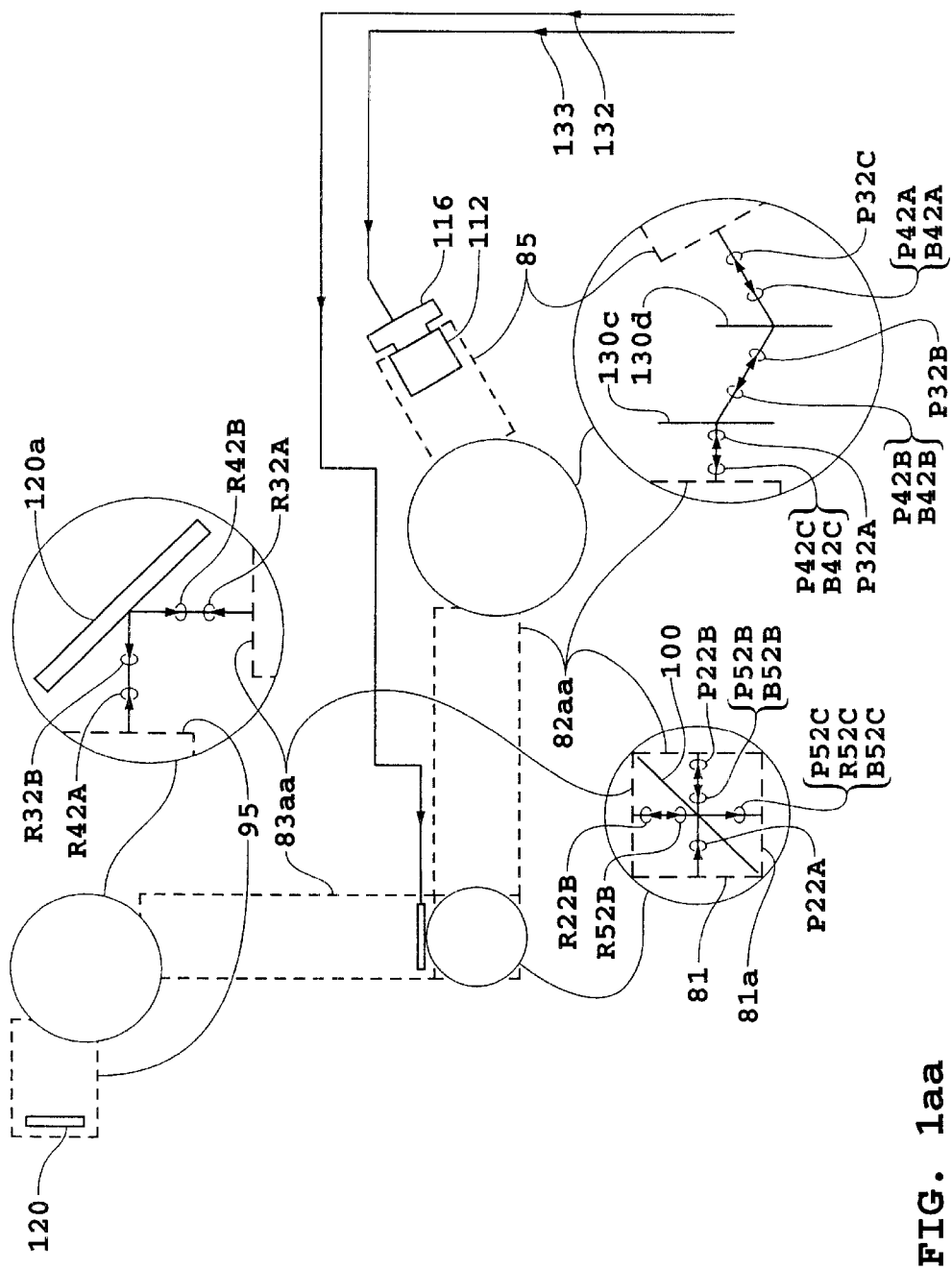
Figure 1A:
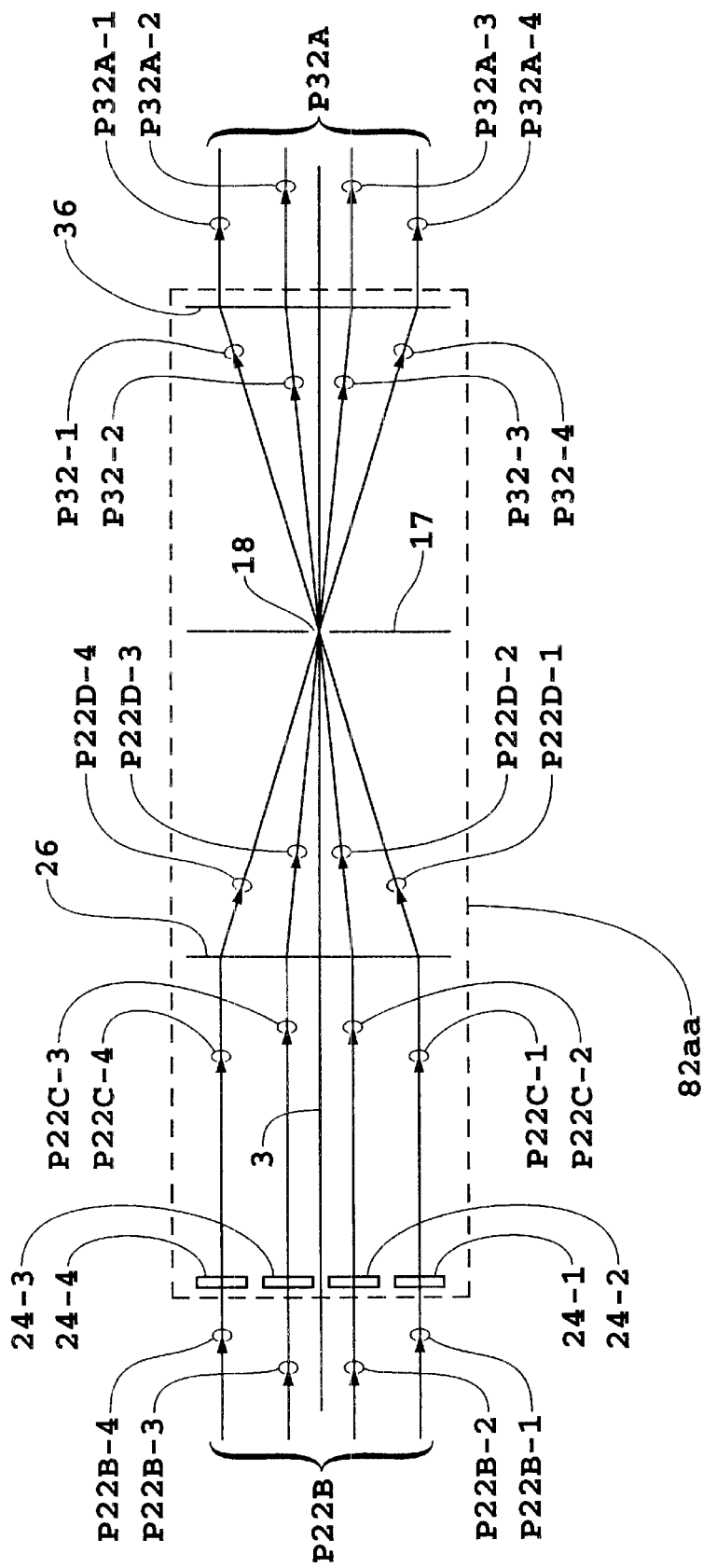
Figure 1A:
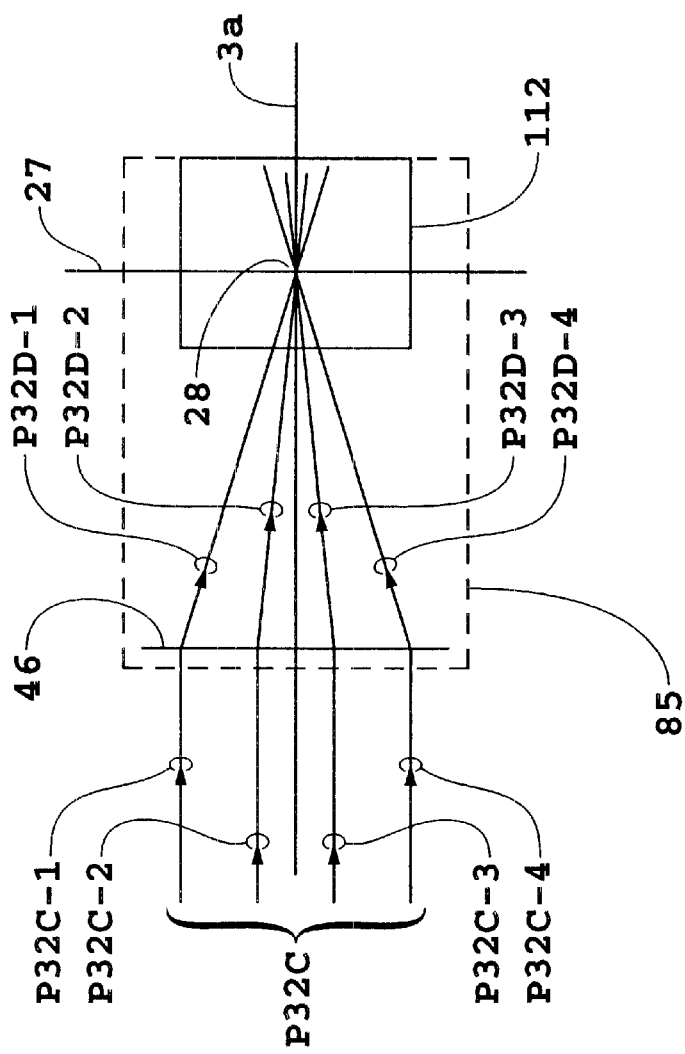
Figure 1A:
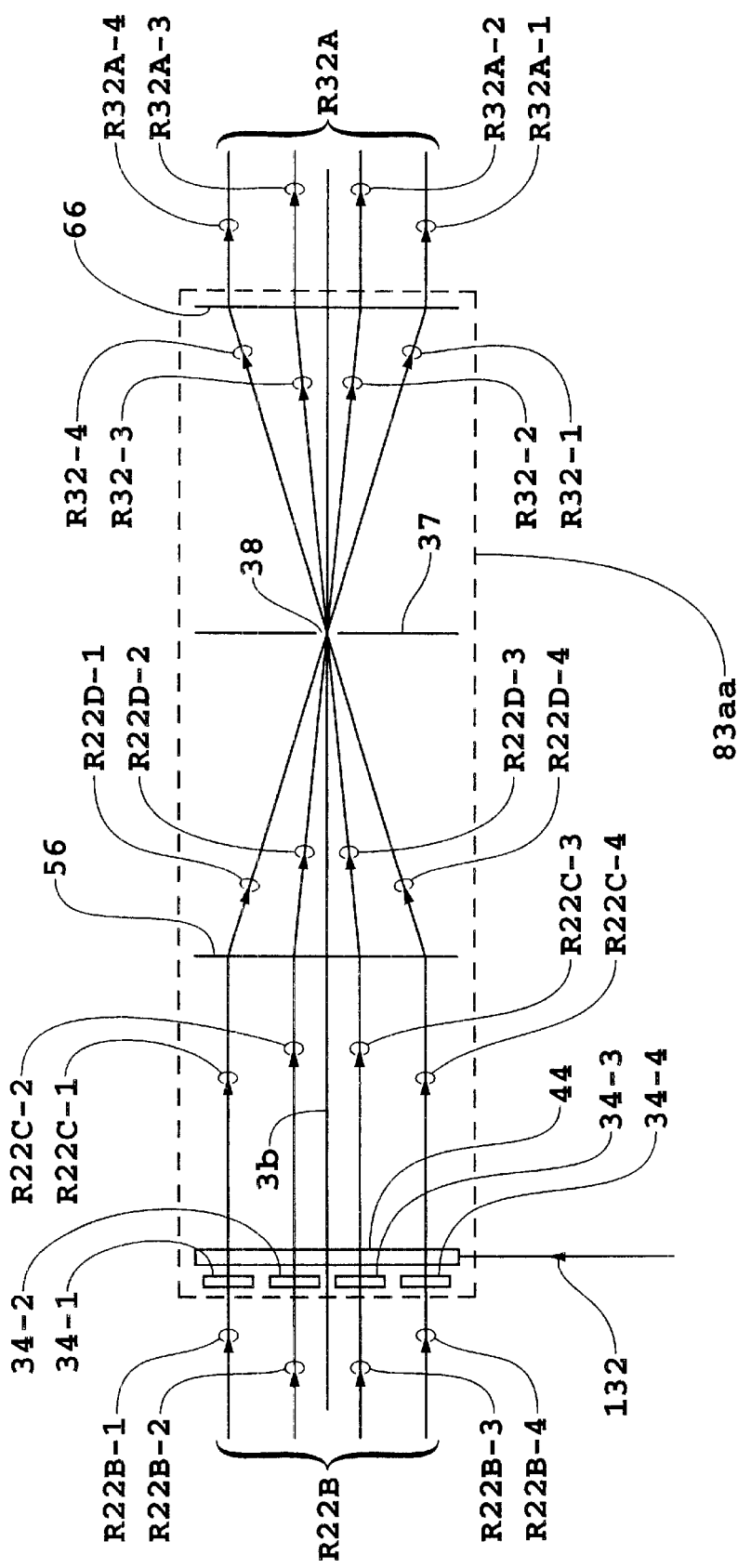
Figure 1A:
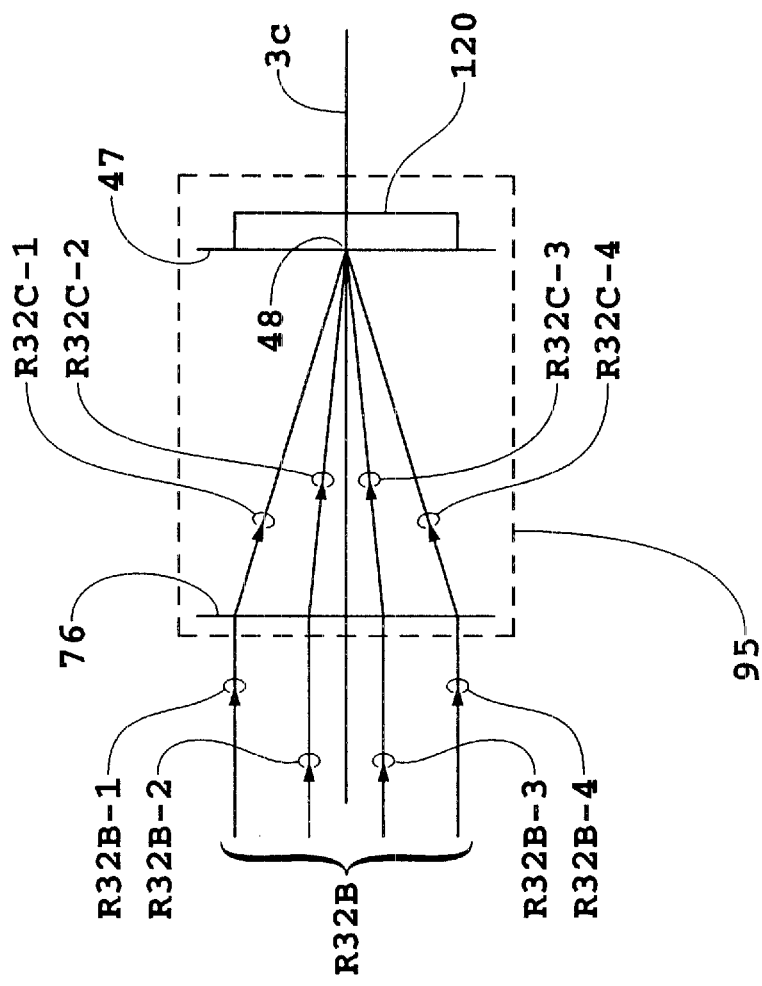
Figure 1A:
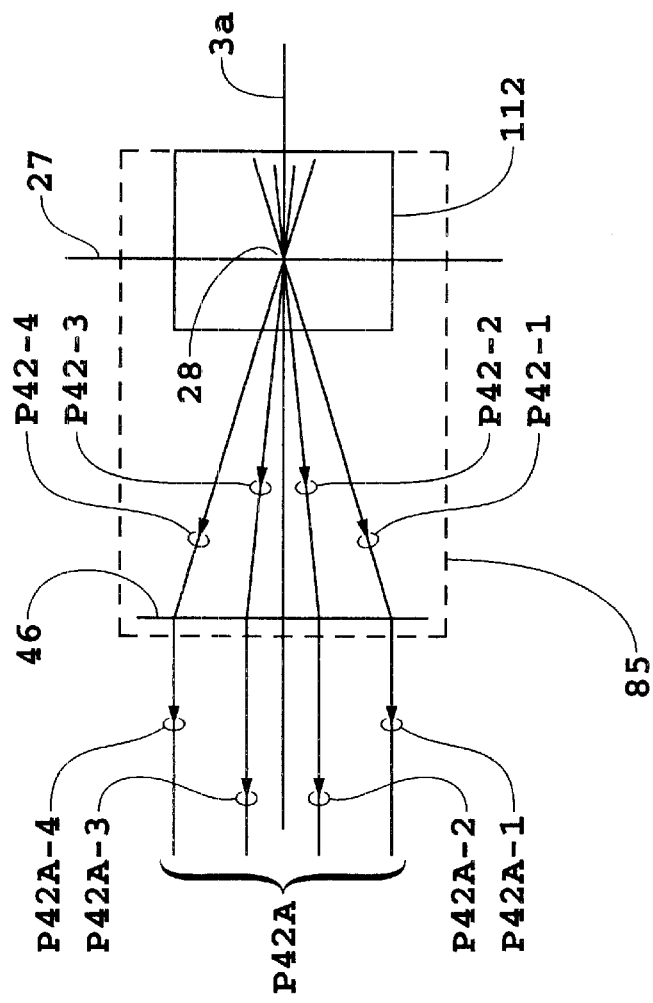
Figure 1A:
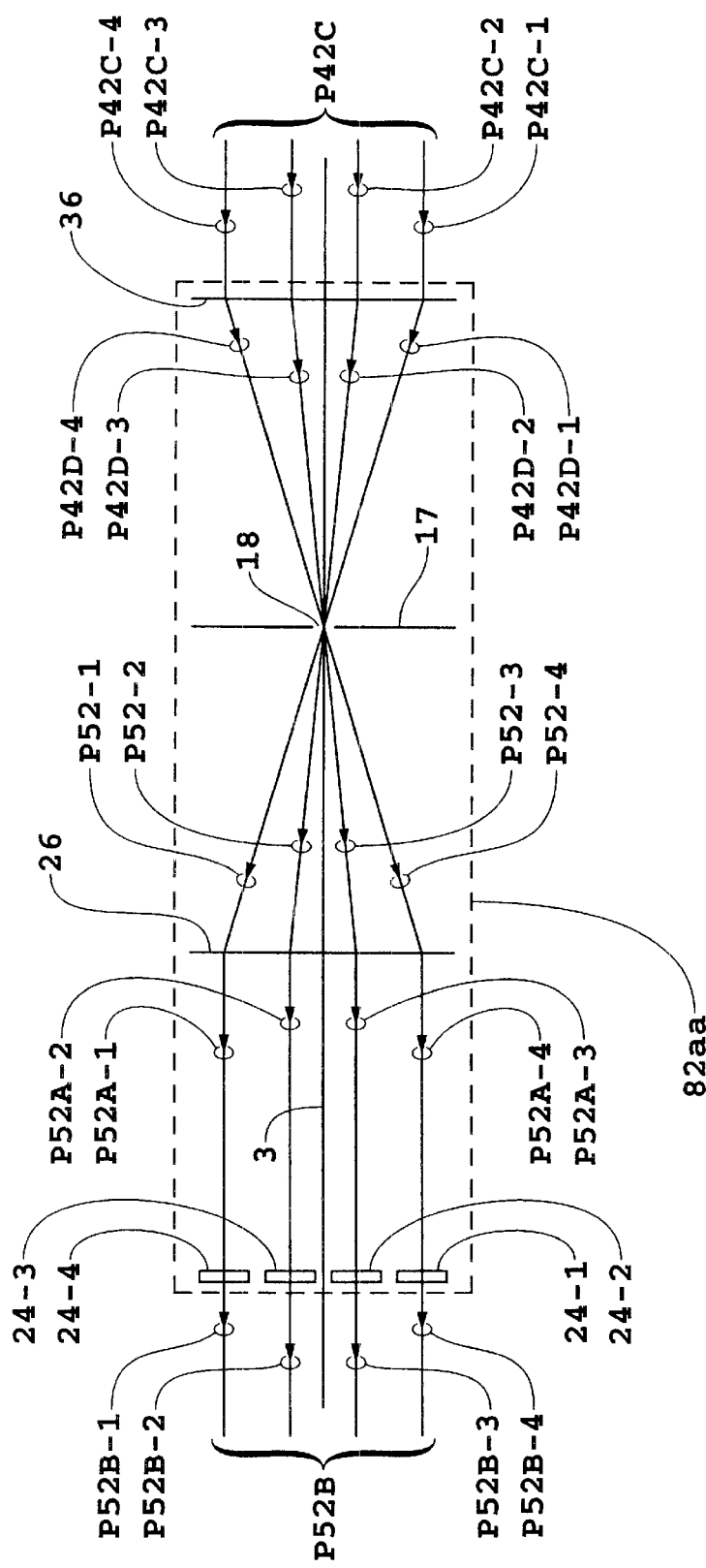
Figure 1A:
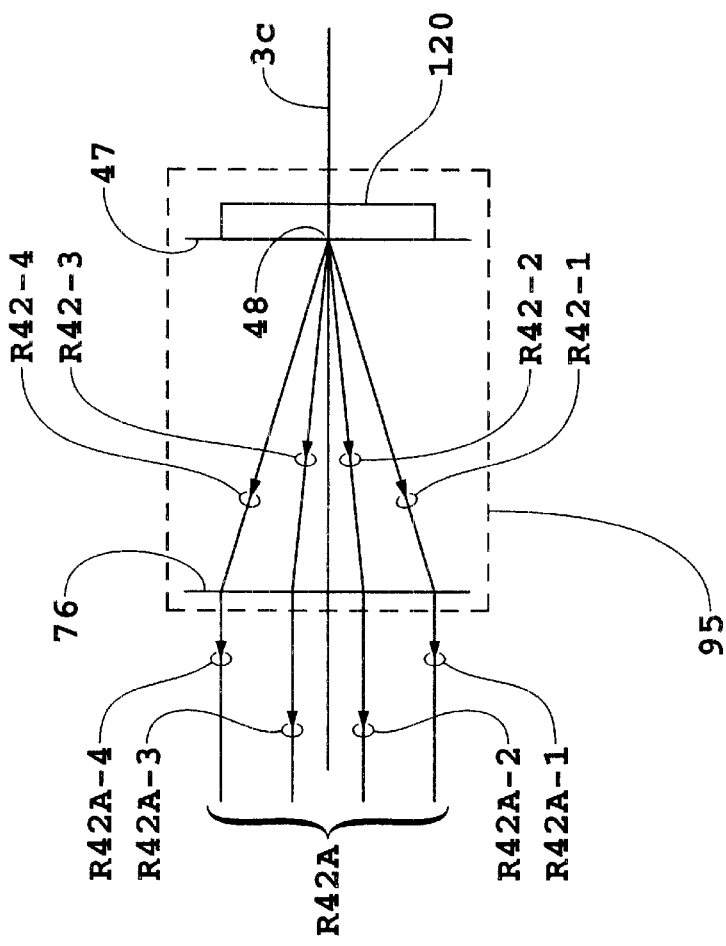
Figure 1A:
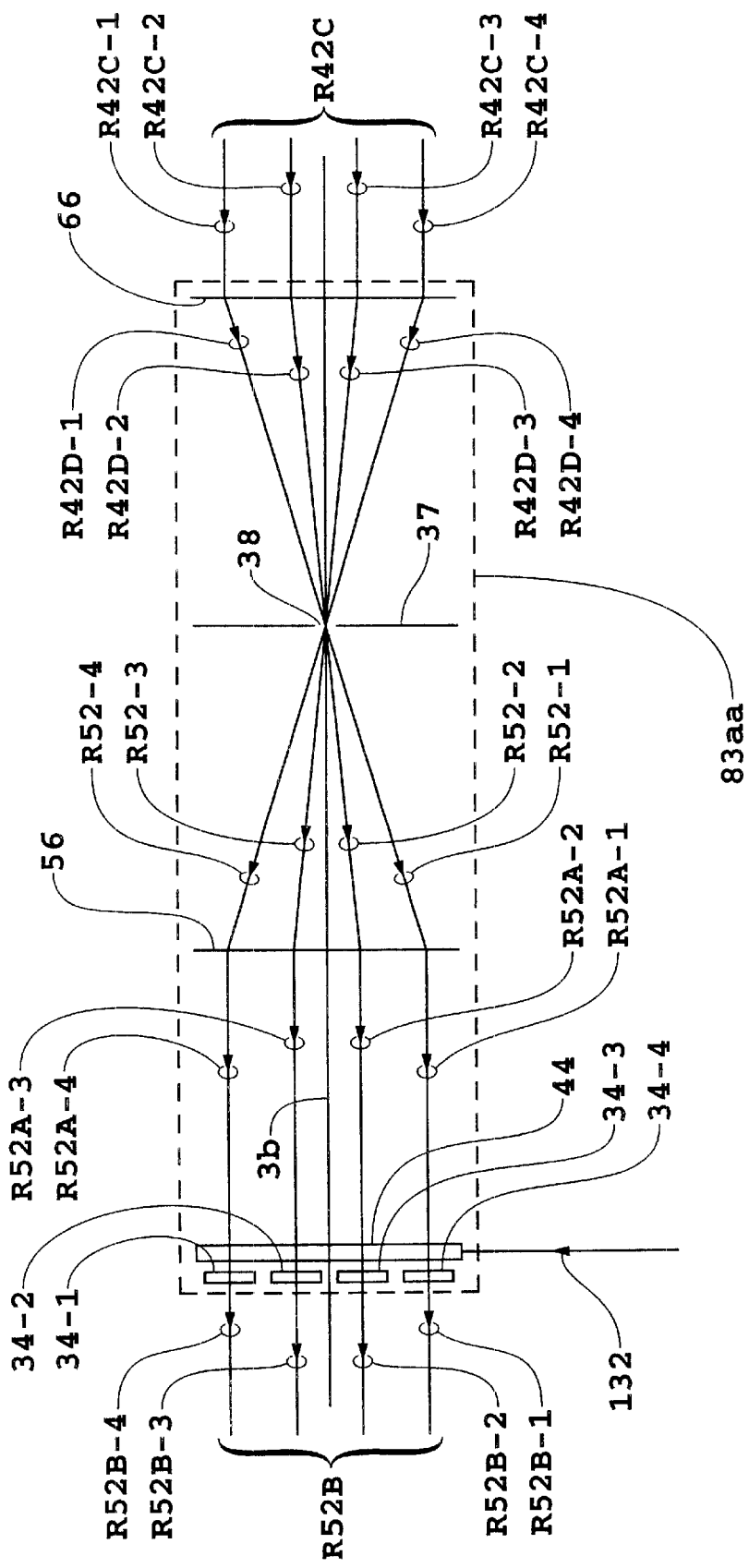

Referring to the drawings in detail, FIGS. 1*a*–1*n* depict in schematic form presently preferred first preferred embodiment of the instant invention. As shown in FIGS. 1*a*–1*n*, the preferred embodiment of the present invention is an interferometer comprised of a beam splitter 100 object material 112, translator 116, a reference mirror 120, dispersive detector elements 130a and 130b, and a detector 114. This configuration is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIG. 1a–1n without significantly departing from the spirit and scope of the preferred first embodiment of the present invention.

The orientation of the plane in which the impulse response function of an imaging subsystem is manipulated in the first preferred embodiment is perpendicular to the plane of FIG. 1a and parallel to the optical axis of the imaging subsystem.

FIG. 1b depicts in schematic form one embodiment of the subsystem 80 shown in FIG. 1a. The plane of FIG. 1b is perpendicular to the plane of FIG. 1a. For the first preferred embodiment, light source 10 is preferably a point source or a spatially incoherent source of radiation across surface of the source, preferably a laser or like source of coherent or partially coherent radiation, most preferably a superirradiant laser, and preferably polarized. Light source 10 emits input beam 2 aligned with optical axis 3 of subsystem 80. As shown in FIG. 1b, light beam 2 enters focusing lens 6 and is focused at pinhole 8 in image plane 7. Light beam 12 comprised of a plurality of light beams 12-1,-2, -3,-4 diverges from the pinhole 8 and enters lens 16 having an optical axis aligned with optical axis 3 of subsystem 80. Light beam 12 emerges from lens 16 as collimated light beam 12A comprised of light beams 12A-1,-2,-3,-4 and enters phase shifter 14. Phase shifter 14 is comprised of rectangular phase shifters 14-1,-2,-3,-4 which are located so that their respective optical axes are parallel to optical axis 3 of subsystem 80. Note that the number of phase shifters may be any suitable number 2m, m being an integer. The example shown in FIG. 1b is for the case of m=2, the case of four phase shifters being sufficient to clearly show the relationship between the components of apparatus of the present invention. Parallel light beams 12A-1,-2,-3,-4 pass through phase shifters 14-1,-2,-3,-4, respectively, and emerge from phase shifter 14 as light beams 12B-1,-2,-3,-4, respectively, which comprise light beam 12B. Each of the phase shifters 14-2 and 14-4 introduce a phase shift of π radians more than the phase shift introduced by each of the phase shifters 14-1 and 14-3, the phase shifts introduced by phase shifters 14-1 and 14-3 being the same.

In FIG. 1a, light beam 12B exits subsystem 80 and enters subsystem 81. In FIG. 1c, light beam 12B enters lens 26 having an optical axis aligned with optical axis 3 of subsystem 81 and emerges as light beam 12C comprised of light beams 12C-1,-2,-3,-4. The plane of FIG. 1c is perpendicular to the plane of FIG. 1a. Lens 26 focuses light beam 12C to image point 18 in image plane 17. Light beam 12C emerges from image point 18 as light beam 22 comprised of light beams 22-1,-2,-3,-4. Light beam 22 enters lens 36 having an optical axis aligned with optical axis 3 subsystem 81. Light beam 22 emerges from lens 36 and exits subsystem 81 as collimated light beam 22A comprised of light beams 22A-1,-2,-3,-4.

As shown in FIG. 1a , light beam 22A is partially transmitted by beam splitter 100 as light beam P22B comprised of light beams P22B-1,-2,-3,-4 and enters subsystem 82 which is shown in FIG. 1d.

In FIG. 1d, light beam P22B impinges onto a phase shifter 24 comprised of phase shifters 24-1,-2,-3,-4. The plane of FIG. 1d is perpendicular to the plane of FIG. 1a. Phase shifter 24 is comprised of the same number of 2m elements as phase shifter 14 and is shown in FIG. 1d with m=2. Light beams P22B-1,-2,-3,-4 pass through phase shifters 24-1,-2,-3,-4, respectively, and emerge as light beam P22C comprised of light beams P22C-1,-2,-3,-4, respectively. The phase shifts introduced by phase shifters 24-1 and 24-3 are of equal values which are π radians more than the phase shift introduced by either phase shifter 24-2 or 24-4, the phase shifts introduced by phase shifters 24-2 and 24-4 being of equal values.

The sum of the phase shifts produced by each pair of phase shifters 14-1 and 24-1, 14-2 and 24 -2, 14-3 and 24 -3, and 14-4 and 24-4 is π radians. Thus there is no net relative phase shift between any two of the light beams P22C-1,-2,-3,-4. Light beam P22C passes through lens 46 as light beam P22D comprised of light beams P22D-1,-2,-3,-4 which is focused to form a line image centered at image point 28 in image plane 27 in object material 112. The axis of the line image is substantially parallel to the optical axis 3 of imaging subsystem 82. The length of the line image is determined by a combination of factors such as the depth of focus and chromatic aberration of probe lens 46 and the optical bandwidth of the source 10. The line section may cut through one or more surfaces of the object material or lie in a surface of the object material. Optical axis of lens 46 is aligned with optical axis 3 of subsystem 82.

In FIG. 1a, light beam 22A is partially reflected by beam splitter 100 as light beam R22B comprised of light beams R22B-1,-2,-3,-4. Light beam R22B enters subsystem 83 that is shown in FIG. 1e. The plane of FIG. 1e is perpendicular to the plane of FIG. 1a. As shown in FIG. 1e, light beam R22B impinges on phase shifter 34 comprised of phase shifters 34-1,-2,-3,-4. Phase shifter 34 contains the same number of elements, 2m, as phase shifter 14 and is shown in FIG. 1e with m=2. Light beam R22B passes through phase shifter 34 and then through phase shifter 44 to emerge as light beam R22C comprised of light beams R22C-1,-2,-3,-4. The phase shift introduced by phase shifter 44 is controlled by signal 132 from computer 118. The phase shifts introduced by phase shifters 34-1 and 34-3 are of equal values which are π radians more than the phase shift introduced by either phase shifter 34-2 or 34-4, the phase shifts introduced by phase shifters 34-2 and 34-4 being of equal values. Thus there is no net relative phase shift between any two of the light beams R22C-1,-2,-3,-4. Light beam R22C passes through lens 56 as light beam R22D comprised of light beams R22D-1,-2,-3,-4. Light beam R22D is focused by lens 56 to image point 38 in image plane 37 on reference mirror 120. Optical axis of lens 56 is aligned with optical axis 3a of subsystem 83.

In FIG. 1f, a portion of light beam P22D (cf. FIG. 1d) is reflected and/or scattered by the object material in the line image centered at image point 28 as a plurality of light beams P32-1,-2,-3,-4 comprising scattered probe beam P32. The plane of FIG. 1f is perpendicular to the plane of FIG. 1a. Scattered probe beam P32 diverges from image point 28 in image plane 27 and enters lens 46. As shown in FIG. 1f, scattered probe beam P32 emerges from lens 46 as collimated scattered probe beam P32A comprised of light beams P32A-1,-2,-3,-4. Light beams P32A-1,-2,-3,-4 pass through phase shifters 24-4,-3,-2,-1, respectively, and emerge as light beams P32B-1,-2,-3,-4, respectively. Light beams P32B-1,-2,-3,-4 comprise scattered probe beam P32B which exits subsystem 82. The phase shifts introduced by phase shifters 24-1 and 24-3 are of equal values which are π radians more than the phase shift introduced by either phase shifter 24-2 or 24-4, the phase shifts introduced by phase shifters 24-2 and 24-4 being of equal values.

In FIG. 1g, light beam R22D (cf. FIG. 1e) is reflected by reference mirror 120 as reflected reference beam R32 comprised of light beams R32-1,-2,-3,-4. The plane of FIG. 1g is perpendicular to the plane of FIG. 1a. Reflected reference beam R32 diverges from image point 38 in image plane 37 and enters lens 56. As shown in FIG. 1g, reflected reference beam R32 emerges from lens 56 as collimated reflected reference beam R32A comprised of light beams R32A-1,-2,-3,-4. Light beams R32A-1,-2,-3,-4 pass first through phase shifter 44 and then through phase shifters 34-4,-3,-2,-1, respectively, to emerge as reflected reference beam R32B comprised of light beams R32B-1,-2,-3,-4, respectively. The phase shift introduced by phase shifter 44 is controlled by signal 132 from computer 118. The phase shifts introduced by phase shifters 34-1 and 34-3 are of equal values which are π radians more than the phase shift introduced by either phase shifter 34-2 or 34-4, the phase shifts introduced by phase shifters 34-2 and 34-4 being of equal values. Light beams R32B-1,-2,-3,-4 comprise light beam R32B which exits subsystem 83.

It is shown in FIG. 1a that scattered probe beam P32B is partially reflected by beam splitter 100 as scattered probe beam P32C which is comprised of light beams P32C-1,-2,-3,-4. Scattered probe beam P32C enters subsystem 81a shown in FIG. 1h. The plane of FIG. 1h is perpendicular to the plane of FIG. 1a. In FIG. 1h, scattered probe beam P32C enters lens 26a having an optical axis aligned with optical axis 3a of subsystem 81a and emerges as scattered probe beam P32D comprised of light beams P32D-1,-2,-3,-4. Lens 26a focuses scattered probe beam P32D onto pinhole 18a in image plane 17a. A portion of scattered probe beam P32D emerges from pinhole 18a as spatially-filtered scattered probe beam P42 comprised of light beams P42-1,-2,-3,-4. Scattered probe beam P42 enters lens 36a having an optical axis aligned with optical axis 3a of subsystem 81a. Spatially-filtered scattered probe beam P42 emerges from lens 36a and exits subsystem 81a as collimated spatially-filtered scattered probe beam P42A comprised of light beams P42A-1,-2,-3,-4.

As shown in FIG. 1a reflected reference beam R32B is partially transmitted by beam splitter 100 as reflected reference beam R32C comprised of light beams R32C-1,-2,-3,-4. Reflected reference beam R32C enters subsystem 81a shown in FIG. 1i. The plane of FIG. 1i is perpendicular to the plane of FIG. 1a. In FIG. 1i, reflected reference beam R32C enters lens 26a and emerges as reflected reference beam R32D comprised of light beams R32D-1,-2,-3,-4. Lens 26a focuses reflected reference beam R32D onto pinhole 18a in image plane 17a. A portion of reflected reference beam R32D emerges from pinhole 18a as spatially-filtered reflected reference beam R42 comprised of light beams R42-1,-2,-3,-4. Spatially-filtered reflected reference beam R42 enters lens 36a. Spatially-filtered reflected reference beam R42 emerges from lens 36a and exits subsystem 81a as collimated spatially-filtered reflected reference beam R42A comprised of light beams R42A-1,-2,-3,-4.

It is shown in FIG. 1a that spatially-filtered scattered probe beam P42A impinges on dispersive element 130a which is preferably a reflecting diffraction grating. A portion of spatially-filtered scattered probe beam P42A is diffracted in the plane of FIG. 1a by the first dispersive detector element 130a as scattered probe beam P42B. Scattered probe beam P42B impinges on a second dispersive detector element 130b which is preferably a transmission diffraction grating. A portion of scattered probe beam P42B is diffracted in the plane of FIG. 1a by the second dispersive detector element 130b as wavenumber-filtered, spatially-filtered scattered probe beam P42C. Although the beams P42B and P42C are comprised of a spectrum of optical frequency components and therefore dispersed in angle in the plane of FIG. 1a, the paths of only one frequency component of beams P42B and P42C are shown in FIG. 1a. The paths shown are typical. The illustration of only one optical frequency component for beams P42B and P42C permits the display of the important properties of subsystem 84 with respect to the wavenumber-filtered, spatially-filtered scattered probe beam P42C without departing from the spirit or scope of the present invention and without introducing undue complexity into FIG. 1a and subsequent figures.

Wavenumber-filtered, spatially-filtered beam P42C enters subsystem 84 shown in FIG. 1j. The plane of FIG. 1j is perpendicular to the plane of FIG. 1a. As shown in FIG. 1j, wavenumber-filtered, spatially-filtered beam P42C passes through lens 66 having an optical axis aligned with optical axis 3d of subsystem 84 and emerges as wavenumber-filtered, spatially-filtered beam P42D comprised of light beams P42D-1,-2,-3,-4. The wavenumber-filtered, spatially-filtered beam P42D illustrated with only one optical frequency component is focused by lens 66 to image point 48 in image plane 47. The location of the image point 48 in the image plane 47 and therefore the location of the image point 48 on a linear array of detector pinholes located in the image plane 47 will depend on the optical frequency of wavenumber-filtered, spatially-filtered beam P42D by virtue of dispersive detector elements 130a and 130b. The portions of a light beam that pass through the linear array of detector pinholes is detected by a multi-pixel detector 114, preferably a detector comprised of a linear array of pixels such as a linear array CCD.

It is shown in FIG. 1a that spatially-filtered reflected reference beam R42A impinges on dispersive detector element 130a. A portion of spatially-filtered reflected reference beam R42A is diffracted in the plane of FIG. 1a by dispersive detector element 130a as reflected reference beam R42B. Reflected reference beam R42B impinges on the second dispersive detector element 130b. A portion of reflected reference beam R42B is diffracted in the plane of FIG. 1a by the second dispersive detector element 130b as wavenumber-filtered, spatially-filtered reflected reference beam R42C. Although the beams R42B and R42C are comprised of a spectrum of optical frequency components and therefore dispersed in angle in the plane of FIG. 1a, the paths of only one optical frequency component for beams R42B and R42C are shown in FIG. 1a. The paths shown are typical. The illustration of only one optical frequency component for beams R42B and R42C permits the display of the important properties of section 84 with respect to the wavenumber-filtered, spatially-filtered reflected reference beam R42C without departing from the spirit or scope of the present invention and without introducing undue complexity into FIG. 1a and subsequent figures.

Wavenumber-filtered, spatially-filtered reflected reference beam R42C enters subsystem 84 shown in FIG. 1k. The plane of FIG. 1k is perpendicular to the plane of FIG. 1a. In FIG. 1k, wavenumber-filtered, spatially-filtered reflected reference beam R42C passes through lens 66 and emerges as wavenumber-filtered, spatially-filtered reflected reference beam R42D comprised of light beams R42D-1,-2,-3,-4. Wavenumber-filtered, spatially-filtered reflected reference beam R42D illustrated with only one optical frequency component in FIG. 1k is focused by lens 66 to image point 48 in image plane 47. The location of the image point 48 in image plane 47 and therefore the location of the image point 48 on the linear array of detector pinholes located in the image plane 47 will depend on the optical frequency of wavenumber-filtered, spatially-filtered reflected reference beam R42D. The portions of a light beam that pass through the linear array of detector pinholes are detected by multi-pixel detector 114.

In FIG. 1l, a portion of light beam P22 (cf. FIG. 1d) is reflected and/or scattered by the object material at an "out-of-focus" image point 58 in out-of-focus image plane 57 as background beam B52 comprised of light beams B52-1,-2,-3,-4. The plane of FIG. 1l is perpendicular to the plane of FIG. 1a. Background beam B52 diverges from out-of-focus image point 58 and enters lens 46. As shown in FIG. 1l, background beam B52 emerges from lens 46 as substantially collimated background beam B52A comprised of light beams B52A-1,-2,-3,-4. Light beams B52A-1,-2,-3,-4 pass through phase shifters 24-4, 24-3, 24-2, and 24-1, respectively, and emerge as light beams B52B-1,-2,-3,-4, respectively. Light beams B52B-1,-2,-3,-4 comprise background beam B52B. The phase shifts introduced by phase shifters 24-1 and 24-3 are of equal values which are $\pi$ radians more than the phase shift introduced by either phase shifter 24-2 or 24-4, the phase shifts introduced by phase shifters 24-2 and 24-4 being of equal values.

As shown in FIG. 1a, background beam B52B is partially reflected by beam splitter 100 as background beam B52C comprised of light beams B52C-1,-2,-3,-4. Background beam B52C enters subsystem 81a shown in FIG. 1m and passes through lens 26a to emerge as background beam B52D. Background beam B52D is comprised of light beams B52D-1,-2,-3,-4. The plane of FIG. 1m is perpendicular to the plane of FIG. 1a. Background beam B52D is focused by lens 26a onto image point 68 in out-of-focus image plane 67 which is displaced from the image plane 17a. Background beam B52D is out-of-focus in the image plane 17a and thus only a small portion of out-of-focus background beam B52D is transmitted by pinhole 18a for each frequency component of background beam B52D. The small portion of out-of-focus background beam B52D is transmitted by pinhole 18a as spatially-filtered background beam B62 comprised of light beams B62-1,-2,-3,-4. A portion of spatially-filtered background beam B62 impinges on lens 36a and emerges as a substantially collimated spatially-filtered background beam B62A comprised of light beams B62A-1,-2,-3,-4. Spatially-filtered background beam B62A exits subsystem 81a as spatially-filtered background beam B62A.

It is shown in FIG. 1a that spatially-filtered background beam B62A impinges on dispersive detector element 130a. A portion of spatially-filtered background beam B62A is diffracted in the plane of FIG. 1a by the first dispersive detector element 130a as background beam B62B. Background beam B62B impinges on the second dispersive detector element 130b. A portion of background beam B62B is diffracted in the plane of FIG. 1a by the second dispersive detector element 130b as wavenumber-filtered, spatially-filtered background beam B62C. Although the beams B62B and B62C are comprised of a spectrum of optical frequency components and therefore dispersed in angle in the plane of FIG. 1a, the paths of only one optical frequency component for beams B62B and B62C are shown in FIG. 1a. Wavenumber-filtered, spatially-filtered background beam B62C enters subsystem 84 shown in FIG. 1n. In FIG. 1n, wavenumber-filtered, spatially-filtered background beam B62C passes through lens 66 and emerges as wavenumber-filtered, spatially-filtered background beam B62D. Wavenumber-filtered, spatially-filtered background beam B62D illustrated with only one optical frequency component in FIG. 1n is focused by lens 66 to image point 48 in image plane 47. The location of the image point 48 in the image plane 47 will depend on the optical frequency of wavenumber-filtered, spatially-filtered background beam B62D. The portions of a light beam that pass through the linear array of detector pinholes is detected by multi-pixel detector 114.

The operation of the apparatus of the present invention depicted in FIGS. 1a–1n is based on the acquisition of a sequence of four intensity measurements by each pixel of detector 114. The sequence of the four linear arrays of intensity values $I_1$, $I_2$, $I_3$, and $I_4$ are obtained by detector 114 with phase shifter 44 introducing a sequence of phase shifts (the total phase shift of the reference beam which includes the phase shifts produced in passing through phase shifter 44 in both directions) $\chi_0$, $\chi_0+\pi$, $\chi_0+\pi/2$, and $\chi_0+3\pi/2$ radians, respectively, where $\chi_0$ is some fixed value of phase shift. (Of course, the function of phase shifters 34 and 44 could be combined into a single phase shifter controlled by the computer 118.) The four linear arrays of intensity values $I_1$, $I_2$, $I_3$, and $I_4$ are sent to computer 118 as signal 131, in either digital or analog format, for subsequent processing. Conventional conversion circuitry, i.e., analog-to-digital converters, is included in either detector 114 or computer 118 for converting the four linear arrays of intensity values $I_1$, $I_2$, $I_3$, and $I_4$ to a digital format. The phase shift by phase shifter 44 is controlled by signal 132 which is generated and subsequently transmitted by computer 118 in accordance with the sequence subsequently set fourth to generate Eqs. (12a) and (12b) or the same sequence subsequently set fourth in Eq. (36). Phase shifter 44 can be of the electro-optical type or the type subsequently described herein for use in broadband operation with respect to optical wavelength. The intensity differences $I_1-I_2$ and $I_3-I_4$ are then computed by computer 118 and these differences contain substantially with relatively high efficiency for respective corresponding optical frequency components only the interference cross term between the complex amplitude of the wavenumber-filtered, spatially-filtered scattered probe beam P42D and of the complex amplitude of the wavenumber-filtered, spatially-filtered reflected reference beam R42D.

The relatively high efficiency for isolation of the interference cross term between the complex amplitude of the wavenumber-filtered, spatially-filtered scattered probe beam P42D (cf. FIG.1j) and the complex amplitude of the wavenumber-filtered, spatially-filtered reflected reference beam R42D (cf. FIG. 1k) is a consequence of two system properties. The first system property is that within a complex scale factor, the spatial distributions of the complex amplitudes of the wavenumber-filtered, spatially-filtered scattered probe beam P42D and the wavenumber-filtered, spatially-filtered reflected reference beam R42D in image plane 47 are substantially the same for an arbitrary phase shift introduced by the phase shifter 44. The second system property is that the interference cross term between the complex amplitude of the wavenumber-filtered, spatially-filtered scattered probe beam P42D and the complex amplitude of the wavenumber-filtered, spatially-filtered reflected reference beam R42D in image plane 47 changes sign when the phase shift introduced by phase shifter 44 is incremented or decremented by $\pi,3\pi,\ldots$ radians. Since the interference cross term between the complex amplitude of the wavenumber-filtered, spatially-filtered scattered probe beam P42D and the complex amplitude of the wavenumber-filtered, spatially-filtered reflected reference beam R42D in image plane 47 changes sign when the phase shift introduced by phase shifter 44 is incremented or decremented by $\pi, 3\pi, \ldots$ radians, this interference cross term does not cancel out in the intensity differences $I_1-I_2$ and $I_3-I_4$. However, all non interference cross terms, i.e. the intensities of the wavenumber-filtered, spatially-filtered scattered probe beam P42D, of the wavenumber-filtered, spatially-filtered background beam B62D (cf. FIG. 1n), and of the wavenumber-filtered, spatially-filtered reflected reference beam R42D will cancel out in the intensity differences $I_1-I_2$ and $I_3-I_4$. The referenced system properties are features that are in common with the confocal interference microscope and henceforth will be referred to as the "confocal interferometric system property".

For the wavenumber-filtered, spatially-filtered background beam B62D (cf. FIG. 1n) in image plane 47, the intensity differences $I_1-I_2$ and $I_3-I_4$ will contain only the interference cross term between the complex amplitude of the wavenumber-filtered, spatially-filtered scattered background beam B62D and the complex amplitude of the wavenumber-filtered, spatially-filtered reflected reference beam R42D as a consequence of the confocal interferometric system property. However, the size of the interference cross term between the complex amplitude of the wavenumber-filtered, spatially-filtered background beam B62D and the complex amplitude of the wavenumber-filtered, spatially-filtered reflected reference beam R42D in image plane 47 will be greatly reduced in relation to the corresponding interference cross term in prior art confocal interference microscope on a pixel by pixel comparison.

For the common case where both the wavenumber-filtered, spatially-filtered scattered probe beam P42D and the wavenumber-filtered, spatially-filtered background beam B62D are present simultaneously, there will be two interference cross terms present in the intensity differences $I_1-I_2$ and $I_3-I_4$, the interference cross term between the complex amplitude of the wavenumber-filtered, spatially-filtered scattered probe beam P42D and the complex amplitude of the wavenumber-filtered, spatially-filtered reflected reference beam R42D and the interference cross term between the complex amplitude of the wavenumber-filtered, spatially-filtered background beam B62D and the complex amplitude of the wavenumber-filtered, spatially-filtered reflected reference beam R42D. Note that the interference cross term between the complex amplitude of the wavenumber-filtered, spatially-filtered background beam B62D and the complex amplitude of the wavenumber-filtered, spatially-filtered scattered probe beam P42D cancel out in the intensity differences $I_1-I_2$ and $I_3-I_4$ as a consequence of the confocal interferometric system property.

The interference cross term between the complex amplitude of the wavenumber-filtered, spatially-filtered background beam B62D and the complex amplitude of the wavenumber-filtered, spatially-filtered reflected reference beam R42D in image plane 47 is representative of the background from out-of-focus images. For the apparatus of the present invention in comparison to prior art interference confocal microscopy systems, the size of the interference cross term between the complex amplitude of the wavenumber-filtered, spatially-filtered background beam B62D and the complex amplitude of the wavenumber-filtered, spatially-filtered reflected reference beam R42D is in general reduced in magnitude in image plane 47 whereas there is substantially no reduction in the magnitude of the interference cross term between the complex amplitude of the wavenumber-filtered, spatially-filtered scattered probe beam P42D and the complex amplitude of the wavenumber-filtered, spatially-filtered reflected reference beam R42D in image plane 47. The reduction of the interference cross term between the complex amplitude of the wavenumber-filtered, spatially-filtered background beam B62D and the complex amplitude of the wavenumber-filtered, spatially-filtered reflected reference beam R42D in image plane 47 follows in part from the fact that the amplitude of a beam decreases as the distance to the image plane is increased. This property is the basis of the reduced background in prior-art confocal interference microscopy. However, in the apparatus of the present invention, the reduction in the magnitude of the interference cross term between the complex amplitude of the wavenumber-filtered, spatially-filtered background beam B62D and the complex amplitude of the wavenumber-filtered, spatially-filtered reflected reference beam R42D in image plane 47 is enhanced in relation to that achieved in prior-art confocal interference microscopy.

The enhanced reduction referred to in the preceding paragraph is realized by the presence of phase shifters 14, 24, and 34. The phase shifters 14, 24, and 34 modify the spatial properties of the complex amplitudes of the wavenumber-filtered, spatially-filtered scattered probe beam P42D, the wavenumber-filtered, spatially-filtered reflected reference beam R42D, and the wavenumber-filtered, spatially-filtered background beam B62D in image plane 47. Although the spatial properties of the complex amplitudes of the wavenumber-filtered, spatially-filtered scattered probe beam P42D and the wavenumber-filtered, spatially-filtered reflected reference beam R42D are both modified by the phase shifters 14, 24, and 34, the modified spatial distributions of the respective complex amplitudes in image plane 47 are substantially the same. This feature was noted earlier in relation to the discussion of the sensitivity of the intensity differences $I_1-I_2$ and $I_3-I_4$ to the interference cross term between the complex amplitude of the wavenumber-filtered, spatially-filtered scattered probe beam P42D and the complex amplitude of the wavenumber-filtered, spatially-filtered reflected reference beam R42D.

However, the respective modified spatial distributions of the complex amplitude of the wavenumber-filtered, spatially-filtered background beam B62D and the complex amplitude of the wavenumber-filtered, spatially-filtered reflected reference beam R42D in image plane 47 are distinctly different. The complex amplitude of the wavenumber-filtered, spatially-filtered reflected reference beam R42D is an antisymmetric function about the center of the wavenumber-filtered, spatially-filtered reflected reference beam R42D in image plane 47. In contrast, the wavenumber-filtered, spatially-filtered background beam B62D which subsequently interferes with the complex amplitude of the wavenumber-filtered, spatially-filtered reflected reference beam R42D is the complex amplitude associated principally with one of the light beams B52D-1,-2,-3, or B52D-4, as shown in FIG. 1m, which generally displays only small relative changes across the space of the image of the wavenumber-filtered, spatially-filtered reflected reference beam R42D in image plane 47. Thus the spatial distribution of the interference cross term between the complex amplitude of the wavenumber-filtered, spatially-filtered background beam B62D and the complex amplitude of the wavenumber-filtered, spatially-filtered reflected reference beam R42D in image plane 47 is comprised primarily of an antisymmetric distribution about the center of the wavenumber-filtered, spatially-filtered reflected reference beam R42D in image plane 47.

The contribution of the interference cross term between the complex amplitude of the wavenumber-filtered, spatially-filtered background beam B62D and the complex amplitude of the wavenumber-filtered, spatially-filtered reflected reference beam R42D to the intensity value recorded by a single pixel of detector 114 is the integral of the interference cross term across the space of the image formed by the wavenumber-filtered, spatially-filtered reflected reference beam R42D in image plane 47. The integration of an antisymmetric function over a space interval centered about the function's axis of antisymmetry is identically zero. Thus the net contribution of the interference cross term between the complex amplitude of the wavenumber-filtered, spatially-filtered background beam B62D and the complex amplitude of the wavenumber-filtered, spatially-filtered reflected reference beam R42D to the intensity value recorded by a single pixel of detector 114 is significantly reduced beyond that achieved in prior-art confocal interference microscopy.

It is important to note that a reduction of the interference cross term between the complex amplitude of the wavenumber-filtered, spatially-filtered background beam B62D and the complex amplitude of the wavenumber-filtered, spatially-filtered reflected reference beam R42D in image plane 47 leads to a reduction of both systematic errors as well as statistical errors. There is a reduction in statistical errors since a reduction of the interference cross term between the complex amplitude of the wavenumber-filtered, spatially-filtered background beam B62D and the complex amplitude of the wavenumber-filtered, spatially-filtered reflected reference beam R42D in image plane 47 results in a reduced number of photoelectrons generated in each pixel of detector 114 compared to the prior art. Since the statistical uncertainty of the integrated charge and hence the output signal is related to the square root of the integrated number of photoelectrons generated in each pixel of the detector, the statistical error in the output signal is substantially reduced for the apparatus in FIGS. 1a–1n.

Thus, the statistical error per each image point of an imaged line section of the object material acquired with the apparatus of the present invention is substantially less than that obtained in the same time interval for prior art confocal interference microscopy for two reasons. The first reason is that in prior art interference confocal microscopy, the imaged line section must be scanned in the interval of time reducing the time spent at each image point by the number of image points in the imaged line section to acquire an array of intensity differences corresponding to the array of intensity differences acquired simultaneously in the apparatus of the present invention in the same interval of time. This leads to an improvement in the statistical accuracy of images comprised of image points of an imaged line section by a factor proportional to the square root of the number of independent image points in the imaged line section for the apparatus of the present invention in comparison to that obtained in prior art interference confocal microscopy. The basis for the second reason is that the size of the interference cross term between the complex amplitude of the wavenumber-filtered, spatially-filtered background beam B62D and the complex amplitude of the wavenumber-filtered, spatially-filtered reflected reference beam R42D in image plane 47 will be substantially reduced in relation to that obtained for the corresponding interference cross term in a prior art confocal interference microscope as noted in paragraphs of the preceding description. These two reasons form the basis for the conclusion that the statistical errors introduced by the amplitude of the out-of-focus images will be greatly reduced for the apparatus of the present invention in relation to the corresponding statistical errors introduced by the amplitude of the out-of-focus images in prior-art confocal interference microscopy when considering the statistical accuracy of an image of a line section of the object material acquired in identical intervals of time.

Correction for the effects, i.e. systematic errors, of out-of-focus images beyond the compensation achieved by the apparatus of the first embodiment may be made by using the computer and computer deconvolutions and integral equation inversion techniques which are known to those skilled in the art to invert integral equations in accordance with subsequently set fourth Eqs. (32a) and (32b).

The signal-to-noise ratio may be adjusted as a function of the wavelength of the source optical frequency components so as to generate for example a signal-to-noise ratio that is to first order independent of wavelength. Generally, the amplitude of the wavelength-filtered, spatially-filtered scattered probe beam P42D normalized to the corresponding optical frequency component of the amplitude of the probe beam P22D prior to entry into object material 112 will change with wavelength due to wavelength dependence of the transmission of the probe beam P22D and scattered probe beam P32 in the object material 112 and due to change of the numerical aperture of the probe lens 46 as the depth of image point 28 into the object material 112 is increased. Also the ratio of the amplitude of the wavelength-filtered, spatially-filtered scattered probe beam P42D to the amplitude of the wavelength-filtered, spatially-filtered background beam B62D will generally decrease as the depth of image point 28 into the object material 112 is increased. A change in the signal-to-noise ratio will generally accompany a change in the amplitude of the wavelength-filtered, spatially-filtered scattered probe beam P42D normalized to the corresponding optical frequency component of the amplitude of the probe beam P22D prior to entry into object material 112. The effects of such factors on the signal-to-noise ratio may be compensated in part by placing a wavelength filter in reference mirror subsystem 83 and/or in the probe beam subsystem 82, preferably in reference mirror subsystem 83, and constructing the transmission of the wavelength filter to have a specific wavelength dependence to adjust and/or optimize the ratio of the wavelength-filtered, spatially-filtered scattered probe beam P42D and the wavelength-filtered, spatially-filtered reflected reference beam R42D transmitted through respective detector pinholes for different wavelengths according to subsequently set fourth Eq. (39).

It was noted in the detailed description of the first embodiment that there was no net relative phase-shift between any two of the light beams P22C-1,-2,-3,-4. This feature makes it possible to achieve the following objective enunciated in the detailed description of the first embodiment: the generation of the conjugate images of pinhole 8 in image plane 27 in object material 112 and in image plane 37 on reference mirror 120 that are substantially unchanged by the presence of phase shifters 14 and 24 and phase shifters 14 and 34, respectively, but producing substantial changes in the images in image planes 17a and 47 which are conjugate to the image point 28 in object material 112 and to the image point 38 on reference mirror 120.

Insight into the interrelationship between phase shifters 14, 24, and 34 may also be gained by considering what would be the consequence should phase shifter 14 be removed from the first embodiment. In this case, the wavenumber-filtered, spatially-filtered reflected reference beam R42D would change from an antisymmetric function to a symmetric function in image plane 47 with no substantial change in the spatial properties of the wavenumber-filtered, spatially-filtered background beam B62D in image plane 47. Thus the spatial distribution of the interference cross term between the complex amplitude of the wavenumber-filtered, spatially-filtered background beam B62D and the complex amplitude of the wavenumber-filtered, spatially-filtered reflected reference beam R42D would be comprised primarily of an symmetric distribution about the center of the wavenumber-filtered, spatially-filtered reflected reference beam R42D in image plane 47. But the integration of a symmetric function over a space interval centered about the function's axis of symmetry is not zero in general and there would be substantially no reduction in the intensity value recorded by a given pixel of detector 114 at image point 48 beyond that achieved in prior-art confocal interference microscopy.

Although the foregoing refers to a particular image point 28 at a particular portion of object material 112, computer 118 can apply control signal 133 to translator 116 so as to position other portions of object material 112 at image point 28, to allow the system to "scan" a desired line section, plane section, or volume section of object material 112. The desired line section, plane section, or volume section of the object material may cut through or include one or more surfaces of the object material.

The Level 1 discrimination in the first preferred embodiment of the present invention is achieved by manipulating the impulse response functions of imaging subsystems of apparatus of the present invention in a plane orthogonal to the plane defined by dispersive detector elements 130a and 130b. A Level 1 type discrimination may also be achieved in a variant of the first preferred embodiment wherein the apparatus and electronic processing means of the variant are substantially the same as for the first preferred embodiment with the phase shifters 14, 24, and 34 rotated by $\pi/2$ radians about their respective optical axes. The reduction of the systematic effects of out-of-focus images in the variant to the first preferred embodiment is the same as that in the first preferred embodiment. The statistical effects due to the out-of-focus images in the variant of the first preferred embodiment is also reduced below that achieved in prior art confocal interference microscopy but generally not as effective as achieved with apparatus of the first preferred embodiment.

Referring now to FIGS. 2a–2f, FIG. 2a depicts in schematic form a second embodiment of the present invention from the first group of embodiments and variants thereof in which the source subsystem 80a, subsystem 81b, and the detector subsystem 84a are preferably configured for approximate slit confocal microscopy. Like reference numerals are used in FIGS. 2a–2f for like elements previously described with reference to FIGS. 1a–1n. The modifications in subsystem 80a shown in FIG. 2b exist in the area of the source 10a which is now preferably comprised of a broadband, spatially incoherent line source, preferably a lamp filament or laser diode array, and in the area of the pinhole 8 of the first embodiment which is now preferably comprised of a linear array of source pinholes 8a aligned with the image of line source 10a formed by lens 6. The modification in subsystem 81b shown in FIGS. 2c and 2d consists of replacing pinhole 18a in subsystem 81a of the first embodiment with a linear array of spatial filter pinholes 18b in subsystem 81b. The modifications in subsystem 84a shown in FIGS. 2e and 2f exist in the area of the detector 114a in which the linear array of pinholes in the image plane 47 of the first embodiment is now preferably a two-dimensional array of detector pinholes and the detector 114 of the first embodiment having a linear array of pixels is now a detector 114a preferably comprised of a two-dimensional array of pixels.

Figure 2A:
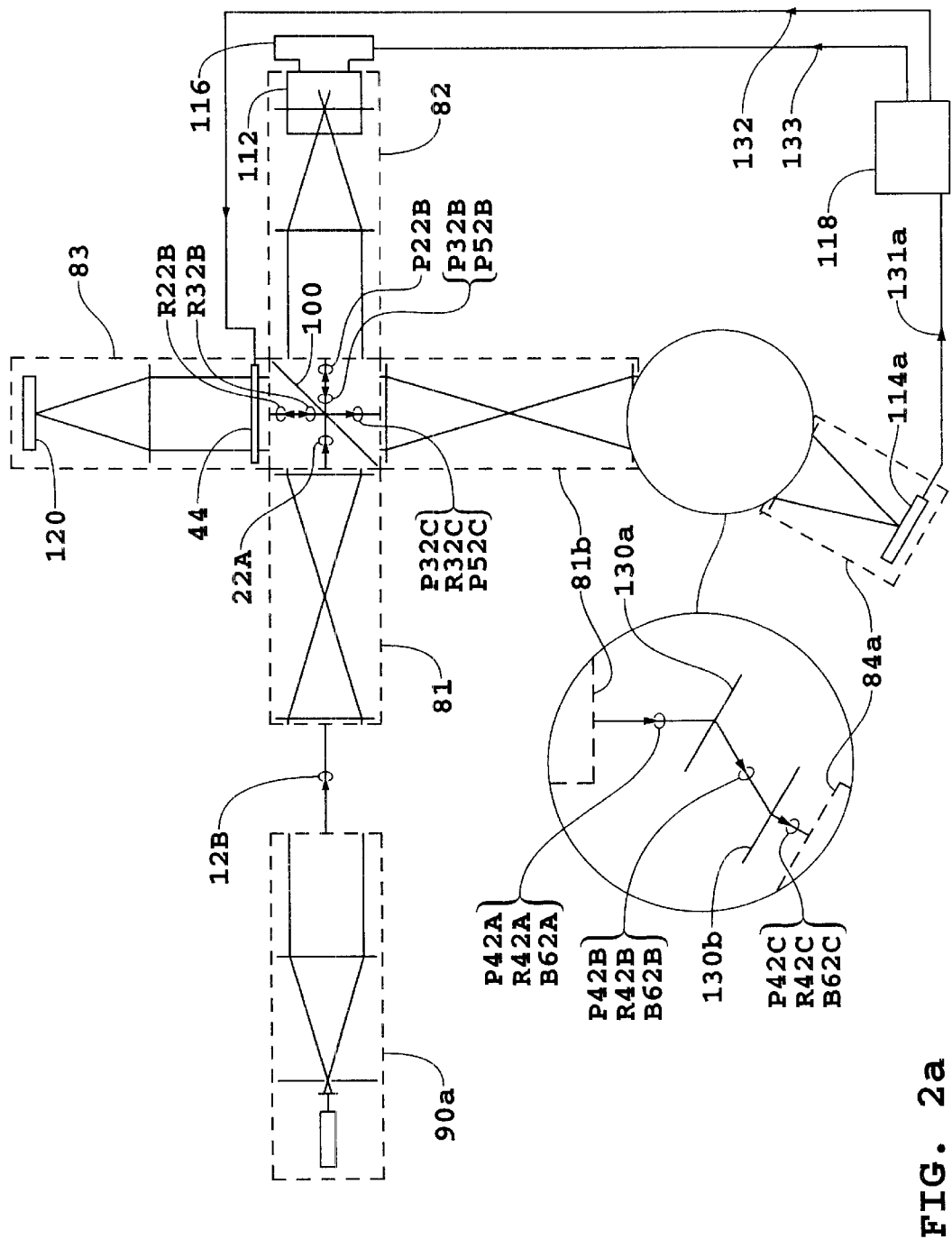
FIGS. 2a–2f taken together illustrate, in schematic form, the presently preferred second embodiment of the present invention with FIG. 2a showing optical paths between subsystems 80a and 81, 81 and 82, 81 and 83, 82 and 81b, 83 and 81b, and 81b and 84a; paths of the electronic signals from computer 118 to translator 116 and to phase shifter 44 in subsystem 83; and path of electronic signal from detector 114a in subsystem 84a to computer 118.
Figure 2B:
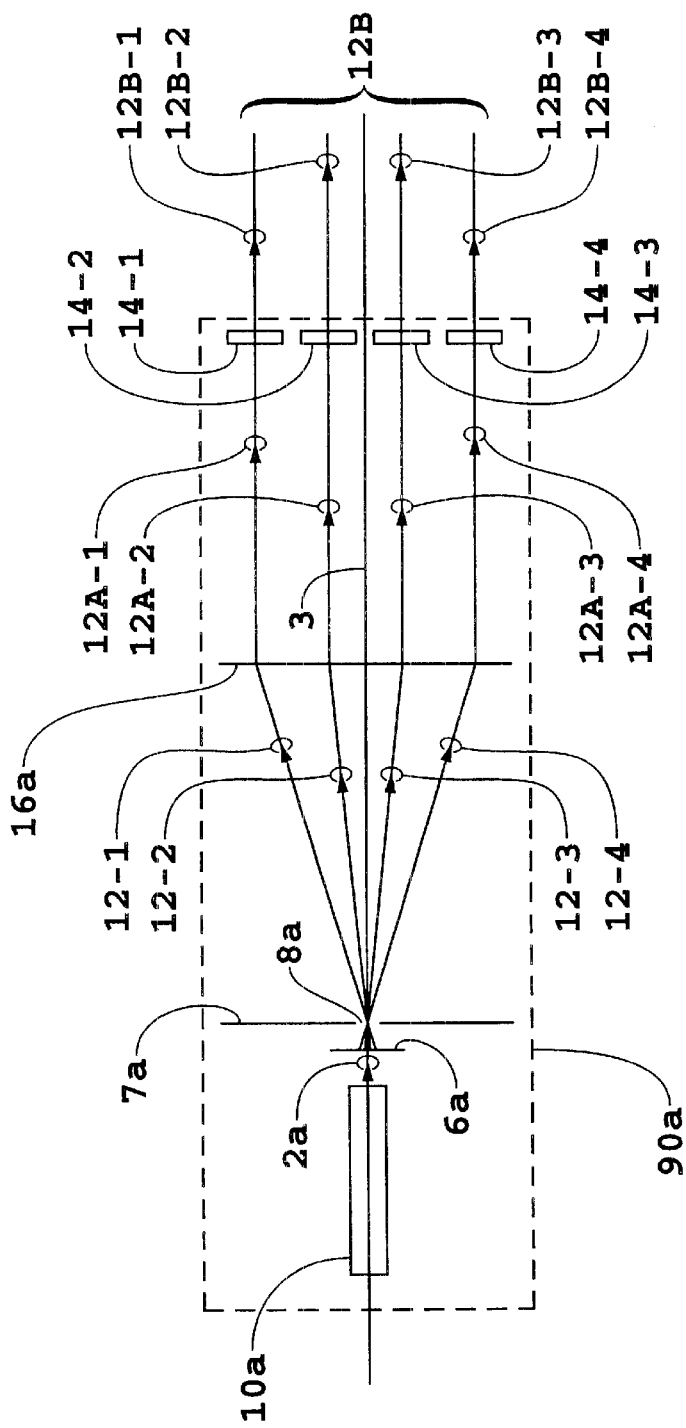
Figure 2C:
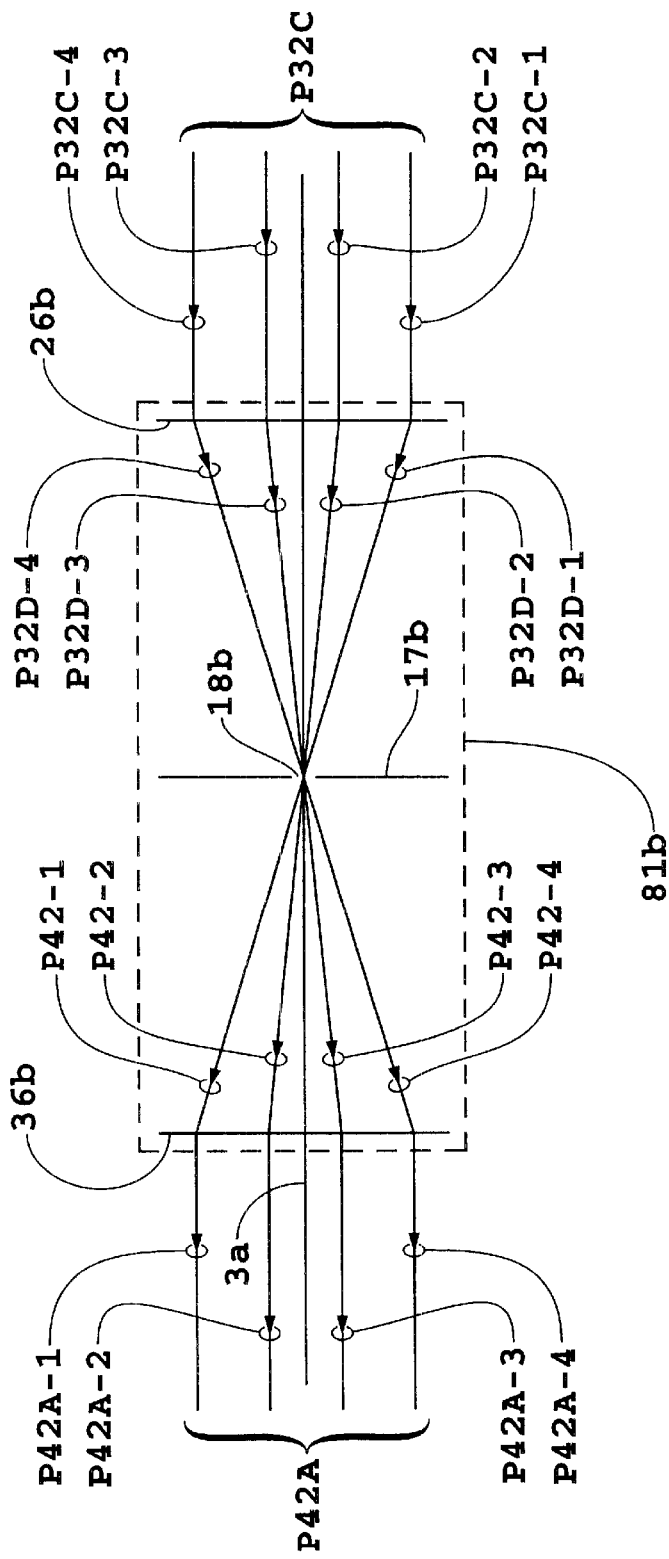
Figure 2D:
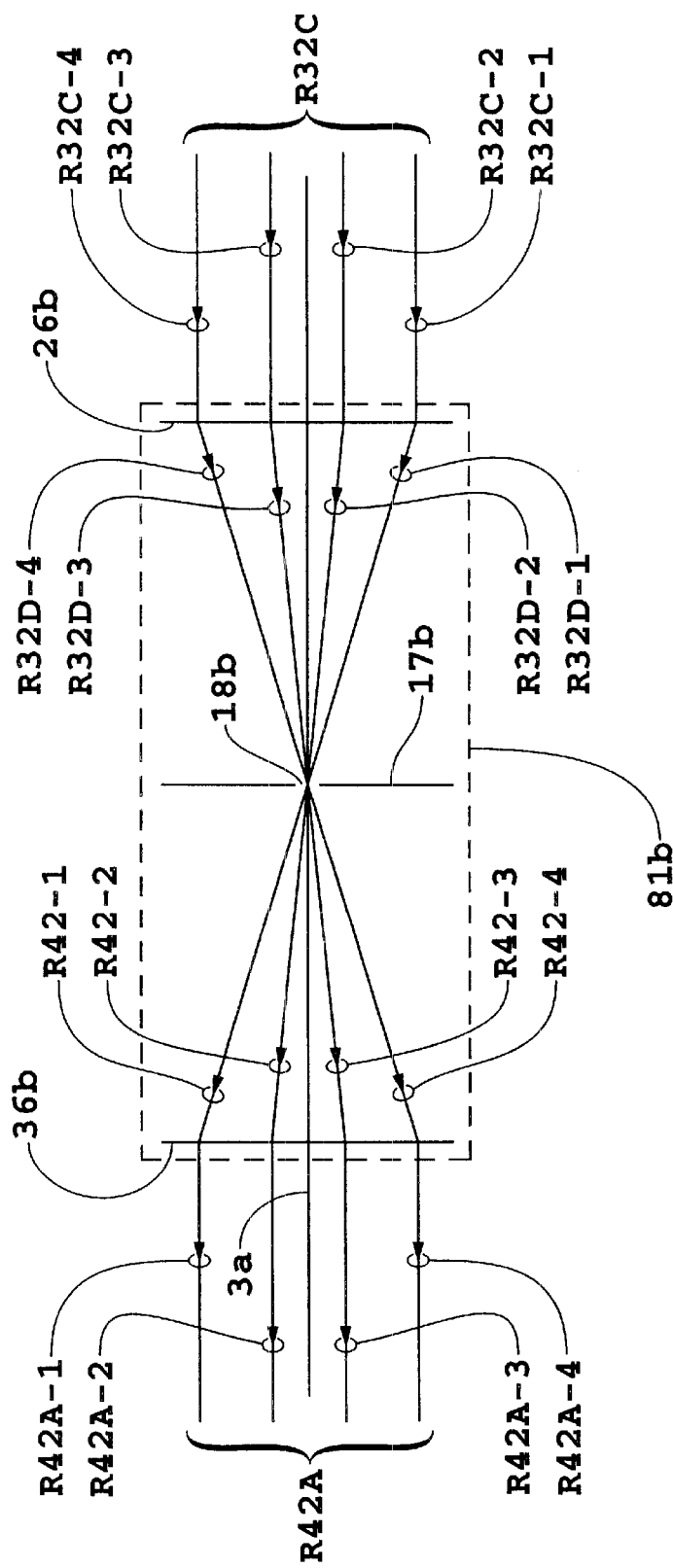
Figure 2E:
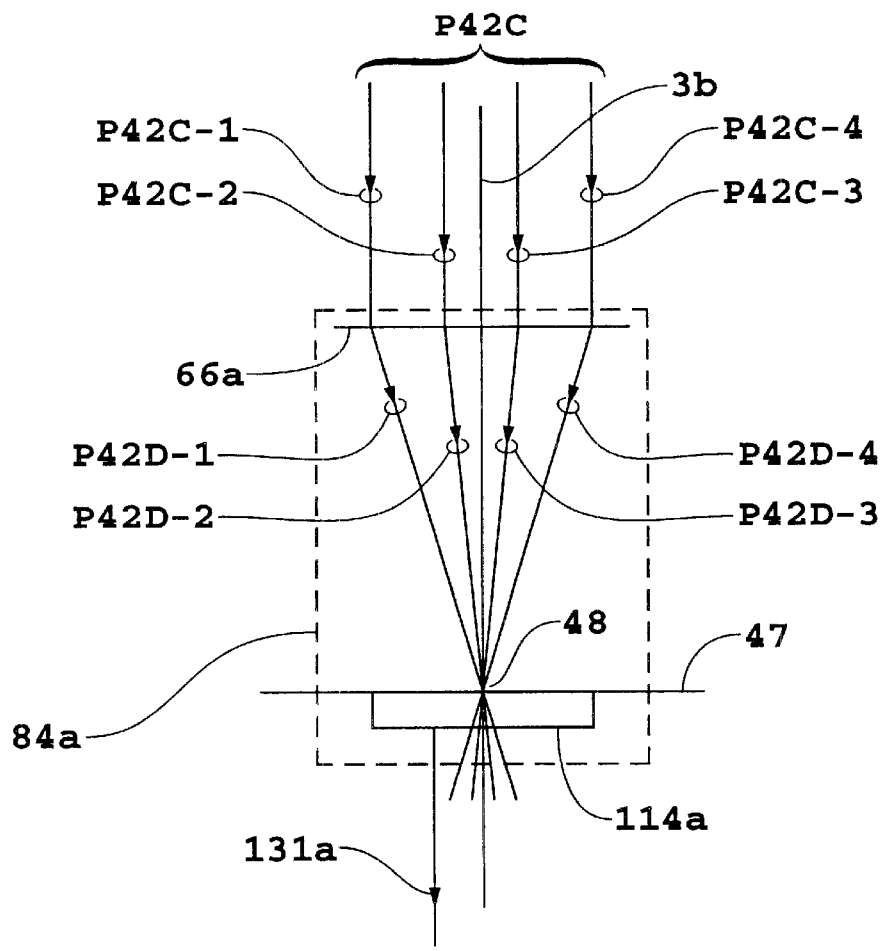
Figure 2F:
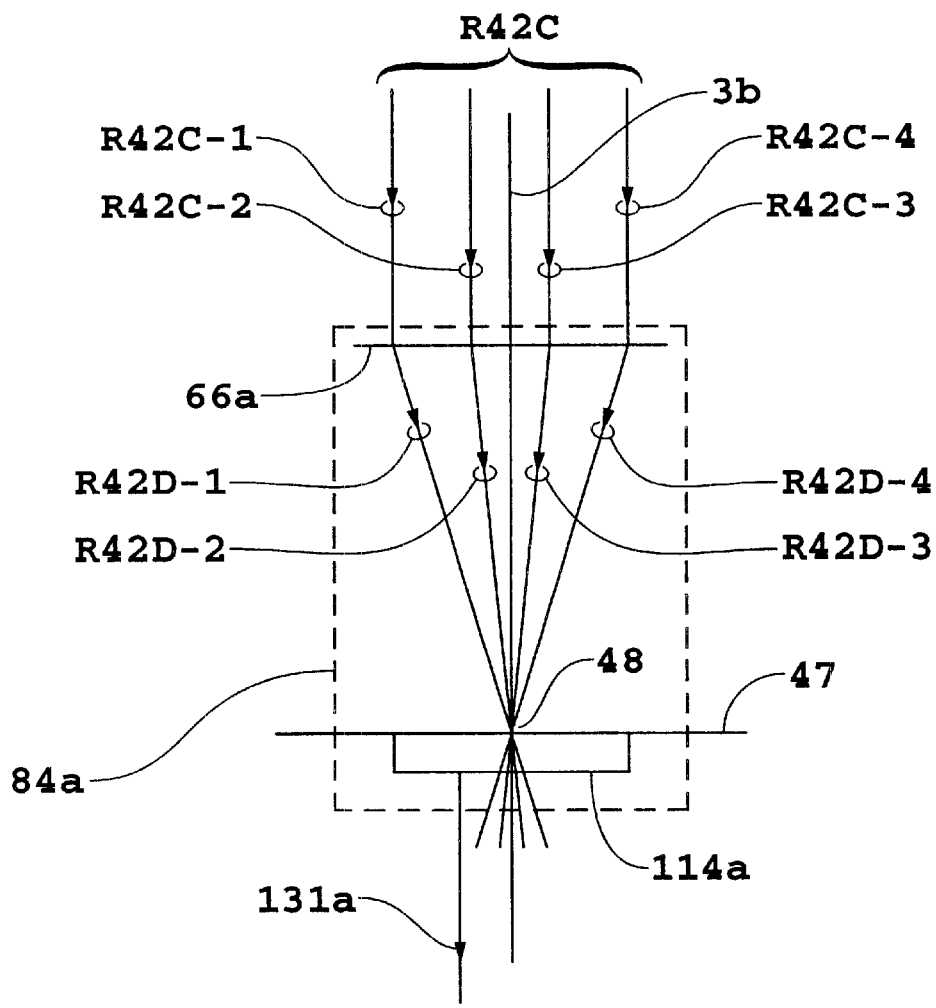
Figure 2A:
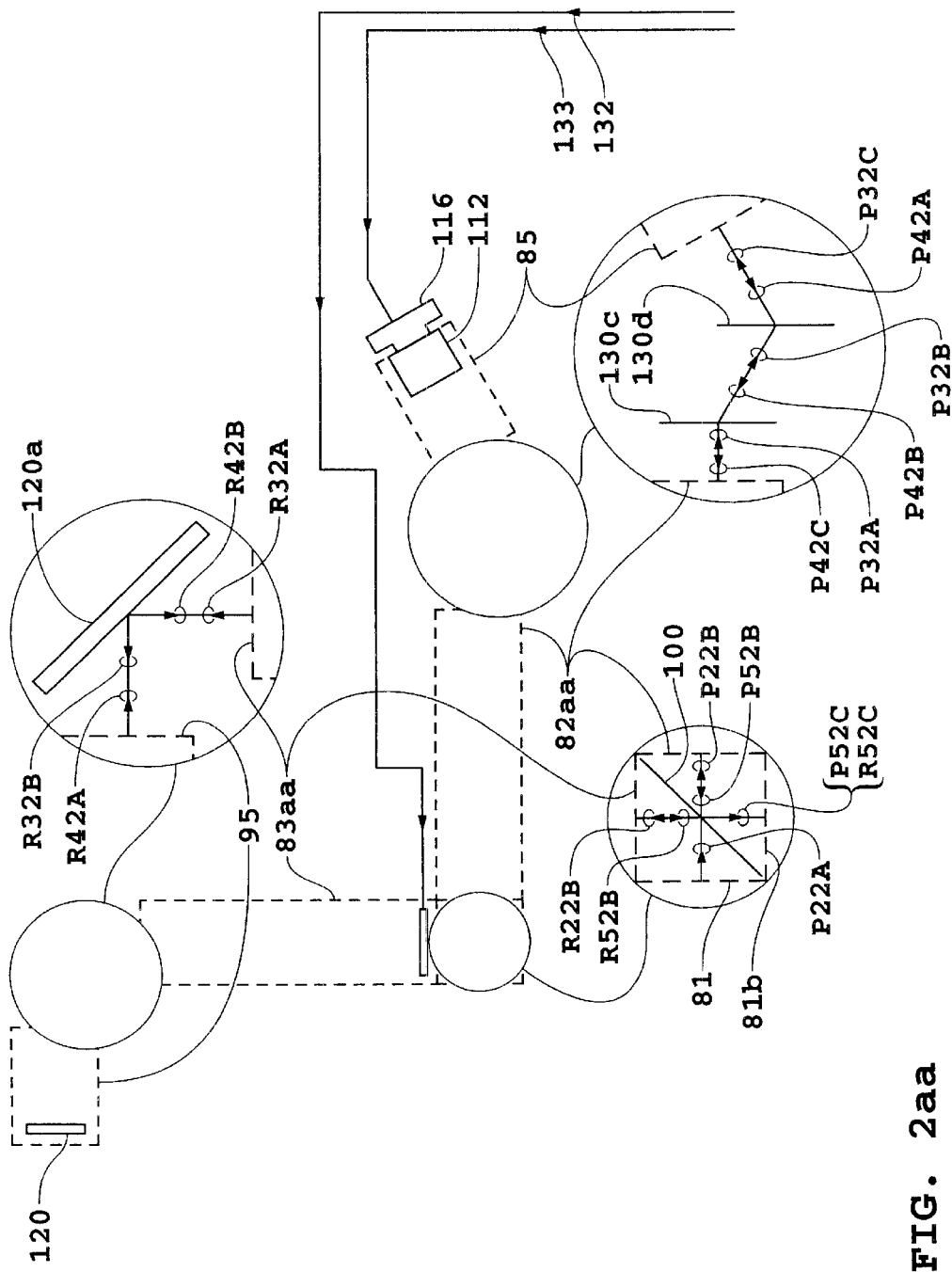

In FIG. 2b, the linear array of source pinholes 8a and source 10a are aligned perpendicular to the plane of FIG. 2b, the plane of FIG. 2b being perpendicular to the plane of FIG. 2a. In FIGS. 2c and 2d, the linear array of spatial filter pinholes 18b is aligned perpendicular to the plane of FIGS. 2c and 2d, the planes of FIGS. 2c and 2d being perpendicular to the plane of FIG. 2a. In FIGS. 2e and 2f, the two-dimensional array of detector pinholes and the two-dimensional array of detector pixels are aligned perpendicular to the plane of FIGS. 2e and 2f.

The remainder of the second embodiment depicted in FIGS. 2a–2f is preferably the same as described for corresponding aspects of the first preferred embodiment in the description of FIGS. 1a–1n.

The Level 1 discrimination in the second preferred embodiment of the present invention is achieved by manipulating the impulse response functions of imaging subsystems of apparatus of the present invention in a plane orthogonal to the plane defined by dispersive detector elements 130a and 130b. A Level 1 type discrimination may also be achieved in a first variant of the second preferred embodiment wherein the apparatus and electronic processing means of the first variant of the second preferred embodiment are substantially the same as for the second preferred embodiment with the phase shifters 14, 24, and 34 rotated by $\pi/2$ radians about their respective optical axes. The reduction of the systematic effects of out-of-focus images in the first variant of the second preferred embodiment is the same as that in the second preferred embodiment. The statistical effects due to the out-of-focus images in the first variant of the second preferred embodiment is also reduced below that achieved in prior art confocal interference microscopy but generally not as effective as achieved with apparatus of the second preferred embodiment.

A second variant of the second preferred embodiment is described wherein the apparatus and electronic processing means of the second variant are substantially the same as for the second preferred embodiment except for the linear arrays of source pinholes 8a and spatial filter pinholes 18a of the second preferred embodiment which are replaced by a source slit and a spatial filter slit. The reduction of the systematic effects of out-of-focus images for the second variant of the second preferred embodiment is the same as that achieved in the second preferred embodiment of the present invention. The statistical effects due to the out-of-focus images in the second variant of the second preferred embodiment is also reduced below that achieved in prior art confocal interference microscopy but generally not as effective as achieved with apparatus of the second preferred embodiment.

The use of a linear array of source pinholes and a linear array of spatial pinholes as in the second preferred embodiment and the first variant of the second preferred embodiment instead of respective slits generates a requirement for a restricted scan of the object material to generate a two-dimensional representation of a section of the object material. The direction of the restricted scan is in the direction of the image of the linear array of source pinholes in the object material. The restricted scan arises because of the spacing between pinholes in the direction of the image of the linear array of source pinholes in the object material. In addition, a high sensitivity to the wavenumber-filtered, spatially-filtered scattered probe beam is maintained when the spacing between the pinholes in the direction of the image of the linear array of source pinholes in the object material complies with a condition subsequently set fourth in Eq. (54).

The number of steps of the restricted scan is determined by the ratio of the spacing between the images of two contiguous source pinholes in the object material and the angular resolution of the respective imaging subsystem. In practice, the number of steps in the restricted scan will be significantly less than the number of pinholes in the linear arrays of source pinholes and spatial filter pinholes. Thus using apparatus of the second preferred embodiment and the first variant of the second preferred embodiment with linear arrays of source pinholes and spatial filter pinholes, a two dimensional representation of a section of object material can be acquired with substantially no scanning.

Referring now to FIGS. 3a–3l, there is shown an alternative third embodiment of the present invention from the first group of embodiments in which the paths for the reference and probe beams of the first preferred embodiment have been modified for the purpose of improving and optimizing the signal-to-noise ratio. The apparatus and electronic processing means for the third embodiment are substantially the same as for the first preferred embodiment with additional optical means which configure the interferometer of the first embodiment so that the ratio of the amplitudes of the reflected reference and scattered probe beams can be adjusted. Optical elements of the third preferred embodiment perform like operations as like denoted elements in the first preferred embodiment and the electronic processing means of the third preferred embodiment perform like operations as like denoted electronic operations of first preferred embodiment. The ratio of the amplitudes of the wavenumber-filtered, spatially filtered reflected reference and scattered probe beams are adjusted by altering the transmission/reflection coefficients of beam splitters 100, 100a, and 100b depicted in FIGS. 3a–3l.

As shown in FIGS. 3a–3l, the third preferred embodiment of the present invention is an interferometer comprised of beam splitters 100, 100a, and 100b, object material 112, translator 116, a reference mirror 120, dispersive detector elements 130a and 130b, and a detector 114. This configuration is known in the art as a form of a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni, ibid., may be incorporated into the apparatus of FIGS. 3a–3l without significantly departing from the spirit and scope of the preferred third embodiment of the present invention.

Figure 3A:
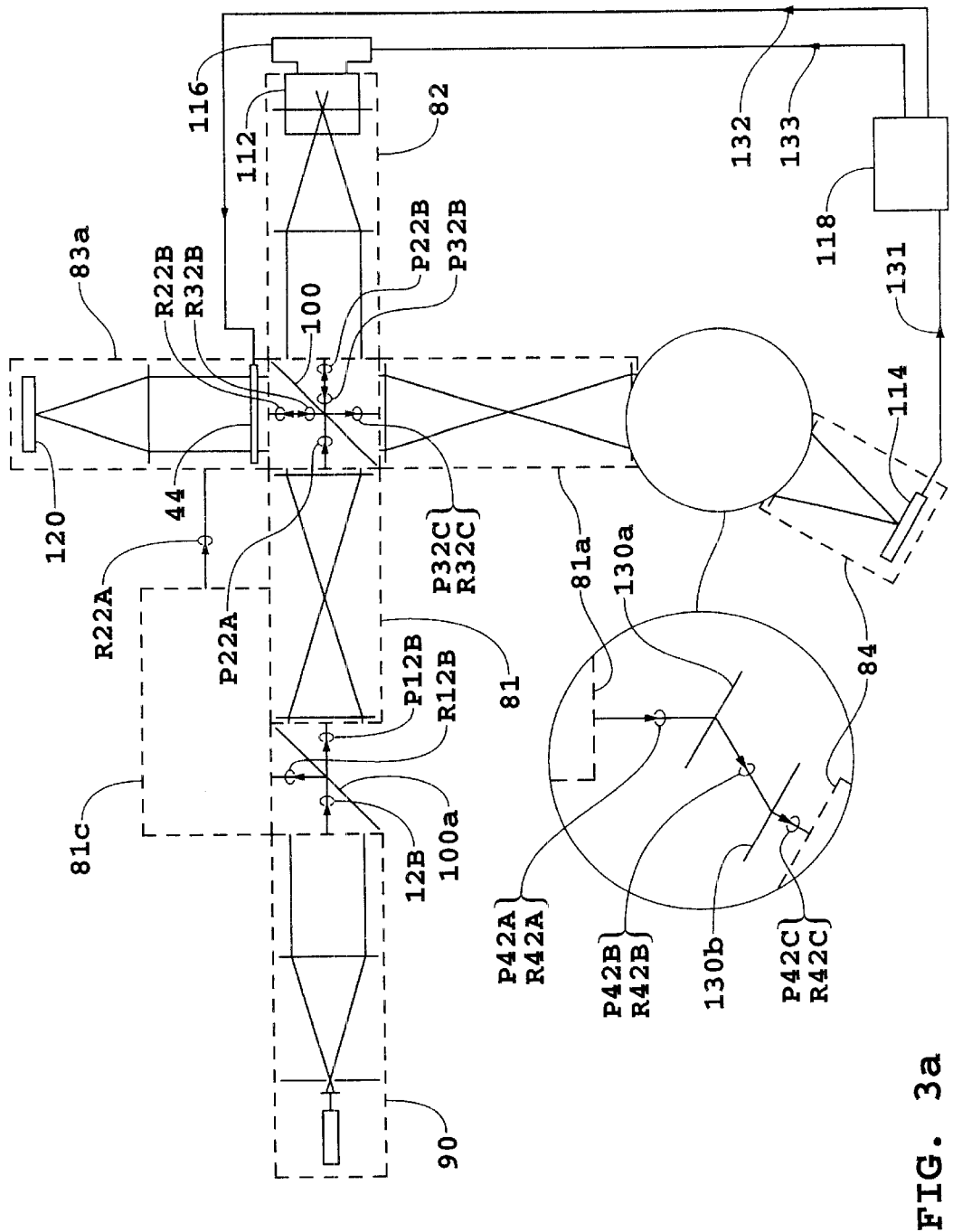

The orientation of the plane in which the impulse response functions of imaging subsystems are manipulated in the third preferred embodiment is perpendicular to the plane of FIG. 3a.

Figure 3B:
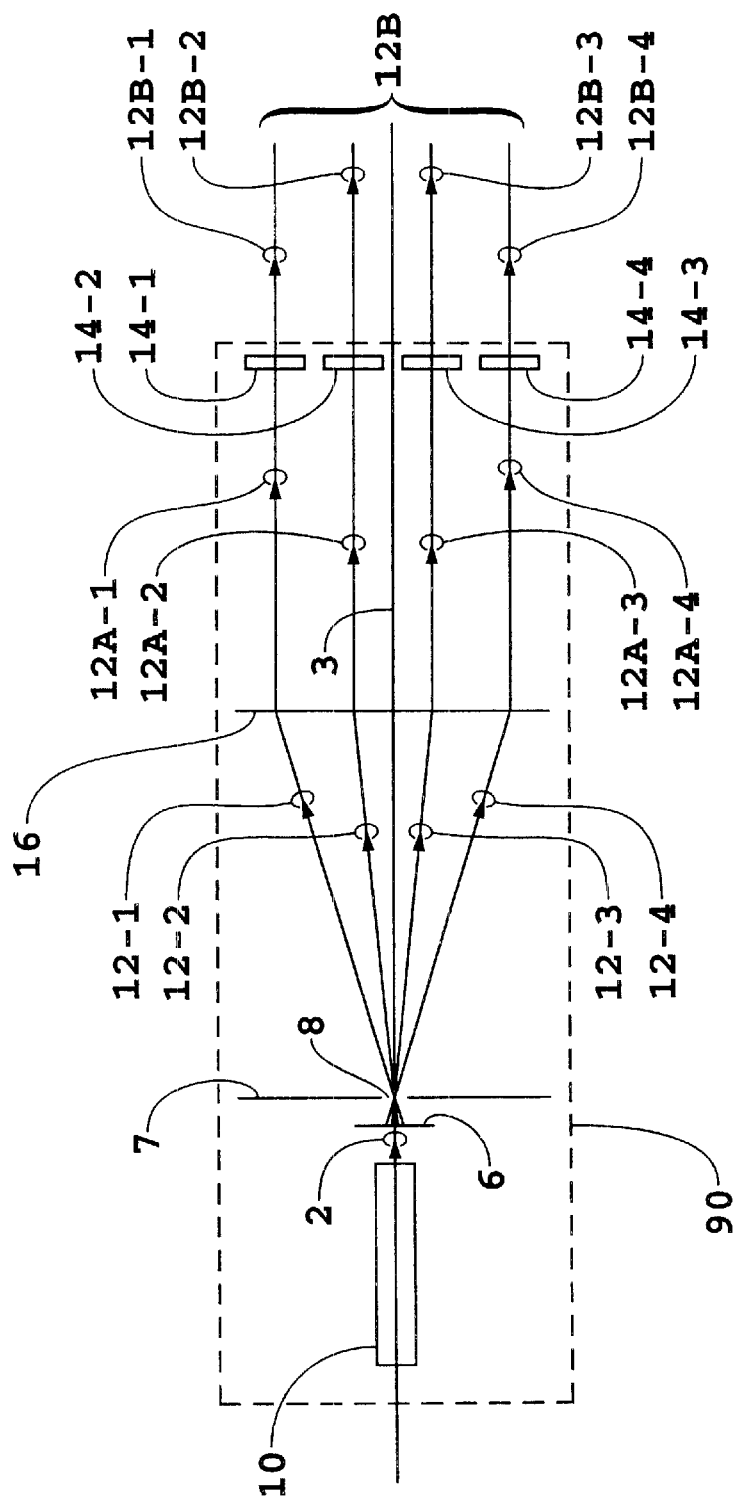

FIG. 3b depicts in schematic form the embodiment of the subsystem 80 shown in FIG. 3a. The plane of FIG. 3b is perpendicular to the plane of FIG. 3a. For the third preferred embodiment, light source 10 is preferably a point source or a spatially incoherent source of radiation across surface of the source, preferably a laser or like source of coherent or partially coherent radiation, most preferably a superirradiant laser, and preferably polarized. Light source 10 emits input beam 2 aligned with optical axis 3 of subsystem 80. As shown in FIG. 3b, light beam 2 enters focusing lens 6 and is focused at pinhole 8 in image plane 7. Light beam 12 comprised of a plurality of light beams 12-1,-2,-3,-4 diverges from the pinhole 8 and enters lens 16 having an optical axis aligned with optical axis 3 of subsystem 80. Light beam 12 emerges from lens 16 as collimated light beam 12A comprised of light beams 12A-1,-2,-3,-4 and enters phase shifter 14. Phase shifter 14 is comprised of rectangular phase shifters 14-1,-2,-3,-4 which are located so that their respective optical axes are parallel to optical axis 3 of subsystem 80. Note that the number of phase shifters may be any suitable number 2m, m being an integer. The example shown in FIG. 3b is for the case of m=2, the case of four phase shifters being sufficient to clearly show the relationship between the components of the apparatus of the present invention. Parallel light beams 12A-1,-2,-3,-4 pass through phase shifters 14-1,-2,-3,-4, respectively, and emerge from phase shifter 14 as light beams 12B-1,-2,-3,-4, respectively, which comprise light beam 12B. Each of the phase shifters 14-2 and 14-4 introduce a phase shift of $\pi$ radians more the phase shift introduced by each of the phase shifters 14-1 and 14-3, the phase shifts introduced by phase shifters 14-1 and 14-3 being the same.

Figure 3C:
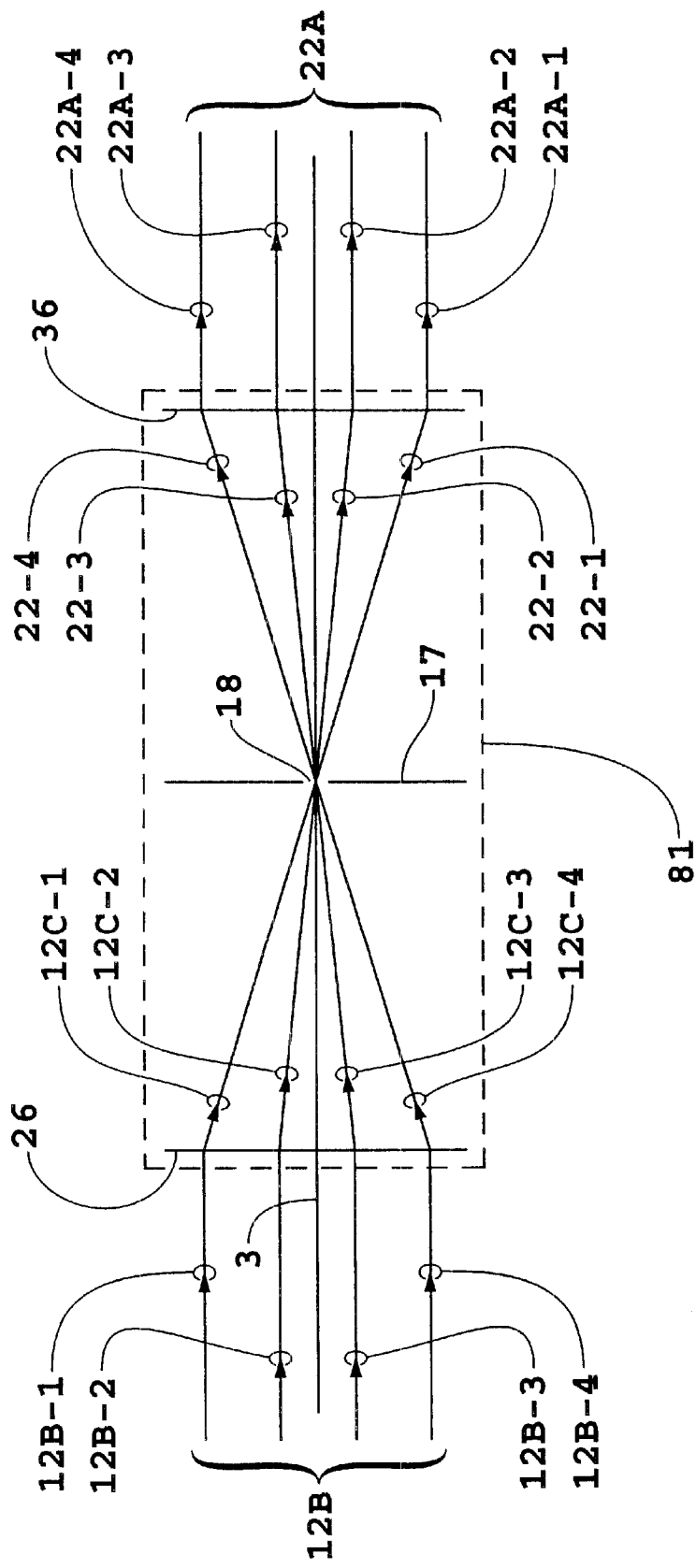

In FIG. 3a, light beam 12B exits subsystem 80 and is partially transmitted by beam splitter 100a as light beam P12B comprised of light beams P12B-1,-2,-3,-4. Light beam P12B enters subsystem 81. In FIG. 3c, light beam P12B enters lens 26 and emerges as light beam P12C comprised of light beams P12C-1,-2,-3,-4. The plane of FIG. 3c is perpendicular to the plane of FIG. 3a. Lens 26 focuses light beam P12C to image point 18 in image plane 17. Light beam P12C emerges from image point 18 as light beam P22 comprised of light beams P22-1,-2,-3,-4. Light beam P22 enters lens 36 having an optical axis aligned with optical axis 3 of subsystem 81. Light beam P22 emerges from lens 36 and exits subsystem 81 as collimated light beam P22A comprised of light beams P22A-1,-2,-3,-4.

Figure 3D:
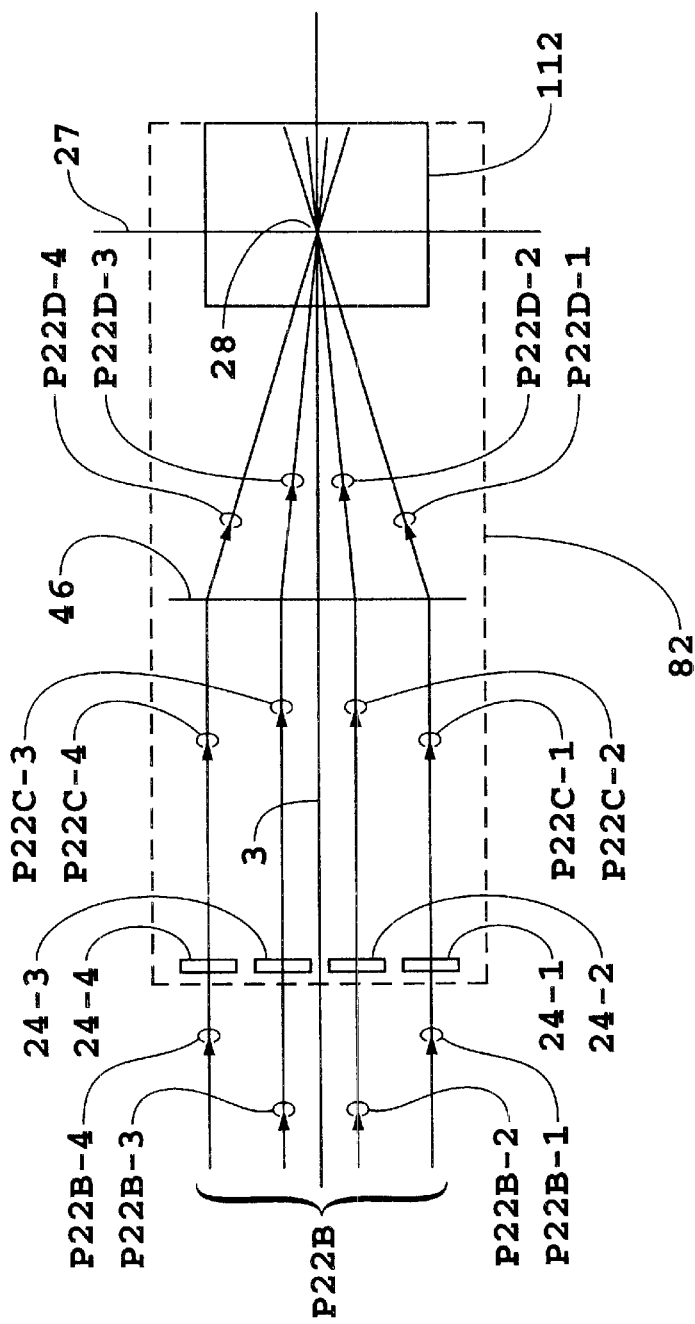

As shown in FIG. 3a, light beam P22A is partially transmitted by beam splitter 100 as light beam P22B comprised of light beams P22B-1,-2,-3,-4 and enters subsystem 82 shown in FIG. 3d. The plane of FIG. 3d is perpendicular to the plane of FIG. 3a.

In FIG. 3d, light beam P22B impinges onto a phase shifter 24 comprised of elements 24-1,-2,-3,-4. Phase shifter 24 is comprised of the same number of 2m elements as phase shifter 14 and is shown in FIG. 3d with m=2. Light beams P22B-1,-2,-3,-4 pass through phase shifters 24-1,-2,-3,-4, respectively, and emerge as light beam P22C comprised of light beams P22C-1,-2,-3,-4, respectively. The phase shifts introduced by phase shifters 24-1 and 24-3 are of equal values which are $\pi$ radians more than the phase shift introduced by either phase shifter 24-2 or 24-4, the phase shifts introduced by phase shifters 24-2 and 24-4 being of equal values. Thus there is no net relative phase shift between any two of the light beams P22C-1,-2,-3,-4. Light beam P22C passes through probe lens 46 as light beam P22D comprised of light beams P22D-1,-2,-3,-4 which is focused to form a line image centered at image point 28 in image plane 27 in object material 112. The axis of the line image is substantially parallel to the optical axis 3 of imaging subsystem 82. The length of the line image is determined by a combination of factors such as the depth of focus and chromatic aberration of probe lens 46 both of which can be adjusted and the optical bandwidth of the source 10. The line section may cut through one or more surfaces of the object material or lie in a surface of the object material. Optical axis of lens 46 is aligned with optical axis 3 of subsystem 82.

In FIG. 3a, light beam 12B is partially reflected by beam splitter 100a as light beam R12B comprised of light beams R12B-1,-2,-3,-4. Light beam R12B enters subsystem 81*c* shown in FIG. 3*e*. The plane of FIG. 3*e* is parallel to the plane of FIG. 3*a*.

Figure 3E:
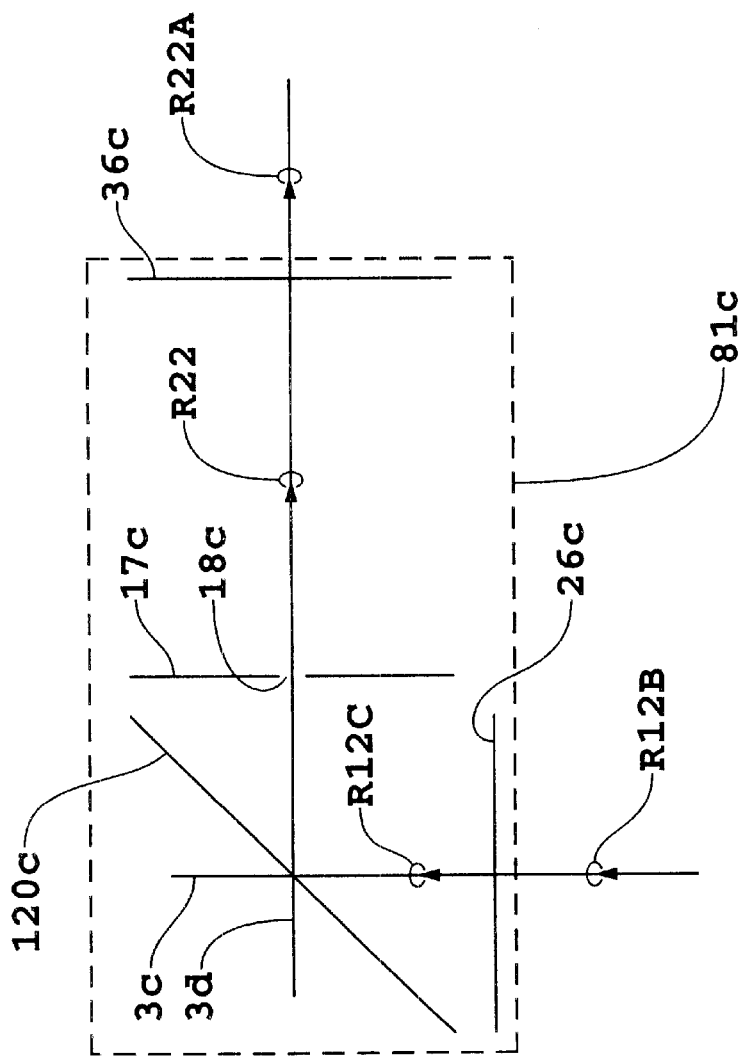

In FIG. 3*e*, light beam R12B enters lens 26*c* and emerges as light beam R12C comprised of light beams R12C-1,-2,-3,-4. Light beams R12B-1,-2,-3,-4 are spatially separated in a plane perpendicular to the plane of FIG. 3*e* and appear superimposed and coextensive in the view presented in FIG. 3*e*. Lens 26*c* has an optical axis aligned with optical axis 3*b* of subsystem 81*c*. Lens 26*c* in conjunction with plane mirror 120*c* focuses light beam R12C to image point 18*c* in image plane 17*c*. Light beam R12C emerges from image point 18*c* as light beam R22 comprised of light beams R22-1,-2,-3,-4. Light beams R22-1,-2,-3,-4 are spatially separated in a plane perpendicular to the plane of FIG. 3*e* and appear superimposed and coextensive in the view presented in FIG. 3*e*. Light beam R22 enters lens 36*c* having an optical axis aligned with optical axis 3*c* of subsystem 81*c*. Light beam R22 emerges from lens 36*c* and exits subsystem 81*c* as collimated light beam R22A comprised of light beams R22A-1,-2,-3,-4. Light beams R22A-1,-2,-3,-4 are spatially separated in a plane perpendicular to the plane of FIG. 3*e* and appear superimposed and coextensive in the view presented in FIG. 3*e*.

Figure 3F:
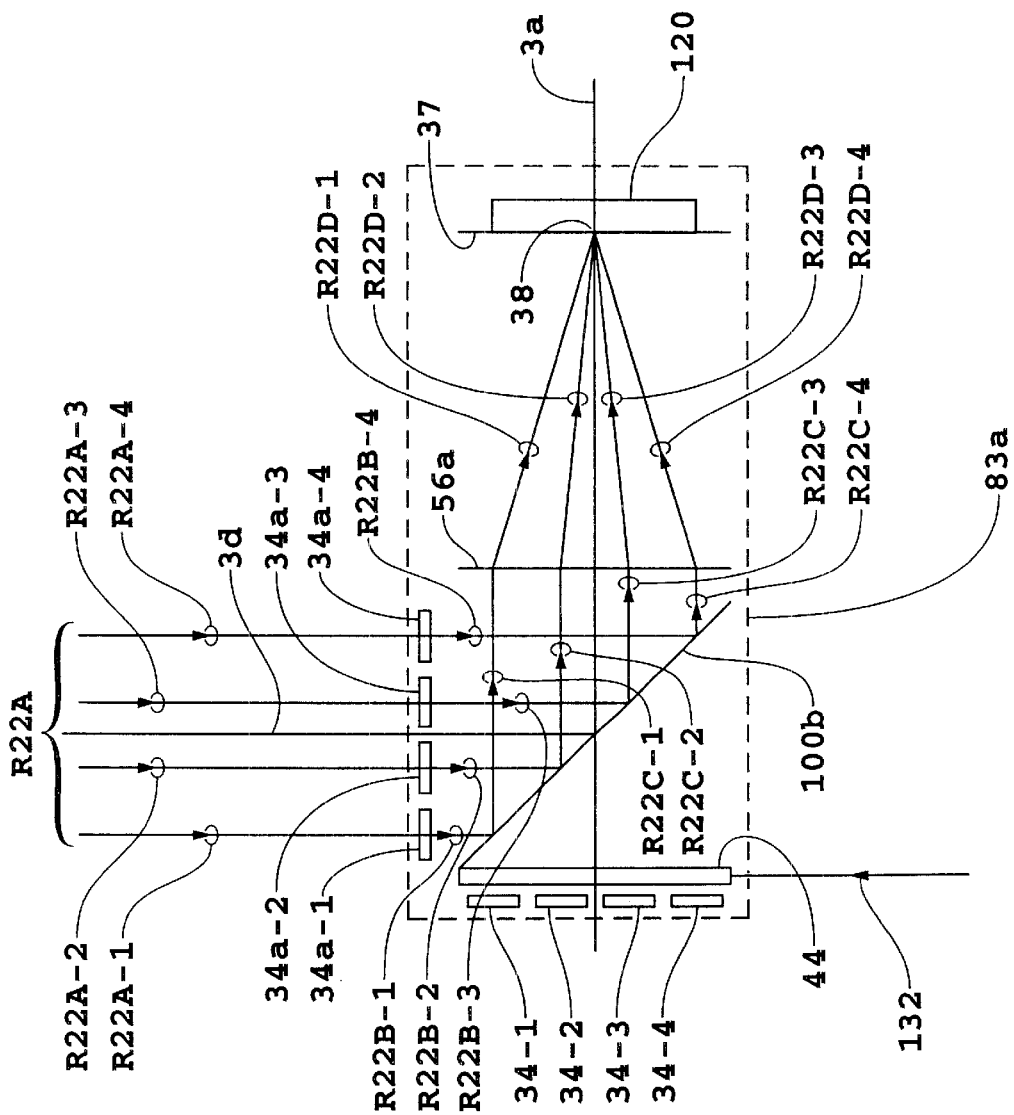

As shown in FIG. 3*a*, light beam R22A after exiting subsystem 81*c* enters subsystem 83*a*. Subsystem 83*a* shown in FIG. 3*f* is comprised of lens 56*a*, reference mirror 120, beam splitter 100*b*, and phase shifters 34, 34*a*, and 44. The plane of FIG. 3*f* is parallel to the plane of FIG. 3*a*. Phase shifter 34 comprised of phase shifter elements 34-1,-2,-3,-4 and phase shifter 34*a* comprised of phase shifter elements 34*a*-1,-2,-3,-4 are illustrated in FIG. 3*f* as rotated $\pi/2$ radians about the optical axes 3*a* and 3*c*, respectively, for the purpose of making the description of and tracking of optical beams R22A, R22B, R22C, and R22D through subsystem 83*a* simpler without departing from the spirit or scope of the third embodiment of the present invention. Accordingly, light beam R22A comprised of light beams R22A-1,-2,-3,-4 and light beam R22B comprised of light beams R22B-1,-2,-3,-4 are illustrated in FIG. 3*f* as rotated by $\pi/2$ radians about the optical axis 3*c* and light beam R22C comprised of light beams R22C-1,-2,-3,-4 and light beam R22D comprised of light beams R22D-1,-2,-3,-4 are illustrated in FIG. 3*f* as rotated by $\pi/2$ radians about the optical axis 3*a*. In subsystem 83*a*, light beam R22A impinges on phase shifter 34*a* which contains the same number of elements, 2*m*, as phase shifter 14. Light beam R22A passes through phase shifter 34*a* as light beam R22B. Light beam R22B is partially reflected as light beam R22C. The phase shifts introduced by phase shifters 34*a*-1 and 34*a*-3 are of equal values which are $\pi$ radians more than the phase shifts introduced by either phase shifter 34*a*-2 or 34*a*-4, the phase shifts introduced by phase shifters 34*a*-2 and 34*a*-4 being of equal values. Thus there is no net relative phase shift between any two of the light beams R22C-1,-2,-3,-4. Light beam R22C passes through lens 56*a* as light beam R22D. Light beam R22D is focused by lens 56*a* to image point 38 in image plane 37 on reference mirror 120. Optical axis of lens 56*a* is aligned with optical axis 3*a* of subsystem 83*a*.

Figure 3G:
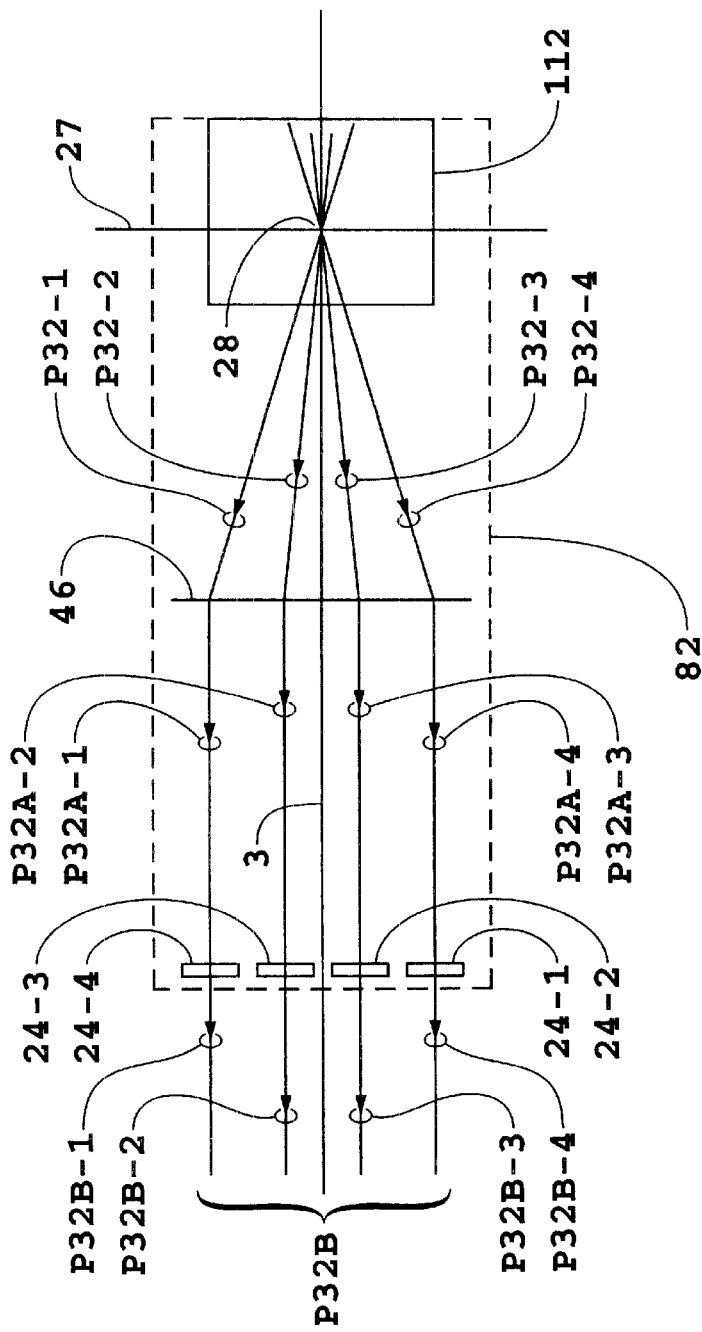

In FIG. 3*g*, a portion of light beam P22D (cf. FIG. 3*d*) is reflected and/or scattered by the object material 112 at image point 28 as a plurality of light beams P32-1,-2,-3,-4 comprising scattered probe beam P32. The plane of FIG. 3*g* is perpendicular to the plane of FIG. 3*a*. Scattered probe beam P32 diverges from image point 28 in image plane 27 and enters lens 46. As shown in FIG. 3*g*, scattered probe beam P32 emerges from lens 46 as collimated scattered probe beam P32A comprised of light beams P32A-1,-2,-3,-4. Light beams P32A-1,-2,-3,-4 pass through phase shifters 24-4,-3,-2,-1, respectively, and emerge as light beams P32B-1,-2,-3,-4, respectively. Light beams P32B-1,-2,-3,-4 comprise scattered probe beam P32B which exits subsystem 82. The phase shifts introduced by phase shifters 24-1 and 24-3 are of equal values which are $\pi$ radians more than the phase shift introduced by either phase shifter 24-2 or 24-4, the phase shifts introduced by phase shifters 24-2 and 24-4 being of equal values.

Figure 3H:
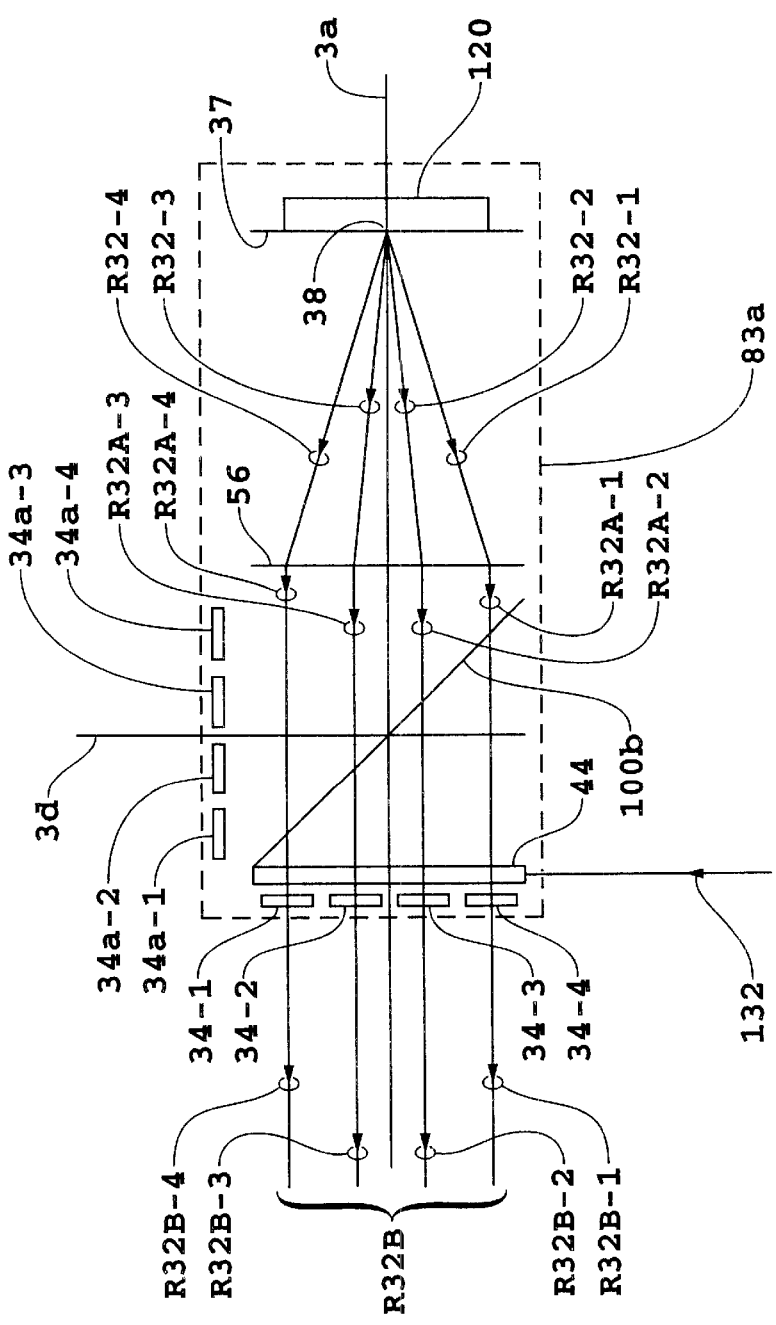

In FIG. 3*h*, light beam R22D (cf. FIG. 3*f*) is reflected by reference mirror 120 as reflected reference beam R32 comprised of light beams R32-1,-2,-3,-4. Subsystem 83*a* shown in FIG. 3*h* is comprised of lens 56*a*, reference mirror 120, beam splitter 100*b*, and phase shifters 34, 34*a*, and 44. Phase shifter 34 comprised of phase shifter elements 34-1,-2,-3,-4 and phase shifter 34*a* comprised of phase shifter elements 34*a*-1,-2,-3,-4 are illustrated in FIG. 3*h* as rotated $\pi/2$ radians about the optical axes 3*a* and 3*c*, respectively, for the purpose of making the description of and tracking of optical beams R32, R32A, and R32B through subsystem 83*a* simpler without departing from the spirit or scope of the third embodiment of the present invention. Accordingly, light beam R32A, light beam R2B comprised of light beams R32B-1,-2,-3,-4, and light beam R32C comprised of light beams R32C-1,-2,-3,-4 are illustrated in FIG. 3*h* as rotated by $\pi/2$ radians about the optical axis 3*a*. The plane of FIG. 3*h* is parallel to the plane of FIG. 3*a*. Reflected reference R32 diverges from image point 38 in image plane 37 and enters lens 56*a*. As shown in FIG. 3*h*, reflected reference beam R32 emerges from lens 56*a* as collimated light beam R32A. Light beams R32A-1,-2,-3,-4 pass first through phase shifter 44 and then through phase shifters 34-4,-3,-2,-1, respectively, to emerge as light beams R32B-1,-2,-3,-4, respectively. The phase shift introduced by phase shifter 44 is controlled by signal 132 from computer 118. The phase shifts introduced by phase shifters 34-1 and 34-3 are of equal values which are a radians more than the phase shift introduced by either phase shifter 34-2 or 34-4, the phase shifts introduced by phase shifters 34-2 and 34-4 being of equal values. Reflected reference beam R32B exits subsystem 83*a*.

Figure 3I:
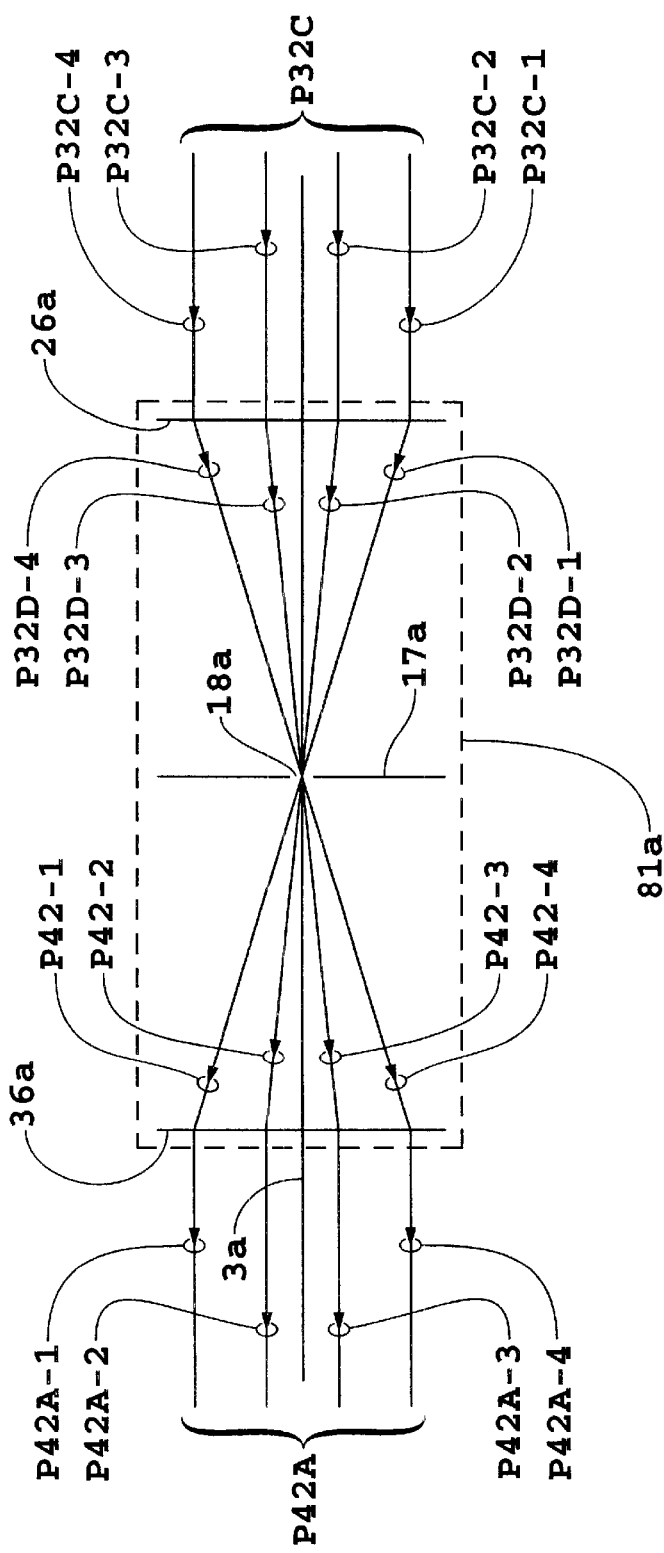

In FIG. 3*a*, a portion of scattered probe beam P32B is reflected by beam splitter 100 as a plurality of light beams P32C-1,-2,-3,-4 comprising scattered probe beam P32C. Scattered probe beam P32C enters subsystem 81*a* shown in FIG. 3*i*. In FIG. 3*i*, scattered probe beam P32C enters lens 26*a* and emerges as scattered probe beam P32D comprised of light beams P32D-1,-2,-3,-4. The plane of FIG. 3*i* is perpendicular to the plane of FIG. 3*a*. Lens 36*a* has an optical axis aligned with optical axis 3*a* of subsystem 81*a*. Lens 26*a* focuses scattered probe beam P32D onto spatial filter pinhole 18*a* in image plane 17*a*. A portion of scattered probe beam P32D emerges from spatial filter pinhole 18*a* as spatially-filtered scattered probe beam P42 comprised of light beams P42-1,-2,-3,-4. Spatially-filtered scattered probe beam P42 enters lens 36*a* having an optical axis aligned with optical axis 3*a* of subsystem 81*a*. Spatially-filtered scattered probe beam P42 emerges from lens 36*a* and exits subsystem 81*a* as collimated spatially-filtered scattered probe beam P42A comprised of light beams P42A-1,-2,-3,-4.

Figure 3J:
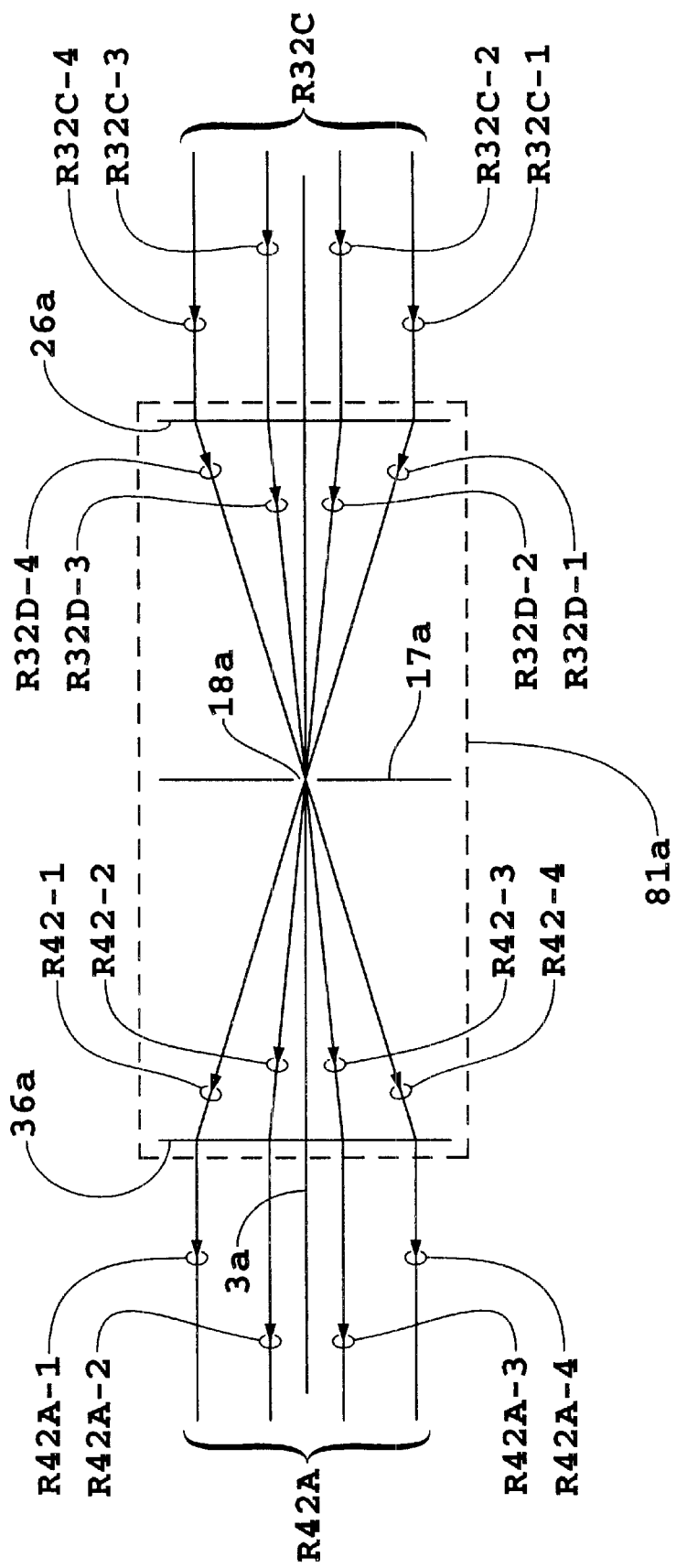

As shown in FIG. 3*a* reflected reference beam R32B is partially transmitted by beam splitter 100 as reflected reference beam R32C comprised of light beams R32C-1,-2,-3,-4. Reflected reference beam R32C enters subsystem 81*a* shown in FIG. 3*j*. The plane of FIG. 3*j* is perpendicular to the plane of FIG. 3*a*. In FIG. 3*j*, reflected reference beam R32C enters lens 26*a* and emerges as reflected reference beam R32D comprised of light beams R32D-1,-2,-3,-4. Lens 26a focuses reflected reference beam R32D onto spatial filter pinhole 18a in image plane 17a. A portion of reflected reference beam R32D emerges from spatial filter pinhole 18a as spatially-filtered reflected reference beam R42 comprised of light beams R42-1,-2,-3,-4. Spatially-filtered reflected reference beam R42 enters lens 36a. Spatially-filtered reflected reference beam R42 emerges from lens 36a and exits subsystem 81a as collimated spatially-filtered reflected reference beam R42A comprised of light beams R42A-1,-2,-3,-4.

It is shown in FIG. 3a that spatially-filtered scattered probe beam P42A impinges on dispersive element 130a which is preferably a reflecting diffraction grating. A portion of spatially-filtered scattered probe beam P42A is diffracted in the plane of FIG. 3a by dispersive detector element 130a as scattered probe beam P42B. Scattered probe beam P42B impinges on a second dispersive detector beam element 130b which is preferably a transmission diffraction grating. A portion of scattered probe beam P42B is diffracted in the plane of FIG. 3a by the second dispersive detector beam element 130b as wavenumber-filtered, spatially-filtered scattered probe beam P42C. Although the beams P42B and P42C are comprised of a spectrum of optical frequency components and therefore dispersed in angle in the plane of FIG. 3a, the paths of only one frequency component of beams P42B and P42C are shown in FIG. 3a. The paths shown are typical. The illustration of only one optical frequency component for the beams P42B and P42C permits the display of the important properties of subsystem 84 with respect to the wavenumber-filtered, spatially-filtered scattered probe beam P42C without departing from the spirit or scope of the present invention and without introducing undue complexity into FIG. 3a and subsequent figures.

Figure 3K:
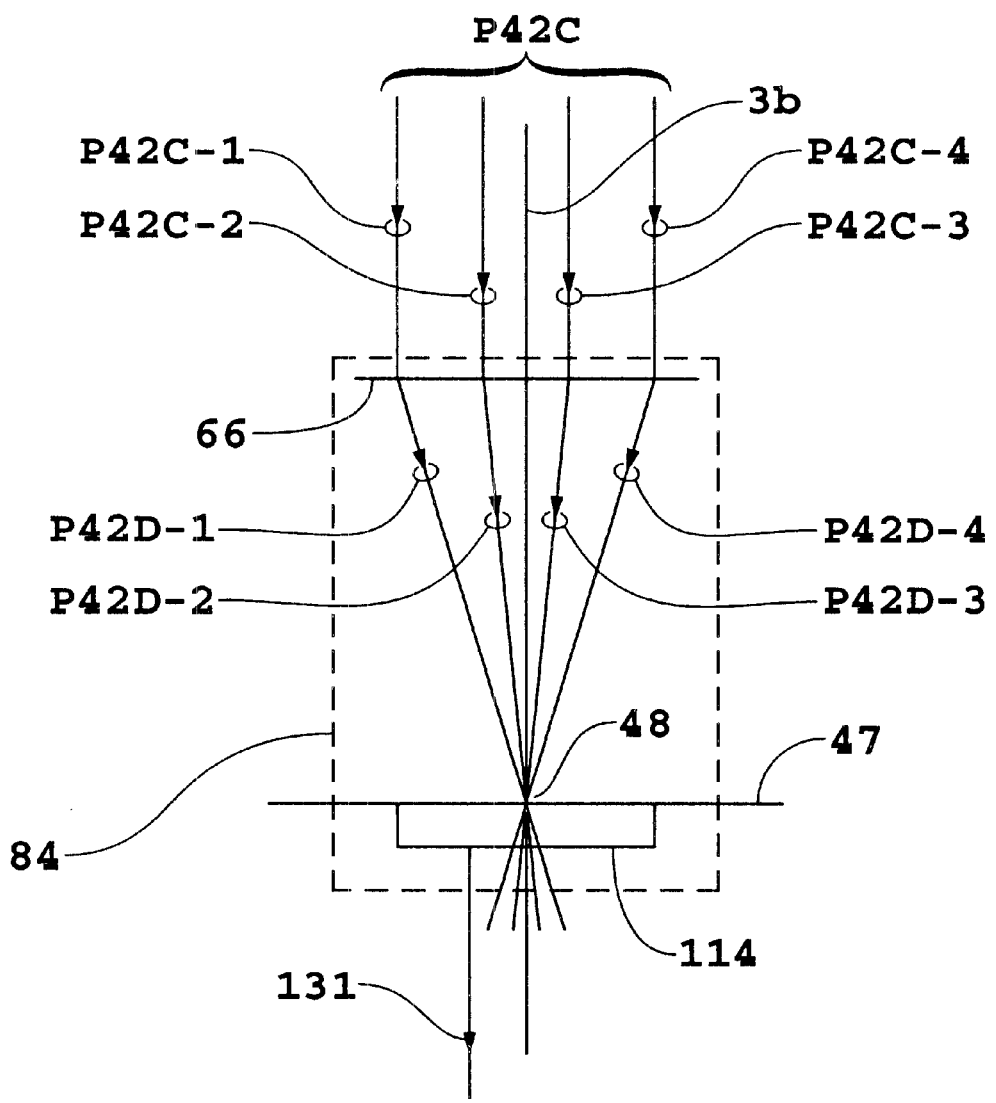
Figure 31:
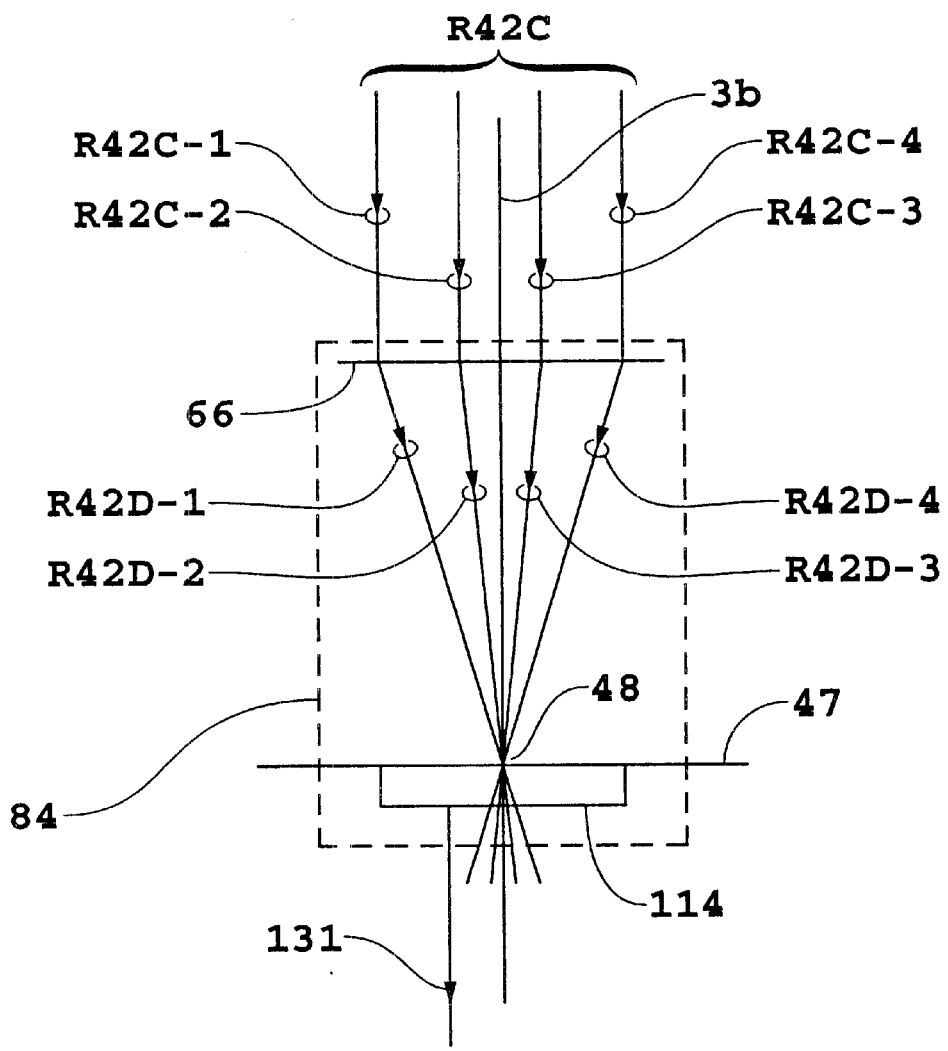
Figure 3A:
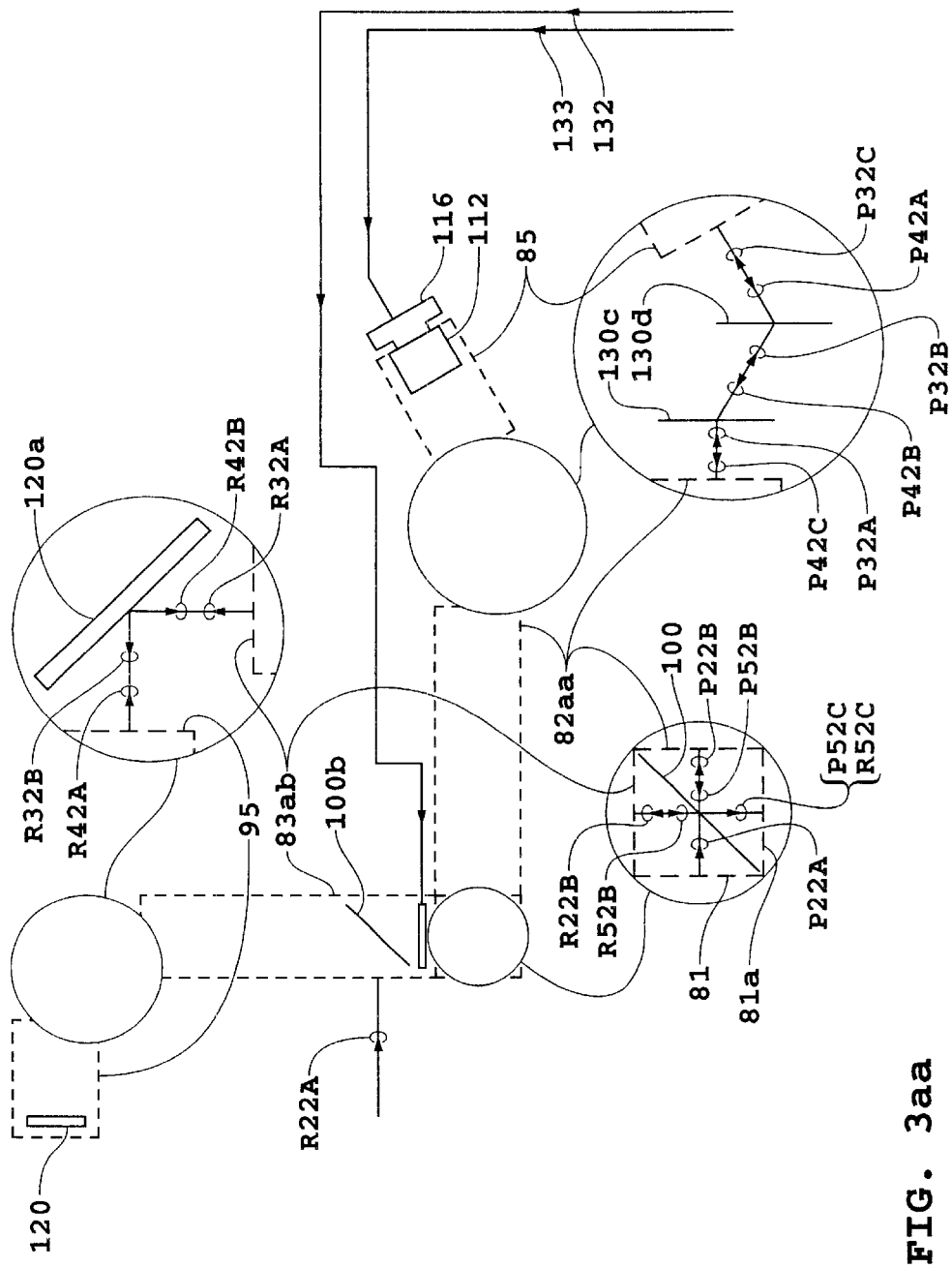
Figure 3A:
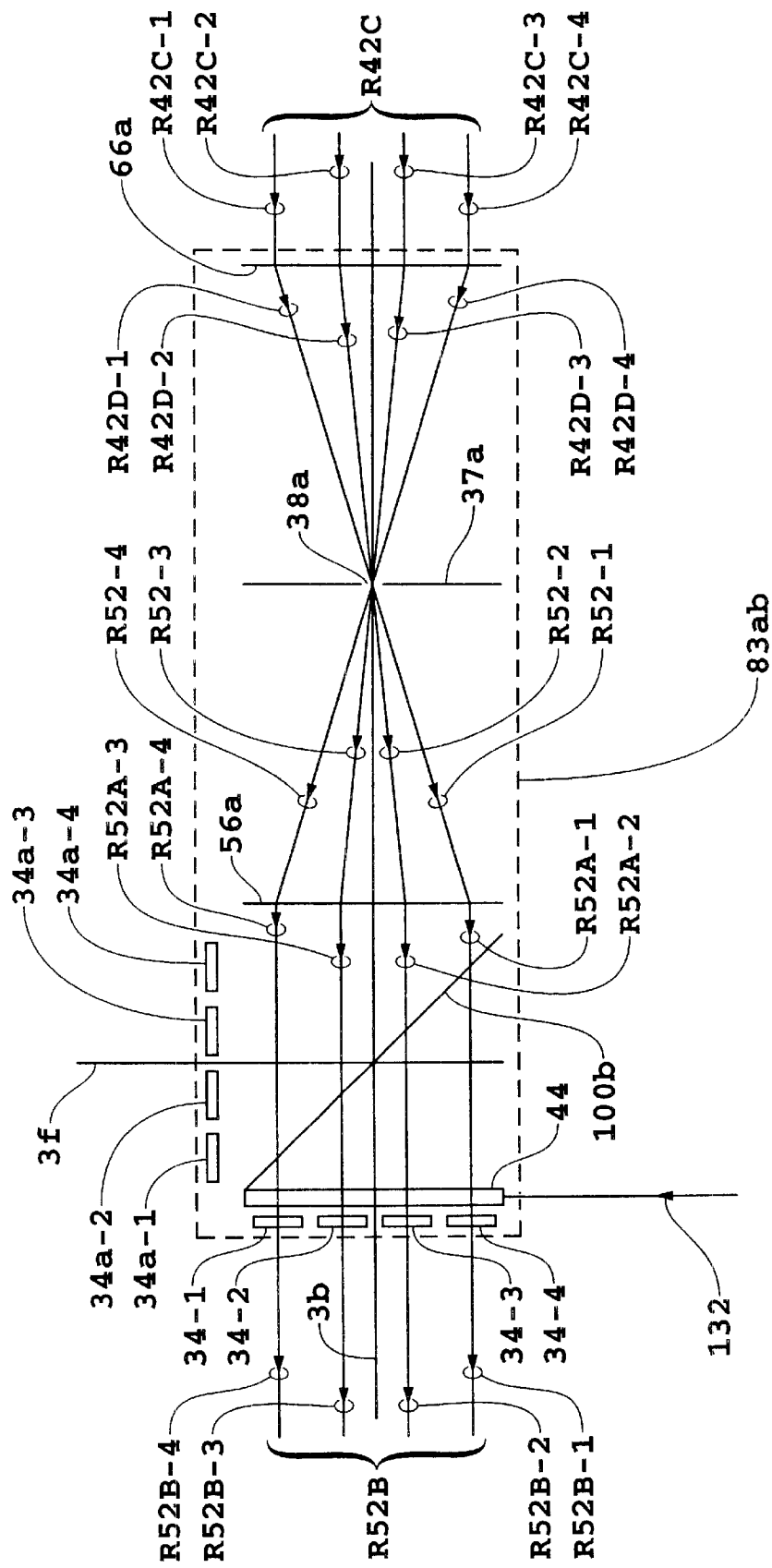

Wavenumber-filtered, spatially-filtered beam P42C enters subsystem 84 shown in FIG. 3k. The plane of FIG. 3k is perpendicular to the plane of FIG. 3a. As shown in FIG. 3k, wavenumber-filtered, spatially-filtered beam P42C passes through lens 66 having an optical axis aligned with optical axis 3d of subsystem 84 and emerges as wavenumber-filtered, spatially-filtered beam P42D comprised of light beams P42D-1,-2,-3,-4. The wavenumber-filtered, spatially-filtered beam P42D illustrated with only one optical frequency component is focused by lens 66 to image point 48 in image plane 47. The location of the image point 48 in the image plane 47 and therefore the location of the image point 48 on a linear array of detector pinholes located in the image plane 47 will depend on the optical frequency of wavenumber-filtered, spatially-filtered beam P42D by virtue of dispersive detector elements 130a and 130b. The portions of a light beam that pass through the linear array of pinholes is detected by detector 114, preferably a detector comprised of a linear array of pixels such as a linear array CCD.

It is shown in FIG. 3a that spatially-filtered reflected reference beam R42A impinges on dispersive detector element 130a. A portion of spatially-filtered reflected reference beam R42A is diffracted in the plane of FIG. 3a by dispersive detector element 130a as reflected reference beam R42B. Reflected reference beam R42B impinges on the second dispersive detector element 130b. A portion of reflected reference beam R42B is diffracted in the plane of FIG. 3a by the second dispersive detector element 130b as wavenumber-filtered, spatially-filtered reflected reference beam R42C. Although the beams R42B and R42C are comprised of a spectrum of optical frequency components and therefore dispersed in angle in the plane of FIG. 3a, the paths of only one optical frequency component for the beams R42B and R42C are shown in FIG. 3a. The paths shown are typical. The illustration of only one optical frequency component for the beams R42B and R42C permits the display of the important properties of section 84 with respect to the wavenumber-filtered, spatially-filtered reflected reference beam R42C without departing from the spirit or scope of the present invention and without introducing undue complexity into FIG. 3a and subsequent figures.

Wavenumber-filtered, spatially-filtered reflected reference beam R42C enters subsystem 84 shown in FIG. 3l. The plane of FIG. 3l is perpendicular to the plane of FIG. 3a. In FIG. 3l, wavenumber-filtered, spatially-filtered reflected reference beam R42C passes through lens 66 and emerges as wavenumber-filtered, spatially-filtered reflected reference beam R42D comprised of light beams R42D-1,-2,-3,-4. Wavenumber-filtered, spatially-filtered reflected reference beam R42D illustrated with only one optical frequency component in FIG. 3l is focused by lens 66 to image point 48 in image plane 47. The location of the image point 48 in image plane 47 and therefore the location of the image point 48 on the linear array of detector pinholes located in the image plane 47 will depend on the optical frequency of wavenumber-filtered, spatially-filtered reflected reference beam R42D. The portions of a light beam that pass through the linear array of detector pinholes are detected by detector 114.

The remainder of the third embodiment depicted in FIGS. 3a–3l is preferably the same as described for corresponding aspects of the first preferred embodiment in the description of FIGS. 1a–1n.

The Level 1 discrimination in the third preferred embodiment of the present invention is achieved by manipulating the impulse response functions of imaging subsystems of apparatus of the present invention in a plane orthogonal to the plane defined by dispersive detector elements 130a and 130b. A Level 1 type discrimination may also be achieved in a variant of the third preferred embodiment wherein the apparatus and electronic processing means of the variant are substantially the same as for the third preferred embodiment with the phase shifters 14, 24, and 34 rotated by π/2 radians about their respective optical axes. The remainder of the variant of the third embodiment is preferably the same as described in the description of the variant of the first preferred embodiment of the present invention.

Referring now to FIGS. 4a–4f, FIGS. 4a–4f depict in schematic form a fourth embodiment of the present invention from the first group of embodiments in which the source subsystem 80a, subsystem 81b, and the detector subsystem 84a are preferably configured for approximate slit confocal microscopy. Like reference numerals are used in FIGS. 4a–4f for like elements previously described with reference to FIGS. 3a–3l. The modifications in subsystem 80a shown in FIG. 4b exist in the area of the source 10a which is now preferably comprised of a broadband, spatially incoherent line source, preferably a lamp filament or laser diode array, and in the area of the pinhole 8 of the third embodiment which is now preferably comprised of a linear array of source pinholes 8a aligned with the image of line source 10a formed by lens 6. The modification in subsystem 81b shown in FIGS. 4c and 4d consists of replacing pinhole 18a in subsystem 81a of the third embodiment with a linear array of spatial filter pinholes 18b in subsystem 81b. The modifications in subsystem 84a shown in FIGS. 4e and 4f exist in the area of the detector 114a in which the linear array of pinholes in the image plane 47 of the third embodiment is now preferably a two-dimensional array of detector pinholes and the detector 114 of the third embodiment having a linear array of pixels is now a detector 114a preferably comprised of a two-dimensional array of pixels.

Figure 4A:
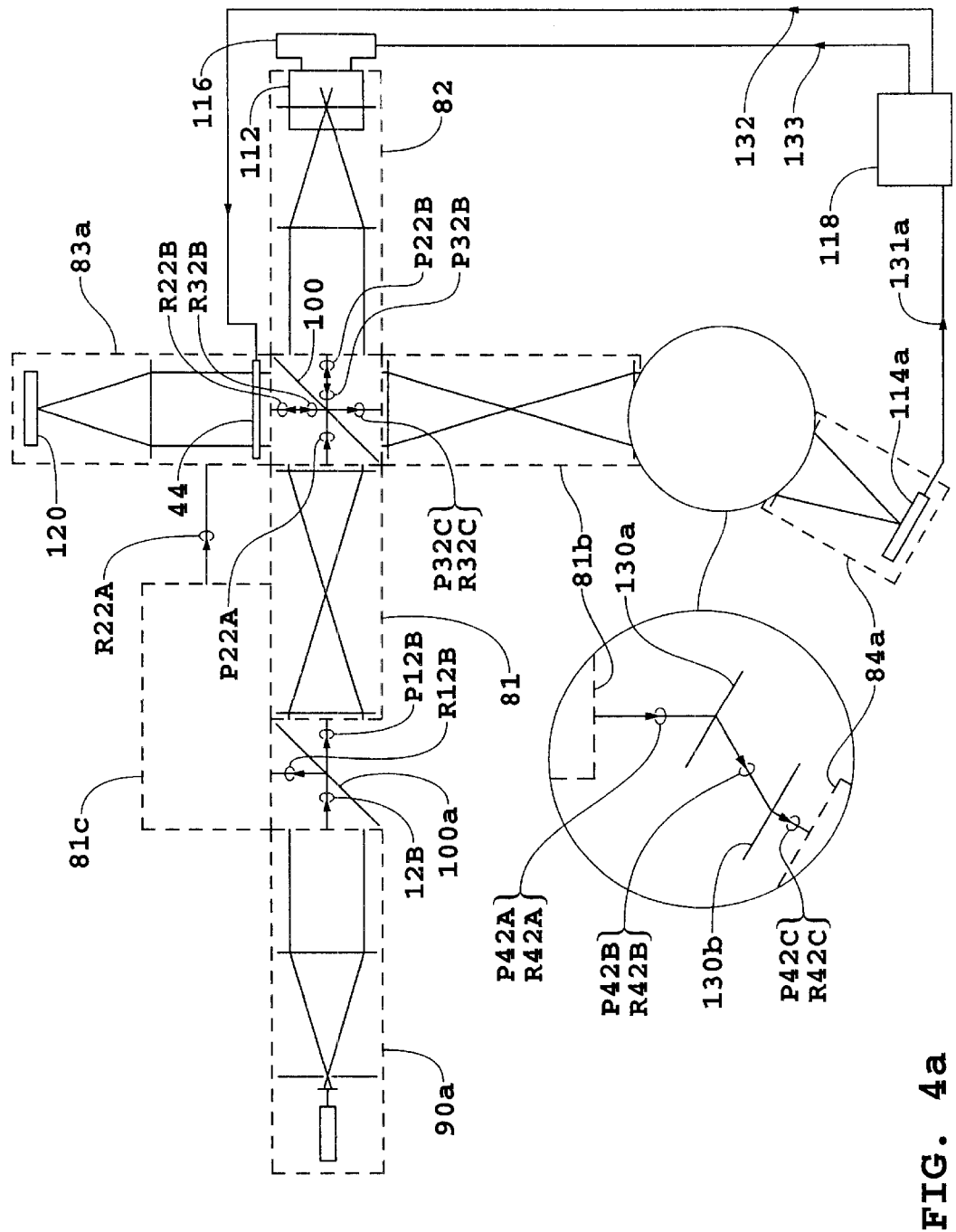
FIGS. 4*a*–4*f* taken together illustrate, in schematic form, the presently preferred fourth embodiment of the present invention with FIG. 4*a* showing optical paths between subsystems 80*a* and 81, 80*a* and 81*c*, 81 and 82, 81*c* and 83*a*, 82 and 81*b*, 83*a* and 81*b*, and 81*b* and 84*a*; paths of the electronic signals from computer 118 to translator 116 and to phase shifter 44 in subsystem 83*a*; and path of electronic signal from detector 114*a* in subsystem 84*a* to computer 118.
Figure 4B:
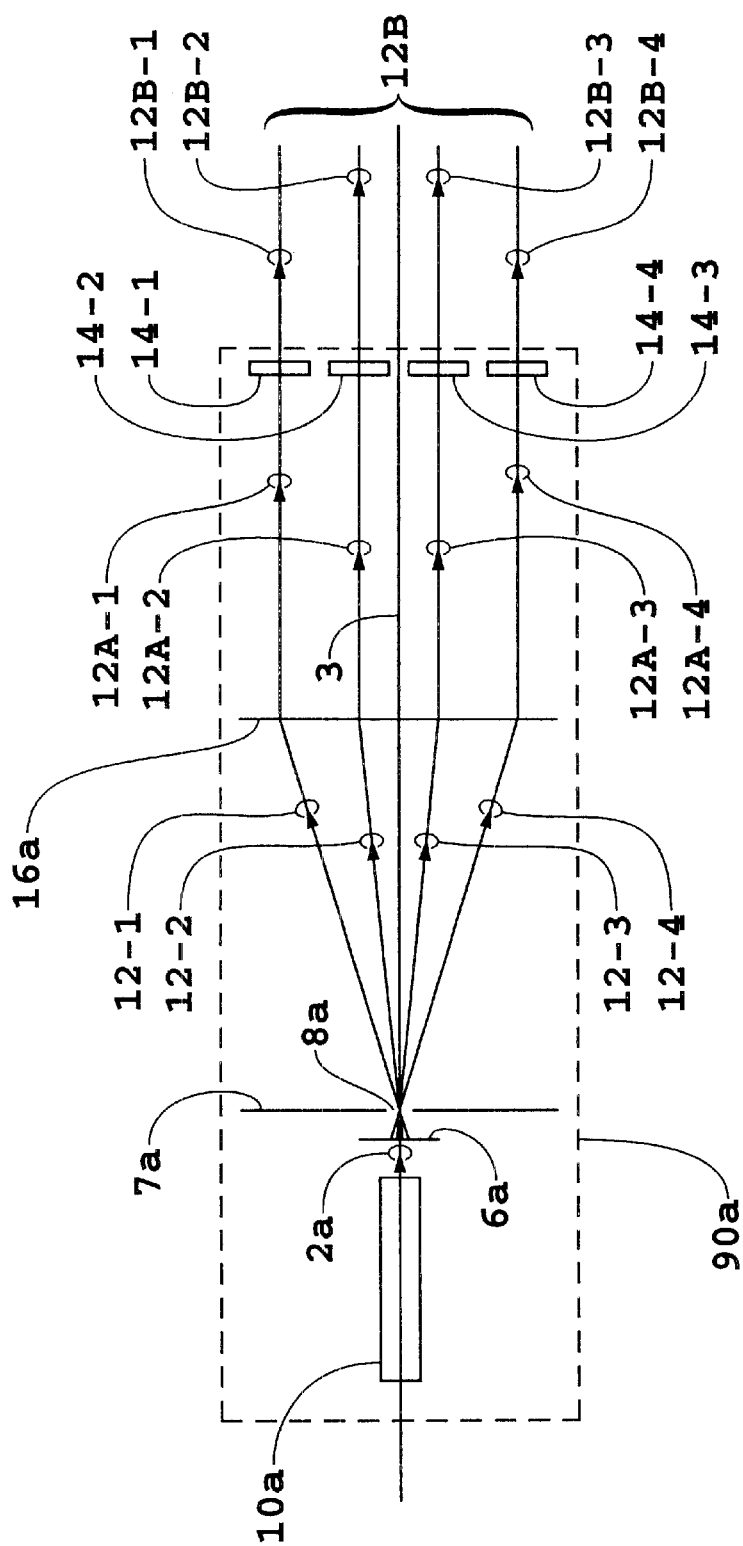
Figure 4C:
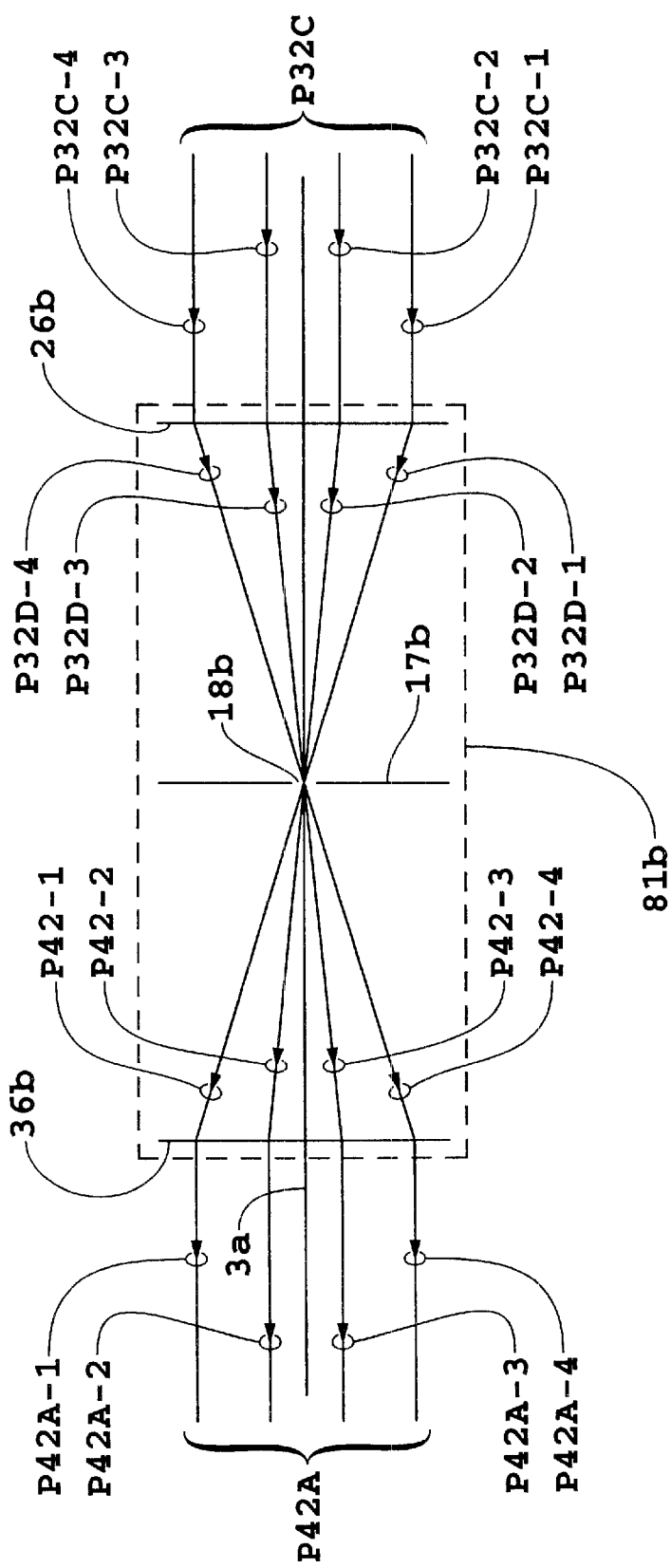
Figure 4D:
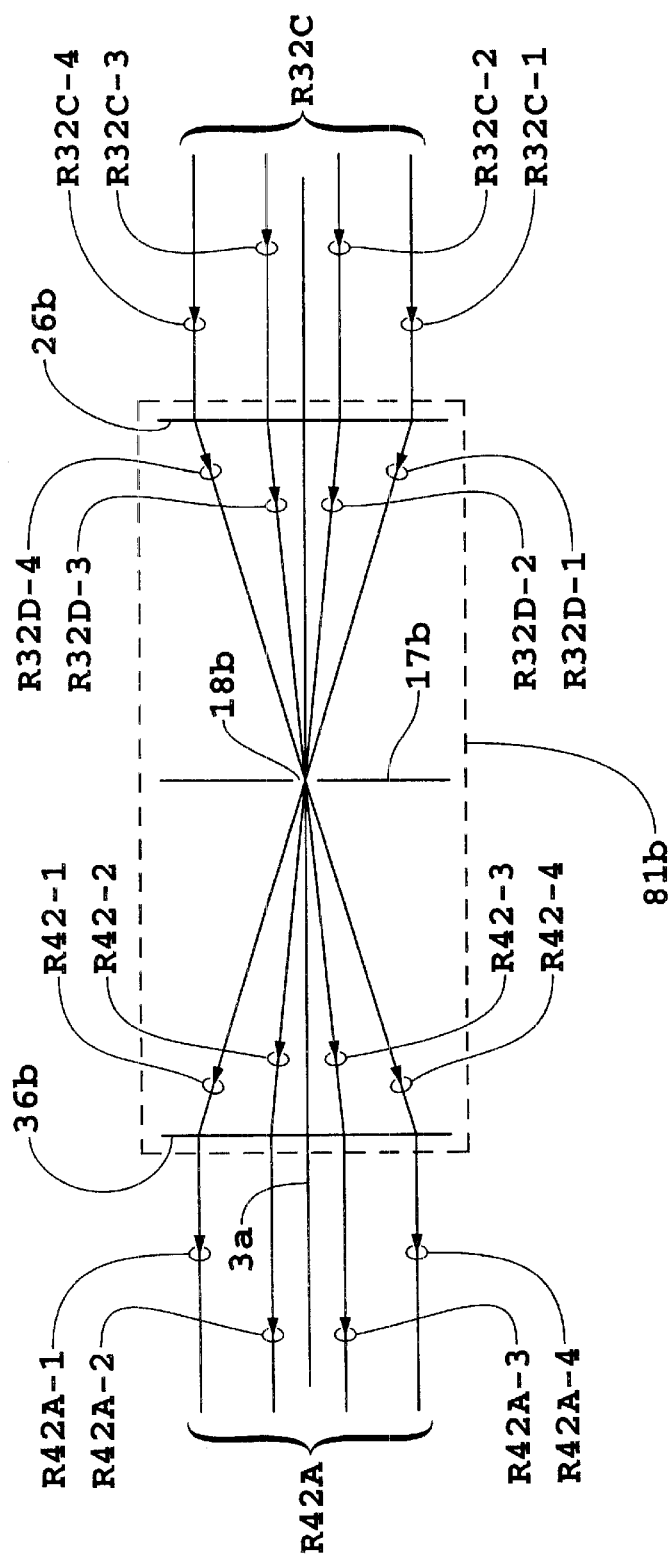
Figure 4E:
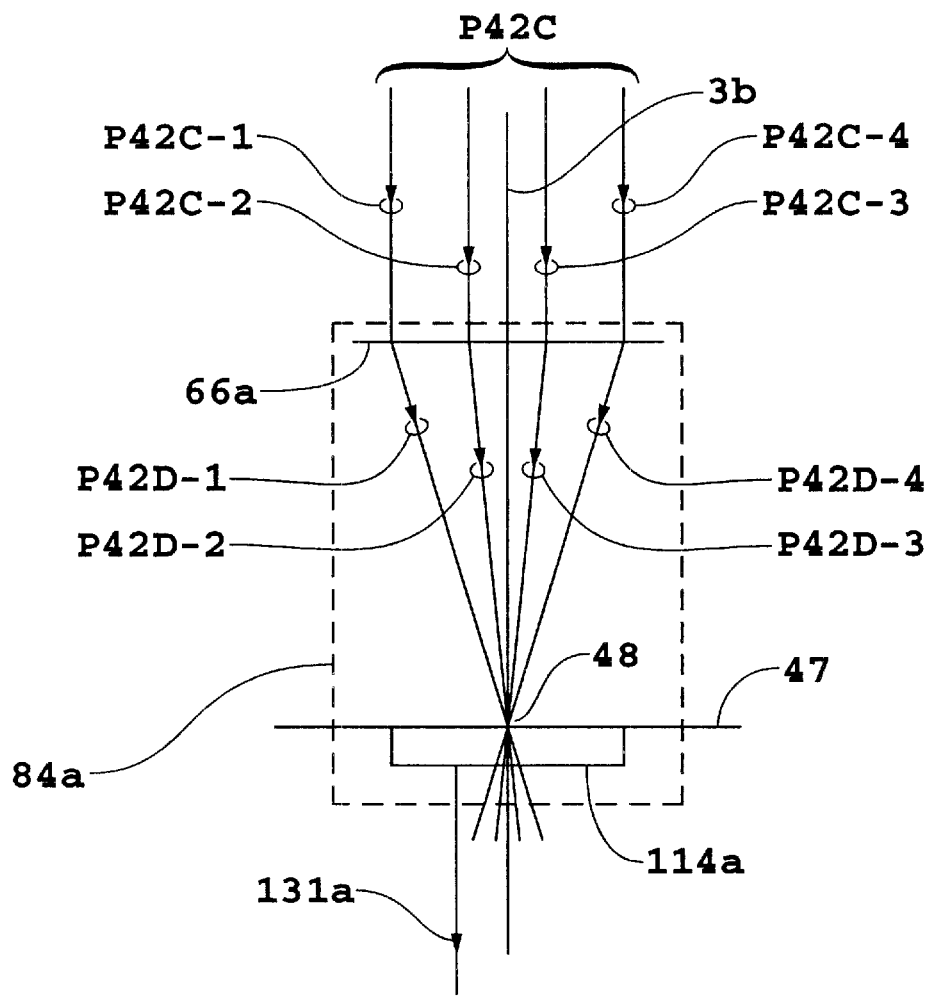
Figure 4F:
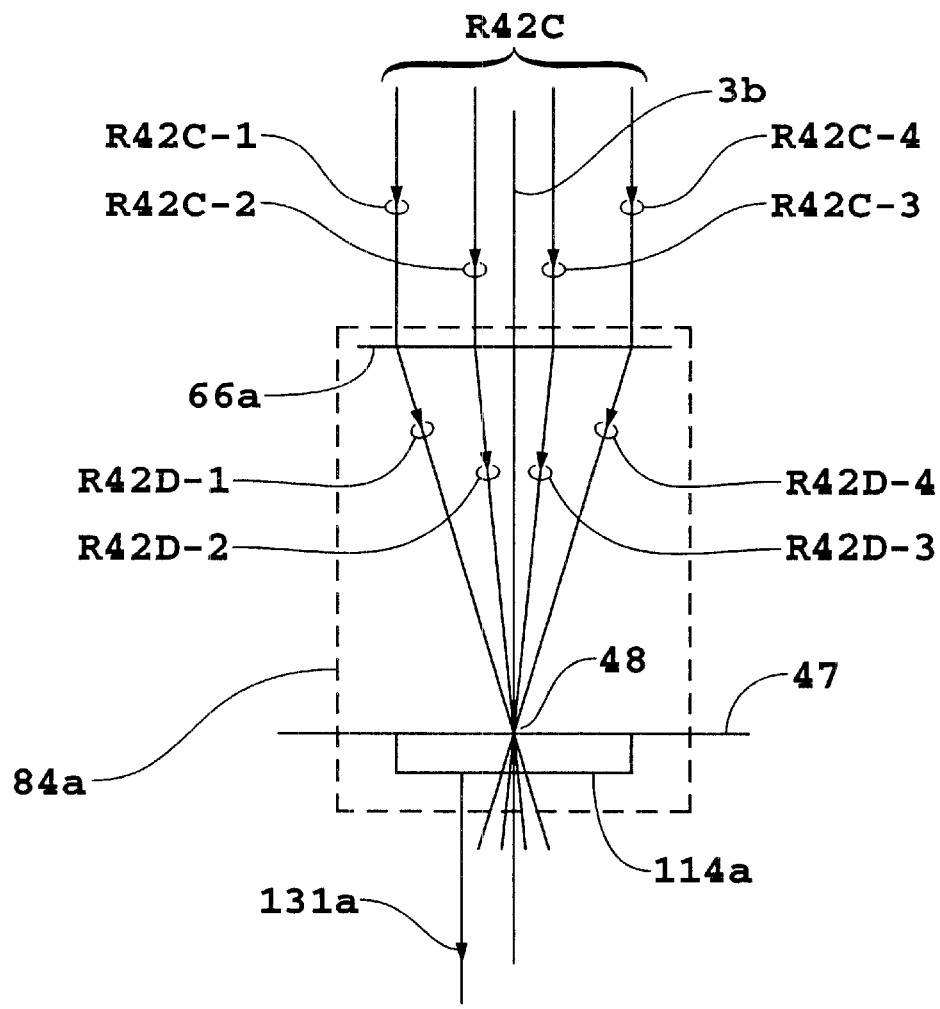
Figure 4A:
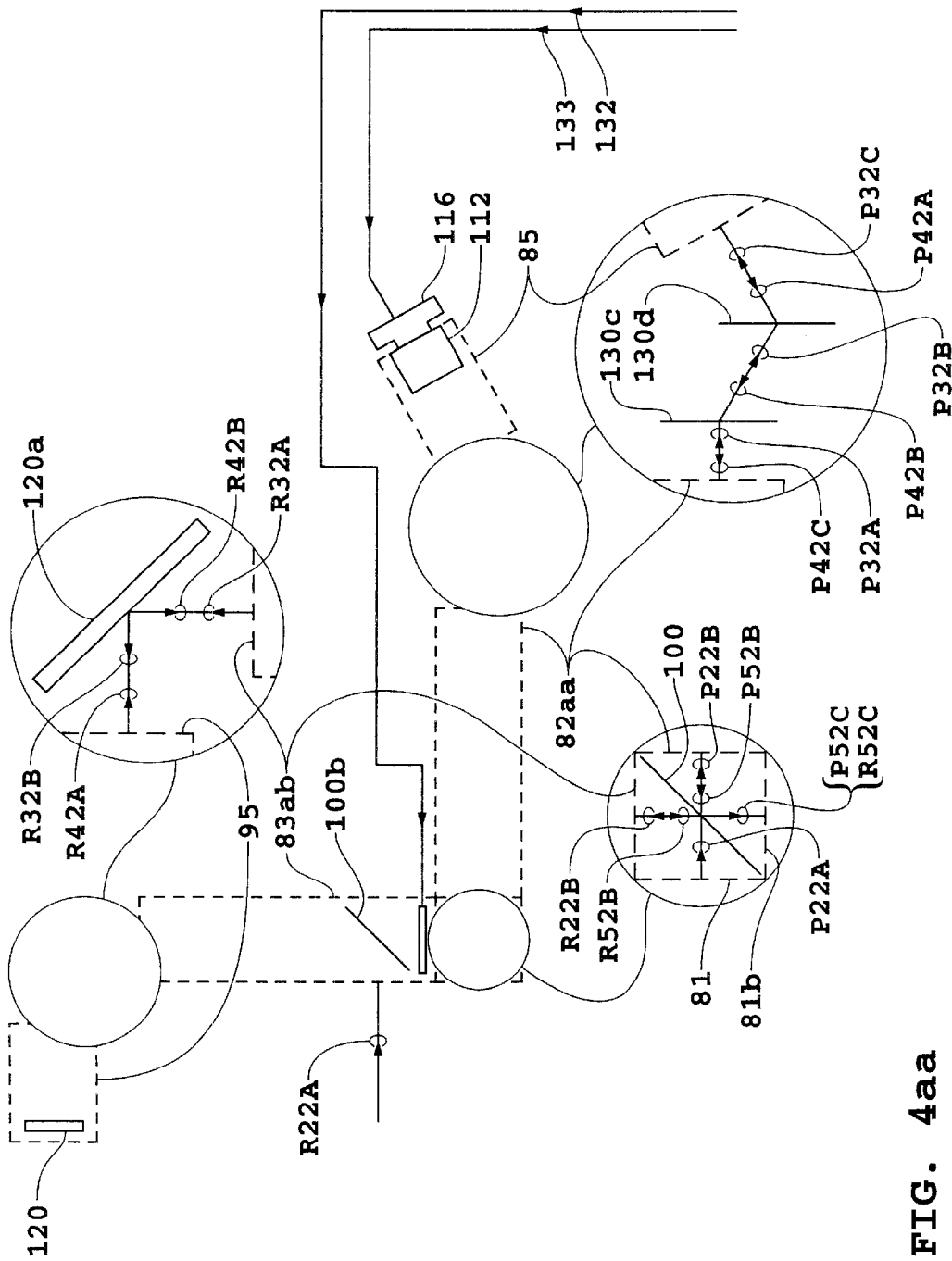

In FIG. 4b, the linear array of source pinholes 8a and source 10a are aligned perpendicular to the plane of FIG. 4b, the plane of FIG. 4b being perpendicular to the plane of FIG. 4a. In FIGS. 4c and 4d, the linear array of spatial filter pinholes 18b is aligned perpendicular to the plane of FIGS. 4c and 4d, the planes of FIGS. 4c and 4d being perpendicular to the plane of FIG. 4a. In FIGS. 4e and 4f, the two-dimensional array of detector pinholes and the two-dimensional array of detector pixels are aligned perpendicular to the plane of FIGS. 4e and 4f.

The remainder of the fourth embodiment depicted in FIGS. 4a–4f is preferably the same as described for corresponding aspects of the third preferred embodiment in the description of FIGS. 3a–3l.

The Level 1 discrimination in the fourth preferred embodiment of the present invention is achieved by manipulating the impulse response functions of imaging subsystems of apparatus of the present invention in a plane orthogonal to the plane defined by dispersive detector elements 130a and 130b. A Level 1 type discrimination may also be achieved in a first variant of the fourth preferred embodiment wherein the apparatus and electronic processing means of the first variant are substantially the same as for the fourth preferred embodiment with the phase shifters 14, 24, and 34 rotated by $\pi/2$ radians about their respective optical axes. The remainder of the first variant of the fourth embodiment is preferably the same as described for corresponding aspects of the first variant of the second preferred embodiment of the present invention.

A second variant of the fourth preferred embodiment is described wherein the apparatus and electronic processing means of the second variant are substantially the same as for the fourth preferred embodiment except for the linear arrays of source pinholes 8a and spatial filter pinholes 18a of the fourth preferred embodiment which are replaced by a source slit and a spatial filter slit. The remainder of the second variant of the fourth embodiment is preferably the same as described for corresponding aspects of the fourth preferred embodiment of the present invention.

The reduction of the systematic effects of out-of-focus images for the second variant of the fourth preferred embodiment is substantially the same as that achieved in prior art slit confocal interference microscopy. However, the statistical effects due to the out-of-focus images in the second variant of the fourth preferred embodiment is reduced below that achieved in prior art slit confocal interference microscopy but generally not as effective as achieved with apparatus of the fourth preferred embodiment and first variant of the fourth preferred embodiment.

The use of a linear array of source pinholes and a linear array of spatial pinholes as in the fourth preferred embodiment and the first variant of the fourth preferred embodiment instead of respective slits generates a requirement for a restricted scan of the object material to generate a two-dimensional representation of a section of the object material. The direction of the restricted scan is in the direction of the image of the linear array of source pinholes in the object material. The restricted scan arises because of the spacing between pinholes in the direction of the image of the linear array of source pinholes in the object material. In addition, a high sensitivity to the wavenumber-filtered, spatially-filtered scattered probe beam is maintained when the spacing between the pinholes in the direction of the image of the linear array of source pinholes in the object material complies with a condition subsequently set fourth in Eq. (54).

The number of steps of the restricted scan is determined by the ratio of the spacing between the images of two contiguous source pinholes in the object material and the angular resolution of the respective imaging subsystem. In practice, the number of steps in the restricted scan will be significantly less than the number of pinholes in the linear arrays of source pinholes and spatial filter pinholes. Thus using apparatus of the fourth preferred embodiment and the first variant of the fourth preferred embodiment with linear arrays of source pinholes and spatial filter pinholes, a two dimensional representation of a section of object material can be acquired with substantially no scanning.

It was noted in the descriptions of the embodiments and variants of the five groups of embodiments that the amplitude and phase of the complex amplitude of a scattered probe beam, scattered and/or reflected by an object material, is obtained by each of the embodiments and variants thereof. The significantly reduced statistical errors and reduced systematic errors in the determination of the complex amplitude of a scattered probe beam for each of the embodiments and variants thereof is a property relevant to the maximum density of data that can be stored and retrieved for a given recording medium of an optical disk, the recording medium being the object material.

The format for data stored at memory sites is typically binary with one bit available for use. With the increased signal-to-noise ratio afforded by the cited properties of reduced statistical errors and reduced systematic errors for the embodiments and variants thereof of the five groups of embodiments described herein, the maximum density of data that can be stored in a given recording medium of an optical disk can be increased. The data stored at a memory site can be expressed in a (base N)×(base M) format, base N for the N number of amplitude windows to which the amplitude of the complex amplitude is compared and base M for the M number of phase windows to which the phase of the complex amplitude is compared.

For the embodiments and variants thereof of the five groups of embodiments, the amplitude of the complex amplitude is processed by a series of N window comparator electronic processors to determine in which of N windows the amplitude is located. Similarly, the phase of the complex amplitude is processed by a series of M window comparator electronic processors to determine in which of M windows the phase is located. The values of N and M that can be used will be determined by factors such as a signal-to-noise ratio achieved and required processing time. The increase in the maximum density of data stored in an optical memory by use of one of the five groups of embodiments is proportional to the product N×M.

The presently preferred fifth embodiment of the present invention from the second group of embodiments has many elements which perform functions analogous to like numbered elements of the first embodiment from the first group of embodiments. In the confocal microscopy system shown in FIG. 1a, subsystem 82 is replaced by subsystem 82aa, dispersive elements 130c and 130d, and subsystem 85; and subsystem 83 is replaced by subsystem 83aa, mirror 120a, and subsystem 95, as shown in FIG. 1aa, to provide the fifth embodiment of the present invention. The fifth embodiment includes a Michelson interferometer comprised of a beam splitter 100, object material 112, translator 116, reference mirror 120, dispersive probe beam elements 130c and 130d, dispersive detector elements 130a and 130b, and detector 114.

As shown in FIG. 1aa, light beam 22A is partially transmitted by beam splitter 100 as light beam P22B comprised of light beams P22B-1,-2,-3,-4 and enters subsystem 82aa which is shown in FIG. 1d.

In FIG. 1aa, light beam P22B impinges onto a phase shifter 24 comprised of phase shifters 24-1,-2,-3,-4. The plane of FIG. 1ab is perpendicular to the plane of FIG. 1aa. Phase shifter 24 is comprised of the same number of 2m elements as phase shifter 14 and is shown in FIG. 1ab with m=2. Light beams P22B-1,-2,-3,-4 pass through phase shifters 24-1,-2,-3,-4, respectively, and emerge as light beam P22C comprised of light beams P22C-1,-2,-3,-4, respectively. The phase shifts introduced by phase shifters 24-1 and 24-3 are of equal values which are π radians more than the phase shift introduced by either phase shifter 24-2 or 24-4, the phase shifts introduced by phase shifters 24-2 and 24-4 being of equal values.

The sum of the phase shifts produced by each pair of phase shifters 14-1 and 24-1, 14-2 and 24-2, 14-3 and 24-3, and 14-4 and 24-4 is π radians. Thus there is no net relative phase shift between any two of the light beams P22C-1,-2,-3,-4. Light beam P22C passes through lens 26 as light beam P22D comprised of light beams P22D-1,-2,-3,-4 which is focused to first intermediate probe beam spot at image point 18 in in-focus image plane 17. Light beam P22D emerges from image point 18 as light beam P32 comprised of light beams P32-1,-2,-3,-4. Light beam P32 enters lens 36 having an optical axis aligned with optical axis 3 subsystem 82aa. Light beam P32 emerges from lens 36 and exits subsystem 82aa as collimated light beam P22A comprised of light beams P32A-1,-2,-3,-4.

In FIG. 1aa, probe beam P32A impinges on a third dispersive element, dispersive probe beam element 130c, which is preferably a transmission diffraction grating. A portion of probe beam P32A is diffracted in the plane of FIG. 1aa by the third dispersive element 130c as probe beam P32B comprised of light beams P32B-1,-2,-3,-4, respectively. Probe beam P32B impinges on a fourth dispersive element, dispersive probe beam element 130d, which is preferably a transmission diffraction grating. A portion of probe beam P32B is diffracted in the plane of FIG. 1aa by the fourth dispersive element 130d as probe beam P32C comprised of light beams P32C-1,-2,-3,-4, respectively. Although probe beams P32B and P32C are comprised of a spectrum of optical frequency components and therefore dispersed in angle in the plane of FIG. 1aa, the paths of only one frequency component of probe beams P32B and P32C are shown in FIG. 1aa. The paths shown are typical. The illustration of only one optical frequency component for probe beams P32B and P32C permits the display of the important properties of subsystem 85 shown in FIG. 1ac with respect to the probe beam P32C without departing from the spirit or scope of the present invention and without introducing undue complexity into FIG. 1aa and subsequent figures.

In FIG. 1ac, probe beam P32C enters subsystem 85 and passes through lens 46 to form probe beam P32D comprised of light beams P32D-1,-2,-3,-4, respectively. Probe beam P32D is focused by lens 46 to form a line image in in-focus image plane 27 in object material 112 and to thereby illuminate the object material 112. The line image in in-focus image plane 27 includes image point 28. The axis of the line image is substantially perpendicular to the optical axis 3a of imaging subsystem 85. The length of the line image is determined by a combination of factors such as the focal length of lens 46 and the dispersive power of the dispersive probe beam elements 130c and 130d, both of which can be adjusted, and the optical bandwidth of the source 10. The line section may cut through one or more surfaces of the object material or lie in a surface of the object material. Optical axis of lens 46 is aligned with optical axis 3a of subsystem 85.

In FIG. 1aa, light beam 22A is partially reflected by beam splitter 100 as light beam R22B comprised of light beams R22B-1,-2,-3,-4. Light beam R22B enters subsystem 83aa, which is shown in FIG. 1ad. The plane of FIG. 1ad is perpendicular to the plane of FIG. 1aa. As shown in FIG. 1ad, light beam R22B impinges on phase shifter 34 comprised of phase shifters 34-1,-2,-3,-4. Phase shifter 34 contains the same number of elements, 2m, as phase shifter 14 and is shown in FIG. 1ad with m=2. Light beam R22B passes through phase shifter 34 and then through phase shifter 44 to emerge as light beam R22C comprised of light beams R22C-1,-2,-3,-4. The phase shift introduced by phase shifter 44 is controlled by signal 132 from computer 118.

The phase shifts introduced by phase shifters 34-1 and 34-3 are of equal values which are π radians more than the phase shift introduced by either phase shifter 34-2 or 34-4, the phase shifts introduced by phase shifters 34-2 and 34-4 being of equal values. Thus there is no net relative phase shift between any two of the light beams R22C-1,-2,-3,-4. Light beam R22C passes through lens 56 as light beam R22D comprised of light beams R22D-1,-2,-3,-4. Light beam R22D is focused by lens 56 to first intermediate reference beam spot at image point 38 in in-focus image plane 37. Optical axis of lens 56 is aligned with optical axis 3b of subsystem 83. Reference beam R22D emerges from the intermediate reference beam spot at image point 38 as reference beam R32 comprised of light R22D-1,-2,-3,-4, respectively. Reference beam R32 enters lens 66 having an optical axis aligned with optical axis 3b of subsystem 83aa. Reference beam R32 emerges from lens 66 and exits subsystem 83aa collimated as reference beam R32A comprised of light beams R32A-1,-2,-3,-4, respectively.

In FIG. 1aa, it is shown that reference beam R32A is reflected by mirror 120a and directed to subsystem 95 as reference beam R32B comprised of light beams R32B-1,-2,-3,-4, respectively. In FIG. 1ae, reference beam R32B passes through lens 76 as reference beam R32C comprised of light beams R32C-1,-2,-3,-4, respectively. Reference beam R32C is focused by lens 76 to image point 48 in in-focus image plane 47 on reference mirror 120. Optical axis of lens 76 is aligned with optical axis 3c of subsystem 95.

In FIG. 1af, a portion of probe beam P32D (cf. FIG. 1ac) is reflected and/or scattered by illuminated object material in the region of the line image in in-focus image plane 27 as scattered probe beam P42 comprised of light beams P42-1,-2,-3,-4. Scattered probe beam P42 diverges from the line image in in-focus image plane 27 and enters lens 46. As shown in FIG. 1af, scattered probe beam P42 emerges from lens 46 and exits subsystem 85 collimated as scattered probe beam P42A comprised of light beams P42A-1,-2,-3,-4, respectively.

As shown in FIG. 1aa, scattered probe beam P42A impinges on the fourth dispersive probe beam element 130d. A portion of scattered probe beam P42A is diffracted in the plane of FIG. 1aa by dispersive probe beam element 130d as scattered probe beam P42B comprised of light beams P42B-1,-2,-3,-4, respectively. Scattered probe beam P42B impinges on the third dispersive probe beam element 130c. A portion of scattered probe beam P42B is diffracted in the plane of FIG. 1aa as scattered probe beam P42C comprised of light beams P42C-1,-2,-3,-4, respectively. Although scattered probe beams P42B and P42C are comprised of a spectrum of optical frequency components and therefore dispersed in angle in the plane of FIG. 1*aa,* the paths of only one frequency component of scattered probe beams P42B and P42C are shown in FIG. 1*aa.* The optical frequency for the component paths of scattered probe beams P42B and P42C is the same optical frequency as for the component paths of probe beams P32B and P32C shown in FIG. 1*aa.*

Scattered probe beam P42C enters subsystem 82*aa* (cf. FIG. 1*aa*) shown in FIG. 1*ag.* In FIG. 1*ag,* scattered probe beam P42C enters lens 36 and emerges as scattered probe beam P42D comprised of light beams P42D-1,-2,-3,-4, respectively. Lens 36 focuses scattered probe beam P42D to intermediate scattered probe beam spot at image point 18 in in-focus image plane 17. Although only the paths of one optical frequency component of scattered probe beam P42D are shown in FIG. 1*ag,* the image points for all optical frequency components of scattered probe beam P42D are the same as the one shown schematically in FIG. 1*ag:* the optical system comprised of lens 36, the dispersive probe beam elements 130*c* and 130*d,* lens 46, and the object material 112 is a confocal imaging system with image point 18 being a conjugate image point of itself for the full spectrum of optical frequency components of beam P32.

Continuing with FIG. 1*ag,* scattered probe beam P42D emerges from image point 18 as scattered probe beam P52 comprised of light beams P52-1,-2,-3,-4, respectively. Scattered probe beam P52 enters lens 26 and is collimated to form scattered probe beam P52A comprised of light beams P52A-1,-2,-3,-4, respectively. Light beams P52A-1,-2,-3,-4 pass through phase shifters 24-4,-3,-2,-1, respectively, and emerge as light beams P52B-1,-2,-3,-4, respectively. Light beams P32B-1,-2,-3,-4 comprise scattered probe beam P52B which exits subsystem 82*aa.* The phase shifts introduced by phase shifters 24-1 and 24-3 are of equal values which are π radians more than the phase shift introduced by either phase shifter 24-2 or 24-4, the phase shifts introduced by phase shifters 24-2 and 24-4 being of equal values.

In FIG. 1*ah,* reference beam R32D (cf. FIG. 1*ae*) is reflected by reference mirror 120 as reflected reference beam R42 comprised of light beams R42-1,-2,-3,-4, respectively. Reflected reference beam R42 diverges from image point 48 in in-focus image plane 47 and enters lens 76. As shown in FIG. 1*ah,* reflected reference beam R42 emerges from lens 76 collimated as reflected reference beam R42A comprised of light beams R42A-1,-2,-3,-4, respectively.

In FIG. 1*aa,* reflected reference beam R42A is reflected by mirror 120*a* and directed to subsystem 83*aa* as reflected reference beam R42B comprised of light beams R42B-1,-2,-3,-4, respectively. In FIG. 1*ai,* reflected reference beam R42B passes through lens 66 as reflected reference beam R42C comprised of light beams R42C-1,-2,-3,-4, respectively. Reflected reference beam R42C is focused by lens 66 to the intermediate reflected reference beam image spot at image point 38 in in-focus image plane 37. Reference beam R42C emerges from the intermediate reflected reference beam spot at image point 38 as reflected reference beam R52 comprised of light beams R52-1,-2,-3,-4, respectively. Reference beam R52 enters lens 56 and emerges from lens 56 as reference beam R52A comprised of light beams R52A-1,-2,-3,-4, respectively. As shown in FIG. 1*ai,* reflected reference beam R52 emerges from lens 56 as collimated reflected reference beam R52A comprised of light beams R52A-1,-2,-3,-4, respectively. Light beams R52A-1,-2,-3,-4 pass first through phase shifter 44 and then through phase shifters 34-4,-3,-2,-1, respectively, to emerge as reflected reference beam R32B comprised of light beams R32B-1,-2,-3,-4, respectively. The phase shift introduced by phase shifter 44 is controlled by signal 132 from computer 118. The phase shifts introduced by phase shifters 34-1 and 34-3 are of equal values which are π radians more than the phase shift introduced by either phase shifter 34-2 or 34-4, the phase shifts introduced by phase shifters 34-2 and 34-4 being of equal values. Light beams R32B-1,-2,-3,-4 which comprise light beam R32B exits subsystem 83*aa.*

The remaining description of the fifth embodiment is the same as corresponding portions of description given for the first embodiment.

The interference cross term between the complex amplitude of the wavenumber-filtered, spatially-filtered scattered probe beam P42D and of the complex amplitude of the wavenumber-filtered, spatially-filtered reflected reference beam R42D of the first embodiment and the interference cross term between the complex amplitude of the wavenumber-filtered, spatially-filtered scattered probe beam P62D and of the complex amplitude of the wavenumber-filtered, spatially-filtered reflected reference beam R62D of the fifth embodiment contain information about two substantially orthogonal line sections in object material 112, the image points of the respective line sections being acquired simultaneously. For the first embodiment, the line section in object material 112 is substantially parallel with the optical axis 3 of subsystem 82 and for the fifth embodiment, the line section in object material 112 is substantially orthogonal to the optical axis 3*a* of subsystem 85.

The Level 1 discrimination in the fifth preferred embodiment of the present invention is achieved by manipulating the impulse response functions of imaging subsystems of apparatus of the present invention in a plane orthogonal to the plane defined by dispersive probe beam elements 130*c* and 130*d* and dispersive detector elements 130*a* and 130*b*. A Level 1 type discrimination may also be achieved in a variant of the fifth preferred embodiment wherein the apparatus and electronic processing means of the variant are substantially the same as for the fifth preferred embodiment with the phase shifters 14, 24, and 34 rotated by π/2 radians about their respective optical axes. The reduction of the systematic effects of out-of-focus images in the variant of the fifth preferred embodiment is the same as that in the fifth preferred embodiment. The statistical effects due to the out-of-focus images in the variant of the fifth preferred embodiment is also reduced below that achieved in prior art confocal interference microscopy but generally not as effective as achieved with apparatus of the fifth preferred embodiment.

The presently sixth preferred embodiment of the present invention from the second group of embodiments has many elements that perform functions analogous to like numbered elements of the second embodiment from the first group of embodiments, the sixth embodiment being configured for approximate slit confocal microscopy. In the confocal microscopy system shown in FIG. 2*a,* subsystem 82 is replaced by subsystem 82*aa,* dispersive elements 130*c* and 130*d,* and subsystem 85; and subsystem 83 is replaced by subsystem 83*aa,* mirror 120*a,* and subsystem 95, as shown in FIG. 2*aa,* to provide the sixth preferred embodiment of the present invention. The sixth embodiment includes a Michelson interferometer comprised of beam splitter 100, object material 112, translator 116, reference mirror 120, dispersive probe beam elements 130*c* and 130*d,* dispersive detector elements 130*a* and 130*b,* and detector 114*a.*

The remaining description of the sixth embodiment is the same as corresponding portions of descriptions given for the second and fifth embodiments.

The interference cross term between the complex amplitude of the wavenumber-filtered, spatially-filtered scattered probe beam P42D and of the complex amplitude of the wavenumber-filtered, spatially-filtered reflected reference beam R42D of the second embodiment and the interference cross term between the complex amplitude of the wavenumber-filtered, spatially-filtered scattered probe beam P62D and of the complex amplitude of the wavenumber-filtered, spatially-filtered reflected reference beam R62D of the sixth embodiment contain information about two substantially orthogonal two-dimensional sections in object material 112, the image points in the respective two-dimensional sections being acquired simultaneously. For the second embodiment, a normal to the two-dimensional section in object material 112 is substantially orthogonal to the optical axis 3 of in subsystem 82 and for the sixth embodiment, a normal to the two-dimensional section in object material 112 is substantially parallel to the optical axis 3a of subsystem 85.

The presently seventh preferred embodiment of the present invention from the second group of embodiments has many elements that perform functions analogous to like numbered elements of the third embodiment from the first group of embodiments. In the confocal microscopy system shown in FIG. 3a, subsystem 82 is replaced by subsystem 82aa, dispersive elements 130c and 130d, and subsystem 85; and subsystem 83a is replaced by subsystem 83ab, mirror 120a, and subsystem 95 to provide the seventh embodiment of the present invention, as shown in FIG. 3aa. The seventh embodiment includes a Michelson interferometer comprised of beam splitter 100, object material 112, translator 116, reference mirror 120, dispersive probe beam elements 130c and 130d, dispersive detector elements 130a and 130b, and detector 114a.

The remaining description of the seventh embodiment is the same as corresponding portions of descriptions given for the third and sixth embodiments.

The interference cross term between the complex amplitude of the wavenumber-filtered, spatially-filtered scattered probe beam P42D and of the complex amplitude of the wavenumber-filtered, spatially-filtered reflected reference beam R42D of the third embodiment and the interference cross term between the complex amplitude of the wavenumber-filtered, spatially-filtered scattered probe beam P62D and of the complex amplitude of the wavenumber-filtered, spatially-filtered reflected reference beam R62D of the seventh embodiment contain information about two substantially orthogonal line sections in object material 112, the image points of the respective line sections being acquired simultaneously. For the third embodiment, the line section in object material 112 is substantially parallel with the optical axis 3 of subsystem 82 and for the seventh embodiment, the line section in object material 112 is substantially orthogonal to the optical axis 3a of subsystem 85.

The presently eighth preferred embodiment of the present invention from the second group of embodiments has many elements that perform functions analogous to like numbered elements of the fourth embodiment from the first group of embodiments. In the confocal microscopy system shown in FIG. 4a, subsystem 82 is replaced by subsystem 82aa, dispersive elements 130c and 130d, and subsystem 85; and subsystem 83a is replaced by subsystem 83ab, mirror 120a, and subsystem 95 to provide the eighth embodiment of the present invention, as shown in FIG. 4aa. The eighth embodiment includes a Michelson interferometer comprised of beam splitter 100, object material 112, translator 116, reference mirror 120, dispersive probe beam elements 130c and 130d, dispersive detector elements 130a and 130b, and detector 114a.

The remaining description of the eighth embodiment is the same as corresponding portions of descriptions given for the fourth and seventh embodiments.

The interference cross term between the complex amplitude of the wavenumber-filtered, spatially-filtered scattered probe beam P42D and of the complex amplitude of the wavenumber-filtered, spatially-filtered reflected reference beam R42D of the fourth embodiment and the interference cross term between the complex amplitude of the wavenumber-filtered, spatially-filtered scattered probe beam P62D and of the complex amplitude of the wavenumber-filtered, spatially-filtered reflected reference beam R62D of the eighth embodiment contain information about two substantially orthogonal two-dimensional sections in object material 112, the image points of the respective two-dimensional sections being acquired simultaneously. For the fourth embodiment, a normal to the two-dimensional section in object material 112 is substantially orthogonal to the optical axis 3 of subsystem 82 and for the eighth embodiment, a normal to the two-dimensional section in object material 112 is substantially parallel to the optical axis 3a of subsystem 85.

The presently preferred ninth, tenth, eleventh, and twelfth preferred embodiments and variants thereof of the present invention from the third group of embodiments comprise the same elements and subsystems of the first, second, third, and fourth embodiments and variants thereof, respectively, except for the omission of the phase shifters 14, 24, 34, and 34a. The remaining description of the embodiments and variants thereof in the third group of embodiments is the same as the corresponding portions of the descriptions given for the embodiments and variants thereof from the first group of embodiments except with respect to the level of statistical accuracy obtained for images in a given time interval.

The level of statistical accuracy obtained for images in a given interval of time with embodiments and variants thereof from the first group of embodiments is better than the level of statistical accuracy obtained for images in the same interval of time with embodiments and variants thereof from the third group of embodiments. However, the statistical errors introduced by the amplitude of the out-of-focus images will be greatly reduced for the apparatus of the embodiments and variants thereof of the third group of embodiments in relation to the corresponding statistical errors introduced by the amplitude of out-of-focus images in prior-art confocal interferometric microscopy.

The size of the interference cross term between the complex amplitude of the wavenumber-filtered, spatially-filtered background beam and the complex amplitude of the wavenumber-filtered, spatially-filtered reflected reference beam in a detector image plane for embodiments and variants thereof of the third group of embodiments will be substantially the same as that obtained for the corresponding interference cross term in prior art confocal interferometric microscopy on a pixel by pixel comparison. However, in a given interval of time, the statistical error per each image point of an imaged line section of the object material acquired with the apparatus of the embodiments and variants thereof of the third group of embodiments is substantially the same as that obtained in the same time interval for only a single image point for the prior art confocal interferometric microscopy. A similar statement applies with respect to imaging two-dimensional sections of the object material. This difference is the basis for the conclusion that the statistical errors introduced by the amplitude of the out-of-focus images will be greatly reduced for the embodiments and variants thereof of the third group of embodiments in relation to the corresponding statistical errors introduced by the amplitude of the out-of-focus images in prior-art confocal interferometric microscopy when considering the statistical accuracy of an image of a line section or two-dimensional section of the object material acquired in identical intervals of time.

The presently preferred embodiments 13, 14, 15, and 16 and variants thereof of the present invention from the fourth group of embodiments comprise the same elements and subsystems of the fifth, sixth, seventh, and eighth embodiments and variants thereof, respectively, except for the omission of the phase shifters 14, 24, 34, and 34a. The remaining description of the embodiments and variants thereof in the fourth group of embodiments is the same as the corresponding portions of the descriptions given for the embodiments and variants thereof from the second group of embodiments except with respect to the level of reduction and compensation of background from out-of-focus images.

The level of reduction and compensation of background from out-of-focus images obtained with embodiments and variants thereof from the second group of embodiments is better than the level of reduction and compensation of background from out-of-focus images obtained with embodiments and variants thereof from the fourth group of embodiments. However, the statistical errors introduced by the amplitude of the out-of-focus images will be greatly reduced for the apparatus of the embodiments and variants thereof of the fourth group of embodiments in relation to the corresponding statistical errors introduced by the amplitude of out-of-focus images in prior-art confocal interferometric microscopy.

The size of the interference cross term between the complex amplitude of the wavenumber-filtered, spatially-filtered background beam and the complex amplitude of the wavenumber-filtered, spatially-filtered reflected reference beam in a detector image plane for embodiments and variants thereof of the fourth group of embodiments will be substantially the same as that obtained for the corresponding interference cross term in prior art confocal interferometric microscopy on a pixel by pixel comparison. However, in a given interval of time, the statistical error per each image point of an imaged line section of the object material acquired with the apparatus of the embodiments and variants thereof of the fourth group of embodiments is substantially the same as that obtained in the same time interval for only one image point for the prior art confocal interferometric microscopy. A similar statement applies with respect to imaging two-dimensional sections of the object material. This difference is the basis for the conclusion that the statistical errors introduced by the amplitude of the out-of-focus images will be greatly reduced for the embodiments and variants thereof of the fourth group of embodiments in relation to the corresponding statistical errors introduced by the amplitude of the out-of-focus images in prior-art confocal interferometric microscopy when considering the statistical accuracy of an image of a line section or two-dimensional section of the object material acquired in identical intervals of time.

The presently preferred embodiments 17, 18, 19, and 20 and variants thereof of the present invention from the fifth group of embodiments comprise the same elements and subsystems of the first, second, third, and fourth embodiments and variants thereof, respectively, except for the replacement of the non-achromatic probe lens of the embodiments and variants thereof of the first group of embodiments by an achromatic probe lens. The remaining description of the embodiments and variants thereof of the fifth group of embodiments is the same as the corresponding portions of the descriptions given for the embodiments and variants thereof from the first group of embodiments except with respect to the level of statistical accuracy obtained in a given interval of time.

The level of reduction and compensation of background from out-of-focus images obtained with embodiments and variants thereof from the fifth group of embodiments is the same as the level of reduction and compensation of background from out-of-focus images obtained with embodiments and variants thereof from the first group of embodiments. However, the statistical errors introduced by the amplitude of the out-of-focus images will be better for the apparatus of the embodiments and variants thereof of the first group of embodiments in relation to the corresponding statistical errors introduced by the amplitude of out-of-focus images in the apparatus of the embodiments and variants thereof of the fifth group of embodiments, the fifth group of embodiments acquiring image points sequentially in time.

The level of reduction and compensation of background from out-of-focus images obtained with embodiments and variants thereof from the fifth group of embodiments is significantly better than the level of reduction and compensation of background from out-of-focus images obtained with prior art confocal interferometric microscopy. The size of the interference cross term between the complex amplitude of the wavenumber-filtered, spatially-filtered background beam and the complex amplitude of the wavenumber-filtered, spatially-filtered reflected reference beam in a detector image plane for embodiments and variants thereof of the fifth group of embodiments will be greatly reduced in relation to that obtained for the corresponding interference cross term in prior art confocal interferometric microscopy on a pixel by pixel comparison. Thus, the level of statistical accuracy and systematic error obtained for images in a given interval of time with embodiments and variants thereof from the fifth group of embodiments is significantly better than the level of statistical accuracy and systematic error obtained for images in the same interval of time with prior art confocal interferometric microscopy.

It will appreciated by those skilled in the art that phase shifters 14, 24, 34, and 34a may be apodized in order to alter the properties of the apparatus of the present invention vis-à-vis the magnitude of reduction of signals from out-of-focus images and the spatial resolving power without departing from the spirit and scope of the present invention. It will also be appreciated by those skilled in the art that the function of the phase shifters 14, 24, 34, and 34a may be achieved by other combinations of phase shifters or be configured with elements comprised of sections of a set of concentric annuli or other geometric patterns without departing from the spirit and scope of the present invention.

Phase shifters 14, 24, 34, 34a, and 44 may be of the electro-optical type or of the dispersive optical element type. References to a dispersive optical element type are given in the following paragraph in regards to broadband operation. Alternatively, the phase shifts described as being introduced by phase shifter 44 may alternatively be produced by making displacements of mirrors such as, for example reference mirror 120, in a direction normal to the reflecting surface of the mirrors.

Improved performance of the apparatus of the present invention for broadband sources will be obtained when the phase shifts produced by phase shifters 14, 24, 34, 34a, and 44 are not dependent on wavelength. It is possible to meet broadband phase shifter requirements by appropriately designing phase shifters 14, 24, 34, 34a, and 44 as types such as disclosed by H. A. Hill, J. W. Figoski, and P. T. Ballard in U.S. Pat. No. 4,213,706 issued July, 1980 and entitled "Background Compensating Interferometer" and by H. A. Hill, J. W. Figoski, and P. T. Ballard in U.S. Pat. No. 4,304,464 issued December, 1981 which is also entitled "Background Compensating Interferometer".

For each of the embodiments and variants thereof of the five groups of embodiments, there is a corresponding embodiment or variant for writing information to an object material comprising a recording medium. Each embodiment or variant for writing information comprises method and apparatus of a corresponding embodiment or variant of the five group of embodiments except for the following changes in configuration: the source and reference mirror subsystems are interchanged and the detectors and detectors pinholes are replaced by a writing mirror which directs the light from the source impinging on the writing mirror substantially back on itself. The reflectivity of the writing mirror and phase shift introduced by the writing mirror are functions of location on the writing mirror arranged in conjunction with a phase-shifting procedure to produce the desired image in the object material. The phase-shifting procedure performs a function analogous to the procedure of introducing a sequence of phase shifts in the wavenumber-filtered, spatially-filtered reflected reference beam to obtain first, second, third, and fourth measured intensity values for the embodiments and variants thereof of the five groups of embodiments.

For the writing embodiments described herein, the recording process comprises a number of different mechanisms and the recording medium of the optical disk comprises a number of different materials and different combinations of materials. Examples of recording processes include electro-optical effects and magneto-optical effects such as Faraday rotation and Kerr effect as well as photochemical hole burning.

When an magneto-optical effect is used for the recording process such that the stored information is retrieved by detecting changes in the state of polarization of a scattered or transmitted probe beam, the embodiments of the five groups of embodiments are configured to detect the polarization of the scattered probe beam in addition to the complex amplitude of the scattered probe beam. The five groups of embodiments are configured to measure the polarization of the scattered probe beam by passing the scattered probe beam through an analyzer such as a polarizing beam splitter and measuring the complex amplitudes of the different polarization states of the scattered probe beam separated by the analyzer.

When an amplitude-recording medium, nonlinear amplitude-recording medium, and/or a phase recording medium are used with the writing embodiments described herein, the reduced statistical errors and the reduced systematic errors associated with images in the recording medium, a property of the writing embodiments described herein, the density of the data stored at a memory site is proportional to NxM where N and M have the same meanings as used in the description of the reading embodiments, the five groups of embodiments.

The information content stored at a given memory site is controlled by the spatial distribution of the reflectivity and the spatial distribution of the phase shifts produced by the writing mirror of the writing embodiments and variants thereof. The windowed reflectivity and windowed phase shifts produced by the writing mirror are controlled by a matrix of electro-optical amplitude modulators and phase shifters located in front of the mirror, the states of the electro-optical amplitude modulators and phase shifters being controlled by the computer. The windowing of the reflectivity and the phase shifts is achieved by electronic processes similar to those used in the windowing of the amplitude and phase of the measured complex scattering amplitude in the five groups of embodiments.

The interference term between the spatially-filtered, wavenumber-filtered scattered probe beam and the spatially-filtered, wavenumber-filtered reflected reference beam measured by the embodiments and variants of the first and third groups of embodiments in the axial direction of a probe lens is proportional to the Fourier transform of the complex scattering amplitude at the image sites in an object material. Similarly, the information stored at a memory site by writing embodiments and variants thereof, corresponding to embodiments and variants of the first and third groups of embodiments, is proportional to the interference term between corresponding spatially-filtered, wavenumber-filtered beam reflected by the writing mirror and the spatially-filtered, wavenumber-filtered reflected reference beam is proportional to the Fourier transform of the complex reflectivity at respective sites on the writing mirror.

It will be apparent to those skilled in the art that it when the complex reflectivity of the writing mirror is chosen so that the interference term between the spatially-filtered, wavenumber-filtered beam reflected by the writing mirror and the spatially-filtered, wavenumber-filtered reflected reference beam is proportional to the inverse Fourier transform of the information to be stored at a memory site, the measured interference term between the spatially-filtered, wavenumber-filtered scattered probe beam and the spatially-filtered, wavenumber-filtered reflected reference beam measured by the embodiments and variants of the first and third groups of embodiments in the axial direction of a probe lens is proportional to the original information stored. Thus, it is not necessity in this instance to perform a Fourier transform of the complex scattering amplitude measured by the embodiments and variants of the first and third groups of embodiments in the axial direction of a probe lens to recover the original information that was stored.

An advantage of certain ones of the first and third groups of embodiments is that a tomographic complex amplitude image of a wafer used in the fabrication of integrated circuits is accomplished by substantially simultaneous imaging of a line section in the depth direction of the wafer with significantly reduced statistical errors and with a background from out-of-focus images significantly reduced compared to or the same as that obtained in a sequence of measurements with prior art single-pinhole confocal interference microscopy or holography. The simultaneous imaging of a line section in the depth direction of the wafer can be used to greatly reduce sensitivity to motion of the wafer in the depth direction generated by for example by translations, scanning, or vibrations of the wafer. The simultaneous imaging of a line section in the depth direction of the wafer can further be used to identify a surface of and/or in the wafer with information acquired simultaneously from multiple depths.

Another advantage of certain other ones of the first and third groups of embodiments is that a tomographic complex amplitude image of a wafer used in the fabrication of integrated circuits is accomplished by substantially simultaneous imaging of a two-dimensional section of the wafer with significantly reduced statistical errors and with a background from out-of-focus images significantly reduced compared to or the same as that obtained in a sequence of measurements with prior art single-pinhole and slit confocal interference microscopy or holography. One axis of the two-dimensional section of the wafer is parallel to the depth direction of the wafer. The simultaneous imaging of a two-dimensional section of the wafer can be used to greatly reduce sensitivity to motion of the wafer in the depth and transverse directions generated by translation, scanning, and/or vibrations of the wafer. The simultaneous imaging of a two-dimensional section in the wafer can further be used to identify a surface or internal surface of the wafer with information acquired simultaneously at other locations, the surface and/or internal surface possibly serving registration purposes.

An advantage of certain ones of the first and third groups of embodiments is that a tomographic complex amplitude image of a biological specimen in vivo, an image which can be used for example in a non-invasive biopsy of the biological specimen, is accomplished by substantially simultaneous imaging of a line section in the depth direction of the biological specimen with significantly reduced statistical errors and with a background from out-of-focus images significantly reduced compared to or the same as that obtained in a sequence of measurements with prior art single-pinhole confocal interference microscopy or holography. The simultaneous imaging of a line section in the depth direction of the biological specimen can be used to greatly reduce sensitivity to motion of the biological specimen in the depth direction generated by for example by translations, scanning, or vibrations of the biological specimen. The simultaneous imaging of a line section in the depth direction of the biological specimen can further be used to identify a surface of and/or in the biological specimen with information acquired simultaneously from multiple depths.

Another advantage of certain other ones of the first and third groups of embodiments is that a tomographic complex amplitude image of a biological specimen in vivo, an image which can be used for example in a non-invasive biopsy of the biological specimen, is accomplished by substantially simultaneous imaging of a two-dimensional section of the biological specimen with significantly reduced statistical errors and with a background from out-of-focus images significantly reduced compared to or the same as that obtained in a sequence of measurements with prior art single-pinhole and slit confocal interference microscopy or holography. One axis of the two-dimensional section of the biological specimen is parallel to the depth direction of the wafer. The simultaneous imaging of a two-dimensional section of the wafer can be used to greatly reduce sensitivity to motion of the biological specimen in the depth and transverse directions generated by translation, scanning, and/or vibrations of the biological specimen. The simultaneous imaging of a two-dimensional section in the biological specimen can further be used to identify a surface or internal surface of the biological specimen with information acquired simultaneously at other locations, the surface and/ or internal surface possibly serving registration purposes.

An advantage of certain ones of the second and fourth groups of embodiments is that a tomographic complex amplitude image of a wafer used in the fabrication of integrated circuits is accomplished by substantially simultaneous imaging of a line section tangent to a surface of the wafer or on a surface in the wafer with significantly reduced statistical errors and with a background from out-of-focus images significantly reduced compared to or the same as that obtained in a sequence of measurements with prior art single-pinhole confocal interference microscopy or holography. The simultaneous imaging of a line section tangent to a surface of the wafer or on a surface in the wafer can be used to greatly reduce sensitivity to motion of the wafer generated by translations, scanning, and/or vibrations of the wafer. The simultaneous imaging of a two-dimensional section tangent to a surface in or on the wafer can further be used to identify a reference location in or/on the wafer with information acquired simultaneously from locations, the reference location serving registration purposes.

An advantage of certain ones of the second and fourth groups of embodiments is that a tomographic complex amplitude image of a biological specimen in vivo, an image which can be used for example in a non-invasive biopsy of the biological specimen, is accomplished by substantially simultaneous imaging of a line section tangent to a surface in or on the specimen with significantly reduced statistical errors and with a background from out-of-focus images significantly reduced compared to or the same as that obtained in a sequence of measurements with prior art single-pinhole confocal interference microscopy or holography. The simultaneous imaging of a line section tangent to a surface in or on the specimen can be used to greatly reduce sensitivity to motion of the specimen generated by translation, scanning, and/or vibrations of the specimen. The simultaneous imaging of a two-dimensional section tangent to a surface in or on the specimen can further be used to identify a reference location in the specimen with information acquired simultaneously from multiple locations, the reference location serving registration purposes.

An advantage of the fifth group of embodiments is that a tomographic complex amplitude image of a wafer used in the fabrication of integrated circuits is that an one-dimensional, two-dimensional, or three-dimensional image of a wafer is generated with a background from out-of-focus images significantly reduced compared to that obtained in a sequence of measurements with prior art single-pinhole confocal interference microscopy or holography.

An advantage of the fifth group of embodiments is that a tomographic complex amplitude image of a biological specimen in vivo, an image which can be used for example in a non-invasive biopsy of the biological specimen, is that an one-dimensional, two-dimensional, or three-dimensional image of the specimen is generated with a background from out-of-focus images significantly reduced compared to that obtained in a sequence of measurements with prior art single-pinhole confocal interference microscopy or holography.

The confocal interference microscopy systems described above can be especially useful in alignment mark identification on a stepper or scanner of lithography applications used for fabricating large scale integrated circuits such as computer chips and the like and in a stand-alone metrology system for measuring overlay performance of the stepper or scanner. The confocal interference microscopy systems described above can also be especially useful in inspection of masks used in the stepper or scanner and in the inspection of wafers at different stages of the fabrication of large scale integrated circuits. Lithography is the key technology driver for the semiconductor manufacturing industry.

Overlay improvement is one of the five most difficult challenges down to and below 100 nm line widths (design rules), see for example the *Semiconductor Industry*

Roadmap, p82 (1997). Since a lithography tool may produce $50–100 M/year of product, the economic value from improving (maintaining) performance of the lithography tool is substantial. Each 1% increase (loss) in yield of the lithography tool results in approximately $1 M/year economic benefit (loss) to the integrated circuit manufacturer and a substantial competitive advantage or disadvantage to the lithography tool vendor.

Overlay is measured by printing one pattern on one level of a wafer and a second pattern on a consecutive level of the wafer and then measuring, on a stand-alone metrology system, the difference in the position, orientation, and distortion of the two patterns.

The stand-alone metrology system comprises a microscope system for viewing the patterns, such as the confocal interference microscopy systems described above, connected to laser gauge-controlled stage for measuring the relative positions of the patterns, and a wafer handling system.

The function of a lithography tool is to direct spatially patterned radiation onto a photoresist-coated wafer. The process involves determining which location of the wafer is to receive the radiation (alignment) and applying the radiation to the photoresist at that location.

To properly position the wafer, the wafer includes alignment marks on the wafer that can be measured by dedicated sensors such as the confocal interference microscopy systems described above. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

When a mask is made, it must be perfect. Any defects in the pattern will destroy the functionality of the semiconductor circuit that is printed with that mask. Before a mask is delivered to the semiconductor manufacturing line, it is passed through an automated mask inspection system that searches for any defects in the pattern. There are two possible strategies in mask inspection, known as die-to-database and die-to-die inspection. The first method involves an automated scanning microscope that compares the mask pattern directly with the computer data used to generate the mask. This requires a very large data handling capability, similar to that needed by the mask writer itself. Any discrepancy between the inspected mask pattern and the data set used to create it is flagged as an error. The confocal interference microscopy systems described above are especially well suited for automated mask inspection with its advantages in background reduction and in the substantially simultaneous acquisition of one-dimensional line section images and two-dimensional section images.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Figure 8A:
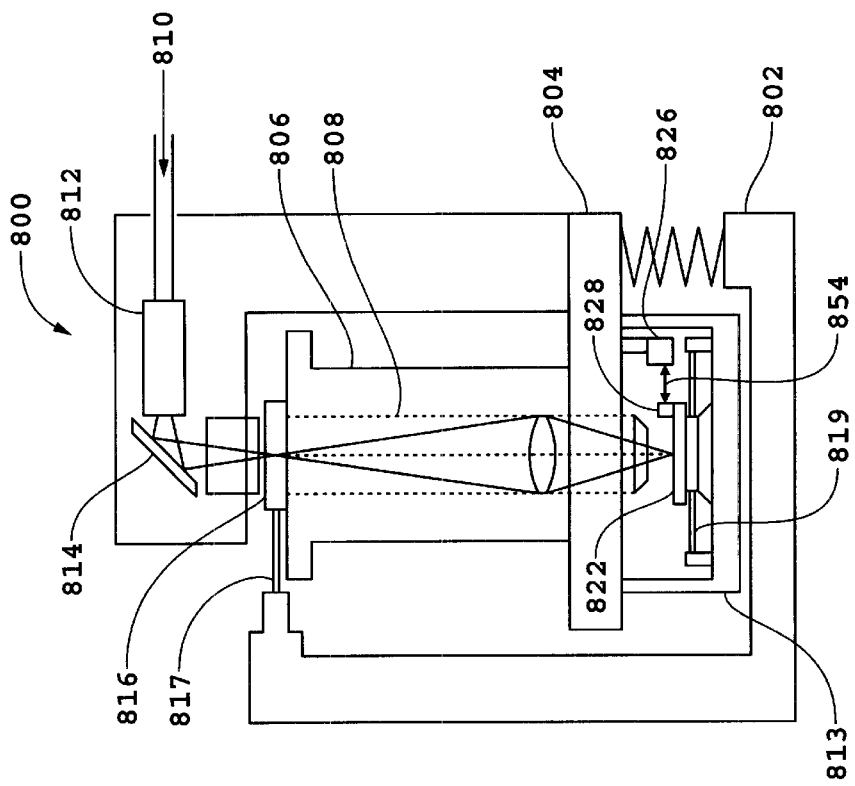
FIGS. 8*a*–*c* relate to lithography and its application to manufacturing integrated circuits.

An example of a lithography scanner 800 using a confocal interference microscopy system (not shown) in FIG. 8a. The confocal interference microscopy system is used to precisely locate the position of alignment marks on the wafer (not shown) within an exposure system. Here, stage 822 is used to position and support the wafer relative to an exposure station. Scanner 800 includes a frame 802, which carries other support structures and various components carried on those structures. An exposure base 804 has mounted on top of it a lens housing 806 atop of which is mounted a reticle or mask stage 816, which is used to support a reticle or mask. A positioning system for positioning the mask relative to the exposure station is indicated schematically by element 817. Positioning system 817 can include, e.g., piezoelectric transducer elements and corresponding control electronics. Although, it is not included in this described embodiment, one or more interferometry systems are used to precisely measure the position of the mask stage as well as other moveable elements whose position must be accurately monitored in processes for fabricating lithographic structures (see supra Sheats and Smith *Microlithography: Science and Technology*).

Suspended below exposure base 804 is a support base 813 that carries wafer stage 822. Stage 822 includes a plane mirror 828 for reflecting a measurement beam 854 directed to the stage by interferometry system 826. A positioning system for positioning stage 822 relative to interferometry system 826 is indicated schematically by element 819. Positioning system 819 can include, e.g., piezoelectric transducer elements and corresponding control electronics. The measurement beam reflects back to the interferometry system, which is mounted on exposure base 804.

During operation, a radiation beam 810, e.g., an ultraviolet (UV) beam from a UV laser (not shown), passes through a beam shaping optics assembly 812 and travels downward after reflecting from mirror 814. Thereafter, the radiation beam passes through a mask (not shown) carried by mask stage 816. The mask (not shown) is imaged onto a wafer (not shown) on wafer stage 822 via a lens assembly 808 carried in a lens housing 806. Base 804 and the various components supported by it are isolated from environmental vibrations by a damping system depicted by spring 820.

Figure 8B:
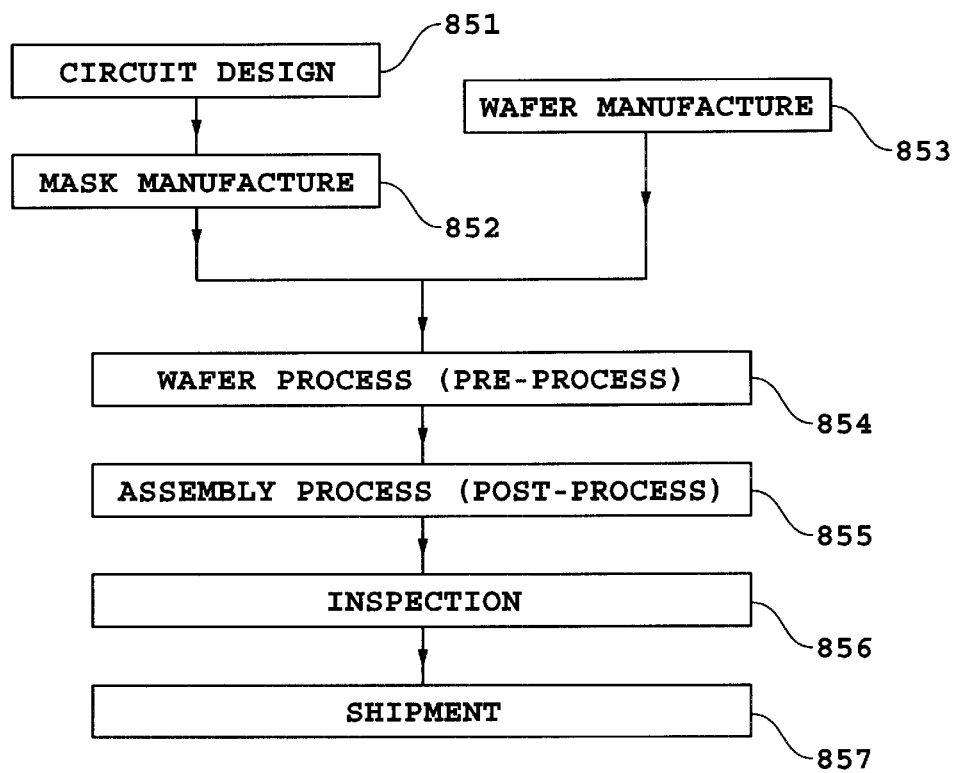

As is well known in the art, lithography is a critical part of manufacturing methods for making semiconducting devices. For example, U.S. Pat. No. 5,483,343 outlines steps for such manufacturing methods. These steps are described below with reference to FIGS. 8b and 8c. FIG. 8b is a flow chart of the sequence of manufacturing a semiconductor device such as a semiconductor chip (e.g. IC or LSI), a liquid crystal panel or a CCD. Step 851 is a design process for designing the circuit of a semiconductor device. Step 852 is a process for manufacturing a mask on the basis of the circuit pattern design. Step 853 is a process for manufacturing a wafer by using a material such as silicon.

Step 854 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The confocal interference microscopy methods and systems described herein can be especially useful to inspect the surface of the wafer and internal layers generate on the wafer by wafer process to check and monitor the effectiveness of the lithography used in the wafer process.

Step 855 is an assembling step, which is called a post-process wherein the wafer processed by step 854 is formed into semiconductor chips. This step includes assembling (dicing and bonding) and packaging (chip sealing). Step 856 is an inspection step wherein operability check, durability check and so on of the semiconductor devices produced by step 855 are carried out. With these processes, semiconductor devices are finished and they are shipped (step 857).

Figure 8C:
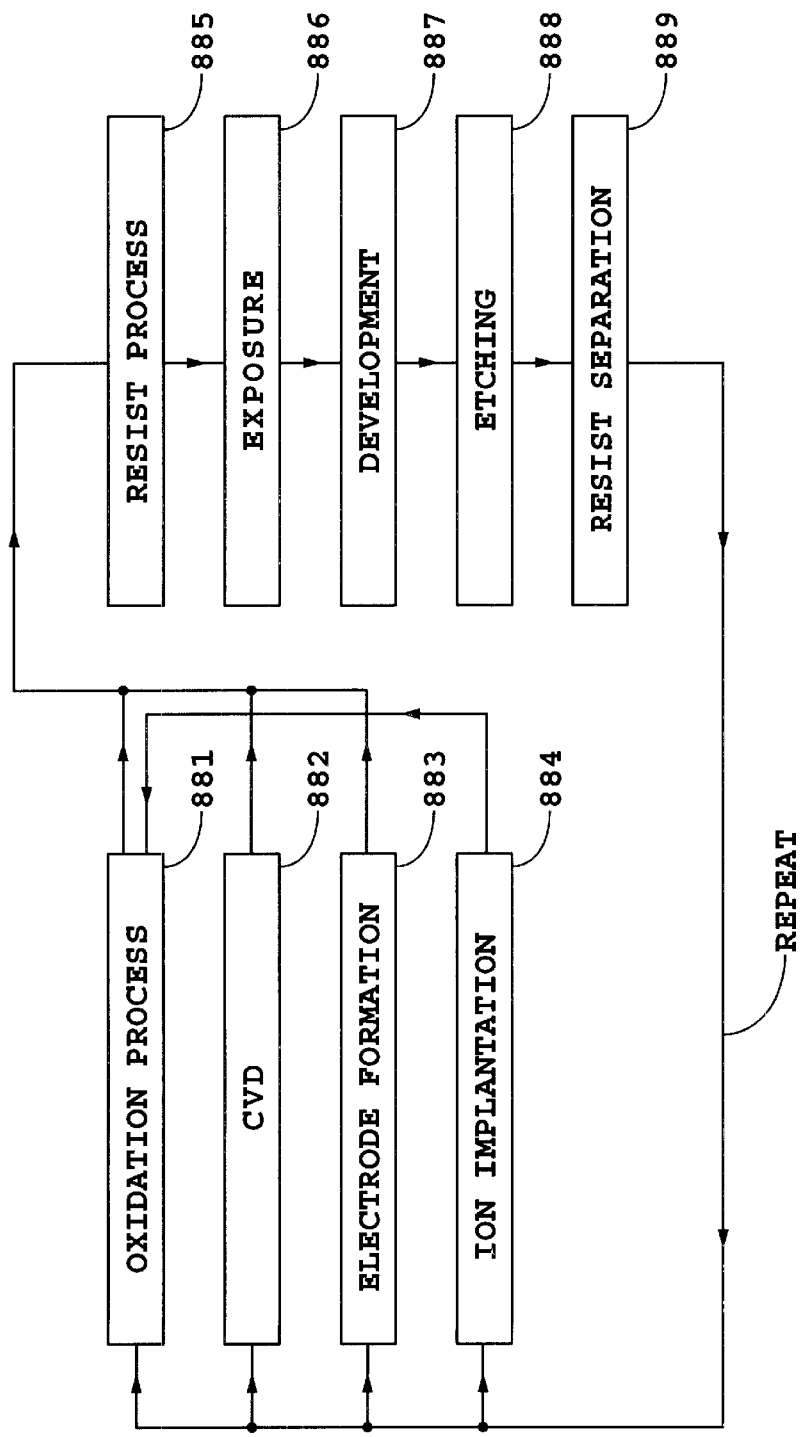

FIG. 8c is a flow chart showing details of the wafer process. Step 861 is an oxidation process for oxidizing the surface of a wafer. Step 862 is a CVD process for forming an insulating film on the wafer surface. Step 863 is an electrode forming process for forming electrodes on the wafer by vapor deposition. Step 864 is an ion implanting process for implanting ions to the wafer. Step 865 is a resist process for applying a resist (photosensitive material) to the wafer. Step 866 is an exposure process for printing, by exposure (i.e., lithography), the circuit pattern of the mask on the wafer through the exposure apparatus described above. Once again, as described above, the use of the confocal interference microscopy systems and methods described herein improve the accuracy, resolution, and maintenance of such lithography steps.

Step 867 is a developing process for developing the exposed wafer. Step 868 is an etching process for removing portions other than the developed resist image. Step 869 is a resist separation process for separating the resist material remaining on the wafer after being subjected to the etching process. By repeating these processes, circuit patterns are formed and superimposed on the wafer.

Figure 9:
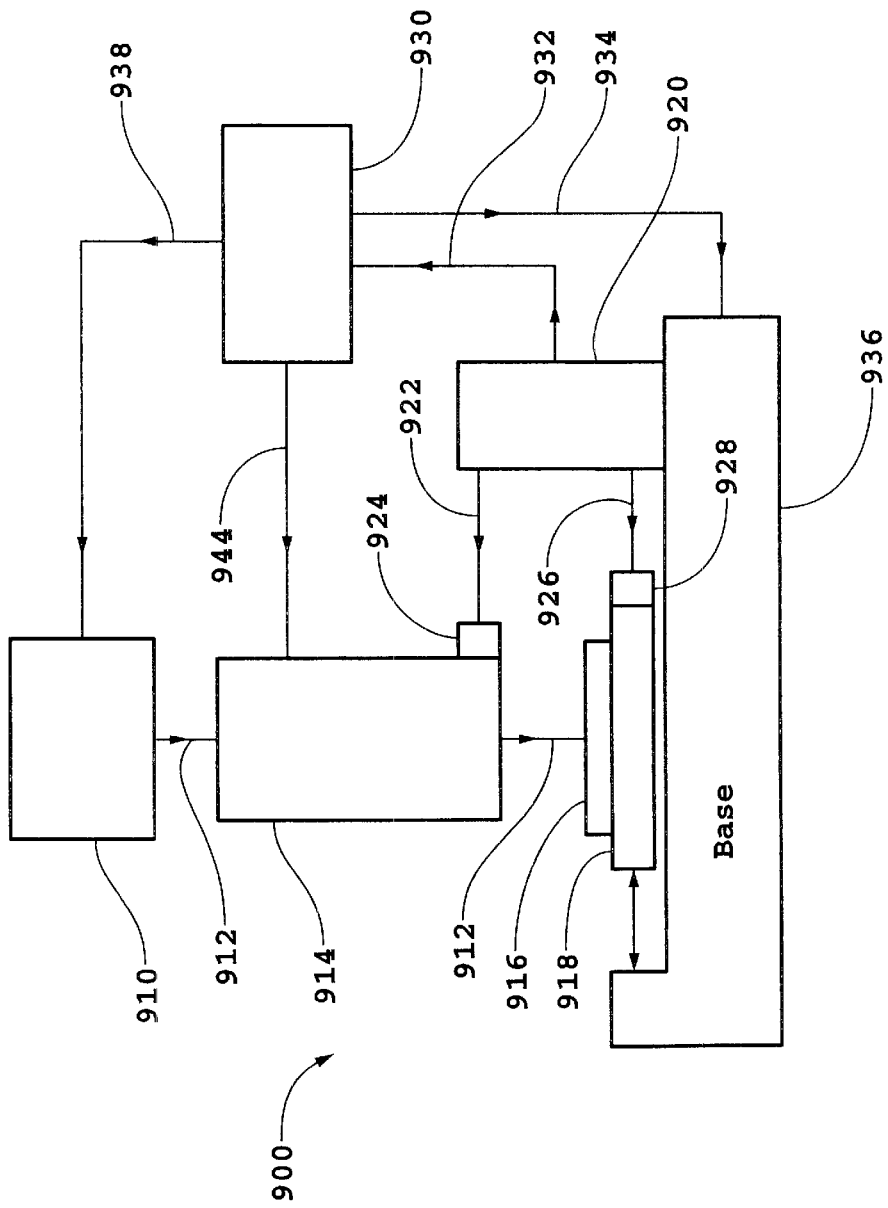
FIG. 9 is a schematic of a mask inspection system employing the confocal interference microscopy system.

An important application of the confocal interference microscopy systems and methods described herein is the inspection of masks and reticles used in the lithography methods described previously. As an example, a schematic of a mask inspection system 900 is shown in FIG. 9. A source 910 generates an source beam 912 and a confocal interference microscopy assembly 914 directs the radiation beam to a substrate 916 supported by a movable stage 918. To determine the relative position of the stage, an interferometry system 920 directs a reference beam 922 to a mirror 924 mounted on beam focusing assembly 914 and a measurement beam 926 to a mirror 928 mounted on stage 918. Changes in the position measured by the interferometry system correspond to changes in the relative position of write beam 912 on substrate 916. Interferometry system 920 sends a measurement signal 932 to controller 930 that is indicative of the relative position of inspection beam 912 on substrate 916. Controller 930 sends an output signal 934 to a base 936 that supports and positions stage 918.

Controller 930 can cause confocal interference microscopy assembly 914 to scan the inspection beam over a region of the substrate, e.g., using signal 934. As a result, controller 930 directs the other components of the system to inspect the substrate. The mask inspection compares the mask pattern directly with computer data used to generate the mask.

The confocal interference microscopy systems described above can be especially useful in control of a spatial relationship between a system for producing an image of an information bearing region in a substance such as an optical disk. In the process of determining information stored in and/or on an optical disk, it is particularly important to prevent physical contact of the system with an external surface of the optical disk.

The system for producing images of an information bearing region and controlling the spatial relationship between the system comprises a support structure supporting the optical disk, a confocal interference microscopy system described above for imaging the profile of the external surface and determining the spatial relationship between the external surface and the system, and a microscope system for imaging the information bearing region. The system further comprises a processor controlling the location of the microscope system relative to the external surface in accordance with the determined spatial relationship to prevent physical contact of the microscope system with the external surface.

The diagram of FIG. 9 can illustrate the above system if numeral 916 is used to designate the optical disk, numeral 914 is used to designate both the microscope system for imaging the information bearing region and the confocal interference microscope system for imaging the profile of the external surface. Note that the two microscope systems referred to can be two different microscope systems or the same system. Numeral 930 designates a processor that generates a signal 934 to control a translator (not shown) in base 936 and positions stage 918. The translator controls the distance in real time between the microscope system 914 and the upper external surface of optical disk 916 in response to signal 934.

The microscope system of the system 914 may comprise, e.g., a pinhole confocal microscopy system, a confocal interference microscopy system described above, or a near-field microscopy system.

Theory

Background Discrimination

The apparatus described in the preferred embodiments all include some form of either a pinhole or slit confocal interference microscopy system. The background discrimination capacity of a confocal microscopy system is one of its most important attributes and results from the strong optical sectioning property of confocal microscopy. This is of a completely different nature from the restricted depth of field in conventional microscopy, the difference being that in a conventional microscope out-of-focus information is merely blurred, whilst in the confocal system it is actually detected much less strongly: light scattered at some place axially separated from the focal plane is defocused at the detector plane and hence fails to pass efficiently through a mask placed there [cf. C. J. R. Sheppard and C. J. Cogswell, "Three-dimensional Imaging In Confocal Microscopy", *Confocal Microscopy*, edited by T. Wilson, (Academic Press, London), pp. 143–169 (1990)]. The Fizeau interferometer used in DIP, for example, possesses a sensitivity to out-of-focus images that is comparable to that found in conventional microscopy.

A characteristic of the confocal interference microscopy of embodiments and variants thereof of the first, second, and fifth groups of embodiments is that the reflected reference beam and the scattered probe beam are both substantially altered at the in-focus image point 48 by pupil function modifications whereas the portion of the out-of-focus beam at in-focus image point 48 is substantially unaltered. For the cited embodiments and variants thereof, it is this property of the present invention that is used to achieve a sensitivity to out-of-focus images reduced in relation to that achieved in prior art confocal interference microscopy.

The apparatus described in the embodiments and variants thereof of the first, second, third, and fourth groups of embodiments further comprise a form of dispersion interferomety. The method of optical time domain reflectometry, OTDR, consists of injecting a short intense pulse of light into an object such as a fiber and measuring the time-dependent backscattering light signal. The method of optical frequency domain reflectometry, OFDR, consists of illuminating an object with monochromatic radiation whose frequency varies with time in a known way and measuring the frequency-dependent backscattering light signal. In the cited embodiments and variants thereof, the wavenumber-dependent backscattering light signal is measured as a function of the wavenumber k. By analogy with the definitions of OTDR and OFDR, the form of dispersion interferometry used in the instant invention may be classified as a form of optical wavenumber domain reflectometry, OWDR.

A sensitivity of the embodiments and variants thereof of the first and third group of embodiments to an amplitude of an in-of-focus image is achieved substantially simultaneously for all axial positions that are accessible in a given exposure as a result of the incorporation of OWDR. For the embodiments and variants thereof of the second and fourth group of embodiments, a sensitivity to an amplitude of an in-of-focus image is also achieved substantially simultaneously for all lateral positions in a line section substantially orthogonal to the optical axis of object material imaging subsystem that are accessible in a given exposure also as a result of the incorporation of OWDR. The standard confocal interference microscopy system must execute a scan in the respective axial dimension or lateral dimension of the object material to obtain the equivalent sensitivity to an amplitude of an in-of-focus image.

The unusual characteristics of the confocal interference microscopy system of the embodiments and variants thereof of the first and second groups of embodiments are the substantially simultaneous acquisition of information for an array of points in an image, each with a sensitivity to out-of-focus images reduced in relation to that achieved in prior art confocal interference microscopy. Confocal interference microscopy systems are known in the art as a means to improve optical sectioning for the purpose of obtaining one-dimensional, two-dimensional and three-dimensional images of an object by reducing the effects of out-of-focus images, pupil function modification schemes for microscopes [cf. M. Born and E. Wolf, *Principles of Optics*, Section 8.6.3, pp. 423–427 (Pergamon Press, New York) 1959] are known in the art as a means to improve contrast for specific applications, and a form of OWDR as used in DIP is known in the art as a means of reducing phase ambiguity. However, the combination of confocal interference microscopy, pupil function modifications, and OWDR in the same system for the purpose of reduction of both systematic errors and statistical errors arising from background light is believed by the inventor to be taught herein for the first time.

The unusual characteristic of the confocal interference microscopy system of the embodiments and variants thereof of the third and fourth groups of embodiments is the substantially simultaneous acquisition of information for an array of points in an image, each with substantially the reduced sensitivity to out-of-focus images of prior art confocal interferometric microscopy. Confocal interferometric microscopy is known in the art as a means of reducing the effects of out-of-focus images and a form of OWDR as used in DIP is known in the art as a means for reducing phase ambiguity; however, the combination of the confocal interferometric microscopy and OWDR in the same system for the purpose of reducing the systematic and statistical errors arising from background light is believed taught herein for the first time in the art.

The unusual characteristic of the confocal interference microscopy system of the embodiments and variants thereof of the fifth group of embodiments is the same as the unusual characteristic of the embodiments and variants thereof of the first and second groups of embodiments relating to the acquisition of information for an array of points in an image, each with a sensitivity to out-of-focus images reduced in relation to that achieved in prior art confocal interference microscopy. Accordingly, the combination of confocal interference microscopy and pupil function modifications in the same system for the purpose of reduction of both systematic errors and statistical errors arising from background light is believed by the inventor to be taught herein for the first time.

Impulse Response Function for In-Focus Image: Axial OWDR

The first embodiment depicted in FIGS. 1a–1n is selected as the system for showing the basis of the distinctive features cited in the preceding section although the basis applies equally well to all four of the embodiments and variants disclosed herein from the first group of embodiments. Pinhole 8 in FIG. 1b and spatial filter pinhole 18a in FIGS. 1h, 1i, and 1m represent conjugate pinholes of a confocal interference system for all optical frequency components of optical beams whilst each pixel of detector 114 in FIGS. 1j, 1k, and 1n is sensitive to only one optical frequency component of an optical beam as a result of the dispersive detector elements 130a and 130b shown in FIG. 1a. It is shown in the following theory paragraphs that it is possible to reconstruct substantially an equivalent of prior art confocal signals appropriate for each accessible axial position from the intensities recorded by detector 114 as a function of optical frequency in a set of four exposures. This corresponds substantially to obtaining simultaneously equivalent prior art in-focus confocal signals as a function of axial position with the apparatus of the present invention in contrast to the standard confocal microscopy system where a physical scan in the axial direction of the object material 112 shown in FIGS. 1c and 1e is required to obtain the prior art confocal signal as a function of axial position.

There are two useful modes of the non-fluorescent confocal scanning microscope [C. J. R. Sheppard, "Scanning optical microscopy", in: *Advances in optical and electron microscopy*, 10, (Academic, London, 1987); C. J. R. Sheppard and A. Choudhury, *Optica Acta*, 24 (10), 1051–1073

(1977)]: the reflection-mode and the transmission-mode. In practice, it is easy to achieve with the reflection-mode microscope the optical sectioning by scanning the object along the axial direction [C. J. R. Sheppard and C. J. Cogswell, *J. Microscopy*, 159(Pt 2), 179–194 (1990); C. J. R. Sheppard and T. Wilson, *Optics Lett.*, 3, 115–117 (1978); C. J. R. Sheppard, D. K. Hamilton, and I. J. Cox, *Proc. R. Soc. Lond.*, A 387, 171–186 (1983)] and thus form three dimensional images.

Figure 5:
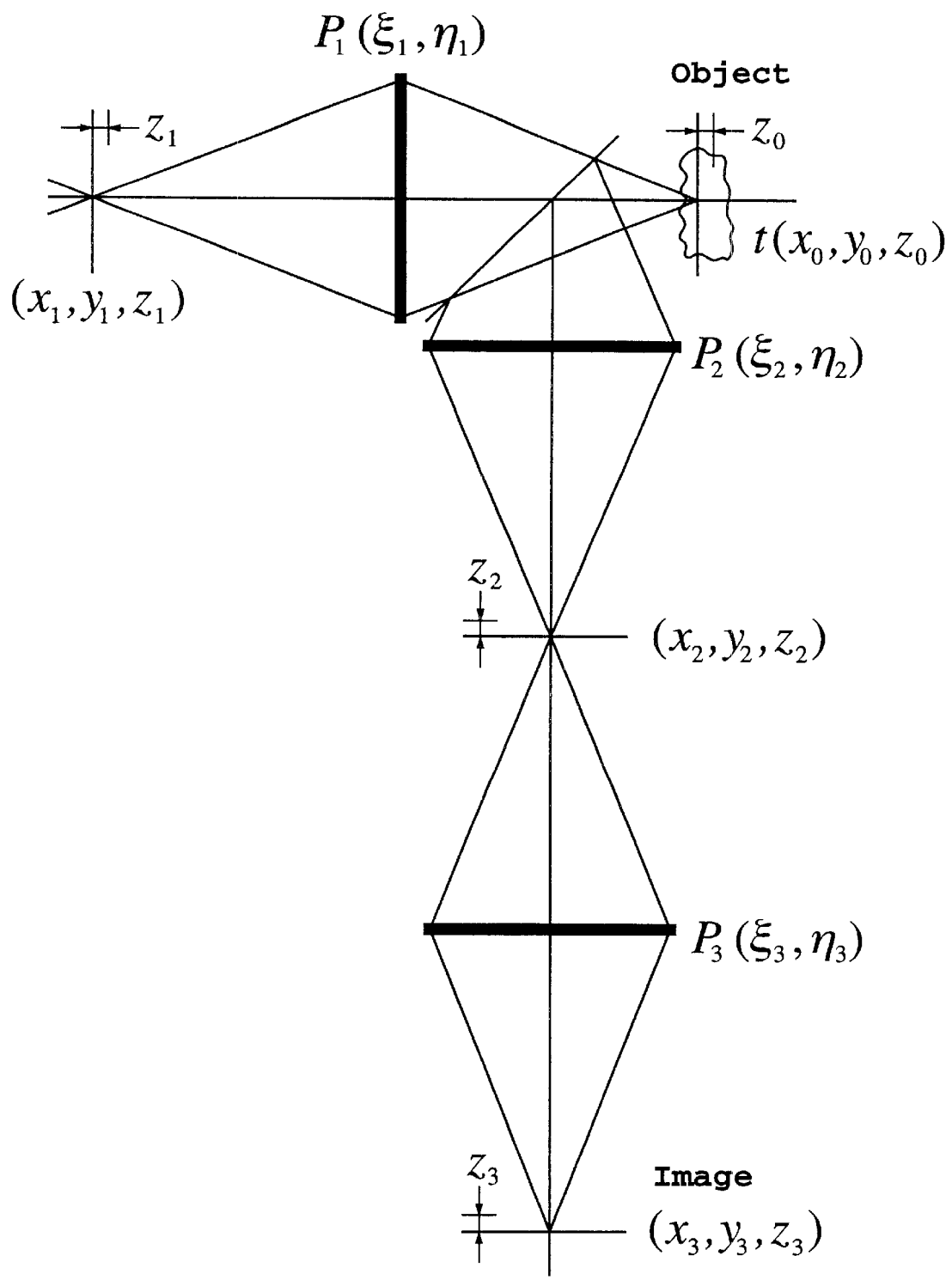
FIG. 5 depicts the geometry of a reflecting confocal microscope with four imaging sections.

Consider a confocal microscope shown in FIG. 5 with three imaging sections. For the combination of subsystems referenced in FIGS. 1*a*–1*n* which contain the source 10, the object 112, and the detector 114 for the probe beam and scattered probe beam, lens 1 of FIG. 5 is the equivalent to the combination of lens 16 of subsystem 80 shown in FIG. 1*b*, lenses 26 and 36 of subsystem 81 shown in FIG. 1*c*, and lens 46 of subsystem 82 shown in FIG. 1*c*; lens 2 of FIG. 5 is the equivalent to the combination of lens 46 of subsystem 82 shown in FIG. 1*f* and lens 26*a* of subsystem 81*a* shown in FIG. 1*h*; and lens 3 of FIG. 5 is the equivalent to the combination of lens 36*a* of subsystem 81*a* shown in FIG. 1*h* and lens 66 of subsystem 84 shown in FIG. 1*j*. For the combination of subsystems referenced in FIGS. 1*a*–1*n* which contain the source 10, the object 112, and the detector 114 for the reference beam and reflected reference beam, lens 1 of FIG. 5 is the equivalent to the combination of lens 16 of subsystem 80 shown in FIG. 1*b*, lenses 26 and 36 of subsystem 81 shown in FIG. 1*c*, and lens 56 of subsystem 83 shown in FIG. 1*e*; lens 2 of FIG. 5 is the equivalent to the combination of lens 56 of subsystem 83 shown in FIG. 1*g* and lens 26*a* of subsystem 81*a* shown in FIG. 1*i*; lens 3 of FIG. 5 is the equivalent to the combination of lens 36*a* of subsystem 81*a* shown in FIG. 1*i* and lens 66 of subsystem 84 shown in FIG. 1*k*.

We define optical coordinates $(v_i, w_i, u_i)$ for four spaces; the image plane space 7A, either the object material 112 space or reference mirror 120 space, the image plane 17*a*A space, and the detector 114 image plane space 47A with i=1, 0, 2, and 3, respectively:

$$v_i = k\tilde{x}_i \sin \alpha_i,$$

$$w_i = k\tilde{y}_i \sin \alpha_i,$$

$$u_i = 4k\tilde{z}_i \sin^2(\alpha_i/2), \qquad (1)$$

where $\sin \alpha_i$ is the numerical aperture of region i, wavenumber $k=2\pi/\lambda$, $\lambda$ is the wavelength of the radiation in vacuum, and $\tilde{x}_i$, $\tilde{y}_i$, and $\tilde{z}_i$ are the optical path distances in region i. The optical path distances are defined as $$\tilde{x}_i = \int_0^{x_i} n(x_i', y_i', z_i') dx_i', \qquad (2)$$

$$\tilde{y}_i = \int_0^{y_i} n(x_i', y_i', z_i') dy_i',$$

$$\tilde{z}_i = \int_0^{z_i} n(x_i', y_i', z_i') dz_i'$$

where the integration is along the path of a respective light ray and $n(x_i', y_i', z_i')$ is the refractive index at position $(x_i', y_i', z_i')$.

It has been shown that imaging in a confocal scanning microscope behaves as a coherent microscope (Sheppard and Choudhury, ibid.) in which the image can be described by a coherent transfer function, the coherent transfer function being the Fourier transform of the impulse response function. Thus, the effective three dimensional impulse response function $h_e(v_3, v_2, v_0, v_1)$ for the system in FIG. 5 can be expressed as $$h_e(v_3, v_2, v_0, v_1) = h_3(v_3-v_2) h_2(v_2-v_0) h_1(v_0-v_1), \qquad (3)$$

where $$h_1(v) = \int\int P_1(\xi_1, \eta_1) \exp\left\{ ju \left[ \frac{1}{4\sin^2(\alpha_1/2)} - \frac{(\xi_1^2+\eta_1^2)}{2} \right] \right\} \times \qquad (4a)$$
$$\exp[-j(\xi_1 v + \eta_1 w) + jkW_1] d\xi_1 d\eta_1;$$

$$h_2(v) = \int\int P_2(\xi_2, \eta_2) \exp\left\{ -ju \left[ \frac{1}{4\sin^2(\alpha_2/2)} - \frac{(\xi_2^2+\eta_2^2)}{2} \right] \right\} \times \qquad (4b)$$
$$\exp[-j(\xi_2 v + \eta_2 w) + jkW_2] d\xi_2 d\eta_2;$$

$$h_3(v) = \int\int P_3(\xi_3, \eta_3) \exp\left\{ -ju \left[ \frac{1}{4\sin^2(\alpha_3/2)} - \frac{(\xi_3^2+\eta_3^2)}{2} \right] \right\} \times \qquad (4c)$$
$$\exp[-j(\xi_3 v + \eta_3 w) + jkW_3] d\xi_3 d\eta_3;$$

$h_i$, $P_i$, and $W_i$ are the impulse response function, the pupil function, and the wave aberration function [cf. Refs. 10–12 in M. Gu and C. J. R. Sheppard, *Appl. Opt.*, 31(14), 2541–2549, (1992)], respectively, for the i th equivalent lens in FIG. 5 with i=1, 2, 3, and 4, respectively; and j is $(-1)^{1/2}$. The impulse response function is the amplitude in an image plane in response to a point-source object. The function of the phase shifter 44 is incorporated into the appropriate pupil function $P_i$.

Assume that the three-dimensional object may be characterized by a scattering distribution $t(v_0)$ [cf. C. J. R. Sheppard and X. Q. Mao, *J. Opt. Soc. Am. A*, 6(9), 1260–1269 (1989)] representing the scattering per unit volume, which is related to the refractive index n by $$t(v_0) = jk^2[1-n^2(v_0)] \qquad (5)$$

[E. Wolf, *Opt. Commun.*, 1, 153–156 (1969)]. Both n and t are in general complex, and the j in Eq. (5) accounts for the fact that in a lossless medium the scattered wave is in phase quadrature to the direct wave. We assume that the effects of multiple scattering are negligible. We also neglect the unscattered radiation, which is a valid assumption for the reflection-mode microscopy because no direct (unscattered) radiation contributes to the image. The image amplitude can be summed over the elemental slices that constitute the object because the principle of superposition is valid. Furthermore the image amplitude must be integrated over the incoherent source of amplitude distribution $A(v_1)$. The attenuation function $a(v_0)$ accounting for the attenuation of the radiation in the object must also be included for both the incident and scattered radiation.

The impulse response functions of the lenses including the dispersive detector elements 130*a* and 130*b* can be written as $$h_1(v_0-v_1) = \{\exp[jk(\tilde{z}_0-\tilde{z}_1)]\} h_1'(v_0-v_1), \qquad (6a)$$

$$h_2(v_2-v_0) = \{\exp[-jk(\tilde{z}_2-\tilde{z}_0)]\} h_2'(v_2-v_0), \qquad (6b)$$

$$h_3(v_3-v_2) = \{\exp[-jk(\tilde{z}_3-\tilde{z}_2)]\} h_3'(v_3-v_2), \qquad (6c)$$

where $$h_1'(v_0-v_1) = \int\int P_1(\xi_1,\eta_1)\exp\{-ju_0[\tfrac{1}{2}(\xi_1^2+\eta_1^2)]\}\times((\exp\{-j[\xi_1(v_0-$$
$$v_1)+\eta_1(w_0-w_1)]+jkW_1\}))d\xi_1 d\eta_1, \qquad (7a)$$

$$h_2'(v_2-v_0) = \int\int P_2(\xi_2,\eta_2)\exp\{j(u_2-u_0)[$$

$$\tfrac{1}{2}(\xi_2^2+\eta_2^2)]\}$$

$$\times((\exp\{-j[\xi_2(v_2-v_0)+$$

$$\eta_2(w_2-w_0)]+jkW_2\}))d\xi_2d\eta_2, \quad (7b)$$

$$h_3'(v_3-v_2) = \iint P_3(\xi_3,\eta_3)G_3(k, v_3)\exp\{$$

$$-ju_2[\tfrac{1}{2}(\xi_3^2+\eta_3^2)]\}$$

$$\times((\exp\{-j[\xi_3(v_3-v_2)+\eta_3(w_3-w_2)]+jkW_3$$

$$\}))d\xi_2d\eta_2, \quad (7c)$$

and $G_3(k,v_3)$ is the dispersive pupil function for the dispersion detector elements 130a and 130b in FIG. 1a. The sign change of u in Eqs. (7b) and (7c) in relation to the corresponding u term in Eq. (7a) is because of the reflection that takes place in the $v_0$ space.

The amplitude of the scattered probe beam $U_S$ in the image plane 17a of the spatial filter pinhole 18a is thus given by $$U_S(v_2) = (R_1T_1)^{1/2} \iint A(v_1) [\iiint h_1(v_0-v_1) \times a(v_0) t(v_0) a(v_0) h_2(v_2-v_0) dv_0] dv_1 \quad (8)$$

where $R_1$ and $T_1$ are the reflection and transmission coefficients, respectively, for beam splitter 100. Substituting Eqs. (6a) and (6b) into Eq. (8) gives the following expression for $U_S(v_2)$:

$$U_S(v_2) = (R_1T_1)^{1/2} \iint A(v_1)\{$$

$$\int \exp(j2k\tilde{z}_0)[\iint h_1'(v_0-v_1) \times$$

$$a(v_0)t(v_0)a(v_0)h_2'(v_2-v_0)dv_0dw_0]$$

$$dz_0\} dv_1 dw_1. \quad (9)$$

The amplitude $U_S(v_2)$ represents for the apparatus of the present invention the complex scattering amplitude at spatial filter pinhole 18a in FIG. 1h. It follows from the properties of the impulse response function $h_e(v_3, v_2, v_0, v_1)$ given by Eq. (3) that the complex scattering amplitude $U_S(v_3)$ in image plane 47 at the detector 114 shown in FIG. 1j is obtained by the convolution of $U_S(v_2)$ with the impulse response function $h_3(v_3-v_2)$ for the combination of lenses 36a and 66 of FIGS. 1h and 1j, respectively, and the dispersive detector elements 130a and 130b in FIG. 1a. The optical coordinates of the image plane 47 are given by $V_3$. Expressed in equation form, $$U_S(v_3) = (R_1T_1)^{1/2} \iint A(v_1)((\int \exp(j2k\tilde{z}$$

$$0)\{\iint h_1'(v_0-v_1) \times$$

$$a(v_0)t(v_0)a(v_0)[\iint h_3'(v_3-v_2)t_2$$

$$(v_2)h_2'(v_2-v_0)dv_2dw_2]$$

$$\times dv_0dw_0\}dz_0))dv_1dw_1 \quad (10)$$

where $t_2(v_2)$ is the transmission function for the spatial filter pinhole 18a. The appropriate equation for $U_S(v_3)$ for the transmission mode confocal microscope configuration is obtained from Eq. (10) by setting $\tilde{z}_0=0$, i.e. $\exp(j\,2k\tilde{z}_0)=1$.

It quite easy to display the important features of OWDR as used in the apparatus of the present invention without introducing undue complexity by examining the properties of observed amplitudes of interference signals obtained from scattering by a planar transverse section of an object. With this in mind, we first consider the response of the confocal interference microscope to a planar transverse section of an arbitrary three dimensional scattering object along with a transverse planar reflector for the reference mirror, a point radiation source, and the refractive indices in regions 1, 2, 3, and 4 equal to 1.

Let the axial locations of the reference mirror and the transverse section of the scattering object be $z_{0,R}$ and $z_{0,S}$, respectively, and the amplitude of the reflected reference beam in image plane 47 at the detector 114 in FIG. 1k be $U_R$. $U_R$ can be obtained from Eq. (10) with the appropriate changes in variables. The output current I from the detector 114 for the given transverse planar section of the scattering object material is of the form $$I\begin{bmatrix} z_{0,S} - z_{0,R}, (v_3/kf_3\sin\alpha_3) = + \\ (v_0/kf_0\sin\alpha_0) + (\Delta v_3/kf_3\sin\alpha_3), w_3, \chi \end{bmatrix} = \quad (11a)$$

$$+|U_R(z_{0,R}, v_3, w_3) + U_S(z_{0,S}, v_3, w_3)|^2$$

which can be expanded as $$I\begin{bmatrix} z_{0,S} - z_{0,R}, (v_3/kf_3\sin\alpha_3) = + \\ (v_0/kf_0\sin\alpha_0) + (\Delta v_3/kf_3\sin\alpha_3), w_3, \chi \end{bmatrix} = +|U_R(z_{0,R}, v_3, w_3)|^2 + \quad (11b)$$

$$|U_S(z_{0,S}, v_3, w_3)|^2 + 2|U_R(z_{0,R}, v_3, w_3)||U_S(z_{0,S}, v_3, w_3)| \times$$

$$\cos[2k(z_{0,S} - z_{0,R}) + (\phi_S - \phi_R) + \chi]$$

$$\Delta v_3 = 2\pi \tilde{m}_4 f_3 \sin\frac{\alpha_3}{[1-(2\pi\tilde{m}_3/k)^2]^{1/2}}, \quad (12)$$

$f_3$ is the focal length of detector region 3, $\tilde{m}_3$ is the $v_3$ component of spatial frequency specific to the diffraction order used of the dispersive detector elements 130a and 130b, $(\phi_S-\phi_R)$ is the phase difference between $U_S$ and $U_R$ at $z_{0,S}=z_{0,R}$, and $\chi$ is the phase shift introduced by a phase shifter 44 in the reference leg of the interferometer in subsystem 83 shown in FIGS. 1e and 1g.

It is seen from examination of Eq. (11b) that, within a constant scale and phase factor, the term in Eq. (11b) proportional to the scattering amplitude $U_S(z_{0,S}, v_3, w_3)$ can be obtained with measurements of $I(z_{0,R}, z_{0,S}, v_3, w_3, \chi)$ at four different values of $\chi$. A preferred set of four values of $\chi$ are $\chi=\chi_0, \chi_0+\pi, \chi_0+(\pi/2)$, and $\chi_0+(3\pi/2)$. The corresponding four values of output current $I_i$ for i=1, 2, 3, and 4, respectively, are combined according to the following schedule to yield $$\Delta I_1 \begin{bmatrix} z_{0,R}, z_{0,S}, (v_3/kf_3\sin\alpha_3) = + \\ (v_0/kf_0\sin\alpha_0) + (\Delta v_3/kf_3\sin\alpha_3), w_3 \end{bmatrix} \equiv I_1 - I_2 = \quad (13a)$$

$$I(z_{0,R}, z_{0,S}, v_3, w_3, \chi_0) - I(z_{0,R}, z_{0,S}, v_3, w_3, \chi_0+\pi) =$$

$$4|U_R(z_{0,R}, v_3, w_3)||U_S(z_{0,S}, v_3, w_3)| \times$$

$$\cos[2k(z_{0,S} - z_{0,R}) + (\phi_S - \phi_R) + \chi_0],$$

$$\Delta I_2 \begin{bmatrix} z_{0,R}, z_{0,S}, (v_3/kf_3\sin\alpha_3) = + \\ (v_0/kf_0\sin\alpha_0) + (\Delta v_3/kf_3\sin\alpha_3), w_3 \end{bmatrix} \equiv I_3 - I_4 = \quad (13b)$$

$$I_p(z_{0,R}, z_{0,S}, v_3, w_3, \chi_0 + \pi/2) -$$

$$I_p(z_{0,R}, z_{0,S}, v_3, w_3, \chi_0 + 3\pi/2) = -4|U_R(z_{0,R}, v_3, w_3)|$$

$$|U_S(z_{0,S}, v_3, w_3)| \times \sin[2k(z_{0,S} - z_{0,R}) + (\phi_S - \phi_R) + \chi_0].$$

The complex expression for $\Delta I$ is defined as $$\Delta I \begin{bmatrix} z_{0,R}, z_{0,S}, (v_3/kf_3\sin\alpha_3) = \\ (v_0/kf_0\sin\alpha_0) + (\Delta v_3/kf_3\sin\alpha_3), w_3 \end{bmatrix} \equiv +\Delta I(z_{0,R}, z_{0,S} v_3, w_3) + \quad (14)$$

$$j\Delta I_2(z_{0,R}, z_{0,S}, v_3, w_3)$$

or with the substitution of Eqs. (13a) and (13b) as $$\Delta I\begin{bmatrix} z_{0,R}, z_{0,S}, (\upsilon_3/kf_3\sin\alpha_3) = + \\ (\upsilon_0/kf_0\sin\alpha_0) + (\Delta\upsilon_3/kf_3\sin\alpha_3), w_3 \end{bmatrix} = + \quad (15)$$

$$4|U_R(z_{0,R}, \upsilon_3, w_3)||U_S(z_{0,S}, \upsilon_3, w_3)| \times$$

$$\exp\{-j[2k(z_{0,S} - z_{0,R}) + (\phi_S - \phi_R)]\}.$$

For a scattering object material of finite axial thickness, the corresponding signal $\Delta I(z_{0,R}, \upsilon_3, w_3)$ is obtained by the integration of $\Delta I(z_{0,R}, z_{0,S}, \upsilon_3, w_3)$ over $z_{0,S}$. Using Eq. (15), $\Delta I(z_{0,R}, \upsilon_3, w_3)$ can be expressed for a scattering object material of finite axial thickness as $$\Delta I\begin{bmatrix} z_{0,R}, (\upsilon_3/kf_3\sin\alpha_3) = + \\ (\upsilon_0/kf_0\sin\alpha_0) + (\Delta\upsilon_3/kf_3\sin\alpha_3), w_3 \end{bmatrix} = + \quad (16)$$

$$\int ((4|U_R||U_S|\exp\{-j[2k(z_{0,S} - z_{0,R}) +$$

$$(\phi_S - \phi_R)]\}) dz_{0,S}.$$

The resulting signal $\Delta I(z_{0,R}, \upsilon_3, w_3)$ is measured as a function of the wavenumber k by measuring $\Delta I(z_{0,R}, \upsilon_3, w_3)$ as a function of $\upsilon_3$.

It is seen from examination of Eq. (16) that, within a constant scale factor, the observed quantity $\Delta I$ is a Fourier transform of the product of the scattered amplitude $U_S$ and the reflected reference amplitude $U_R$. Prior art confocal interference microscopy obtains the equivalent information about the object material. The information represented by $\Delta I(z_{0,R}, \upsilon_3, w_3)$ about the object material at an array of axial points in the $z_0$ direction is obtained with apparatus of the present invention from a set of four independent measurements acquired sequentially in time with no scanning of the object material required. For prior art confocal interference microscopy, equivalent four independent measurements must be made for each axial point in the array of axial points in the $z_0$ direction by scanning the object material. Thus, information represented $\Delta I(z_{0,R}, \upsilon_3, w_3)$ is acquired about the object material with the apparatus of the present invention in less time than with prior art interference confocal microscopy. It is this feature of the instant invention which leads in part to an improvement in statistical accuracy and a reduced sensitivity to motion of the object material during acquisition of the measured currents.

Properties of Fourier Transformed Scattering Amplitude

It was shown in the section entitled "Impulse Response Function for In-Focus Image" that the measured intensities $I_i$ can be combined to give $\Delta I$ as expressed by Eq. (16) which is the Fourier transform of the product of the scattered amplitude $U_S$ and the reflected reference amplitude $U_R$. Thus, information about the scattering object itself can be obtained by computing the inverse Fourier transform $F^{-1}$ ($\Delta I$) of $\Delta I(z_{0,R}, \upsilon_3, w_3)$ with respect to the wavenumber k, i.e.

$$F^{-1}(\Delta I) = \quad (17)$$

-continued $$\int \Delta I\begin{bmatrix} z_{0,R}, (\upsilon_3/k'f_3\sin\alpha_3) = \\ (\upsilon_0/k'f_0\sin\alpha_0) + (\Delta\upsilon_3/k'f_3\sin\alpha_3), w_3 \end{bmatrix} \times [\exp(jk'z)]dk'.$$

Substituting into Eq. (17) the expression for $\Delta I$ given by Eq. (16), the following equation for the product of the scattered amplitude $U_S$ and the reflected reference amplitude $U_R$ is obtained.

$$|U_R||U_S|e^{-j(\phi_S - \phi_R)} = (\tfrac{1}{4})F^{-1}(\Delta I). \quad (18)$$

The preferred procedure for computation of $|U_S|\exp(-j\phi_S)$ from $F^{-1}(\Delta I)$ which is based on Eq. (18) is the multiplication of $[F^{-1}(\Delta I)]/4$ by $[|U_R|\exp(j\phi_R)]^{-1}$ where the reflected amplitude $|U_R|\exp(j\phi_R)$ is determined by a independent set of measurements. In the referenced computation, it is important to only know $\phi_R$ relative to the all non-object material contributions to $\phi_S$, $\phi_{S,0}$. A method for the determination of $|U_R|\exp[j(\phi_R - \phi_{S,0})]$ is comprised of three different types of measurements. The first type of measurement is made with the object material 112 replaced by a plane reflecting surface with known reflecting properties to yield a measurement of the corresponding complex quantity $\Delta I$. From the corresponding complex quantity $\Delta I$ obtained with the first type of measurement, a measurement of $|U_R||U_{S,0}|\exp[j(\phi_R - \phi_{S,0})]$ is acquired where $|U_{S,0}|$ describes all non-object material contributions to $|U_S|$. The second type of measurement is to measure one of the $I_i$ with no object material present. From the $I_i$ acquired with no object material present, a measurement of $|U_R|^2$ is acquired. The third type of measurement is to measure one of the $I_i$ with no reference mirror present and the object material 112 replaced by a plane reflecting surface with known reflecting properties. From the $I_i$ acquired with no reference mirror present and the object material 112 10 replaced by a plane reflecting surface, a measurement of $|U_{S,0}|^2$ is acquired. The measurements of the three quantities $|U_R||U_{S,0}|\exp[j(\phi_R - \phi_{S,0})]$, $|U_R|^2$, and $|U_{S,0}|^2$ contain the information required for the determination of $\{|U_R|\exp[j(\phi_R - \phi_{S,0})]\}^{-1}$ for use in the computation of $|U_S|\exp(-j\phi_S)$ from $F^{-1}(\Delta I)$.

The accuracy to which $|U_R|\exp[j(\phi_R - \phi_{S,0})]$ can be determined by the described procedure will depend in part on the level of intrinsic background present in the apparatus of the present invention, the background produced by the apparatus itself and not by the object material. It is important to note that the described method may also be used to help characterize $|U_{S,0}|^2$ and thus the impulse response function for the object material arm of the interferometer of the apparatus of the present invention.

The axial resolution of the apparatus of the present invention is easily estimated for the case where the axial resolution exceeds that determined by the numerical apertures of the apparatus of the present invention for a given wavelength. The following simplifying assumptions are made in order to estimate the axial resolution for such a condition without the distraction of or confusing the picture with non-essential details. Assuming that $|U_R||U_S|$ and $(\phi_S - \phi_R)$ change by a negligible amount over the interval $k_-$ to $k_+$ and further assuming the spectrum of the source to be a triangle function in this interval, $\Delta(k, k_+, k_-)$, the integration over k' Eq. (17) can be evaluated in closed form with the result $$F^{-1}(\Delta I) = 4\Delta k \int \left[ \left[ |U_R||U_S| \exp\left\{ \begin{array}{c} -j2\bar{k}[(z_{0,S} - z_{0,R}) - z] \\ -j(\phi_S - \phi_R) \end{array} \right\} \times \right.\right. \qquad (19)$$

$$\left.\left. \left( \left( \frac{\sin\{\Delta k[(z_{0,S} - z_{0,R}) - z]\}}{\{\Delta k[(z_{0,S} - z_{0,R}) - z]\}} \right) \right)^2 \right] dz_{0,S} \right]$$

where $$\Lambda(k, k_+, k_-) = \begin{cases} 0, & k \geq k_+ \\ 1, & k = \bar{k} \\ 0, & k \leq k_- \end{cases} \qquad (20)$$

$$\bar{k} = [(k_+ + k_-)/2], \qquad (21a)$$

$$\Delta k = [(k_+ - k_-)/4]. \qquad (21b)$$

We see from Eq. (19) that $|U_S|$ is obtained with an axial spatial resolution of $$\Delta z = \frac{2.8}{\Delta k} = \frac{4(2.8)}{(k_+ - k_-)}, \qquad (22a)$$

or written in terms of wavelength as $$\Delta z = \frac{2.8}{\pi} \left( \frac{2\lambda_+ \lambda_-}{\lambda_+ - \lambda_-} \right), \qquad (22b)$$

where $$\lambda_+ = 2\pi/k_-, \lambda_- = 2\pi/k_+. \qquad (23)$$

White-Light Fringe Pattern

For the example of the scattering object being a single reflective surface, $\Delta I$ is typical of the white-light fringe pattern when the axial resolution exceeds that determined by the numerical apertures of the apparatus of the present invention for a given wavelength. Consequently for this situation, the relative location of the reference and object reflective surfaces may easily identified with an axial resolving power similar to that given by Eq. (22a) or Eq. (22b). This may be achieved directly from the white-light fringe pattern by either locating the peak in the fringe pattern with the largest amplitude, locating the peak in the envelope of the white-light fringe pattern or some other contrast reference feature (cf. Refs. 2–7 in L. Deck and P. de Groot, ibid.).

Impulse Response Function for In-Focus Image: Transverse OWDR

The fifth embodiment of the second group of embodiments is selected as the system for showing the basis of the distinctive features cited in the section entitled "Background Compensation" although the basis applies equally well to all of the embodiments and variants thereof of the second group of embodiments. The Impulse Response Function for an in-focus image for a confocal interferometric microscopy system using OWDR as for the fifth embodiment is easily obtained from the Impulse Response Function derived in the preceding section for the first embodiment: the pupil functions $P_i$ of the first embodiment are replace by the corresponding pupil functions of the fifth embodiment, the pupil functions $P_i$ of the fifth embodiment including the effects of the dispersive elements 130a, 130b, 130c, and 130d (see FIGS. 1aa, 2aa, 3aa, and 4aa).

It is seen from examination of Eq. (16) that, within a constant scale factor, the observed quantity $\Delta I$ is a Fourier transform of the product of the scattered amplitude $U_S$ and the reflected reference amplitude $U_R$. Prior art confocal interference microscopy obtains the equivalent information about the object material. The information represented by $\Delta I(\bar{z}_{0,S}, z_{0,R}, \upsilon_3, w_3)$ about the object material at an array of lateral points in the transverse planar section is obtained with apparatus of the present invention from a set of four independent measurements acquired sequentially in time with no scanning of the object material required. For prior art confocal interference microscopy, equivalent four independent measurements must be made for each lateral point in the array of lateral points in the transverse planar section by scanning the object material. Thus, information represented by $\Delta I(\bar{z}_{0,S}, z_{0,R}, \upsilon_3, w_3)$ is acquired about the object material with the apparatus of the present invention in less time than with prior art interference confocal microscopy. It is this feature of the instant invention which leads in part to an improvement in statistical accuracy and a reduced sensitivity to motion of the object material during acquisition of the measured currents.

The Amplitude of Out-of-Focus Image

The amplitude of the out-of-focus beam $U_B$ in the spatial filter pinhole in image plane 17a can be expressed in terms of the Fresnel integrals C(z) and S(z) which are defined as $$C(z) = \int_0^z \cos\left(\frac{\pi}{2} t^2\right) dt, \qquad (24)$$

$$S(z) = \int_0^z \sin\left(\frac{\pi}{2} t^2\right) dt \qquad (25)$$

[cf. Abramowitz and Stegun, *Handbook of Mathematical Functions*, (Nat. Bur. of Standards, Appl. Math. Ser. 55), Sect. 7.3, 300–302, 1964]. The expression for $U_B$ can written as $$U_B(\nu_2) = -\left(\frac{j}{\lambda}\right)\left(\frac{A_B}{f_2^2}\right)\left(\frac{\pi f_2^2}{kz_B}\right) \exp[jk(\bar{z}_B)] \times \qquad (26)$$

$$\exp[jk(x_2^2 + y_2^2)/(2z_B)] \times$$

-continued $$\int\int P_2(\tilde{\xi}_2, \tilde{\eta}_2)\exp[-j\frac{\pi}{2}(\tilde{\xi}_2^2 + \tilde{\eta}_2^2)]d\tilde{\xi}_2 d\tilde{\eta}_2$$

for a point source 8 located at $v_1=(0,0,0)$ where $f_2$ is the focal length of region 2 in FIG. 5, $(x_2, y_2, z_B)$ are the out-of-focus coordinates in image plane 57, $(A_B/f_2)$ is the amplitude of the out-of-focus beam at the exit pupil of lens 2, $$\tilde{\xi}_2 = \left(\frac{kz_B}{\pi f_2^2}\right)^{1/2}\left(\xi_2 + \frac{x_2}{z_B}f_2\right), \tag{27a}$$

$$\tilde{\eta}_2 = \left(\frac{kz_B}{\pi f_2^2}\right)^{1/2}\left(\eta_2 + \frac{x_2}{z_B}f_2\right), \tag{27b}$$

and $\xi_2$ and $\eta_2$ are the exit pupil coordinates of lens 2 (derived from the theory of diffraction presented in Section 8.8.1 of Born and Wolf, ibid.). The result after the integration over $\xi_2$ and $\eta_2$ for a Level 2 discrimination, m=2, and no apodization of the phase shifter elements of phase shifters 14, 24, and 34 is $$U_B(v_2) = -\left(\frac{j}{\lambda}\right)\left(\frac{A_B}{f_2^2}\right)\left(\frac{\pi f_2^2}{kz_B}\right)\exp[jk(\tilde{z}_B)] \times \tag{28}$$

$$\exp[jk(x_2^2 + y_2^2)/(2z_B)] \times$$

$$\{[C(\xi_5') - 2C(\xi_4') + 2C(\xi_3') - 2C(\xi_2') + C(\xi_1')] -$$

$$j[S(\xi_5') - 2S(\xi_4') + 2S(\xi_3') - 2S(\xi_2') + S(\xi_1')]\} \times$$

$$\{[C(\eta_5') - 2C(\eta_4') + 2C(\eta_3') - 2C(\eta_2') + C(\eta_1')] -$$

$$j[S(\eta_5') - 2S(\eta_4') + 2S(\eta_3') - 2S(\eta_2') + S(\eta_1')]\}$$

where $$\xi_p' = \left(\frac{kz_B}{\pi f_2^2}\right)^{1/2}\left[(p-3)a + \frac{x_2}{z_B}f_2\right]; \quad p = 1, \ldots, 5, \tag{29a}$$

$$\eta_p' = \left(\frac{kz_B}{\pi f_2^2}\right)^{1/2}\left[(p-3)a + \frac{y_2}{z_B}f_2\right]; \quad p = 1, \ldots, 5, \tag{29b}$$

and a is the width of the phase shift elements in the $\xi_2$ and $\eta_2$ directions. The result for a Level 1 discrimination operating for example in the $v_2$ direction, m=2, and no apodization of the phase shifter elements of phase shifters 14, 24, and 34 is $$U_B(v_2) = -\left(\frac{j}{\lambda}\right)\left(\frac{A_B}{f_2^2}\right)\left(\frac{\pi f_2^2}{kz_B}\right)\exp[jk(\tilde{z}_B)] \times \tag{30}$$

$$\exp[jk(x_2^2 + y_2^2)/(2z_B)] \times$$

$$\{[C(\xi_5') - 2C(\xi_4') + 2C(\xi_3') - 2C(\xi_2') + C(\xi_1')] -$$

$$j[S(\xi_5') - 2S(\xi_4') + 2S(\xi_3') - 2S(\xi_2') + S(\xi_1')]\}.$$

Figure 6:
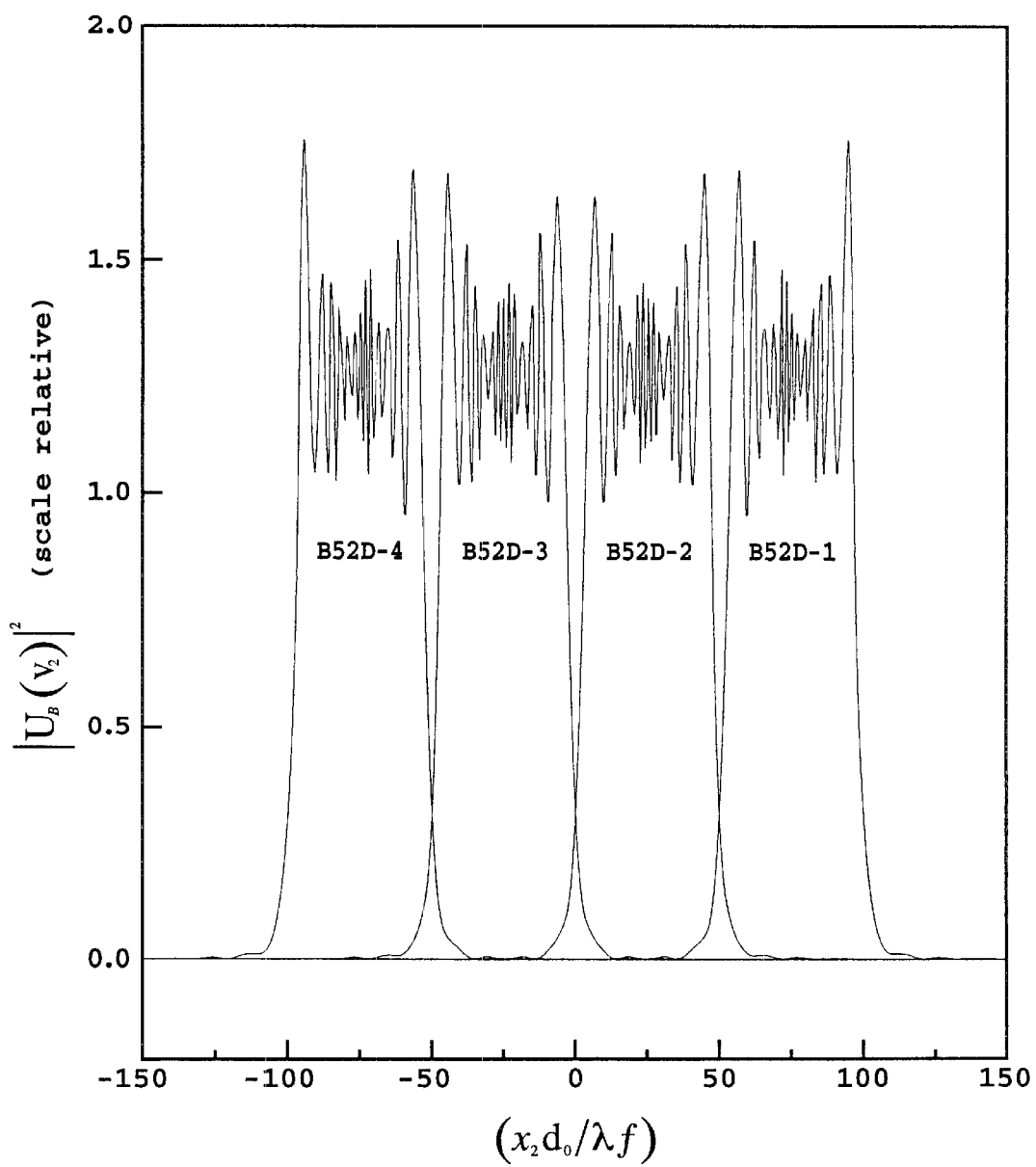
FIG. 6 is a graph depicting the amplitude of an out-of-focus image in the spatial-filter pinhole plane in accordance with the four preferred embodiments and variants of the preferred embodiments of the present invention.

An example of $|U_B(v_2)|^2$ for each of the beams B52D-1,-2,-3,-4 for the Level 1 discrimination is shown in FIG. 6 as a function of $(x_2d_0/\lambda f_2)$ for $y_2=0$ and $z_2=50\lambda(f_2/d_0)^2$.

It is evident on examination of FIG. 6 why the apparatus of the present invention displays reduced sensitivity to background from out-of-focus images in comparison to prior art interference confocal microscopy, prior art interference confocal microscopy being sensitive to $U_B$ while apparatus of the present invention is sensitive in first order to the derivatives of $U_B$ with respect to $x_2$ and $y_2$ as a result of the antisymmetric spatial properties of $U_R$ in image plane 17a. It is possible to demonstrate using the properties of Fresnel internals [cf. Abramowitz and Stegun, ibid.] that the integration of an optical frequency component of $(U_R U_B^* + U_R^* U_B)$ at the spatial filter pinhole 18a, which is to a good approximation equivalent to integration the corresponding $(U_R U_B^* + U_R^* U_B)$ over a corresponding detector pinhole, behaves in the manner listed in Table 1 for both the case of prior art confocal interferometric microscopy

TABLE 1

| Apparatus | $(A_B/f_2)^{-1}\int\int(U_R U_B^* + U_R^* U_B)dx_2 dy_2$ |
|---|---|
| Prior Art interference confocal microscopy | $\propto \left(\frac{1}{z_B}\right)$ |
| Present Invention: Level 1 discrimination, No apodization | $\propto \left(\frac{1}{z_B}\right)^{3/2}$ |
| Present Invention: Level 2 discrimination, No apodization | $\propto \left(\frac{1}{z_B}\right)^2$ |
| Present Invention: Level 1 discrimination, $\left|\sin\left(\pi\frac{\xi_2}{a}\right)\right|$ apodization | $\propto \left(\frac{1}{z_B}\right)^2$ |
| Present Invention: Level 2 discrimination, $\left|\sin\left(\pi\frac{\xi_2}{a}\right)\right|$ apodization, $\left|\sin\left(\pi\frac{\eta_2}{a}\right)\right|$ apodozation | $\propto \left(\frac{1}{z_B}\right)^3$ | and for the case of the invention disclosed herein. In Table 1, U* denotes the complex conjugate of U and the integration is over intervals centered about the position where $U_R$ is antisymmetric in $x_2$ for Level 1 discrimination and in both $x_2$ and $y_2$ for Level 2 discrimination.

Improved discrimination against background from out-of-focus images beyond that given in Table 1 is obtained in apparatus of the present invention by the apodization of phase shifter elements of phase shifters 14, 24, and 34 so as to decrease the magnitude of the derivatives of $U_B$ with respect to $x_2$ and $y_2$. Consider the apodization function $T_2(\xi_2, \eta_2)$ $$T_2(\xi_2, \eta_2) = \left|\sin\left(\pi\frac{\xi_2}{a}\right)\right|\left|\sin\left(\pi\frac{\eta_2}{a}\right)\right|. \tag{31}$$

The result after the integration over $\xi_2$ and $\eta_2$ for a Level 2 discrimination and m=2 is $$U_B(v_2) = -\left(\frac{1}{2k}\right)\left(\frac{A_B}{f_2^2}\right)\left(\frac{\pi f_2^2}{kz_B}\right)\exp[jk(\tilde{z}_B)] \times \tag{32}$$

$$\left\{\exp\left[jk\left(\frac{f_2^2}{2kz_B}\right)\left(\frac{kx_2}{f_2} - \frac{\pi}{a}\right)^2\right]\times\right.$$

$$\{[C(\xi_5'') - C(\xi_1'')] - j[S(\xi_5'') - S(\xi_1'')]\} -$$

$$\exp\left[jk\left(\frac{f_2^2}{2kz_B}\right)\left(\frac{kx_2}{f_2} + \frac{\pi}{a}\right)^2\right]\times$$

$$\left.\{[C(\xi_5'') - C(\xi_1'')] - j[S(\xi_5'') - S(\xi_1'')]\}\right\}\times$$

-continued $$\left\langle \exp\left[jk\left(\frac{f_2^2}{2kz_B}\right)\left(\frac{ky_2}{f_2} - \frac{\pi}{a}\right)^2\right] \times \right.$$

$$\{[C(\eta_5') - C(\eta_1')] - j[S(\eta_5') - S(\eta_1')]\} -$$

$$\exp\left[jk\left(\frac{f_2^2}{2kz_B}\right)\left(\frac{ky_2}{f_2} + \frac{\pi}{a}\right)^2\right] \times$$

$$\left. \{[C(\eta_5'') - C(\eta_1'')] - j[S(\eta_5'') - S(\eta_1'')]\} \right\rangle$$

where $$\xi_p' = \left(\frac{kz_B}{\pi f_2^2}\right)^{1/2}\left[(p-3)a + \left(\frac{f_2^2}{kz_B}\right)\left(\frac{kx_2}{f_2} - \frac{\pi}{a}\right)\right], \quad p = 1, 5; \quad (33a)$$

$$\xi_p'' = \left(\frac{kz_B}{\pi f_2^2}\right)^{1/2}\left[(p-3)a + \left(\frac{f_2^2}{kz_B}\right)\left(\frac{kx_2}{f_2} + \frac{\pi}{a}\right)\right], \quad p = 1, 5; \quad (33b)$$

$$\eta_p' = \left(\frac{kz_B}{\pi f_2^2}\right)^{1/2}\left[(p-3)a + \left(\frac{f_2^2}{kz_B}\right)\left(\frac{ky_2}{f_2} - \frac{\pi}{a}\right)\right], \quad p = 1, 5; \quad (33c)$$

$$\eta_p'' = \left(\frac{kz_B}{\pi f_2^2}\right)^{1/2}\left[(p-3)a + \left(\frac{f_2^2}{kz_B}\right)\left(\frac{ky_2}{f_2} + \frac{\pi}{a}\right)\right], \quad p = 1, 5. \quad (33d)$$

It is possible to demonstrate using the properties of Fresnel internals [cf. Abramowitz and Stegun, op. cit.] that the integration of an optical frequency component of $(U_R U_B^* + U_R^* U_B)$ at the spatial filter pinhole 58, which is to a good approximation equivalent to integration the corresponding $(U_R U_B^* + U_R^* U_B)$ over a corresponding detector pinhole, behaves in the manner listed in Table 1 for the invention disclosed herein with a Level 2 discrimination with the apodization given by Eq. (31) and a Level 1 discrimination in the $\xi_2$ direction with an apodization having a $\xi_2$ dependence of $|\sin(\pi\xi_2/a)|$ and no apodization in the $\eta_2$ direction.

A very significant feature of the properties of apparatus which embodies the present invention is that the enhanced reduction of the interference term wave-number filtered, spatially-filtered reflected reference beam and the wave-number filtered, spatially-filtered background beam detected in image plane 67 is effective for each independent volume element of the source of out-of-focus images. Therefore, the reduction leads to both a reduction in the statistical error as well as an enhanced reduction in the systematic error produced by the background from out-of-focus images.

The potential value of the differing possibilities for reduced sensitivity of apparatus of the present invention to background from out-of-focus images may also be appreciated in the context of the axial sectioning power of prior art interference confocal microscopy being effectively reduced in comparison to the axial sectioning power of prior art confocal microscopy. The error signal in prior art interference confocal microscopy due to the detected interference cross term between the reflected reference amplitude and the background amplitude from out-of-focus images has a weaker dependence on $z_B$ by one order in $z_B$ in comparison to the error signal in prior art confocal microscopy due to the detected background from the intensity of out-of-focus images.

Statistical Error

Consider the response of the apparatus of the present invention to a planar transverse section of an arbitrary three-dimensional scattering object 112. The output current I from a pixel of the detector for the given transverse planar section of the scattering object 112 is of the form $$I(z_{0,S} - z_{0,R}, \chi) = \iint_p |U_R|^2 dx_3 dy_3 + \iint_p |U_B|^2 dx_3 dy_3 + \quad (34)$$

$$\iint_p |U_S|^2 dx_3 dy_3 +$$

$$\cos\chi \iint_p \left(\begin{array}{c} U_R U_S^* \\ + U_R^* U_S \end{array}\right) dx_3 dy_3 +$$

$$j\sin\chi \iint_p \left(\begin{array}{c} U_R U_S^* \\ - U_R^* U_S \end{array}\right) dx_3 dy_3 +$$

$$\cos\chi \iint_p \left(\begin{array}{c} U_R U_B^* \\ + U_R^* U_B \end{array}\right) dx_3 dy_3 +$$

$$j\sin\chi \iint_p \left(\begin{array}{c} U_R U_B^* \\ - U_R^* U_B \end{array}\right) dx_3 dy_3 +$$

$$\iint_p (U_S U_B^* + U_S^* U_B) dx_3 dy_3$$

where the integration $\iint_p$ is over the area of a detector pinhole and $\chi$ is the phase shift introduced by phase shifter 44. The corresponding equations for the intensity differences $\Delta I_1 = I_1 - I_2$ and $\Delta I_2 = I_3 - I_4$ defined by Eqs. (12a) and (12b), respectively, are $$\Delta I_1 = 2\iint_p (U_R U_B^* + U_R^* U_B) dx_3 dy_3 + \quad (35a)$$

$$2\iint_p (U_R U_S^* + U_R^* U_S) dx_3 dy_3,$$

$$\Delta I_2 = j2\iint_p (U_R U_B^* - U_R^* U_B) dx_3 dy_3 + \quad (35b)$$

$$j2\iint_p (U_R U_S^* - U_R^* U_S) dx_3 dy_3$$

where $I_i$ is defined by the equation $$I_i = I(\chi = \chi_i), \chi_1 = 0, \chi_2 = \pi, \chi_3 = \pi/2, \chi_4 = 3\pi/2. \quad (36)$$

The statistical errors for $\iint_p (U_R U_S^* + U_R^* U_S) dx_3 dy_3$ and $j\iint_p (U_R^* U_S^* - U_R^* U_S) dx_3 dy_3$ can be expressed as $$\frac{\sigma^2\left[\iint_p (U_R U_S^* + U_R^* U_S) dx_3 dy_3\right]}{\iint_p |U_R|^2 dx_3 dy_3} = +\frac{1}{2} + \quad (37a)$$

$$\frac{1}{2}\frac{\iint_p |U_B|^2 dx_3 dy_3}{\iint_p |U_R|^2 dx_3 dy_3} + \frac{1}{2}\frac{\iint_p |U_S|^2 dx_3 dy_3}{\iint_p |U_R|^2 dx_3 dy_3} +$$

$$\frac{1}{2}\frac{\sigma^2\left[\iint_p (U_R U_B^* + U_R^* U_B) dx_3 dy_3\right]}{\iint_p |U_R|^2 dx_3 dy_3} +$$

$$\frac{1}{2}\frac{\sigma^2\left[\iint_p (U_S U_B^* + U_S^* U_B) dx_3 dy_3\right]}{\iint_p |U_R|^2 dx_3 dy_3},$$

$$\frac{\sigma^2\left[j\iint_p(U_R U_S^* - U_R^* U_S)dx_3 dy_3\right]}{\iint_p |U_R|^2 dx_3 dy_3} = \frac{1}{2} + \quad (37b)$$

$$\frac{1}{2}\int\frac{\int_p |U_B|^2 dx_3 dy_3}{\iint_p |U_R|^2 dx_3 dy_3} + \frac{1}{2}\int\frac{\int_p |U_S|^2 dx_3 dy_3}{\iint_p |U_R|^2 dx_3 dy_3} +$$

$$\frac{1}{2}\frac{\sigma^2\left[j\iint_p(U_R U_B^* - U_R^* U_B)dx_3 dy_3\right]}{\iint_p |U_R|^2 dx_3 dy_3} +$$

$$\frac{1}{2}\frac{\sigma^2\left[\iint_p(U_S U_B^* + U_S^* U_B)dx_3 dy_3\right]}{\iint_p |U_R|^2 dx_3 dy_3},$$

respectively. It has been assumed in the derivation of Eqs. (37a) and (37b) that $\sigma^2(\iint_p |U_R|^2 dx_3 dy_3) = \iint_p |U_R|^2 dx_3 dy_3$ and $\sigma^2(\iint_p |U_B|^2 dx_3 dy_3) = \iint_p |U_B|^2 dx_3 dy_3$, i.e. the statistical noise in the system is determined by the Poisson statistics of the number of photoemissive electrons detected and both $\iint_p |U_R|^2 dx_3 dy_3$ and $\iint_p |U_B|^2 dx_3 dy_3$ correspond to a large number of photoemissive electrons. For the case where $\iint_p |U_R|^2 dx_3 dy_3 \gg \iint_p |U_S|^2 dx_3 dy_3$ and $\iint_p |U_B|^2 dx_3 dy_3 \gg \iint_p |U_S|^2 dx_3 dy_3$, the terms on the right hand sides of Eqs. (37a) and (37b) which depend on $U_S$ can be neglected which leads to the simplified equations $$\frac{\sigma^2\left[\iint_p(U_R U_S^* + U_R^* U_S)dx_3 dy_3\right]}{\iint_p |U_R|^2 dx_3 dy_3} = \frac{1}{2} + \quad (38a)$$

$$\frac{1}{2}\int\frac{\int_p |U_B|^2 dx_3 dy_3}{\iint_p |U_R|^2 dx_3 dy_3} +$$

$$\frac{1}{2}\frac{\sigma^2\left[\iint_p(U_R U_B^* + U_R^* U_B)dx_3 dy_3\right]}{\iint_p |U_R|^2 dx_3 dy_3},$$

$$\frac{\sigma^2\left[j\iint_p(U_R U_S^* - U_R^* U_S)dx_3 dy_3\right]}{\iint_p |U_R|^2 dx_3 dy_3} = \frac{1}{2} + \quad (38b)$$

$$\frac{1}{2}\int\frac{\int_p |U_B|^2 dx_3 dy_3}{\iint_p |U_R|^2 dx_3 dy_3} +$$

$$\frac{1}{2}\frac{\sigma^2\left[j\iint_p(U_R U_B^* - U_R^* U_B)dx_3 dy_3\right]}{\iint_p |U_R|^2 dx_3 dy_3}.$$

It is of value to note that the additional gain in the signal-to-noise ratios for $\iint_p(U_R U_S^* + U_R^* U_S)dx_3 dy_3$ and $j\iint_p(U_R U_S^* - U_R^* U_S)dx_3 dy_3$ obtained in going from $\iint_p |U_R|^2 dx_3 dy_3 = 2\iint_p |U_B|^2 dx_3 dy_3$ to $\iint_p |U_R|^2 dx_3 dy_3 \gg \iint_p |U_B|^2 dx_3 dy_3$ is a factor of approximately (3/2). However, this latter gain is made at the expense of a considerable increase in the power of the source and in the required dynamic range of the signal processing electronics. Therefore, the optimum choice for $|U_R|$ will typically be with $$\iint_p |U_R|^2 dx_3 dy_3 \geq 2\iint_p |U_B|^2 dx_3 dy_3. \quad (39)$$

When the condition expressed by Eq. (39) is satisfied, the statistical errors given by Eqs. (38a) and (38b) are bounded as expressed in the following inequalities:

$$\frac{1}{2} < \frac{\sigma^2\left[\iint_p(U_R U_S^* + U_R^* U_S)dx_3 dy_3\right]}{\iint_p |U_R|^2 dx_3 dy_3} \leq \frac{9}{8}, \quad (40a)$$

$$\frac{1}{2} < \frac{\sigma^2\left[\iint_p(U_R U_S^* - U_R^* U_S)dx_3 dy_3\right]}{\iint_p |U_R|^2 dx_3 dy_3} \leq \frac{9}{8}. \quad (40b)$$

It is clearly evident on examination of Eqs. (37a) and (37b) or Eqs. (38a) and (38b) that apparatus embodying the present invention with its reduced background from out-of-focus images has intrinsically lower statistical errors for given operating values of $U_S$ and $U_R$ in relation to prior art confocal interference microscopy systems. Typically, the signal-to-noise ratios obtained when using apparatus embodying the present invention will be larger by a factor of $(3/2)^{1/2}$ over that obtained by a confocal interference microscope not employing the invention disclosed herein.

The interpretation of Eqs. (37a) and (37b), Eqs. (38a) and (38b), and Eqs. (40a) and (40b) is the following: it is possible with the invention disclosed herein to achieve from a set of four intensity measurements the components of the complex scattering amplitude such that for each independent position in the object, the statistical error for each of the components of the inferred complex scattering amplitude is typically within a factor of $(3/2)^{1/2}$ of the limiting statistical error fixed by the statistics of the complex scattering amplitude itself, and that the referred to statistical error can be achieved with lower operating power levels of the source and lower required dynamic range capacity in the signal processing electronics in relation to prior art confocal interference microscopes. The term independent position is used to mean that the associated sets of four measured intensities are statistically independent sets.

It may be possible to achieve the condition expressed by Eq. (39) for the first and second embodiments illustrated in FIGS. 1a–1n and FIGS. 2a–2f and variant of the first and second embodiments by reducing the transmission of phase shifter 24 so as to attenuate simultaneously the scattered probe beam and the out-of-focus image beam at the image plane 47. In order to obtain a given signal-to-noise ratio, this attenuation procedure may require the increase of the strength of the light source 10 as the attenuation at phase shifter 24 is increased. The alternative third and fourth embodiments of the invention illustrated in FIGS. 3a–3l and FIGS. 4a–4f and the variants of the third and fourth embodiments permits the condition given by Eq. (39) to be satisfied by adjusting the transmission/reflection properties of beam splitters 100, 100a, and 100b relative to each other. When either the third or fourth embodiments are used to meet the condition expressed by Eq. (39), the light source 10 or 10a may in general be operated at lower power levels relative to that required by the above described attenuation procedure based on the reduction of transmission of phase shifter 24.

The signal-to-noise ratio may be adjusted as a function of the wavelength of the source optical frequency components so as to generate for example a signal-to-noise ratio that is to first order independent of wavelength. This feature was described in the section presenting the detailed description of the first embodiment. As stated in the cited description, the amplitude of the wavelength-filtered, spatially-filtered scattered probe beam P42D normalized to the corresponding optical frequency component of the amplitude of the probe beam P22D prior to entry into object material 112 will generally change with wavelength due to enunciated factors. Also the ratio of the amplitude of the wavelength-filtered, spatially-filtered scattered probe beam P42D to the amplitude of the wavelength-filtered, spatially-filtered background beam B62D will generally decrease as the depth of image point 28 into the object material 112 is increased. The effects of such factors on the signal-to-noise ratio may be compensated in part by placing a wavelength filter in reference mirror subsystem 83 and/or in the probe beam subsystem 82, preferably in reference mirror subsystem 83, and constructing the transmission of the wavelength filter to have a specific wavelength dependence to adjust and/or optimize the ratio of the wavelength-filtered, spatially-filtered scattered probe beam P42D and the wavelength-filtered, spatially-filtered reflected reference beam R42D transmitted through respective detector pinholes for different wavelengths so as to satisfy the condition expressed by Eq. (39).

Systematic Error Due to Out-of-Focus Images

Eqs. (35a) and (35b) can be used in conjunction with measured values of $\Delta I_1$, $\Delta I_2$, and $|U_R|\exp[j(\phi_R-\phi_{S,0})]$ to obtain measurements of the real and imaginary parts of $U_S$. The quantity $|U_R|\exp[j(\phi_R-\phi_{S,0})]$ may be determined for example by the method described in section entitled "Properties of Fourier Transformed Scattering Amplitude". There remains the potential systematic error terms, $$\int\int_P (U_R U_B^* + U_R^* U_B) dx_3 dy_3, \quad (41a)$$

$$\int\int_P (U_R U_B^* - U_R^* U_B) dx_3 dy_3. \quad (41b)$$

These systematic error terms can be significant when $|U_B| >> |U_S|$. Consequently, it is desirable for the interference terms expressed by Eqs. (41a) and (41b) to be compensated to an acceptable level.

The compensation for the $\int\int_P (U_R U_B^* + U_R^* U_B) dx_3 dy_3$ and $\int\int_P (U_R U_B^* - U_R^* U_B) dx_3 dy_3$ terms in the invention disclosed herein requires in general much less in the way of computer processing than that required in prior art confocal interference microscopy. This is be cause the spatial properties of $U_B$ depend on the scattering properties of the three dimensional object 112 under examination and therefore on $U_S$ through an integral equation. These integral equations, Eqs. (35a) and (35b), are Fredholm integral equations of the second kind. The computer processing required to perform the inversion of the respective integral equations to obtain $U_S$ decreases when the $\int\int_P (U_R U_B^* + U_R^* U_B) dx_3 dy_3$ and $\int\int_P (U_R U_B^* - U_R^* U_B) dx_3 dy_3$ terms are reduced such as in apparatus which embodies the present invention. Generally, the rate of decrease in the required computer processing is faster then the rate of reduction of the $\int\int_P (U_R U_B^* + U_R^* U_B) dx_3 dy_3$ and $\int\int_P (U_R U_B^* - U_R^* U_B) dx_3 dy_3$ terms.

For those interferometric measurements where the mutual interference terms the $\int\int_P (U_S U_B^* + U_S^* U_B) dx_3 dy_3$ term is not compensated in contrast to that in apparatus embodying the present invention, the integral equations corresponding to Eqs. (35a) and (35b) are nonlinear integral equations: they are integral equations that are second order in $U_S$. Nonlinear integral equations require in general considerably more sophistication in regards to the computer hardware and software for their solution than do linear integral equations. Thus, the transformation by apparatus embodying the present invention from working with a $\int\int_P (U_S U_B^* + U_S^* U_B) dx_3 dy_3$ term to $\int\int_P (U_R U_B^* + U_R^* U_B) dx_3 dy_3$ and $\int\int_P (U_R U_B^* - U_R^* U_B) dx_3 dy_3$ terms represents an important feature of the invention in relation to prior art pinhole confocal microscopy.

Note also that the reduction of the systematic error due to the background signal $\int\int_P |U_B|^2 dx_3 dy_3$ is complete in apparatus embodying the present invention in contrast to that achieved with the prior art pinhole confocal microscope.

Broadband Operation

One of the significant features of the invention is that the enhanced reduction of the effects of background from out-of-focus images is operative when source 10 is a broadband source as required for the simultaneous imaging of multiple image point in the axial direction of probe lens 46. For the discussion of this feature, it is assumed for simplicity in the present disclosure that the aberration functions $W_i=1$ and that there is no apodization of the pupil functions $P_i$, i.e. no apodization of the phase shifters 14, 24, 34, 34a, and 44. Those skilled in the art will appreciate that when apodization is employed to modify the resolution, for example, the resulting mathematical expression for $U_S(v_3)$ will be more complicated, but nonetheless will generally retain the important features with regards for example to its symmetric or antisymmetric spatial properties.

The integration of Eq. (9) under the simplifying assumptions enunciated in the preceding paragraph and for the case of Level 1 discrimination yields $$U_S(v_2) = \left(\frac{1}{2}\right)\left(\frac{a'}{d_0}\right)(R_1 T_1)^{1/2} \int A(v_1) dv_1 \times \quad (42)$$

$$\int\int \text{sinc}[(a'/2d_0)(v_0 - v_1)] \times$$

$$\left\{\frac{\sin[m(v_0 - v_1)]}{m\sin[(1/2)(v_0 - v_1)]}\right\} a(v_0) t(v_0) a(v_0) \times$$

$$\text{sinc}[(a'/2d_0)(v_2 - v_0)]\left\{\frac{\sin[m(v_2 - v_0)]}{m\sin(v_2 - v_0)}\right\} \times$$

$$\sin[(1/2)(v_2 - v_0)]\exp(j2k\tilde{z}_S) dv_0 dz_0$$

where $\tilde{z}_0$ has been replaced by $\tilde{z}_S$, a' and $d_0$ are the width and the center to center distance, respectively, of the elements in phase shifters 14, 24, 34, and 34a and sinc x≡(sin x)/x. The $w_i$ dependence has been suppressed since it is not relevant in Level 1 discrimination to the reduction of the background from out-of-focus images, the spatial properties of $U_S(v_2)$ in the $v_2$ direction being arranged so as to obtain an enhanced reduction of the wavenumber-filtered, spatially-filtered background beam and as a consequence, a potential source of limitation on a broadband operation.

The corresponding expression for the amplitude of the reflected reference beam $U_R(v_2)$ is $$U_R(v_2) = \left(\frac{1}{2}\right)\left(\frac{a'}{d_0}\right)(T_1 R_1)^{1/2} \int A(v_1) dv_1 \times \quad (43)$$

$$\int \text{sinc}[(a'/2d_0)(v_0 - v_1)] \times$$

$$\left\{\frac{\sin[m(v_0 - v_1)]}{m\sin[(1/2)(v_0 - v_1)]}\right\} \text{sinc}[(a'/2d_0)(v_2 - v_0)] \times$$

$$\left\{\frac{\sin[m(v_2 - v_0)]}{m\sin(v_2 - v_0)}\right\} \sin[(1/2)(v_2 - v_0)]\exp(j2k\tilde{z}_R) dv_0$$

where $\tilde{z}_0$ has been replaced by $\tilde{z}_R$.

Lets consider the special case where $a'=d_0$. Eqs. (42) and (43) reduce for the special case to $$U_S(v_2) = \left(\frac{1}{2}\right)(R_1T_1)^{1/2} \int A(v_1)dv_1 \int \int 2\text{sinc}[m(v_0 - v_1)] \times \quad (44)$$
$$a(v_0)t(v_0)a(v_0) \times$$
$$\text{sinc}[(1/2)(v_2 - v_0)]\left\{\frac{\sin[m(v_2 - v_0)]}{m\sin(v_2 - v_0)}\right\} \times$$
$$\sin[(1/2)(v_2 - v_0)]\exp(j2k\bar{z}_S)dv_0 dz_0,$$

$$U_R(v_2) = \left(\frac{1}{2}\right)(T_1R_1)^{1/2} \int A(v_1)dv_1 \int 2\text{sinc}[m(v_0 - v_1)] \times \quad (45)$$
$$\text{sinc}[(1/2)(v_2 - v_0)]\left\{\frac{\sin[m(v_2 - v_0)]}{m\sin(v_2 - v_0)}\right\} \times$$
$$\sin[(1/2)(v_2 - v_0)]\exp(j2k\bar{z}_R)dv_0,$$

respectively.

The integration over $v_0$ in Eq. (45) can be performed with the result $$U_R(v_2) = \left(\frac{1}{2}\right)(T_1R_1)^{1/2} \int A(v_1)(1/m)\text{sinc}[(1/2)(v_2 - v_1)] \times \quad (46)$$
$$\left\{\frac{\sin[m(v_2 - v_1)]}{m\sin(v_2 - v_1)}\right\} \times$$
$$\sin[(1/2)(v_2 - v_1)]\exp(j2k\bar{z}_R)dv_1.$$

Figure 7:
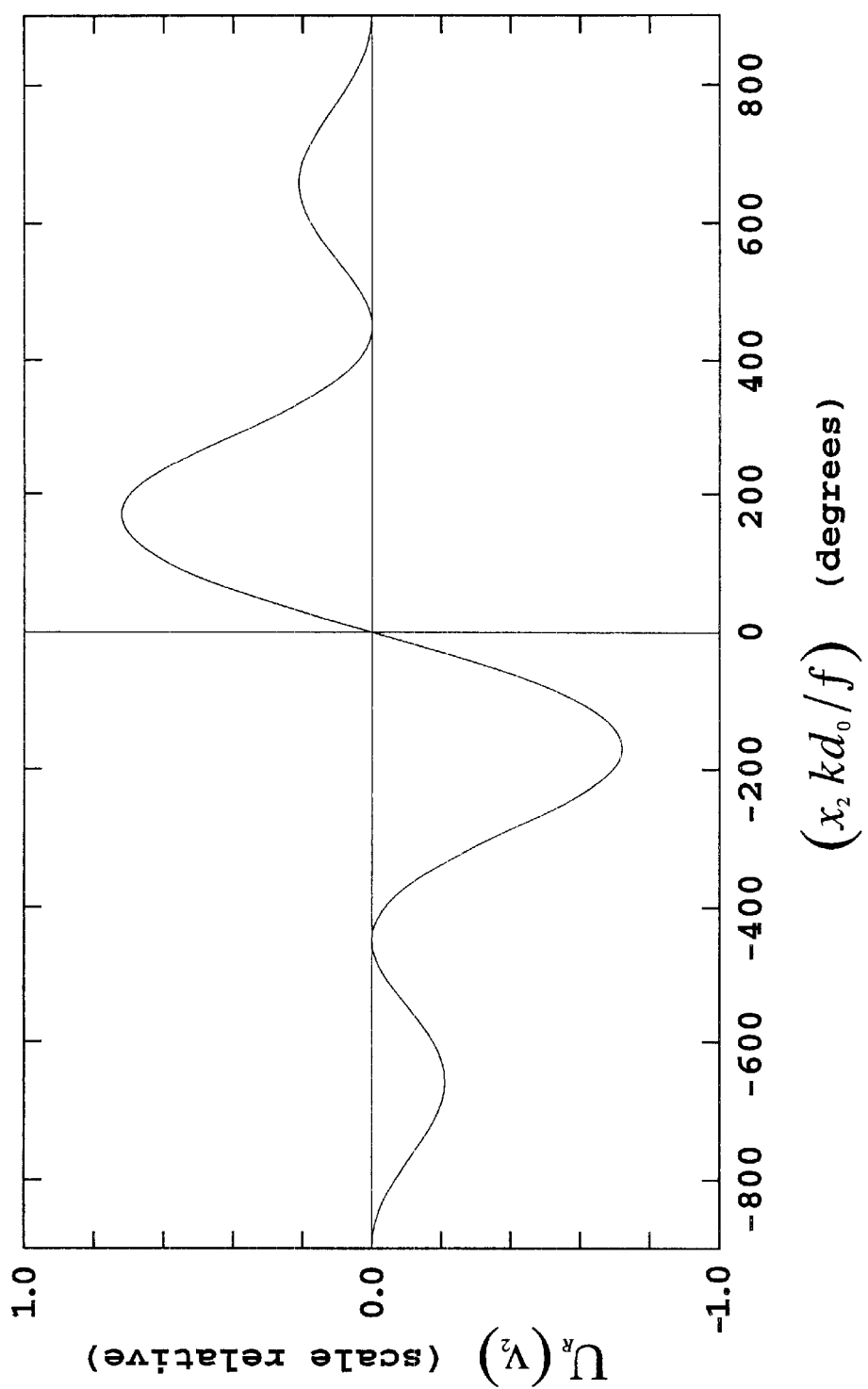
FIG. 7 is a graph depicting a reflected reference beam amplitude in the spatial filter pinhole plane in accordance with the four preferred embodiments and variants of the preferred embodiments of the present invention.

An example of $U_R(V_2)$ is shown in FIG. 7 for a two element phase shifting system (m=1) as a function of $(x_2 k d_0/f)$ for $y_2=0$, $z_2=0$, and $v_1=0$.

The antisymmetric spatial distribution of $U_R(V_2)$ about $v_1$ is clearly exhibited in Eq. (46) through the factor $\sin[(\frac{1}{2})(v_2-v_1)]$. The spatial distribution of $U_S(v_2)$ will in general display similar behavior since Eq. (44) is of the same mathematical structure as Eq. (45). It is this antisymmetric spatial distribution which is exploited in the preferential reduction of the amplitude of the background from out-of-focus images.

From system properties such as exhibited in Eq. (46), it is evident that for $U_S(v_2)$ given by Eq. (44), a high sensitivity is maintained for the in-focus image as long as the phase $(v_2-v_1)$ meets the condition that $$\sigma(v_2-v_1) \leq \pi/2m \quad (47)$$

where $[\sigma(q)]^2$ is the variance of argument q.

Contributions to the signals for given values of $(v_2-v_1)$ have a hyperbolic relationship between $(x_2-x_1)/f$ and k, $(v_2-v_1)$ being proportional to $k(x_2-x_1)/f$. Therefore a restriction may be placed on k so that the corresponding allowed values of k and $(x_2-x_1)/f$ will permit Eq. (47) to be satisfied and an image to be obtained with the detector that will yield an improved signal-to-noise ratio (with respect to strength of in-focus signals relative to strength of out-of-focus signals). From Eq. (47), we obtain the relationship $$(kd_0)^2\{\sigma[(x_2-x_1)/f]\}^2 + (kd_0)^2[(x_2-x_1)/f]^2\left(\frac{\sigma_k}{k}\right)^2 \leq \left(\frac{\pi}{2m}\right)^2. \quad (48)$$

Choosing for the discussion presented here to operate in a mode where each of the two terms on the left hand side of Eq. (48) contribute equally to the left side, we have $$(kd_0)\sigma[(x_2-x_1)/f] \leq \pi/2^{3/2}m \quad (49)$$

and $$(kd_0)[(x_2-x_1)/f]\left(\frac{\sigma_k}{k}\right) \leq \frac{\pi}{2^{3/2}m}. \quad (50)$$

An equation is obtained for $(\sigma_k/k)$ by combining Eq. (50) with the equation $$(v_2-v_1)=[kd_0(x_3-x_0)/f]=r\pi, \ r=1,3,\ldots \quad (51)$$

where $r\pi$ represents the subset of values of $(v_2-v_1)$ which give rise to peaks in the factor $$\left\{\frac{\sin[m(v_2-v_1)]}{m\sin(v_2-v_1)}\right\}. \quad (52)$$

The result is $$\left(\frac{\sigma_k}{k}\right) \leq \left(\frac{1}{2^{3/2}mr}\right). \quad (53)$$

It is evident from Eq. (53) that apparatus embodying the present invention is effective for relatively broadband operations in $\lambda$. For example, $(\sigma_k/k) \leq 0.35$ for m=1 and r=1 and $(\sigma_k/k) \leq 0.18$ for m=2 and r=1.

There is a limitation on the range of the values of r that may be effectively used. This limitation comes from consideration of signal-to-noise ratio. For each peak in the factor given by Eq. (52) that contributes to the observed signal, there is an improved signal strength. However, as the number of peaks included is increased and thus the maximum value of r, $r_{max}$, is increased, the bandwidth on k must be reduced according to Eq. (53).

There is also a restriction on the spacing between source pinholes when using Level 2 discrimination in either the second or fourth embodiments of the present invention and the respective variations to the detailed descriptions of the second and fourth embodiments. This restriction can be obtained using an analysis similar to the type of analysis of the section on broadband operation. From system properties such as exhibited in Eq. (46), it is evident that a high sensitivity for $U_S(v_2)$ is maintained for the in-focus image as long as $$\delta v_1 \geq 4\pi \quad (54)$$

where $\delta v_1$ is the spacing between contiguous pinholes of the respective linear array source of pinholes.

Note that the right hand side of the constraints expressed by Eqs. (49) and (50) do not depend explicitly on $x_1$ or $y_1$. Thus, apparatus embodying the present invention is affective for point like sources with no intrinsic restriction on the range of values for $x_1$ and $y_1$.

Observing Through a Turbid Medium

Another significant feature of the invention disclosed herein is that the enhanced reduction of the effects of background from out-of-focus images can be operative when observing through a turbulent medium. The impulse response function $h_{A,M}$ for observing through a turbulent medium is $$h_{A,M}=h_A*h_M \quad (55)$$

where $h_A$ is the impulse response function for the apparatus when observing through non turbulent medium, $h_M$ is the impulse response function for the turbulent medium, and * denotes the convolution of $h_A$ and $h_M$. The Fourier transform $F(h_A*h_M)$ of $h_A*h_M$ is $$F(h_{A,M}) = F(h_A)F(h_M). \tag{56}$$

The impulse response function $h_M$ is very well represented by a Gaussian distribution $$h_M(v_l - v_m) = \frac{1}{\sqrt{2\pi}\,\sigma} \exp\left[-\frac{(v_l - v_m)^2 + (w_l - w_m)^2}{2\sigma^2}\right] \tag{57}$$

where $\sigma^2$ is the variance of $h_M$.

The Fourier transform $F(h_M)$ of $h_M$ is given by $$F(h_M) = \exp\left(-\frac{q \cdot q\sigma^2}{2}\right) \tag{58}$$

where q is the angular spatial frequency vector conjugate to v. The lowest frequency peak in $h_A$ is located at the frequency $$q = 2\pi(d_0/\lambda). \tag{59}$$

It is apparent from Eqs. (56) and (58) that a relatively large value for $h_{A,M}$ is maintained at $q=(d_0/\lambda)$ when $$F(h_M) \geq (1/e) \tag{60}$$

or $$\frac{q \cdot q\sigma^2}{2} \leq 1. \tag{61}$$

Using equations (59) and (61), it follows that the values of $d_0$ that can be used are constrained by the condition $$d_0 \leq \frac{\lambda}{\sqrt{2}\,\pi\sigma}. \tag{62}$$

Thus, it is possible to configure the tomographic imaging system embodying the present invention to maintain a relatively high sensitivity for spatial frequencies below the cut off frequency imposed by $h_M$.

In accordance with the present invention it is recognized that for a reference beam amplitude of arbitrary spatial properties, the interference term between the amplitudes of the background light (i.e., the out-of-focus return probe beam) and the reference beam may dominate generation of undesired systematic errors and be important in generation of undesired statistical errors. The interference term between the amplitudes of the background light and the reference beam is reduced in the above embodiments of the invention because of the antisymmetric spatial properties produced in the reference beam by phase shifting. Since this interference term is reduced, it does not cause generation of unacceptably large systematic errors and statistical errors in data produced by each pixel of multi-pixel detector.

It is also recognized that the amplitude of the wavenumber-filtered, spatially-filtered reflected reference beam and the interference term between the wavenumber-filtered, spatially-filtered reflected reference beam and the wavenumber-filtered, spatially-filtered scattered probe beam (i.e., the "desired signal") are related. The reference beam is detected as the square of the amplitude of the wavenumber-filtered, spatially-filtered reflected reference beam. The wavenumber-filtered, spatially-filtered scattered probe beam is detected as the interference term between the wavenumber-filtered, spatially-filtered reflected reference beam and the wavenumber-filtered, spatially-filtered scattered probe beam, i.e., the amplitude of the wavenumber-filtered, spatially-filtered scattered probe beam multiplied by the amplitude of the wavenumber-filtered, spatially-filtered reflected reference beam. The detected wavenumber-filtered, spatially-filtered reflected reference beam and the detected wavenumber-filtered, spatially-filtered scattered probe beam therefore are related, because the amplitude of the wavenumber-filtered, spatially-filtered reflected reference beam is present in each. This relationship makes the determination of properties of the object material from such interference term more statistically accurate. Consequently, accurate characterization of the object material can be obtained from data produced by the multi-pixel detector in response to the interference term between the wavenumber-filtered, spatially-filtered reflected reference beam and the wavenumber-filtered, spatially-filtered scattered probe beam. This is because the statistical accuracy acquired for a given pixel of the multi-pixel detector is limited by the number of photoelectrons produced in the pixel in response to the square of the amplitude of the wavenumber-filtered, spatially-filtered scattered probe beam, but not in response to either the square of the amplitude of the wavenumber-filtered, spatially-filtered reflected reference beam or the square of the amplitude of the wavenumber-filtered, spatially-filtered background beam.

It will be further appreciated by those skilled in the art that alternative and/or additional optical elements and detectors may be incorporated into one of the disclosed embodiments of the present invention. For example, polarizing beam splitters alternatively may be used and or used with additional phase shifting elements to alter the properties of the radiation used to probe the object material. A further example would be the addition of a detector to monitor the intensity of the light source. These and other obvious modifications may be introduced without departing from the spirit and scope of the present invention.

It should also be appreciated that phase shifter 34 could be omitted for example in FIGS. 1a–1n, in which case the image of point light source 8 produced at image point 38 in the image plane 37 will be different than described above although the image of point light source 8 produced by the reflected reference beam at image point 48 in the image plane 47 will not be altered substantially from that described above. Nonetheless, the above described cancellation of out-of-focus images would be achieved. Similarly, phase shifter 34 could be omitted in FIGS. 2a–2f 2f and phase shifters 34 and 34a could be omitted in FIGS. 3a–3l and 4a–4f.

It should also be appreciated that spatial configurations of the phase shifter elements of phase shifters 14, 24, 34, and 34a may be different from that described above and/or apodized as long as the spatial distribution of the amplitude of the reflected reference beam in the single pixel detector plane produces a substantially spatially antisymmetric distribution. However, the image data produced by the multi-pixel detector may need to be processed slightly differently for the above described embodiments of the invention to produce the desired tomographic image of the object material 112.

It will be appreciated by those skilled the art that the interferometers of the embodiments and variants thereof described herein can be configured as confocal interferometric microscopy instruments functioning in the transmission mode without departing from the scope and spirit of the present invention. The transmission mode may be a preferred mode of operation for certain reading and writing modes of the present invention such as when detecting changes in polarization state of a probe beam.

It should further be appreciated that the interferometers of the embodiments described above could be of the polarizing type, for example for the purpose of probing the object material 112 with polarized light or for increasing the throughput of light through the interferometer to the single or multi-pixel detector. However, an additional optical element such as a polarizing beam splitter will need to be added to the apparatus described above for the purpose of mixing the reflected reference beam and the scattered probe beam at the single or multi-pixel detector.

What is claimed:

1. A method for discriminating an in-focus image from an out-of-focus image so as to reduce errors in information representing the in-focus image, comprising the steps of:

(a) producing a probe beam and a reference beam from an array of monochromatic point radiation sources;

(b) producing an in-focus return probe beam by directing the probe beam to an array of in-focus image points;

(c) producing antisymmetric spatial properties in the in-focus return probe beam;

(d) producing an in-focus reference beam;

(e) producing antisymmetric spatial properties in the in-focus reference beam;

(f) interfering the in-focus reference beam with a beam from a plurality of out-of-focus image points;

(g) interfering the in-focus reference beam with the in-focus return probe beam;

(h) reducing systematic and statistical errors in data produced by a detector to represent the information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam.

2. The method of claim 1 wherein the step (h) includes detecting the in-focus reference beam as a non-linear function of the amplitude of the in-focus reference beam and using that amplitude in determining the complex amplitude of the in-focus return probe beam from the amplitudes of the interference terms.

3. The method of claim 1 including providing an optical disk, wherein the array of in-focus image points is in and/or on the optical disk.

4. The method of claim 1 including providing in situ tissue of a human or animal subject, wherein the array of in-focus image points is in and/or on the in situ tissue.

5. The method of claim 1 including providing excised biopsy tissue of a human or animal subject, wherein the array of in-focus image points is in and/or on the excised biopsy tissue.

6. The method of claim 1 including providing a reference surface having a fixed relationship to the array of in-focus image points and performing steps (b) through (h) for in-focus reference image points located on the reference surface, and determining locations of the array of in-focus image points relative to the reference surface.

7. The method of claim 3 including providing relative mechanical translation between an optical disk and the probe beam to allow steps (b) through (h) to be performed for other portions of the optical disk at the in-focus image points.

8. A method for discriminating an in-focus image from an out-of-focus image so as to reduce errors in information representative of the in-focus image, comprising the steps of:

(a) producing a probe beam and a reference beam from an array of monochromatic point radiation sources;

(b) producing an in-focus return probe beam by directing the probe beam to an array of in-focus image points, the in-focus return probe beam including a plurality of in-focus return sub-beams, each in-focus return sub-beam being associated with at least one in-focus image point of the array;

(c) producing antisymmetric spatial properties in each in-focus return sub-beam;

(d) producing an in-focus reference beam including a plurality of in-focus reference sub-beams, each in-focus reference sub-beam being associated with an in-focus return sub-beam, respectively;

(e) producing antisymmetric spatial properties in each in-focus reference sub-beam;

(f) interfering the in-focus reference beam with a beam from a plurality of out-of-focus image points;

(g) interfering the in-focus reference beam with the in-focus return probe beam;

(h) reducing systematic and statistical errors in data produced by a detector array to represent the information being determined by detecting the complex amplitudes of the in-focus return sub-beams as interference data by means of detector elements, respectively, of the detector array wherein the interference data comprises interference terms between corresponding in-focus reference sub-beams and in-focus return probe sub-beams and other interference terms of substantially reduced amplitudes between out-of-focus image beams associated with out-of-focus image points, respectively, and corresponding in-focus reference sub-beams.

9. The method of claim 8 wherein the step (h) includes detecting the in-focus reference beam as a non-linear function of the amplitude of the in-focus reference beam and using that amplitude in determining the complex amplitude of the in-focus return probe beam from the amplitudes of the interference terms.

10. A method for discriminating an in-focus image from an out-of-focus image so as to reduce errors in information representative of the in-focus image, comprising the steps of:

(a) producing a probe beam and a reference beam from a wideband point radiation source;

(b) producing an in-focus reference beam;

(c) producing antisymmetric spatial properties in the in-focus reference beam;

(d) passing the probe beam through a dispersal element to convert the probe beam to a beam focused to a target line;

(e) producing an in-focus return probe beam;

(f) producing antisymmetric spatial properties in the in-focus return probe beam;

(g) spatially filtering the in-focus return probe beam;

(h) passing the spatially filtered in-focus return probe beam through a dispersal element to convert it to a beam focused to a line in a detector plane of a detector;

(i) spatially filtering the in-focus reference beam;

(j) passing the spatially filtered in-focus reference beam through a dispersal element to convert it to a beam focused to the line in the detector plane;

(k) spatially filtering a beam from a plurality of out-of-focus image points;

(l) passing the spatially filtered beam from the plurality of out-of-focus image points through a dispersal element;

(m) interfering the spatially filtered in-focus reference beam with the spatially filtered beam from the out-of-focus image points;

(n) interfering the spatially filtered in-focus reference beam with the spatially filtered in-focus return probe beam; and (o) reducing systematic and statistical errors in data produced by a detector to represent the information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam.

11. The method of claim 10 wherein the step (o) includes detecting the in-focus reference beam as a non-linear function of the amplitude of the in-focus reference beam and using that amplitude in determining the complex amplitude of the in-focus return probe beam from the amplitudes of the interference terms.

12. The method of claim 10 including providing an optical disk, wherein the target line is in and/or on the optical disk.

13. The method of claim 10 including providing in situ tissue of a human or animal subject, wherein the target line is in and/or on the in situ tissue.

14. The method of claim 10 including providing excised biopsy tissue of a human or animal subject, wherein the target line is in and/or on the excised biopsy tissue.

15. The method of claim 10 wherein step (a) includes producing the probe beam and the reference beam from an array of wideband point radiation sources.

16. The method of claim 10 including providing a reference surface near or on the target line and performing steps (b) through (o) for in-focus reference image points located on the reference surface and determining locations of the in-focus image points near or on the target line relative to the reference surface.

17. The method of claim 12 including providing relative mechanical translation between the optical disk and the probe beam to allow steps (b) through (o) to be performed for other portions of the optical disk at the target line.

18. The method of claim 12 wherein step (d) includes passing the probe beam through at least one grating wherein the target line is substantially parallel to a major surface of the optical disk.

19. The method of claim 12 wherein the target line of step (d) is substantially perpendicular to a major surface of the optical disk.

20. The method of claim 19 including performing Fourier transforms on the data produced by the detector to convert the interferometric data to determine information stored at predetermined depths along the target line.

21. A method for discriminating an in-focus image from an out-of-focus image so as to reduce errors in determining information represented by information representative of the in-focus image, comprising the steps of:

(a) producing a probe beam and a reference beam from a wideband point radiation source;

(b) producing an in-focus reference beam;

(c) producing antisymmetric spatial properties in the in-focus reference beam;

(d) converting the probe beam to a beam focused to a target line;

(e) producing an in-focus return probe beam;

(f) producing antisymmetric spatial properties in the in-focus return probe beam;

(g) spatially filtering the in-focus return probe beam;

(h) converting the spatially filtered in-focus return probe beam to a beam focused to a line in a detector plane of a detector;

(i) spatially filtering the in-focus reference beam;

(j) converting the spatially filtered in-focus reference beam to a beam focused to the line in the detector plane;

(k) spatially filtering a beam from a plurality of out-of-focus image points;

(l) interfering the converted spatially filtered in-focus reference beam with the spatially filtered beam from the plurality of out-of-focus image points;

(m) interfering the converted spatially filtered in-focus reference beam with the converted spatially filtered in-focus return probe beam; and (n) reducing errors in data produced by the detector to represent the information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam.

22. The method of claim 21 wherein the step (n) includes detecting the converted spatially filtered in-focus reference beam as a non-linear function of the amplitude of the converted spatially filtered in-focus reference beam and using that amplitude in determining the complex amplitude of the in-focus return probe beam from the amplitude of the interference term.

23. The method of claim 21 including providing an optical disk, wherein the target line is in and/or on the optical disk.

24. The method of claim 21 including providing in situ tissue of a human or animal subject, wherein the target line is in and/or on the in situ tissue.

25. The method of claim 21 including providing excised biopsy tissue of a human or animal subject, wherein the target line is in and/or on the excised biopsy tissue.

26. The method of claim 21 wherein step (a) includes producing the probe beam and the reference beam from an array of wideband point radiation sources.

27. The method of claim 21 including providing a reference surface in fixed relationship to the target line and performing steps (b) through (n) for in-focus reference image points located on the reference surface, and determining the location of the target line relative to the reference surface.

28. The method of claim 21 including providing relative mechanical translation between the substance and the probe beam to allow steps (b) through (n) to be performed for other portions of the substance.

29. The method of claim 23 wherein step (d) includes passing the probe beam through at least one grating, wherein the target line is substantially parallel to a major surface of the optical disk.

30. The method of claim 21 including performing Fourier transforms on the interferometric data produced by the detector to convert the data to determine information representative of conditions at predetermined points along the target line.

31. The method of claim 23 wherein the target line is substantially perpendicular to a major surface of the optical disk.

32. A system for use in profiling the surface of a wafer, the system comprising:
    (a) a stage for supporting the wafer;
    (b) an illumination system for imaging spatially patterned radiation onto the wafer;
    (c) a gauged positioning control system for adjusting the position of the stage relative to the imaged radiation;
    (d) an interferometry system for measuring the position of the wafer relative to the imaged radiation; and
    (e) an identification mark sub-system for identifying an alignment mark in an information-bearing region, the identification mark sub-system including means for discriminating an in-focus image of an information-bearing region in and/or on a substance from an out-of-focus image so as to reduce errors in determining information represented by the information-bearing region in and/or on the substance, the discriminating means including
        (1) means for producing a probe beam and a reference beam from an array of monochromatic point radiation sources,
        (2) means for producing an in-focus return probe beam by directing the probe beam to an array of in-focus image points,
        (3) means for producing antisymmetric spatial properties in the in-focus return probe beam,
        (4) means for producing an in-focus reference beam,
        (5) means for producing antisymmetric spatial properties in the in-focus reference beam,
        (6) means for interfering the in-focus reference beam with a beam from a plurality of out-of-focus image points,
        (7) means for interfering the in-focus reference beam with the in-focus return probe beam, and
        (8) means for reducing systematic and statistical errors in data produced by a detector to represent the information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam.

33. A metrology system for use in measuring overlay accuracy of a lithography stepper or scanner in fabricating an integrated circuit on a wafer, the metrology system comprising:
    (a) a gauge-controlled stage for measuring the relative positions of a first pattern in a first information-bearing region on a first level of the integrated circuit and a second pattern in a second information-bearing region on a second level of the integrated circuit;
    (b) a wafer handling system including the stage, for supporting the wafer; and
    (c) a microscope system for viewing the patterns to compare the relative positions of the first pattern and the second pattern, the microscope including
        (1) means for producing a probe beam and a reference beam from an array of monochromatic point radiation sources,
        (2) means for producing an in-focus return probe beam by directing the probe beam to an array of in-focus image points,
        (3) means for producing antisymmetric spatial properties in the in-focus return probe beam,
        (4) means for producing an in-focus reference beam,
        (5) means for producing antisymmetric spatial properties in the in-focus reference beam,
        (6) means for interfering the in-focus reference beam with a beam from a plurality of out-of-focus image points,
        (7) means for interfering the in-focus reference beam with the in-focus return probe beam, and
        (8) means for reducing systematic and statistical errors in data produced by a detector to represent information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam.

34. A metrology system for use in measuring defects in a mask to be used in fabrication of an integrated circuit, the metrology system comprising:
    (a) a gauge-controlled stage for supporting the mask;
    (b) a microscope system for imaging the mask and producing a first digital representation of pattern features of the mask, the microscope system including
        (1) means for producing a probe beam and a reference beam from an array of monochromatic point radiation sources,
        (2) means for producing an in-focus return probe beam by directing the probe beam to an array of in-focus image points,
        (3) means for producing antisymmetric spatial properties in the in-focus return probe beam,
        (4) means for producing an in-focus reference beam,
        (5) means for producing antisymmetric spatial properties in the in-focus reference beam,
        (6) means for interfering the in-focus reference beam with a beam from a plurality of out-of-focus image points,
        (7) means for interfering the in-focus reference beam with the in-focus return probe beam, and
        (8) means for reducing systematic and statistical errors in data produced by a detector to represent information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam;

(c) a memory system for storing an accurate second digital representation of the pattern features of the mask; and (d) a processor coupled to the memory system and the microscope system for comparing the first and second digital representations of the mask image to determine defects of the mask.

35. The metrology system of claim 34 wherein the second digital representation represents the pattern features of an ideal mask.

36. The metrology system of claim 34 wherein the second digital representation includes data obtained by operating the microscope system to image a reference mask having essentially no defects.

37. A system for producing an image of an information-bearing region with reduced sensitivity to motion of a substance containing the information-bearing region, the system comprising:

(a) a support structure supporting the substance;

(b) a microscope system for imaging the information-bearing region, the microscope system including
  (1) means for producing a probe beam and a reference beam from an array of monochromatic point radiation sources,
  (2) means for producing an in-focus return probe beam by directing the probe beam to an array of in-focus image points,
  (3) means for producing antisymmetric spatial properties in the in-focus return probe beam,
  (4) means for producing an in-focus reference beam,
  (5) means for producing antisymmetric spatial properties in the in-focus reference beam,
  (6) means for interfering the in-focus reference beam with a beam from a plurality of out-of-focus image points,
  (7) means for interfering the in-focus reference beam with the in-focus return probe beam, and
  (8) means for reducing systematic and statistical errors in data produced by a detector to represent information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam, wherein a predetermined one-dimensional or two-dimensional section of the information-bearing region produced by the microscope system is substantially independent of motion of the substance relative to the microscope system.

38. The system of claim 37 wherein all of the image points of a predetermined one-dimensional or two-dimensional section of the information-bearing region are acquired substantially simultaneously.

39. A system for producing an image of an information bearing surface of a substance having an external surface to control a spatial relationship between the system and the external surface, the system comprising;

a) a support structure supporting the substance;

b) a microscope system for imaging the profile of the external surface and determining the spatial relationship between the external surface and the system, the microscope system including (1) means for producing a probe beam and a reference beam from an array of monochromatic point radiation sources, (2) means for producing an in-focus return probe beam by directing the probe beam to an array of in-focus image points, (3) means for producing antisymmetric spatial properties in the in-focus return probe beam, (4) means for producing an in-focus reference beam, (5) means for producing antisymmetric spatial properties in the in-focus reference beam, (6) means for interfering the in-focus reference beam with a beam from a plurality of out-of-focus image points, (7) means for interfering the in-focus reference beam with the in-focus return probe beam, and (8) means for reducing systematic and statistical errors in data produced by a detector to represent information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam; and c) a processor controlling the location of the microscope system relative to the external surface in accordance with the determined spatial relationship to prevent physical contact of the microscope system with the external surface.

40. The system of claim 39 wherein the processor controls the location of the microscope system on a real time basis.

41. The system of claim 40 wherein the processor operates to maintain the microscope system at least a predetermined distance from the external surface.

42. A system for use in fabricating integrated circuitry on a wafer, the system comprising:

(a) a stage for supporting the wafer;

(b) an illumination system for imaging spatially patterned radiation onto the wafer;

(c) a gauged positioning control system for adjusting the position of the stage relative to the imaged radiation;

(d) an interferometry system for measuring the position of the wafer relative to the imaged radiation; and (e) an identification mark sub-system for identifying an alignment mark in an information-bearing region, the identification mark sub-system including means for discriminating an in-focus image of an information-bearing region in and/or on a substance from an out-of-focus image so as to reduce errors in determining information represented by the information-bearing region in and/or on the substance, the discriminating means including (1) means for producing a probe beam and a reference beam from a wideband point radiation source, (2) means for producing an in-focus reference beam, (3) means for producing antisymmetric spatial properties in the in-focus reference beam, (4) means for passing the probe beam through a dispersal element to convert the probe beam to a beam focused to a target line in the information-bearing region, (5) means for producing an in-focus return probe beam, (6) means for producing antisymmetric spatial properties in the in-focus return probe beam,
(7) means for spatially filtering the in-focus return probe beam,
(8) means for passing the spatially filtered in-focus return probe beam through a dispersal element to convert it to a beam focused to a line in a detector plane of a detector,
(9) means for spatially filtering the in-focus reference beam,
(10) means for passing the spatially filtered in-focus reference beam through a dispersal element to convert it to a beam focused to the line in the detector plane,
(11) means for spatially filtering a beam from a plurality of out-of-focus image points,
(12) means for passing the spatially filtered beam from the plurality of out-of-focus image points through a dispersal element,
(13) means for interfering the spatially filtered in-focus reference beam with the spatially filtered beam from the out-of-focus image points,
(14) means for interfering the spatially filtered in-focus reference beam with the spatially filtered in-focus return probe beam, and
(15) means for reducing systematic and statistical errors in data produced by a detector to represent information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam.

43. A metrology system for use in measuring overlay accuracy of a lithography stepper or scanner in fabricating an integrated circuit on a wafer, the metrology system comprising:
(a) a gauge-controlled stage for measuring the relative positions of a first pattern in a first information-bearing region on a first level of the integrated circuit and a second pattern in a second information-bearing region on a second level of the integrated circuit;
(b) a wafer handling system including the stage, for supporting the wafer; and
(c) a microscope system for viewing the patterns, the microscope system including
    (1) means for producing a probe beam and a reference beam from a wideband point radiation source,
    (2) means for producing an in-focus reference beam,
    (3) means for producing antisymmetric spatial properties in the in-focus reference beam,
    (4) means for passing the probe beam through a dispersal element to convert the probe beam to a beam focused to a target line in the information-bearing region,
    (5) means for producing an in-focus return probe beam,
    (6) means for producing antisymmetric spatial properties in the in-focus return probe beam,
    (7) means for spatially filtering the in-focus return probe beam,
    (8) means for passing the spatially filtered in-focus return probe beam through a dispersal element to convert it to a beam focused to a line in a detector plane of a detector,
    (9) means for spatially filtering the in-focus reference beam,
    (10) means for passing the spatially filtered in-focus reference beam through a dispersal element to convert it to a beam focused to the line in the detector plane,
    (11) means for spatially filtering a beam from a plurality of out-of-focus image points,
    (12) means for passing the spatially filtered beam from the plurality of out-of-focus image points through a dispersal element,
    (13) means for interfering the spatially filtered in-focus reference beam with the spatially filtered beam from the out-of-focus image points,
    (14) means for interfering the spatially filtered in-focus reference beam with the spatially filtered in-focus return probe beam, and
    (15) means for reducing systematic and statistical errors in data produced by a detector to represent information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam.

44. A metrology system for use in measuring defects in a mask to be used in fabrication of an integrated circuit, the metrology system comprising:
(a) a gauge-controlled stage for supporting the mask;
(b) a microscope system for imaging the mask and producing a first digital representation of pattern features of the mask, the microscope system including
    (1) means for producing a probe beam and a reference beam from a wideband point radiation source,
    (2) means for producing an in-focus reference beam,
    (3) means for producing antisymmetric spatial properties in the in-focus reference beam,
    (4) means for passing the probe beam through a dispersal element to convert the probe beam to a beam focused to a target line in the information-bearing region,
    (5) means for producing an in-focus return probe beam,
    (6) means for producing antisymmetric spatial properties in the in-focus return probe beam,
    (7) means for spatially filtering the in-focus return probe beam,
    (8) means for passing the spatially filtered in-focus return probe beam through a dispersal element to convert it to a beam focused to a line in a detector plane of a detector,
    (9) means for spatially filtering the in-focus reference beam,
    (10) means for passing the spatially filtered in-focus reference beam through a dispersal element to convert it to a beam focused to the line in the detector plane,
    (11) means for spatially filtering a beam from a plurality of out-of-focus image points,
    (12) means for passing the spatially filtered beam from the plurality of out-of-focus image points through a dispersal element,

(13) means for interfering the spatially filtered in-focus reference beam with the spatially filtered beam from the out-of-focus image points,

(14) means for interfering the spatially filtered in-focus reference beam with the spatially filtered in-focus return probe beam, and

(15) means for reducing systematic and statistical errors in data produced by a detector to represent information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam;

(c) a memory system for storing an accurate second digital representation of the pattern features of the mask; and (d) a processor coupled to the memory system and the microscope system for comparing the first and second digital representations of the mask image to determine defects of the mask.

45. The metrology system of claim 44 wherein the second digital representation includes data representing the pattern features of an ideal mask.

46. The metrology system of claim 44 wherein the second digital representation includes data obtained by operating the microscope system to image a reference mask having essentially no defects.

47. A system for producing an image of an information-bearing region, with reduced sensitivity to motion of a substance containing the information-bearing region, the system comprising:

(a) a support structure supporting the substance;

(b) a microscope system for imaging the information-bearing region, the microscope system including (1) means for producing a probe beam and a reference beam from a wideband point radiation source, (2) means for producing an in-focus reference beam, (3) means for producing antisymmetric spatial properties in the in-focus reference beam, (4) means for passing the probe beam through a dispersal element to convert the probe beam to a beam focused to a target line in the information-bearing region, (5) means for producing an in-focus return probe beam, (6) means for producing antisymmetric spatial properties in the in-focus return probe beam, (7) means for spatially filtering the in-focus return probe beam, (8) means for passing the spatially filtered in-focus return probe beam through a dispersal element to convert it to a beam focused to a line in a detector plane of a detector, (9) means for spatially filtering the in-focus reference beam,

(10) means for passing the spatially filtered in-focus reference beam through a dispersal element to convert it to a beam focused to the line in the detector plane,

(11) means for spatially filtering a beam from a plurality of out-of-focus image points,

(12) means for passing the spatially filtered beam from the plurality of out-of-focus image points through a dispersal element,

(13) means for interfering the spatially filtered in-focus reference beam with the spatially filtered beam from the out-of-focus image points,

(14) means for interfering the spatially filtered in-focus reference beam with the spatially filtered in-focus return probe beam, and

(15) means for reducing systematic and statistical errors in data produced by a detector to represent information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam, wherein a predetermined one-dimensional or two-dimensional section of the information-bearing region produced by the microscope system is substantially independent of motion of the substance relative to the microscope system.

48. The system of claim 47 wherein all of the image points of a predetermined one-dimensional or two-dimensional section of the information-bearing region are acquired substantially simultaneously.

49. A system for producing an image of an information bearing surface of a substance having an external surface to control a spatial relationship between the system and the external surface, the system comprising;

a) a support structure supporting the substance;

b) a microscope system for imaging the profile of the external surface and determining the spatial relationship between the external surface and the system, the microscope system including (1) means for producing a probe beam and a reference beam from a wideband point radiation source, (2) means for producing an in-focus reference beam, (3) means for producing antisymmetric spatial properties in the in-focus reference beam, (4) means for passing the probe beam through a dispersal element to convert the probe beam to a beam focused to a target line in the information-bearing region, (5) means for producing an in-focus return probe beam, (6) means for producing antisymmetric spatial properties in the in-focus return probe beam, (7) means for spatially filtering the in-focus return probe beam, (8) means for passing the spatially filtered in-focus return probe beam through a dispersal element to convert it to a beam focused to a line in a detector plane of a detector, (9) means for spatially filtering the in-focus reference beam,

(10) means for passing the spatially filtered in-focus reference beam through a dispersal element to convert it to a beam focused to the line in the detector plane,

(11) means for spatially filtering a beam from a plurality of out-of-focus image points,

(12) means for passing the spatially filtered beam from the plurality of out-of-focus image points through a dispersal element,

(13) means for interfering the spatially filtered in-focus reference beam with the spatially filtered beam from the out-of-focus image points,

(14) means for interfering the spatially filtered in-focus reference beam with the spatially filtered in-focus return probe beam, and

(15) means for reducing systematic and statistical errors in data produced by a detector to represent information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam; and c) a processor controlling the location of the microscope system relative to the external surface in accordance with the determined spatial relationship to prevent physical contact of the microscope system with the external surface.

50. The system of claim 49 wherein the processor controls the location of the microscope system on a real time basis.

51. The system of claim 50 wherein the processor operates to maintain the microscope system at least a predetermined distance from the external surface.

52. A system for use in fabricating integrated circuitry on a wafer, the system comprising:

(a) a stage for supporting the wafer;

(b) an illumination system for imaging spatially patterned radiation onto the wafer;

(c) a gauged positioning control system for adjusting the position of the stage relative to the imaged radiation;

(d) an interferometry system for measuring the position of the wafer relative to the imaged radiation; and (e) an identification mark sub-system for identifying an alignment mark in an information-bearing region, the identification mark sub-system including means for discriminating an in-focus image of an information-bearing region in and/or on a substance from an out-of-focus image so as to reduce errors in determining information represented by the information-bearing region in and/or on the substance, the discriminating means including (1) means for producing a probe beam and a reference beam from a wideband point radiation source, (2) means for producing an in-focus reference beam, (3) means for producing antisymmetric spatial properties in the in-focus reference beam, (4) means for converting the probe beam to a beam focused to a target line in the information-bearing region, (5) means for producing an in-focus return probe beam, (6) means for producing antisymmetric spatial properties in the in-focus return probe beam, (7) means for spatially filtering the in-focus return probe beam, (8) means for converting the spatially filtered in-focus return probe beam to a beam focused to a line in a detector plane of a detector, (9) means for spatially filtering the in-focus reference beam,

(10) means for converting the spatially filtered in-focus reference beam to a beam focused to the line in the detector plane,

(11) means for spatially filtering a beam from a plurality of out-of-focus image points,

(12) means for interfering the converted spatially filtered in-focus reference beam with the spatially filtered beam from the plurality of out-of-focus image points,

(13) means for interfering the converted spatially filtered in-focus reference beam with the converted spatially filtered in-focus return probe beam, and

(14) means for reducing errors in data produced by the detector to represent information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam.

53. A metrology system for use in measuring overlay accuracy of a lithography stepper or scanner in fabricating an integrated circuit on a wafer, the metrology system comprising:

(a) a gauge-controlled stage for measuring the relative positions of a first pattern in a first information-bearing region on a first level of the integrated circuit and a second pattern in a second information-bearing region on a second level of the integrated circuit;

(b) a wafer handling system including the stage, for supporting the wafer; and (c) a microscope system for viewing the patterns to compare the relative positions of the first pattern and the second pattern, the microscope system including (1) means for producing a probe beam and a reference beam from a wideband point radiation source, (2) means for producing an in-focus reference beam, (3) means for producing antisymmetric spatial properties in the in-focus reference beam, (4) means for converting the probe beam to a beam focused to a target line in the information-bearing region, (5) means for producing an in-focus return probe beam, (6) means for producing antisymmetric spatial properties in the in-focus return probe beam, (7) means for spatially filtering the in-focus return probe beam, (8) means for converting the spatially filtered in-focus return probe beam to a beam focused to a line in a detector plane of a detector, (9) means for spatially filtering the in-focus reference beam,

(10) means for converting the spatially filtered in-focus reference beam to a beam focused to the line in the detector plane,

(11) means for spatially filtering a beam from a plurality of out-of-focus image points,

(12) means for interfering the converted spatially filtered in-focus reference beam with the spatially filtered beam from the plurality of out-of-focus image points,

(13) means for interfering the converted spatially filtered in-focus reference beam with the converted spatially filtered in-focus return probe beam, and

(14) means for reducing errors in data produced by the detector to represent information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam.

54. A metrology system for use in measuring defects in a mask to be used in fabrication of an integrated circuit, the metrology system comprising:
   (a) a gauge-controlled stage for supporting the mask;
   (b) a microscope system for imaging the mask and producing a first digital representation of pattern features of pattern features of the mask, the microscope system including
      (1) means for producing a probe beam and a reference beam from a wideband point radiation source,
      (2) means for producing an in-focus reference beam,
      (3) means for producing antisymmetric spatial properties in the in-focus reference beam,
      (4) means for converting the probe beam to a beam focused to a target line in the information-bearing region,
      (5) means for producing an in-focus return probe beam,
      (6) means for producing antisymmetric spatial properties in the in-focus return probe beam,
      (7) means for spatially filtering the in-focus return probe beam,
      (8) means for converting the spatially filtered in-focus return probe beam to a beam focused to a line in a detector plane of a detector,
      (9) means for spatially filtering the in-focus reference beam,
      (10) means for converting the spatially filtered in-focus reference beam to a beam focused to the line in the detector plane,
      (11) means for spatially filtering a beam from a plurality of out-of-focus image points,
      (12) means for interfering the converted spatially filtered in-focus reference beam with the spatially filtered beam from the plurality of out-of-focus image points,
      (13) means for interfering the converted spatially filtered in-focus reference beam with the converted spatially filtered in-focus return probe beam, and
      (14) means for reducing errors in data produced by the detector to represent information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam;
   (c) a memory system for storing an accurate second digital representation of the pattern features of the mask; and
   (d) a processor coupled to the memory system and the microscope system for comparing the first and second digital representations of the mask image to determine defects of the mask.

55. The metrology system of claim 54 wherein the second digital representation includes data representing the pattern features of an ideal mask.

56. The metrology system of claim 54 wherein the second digital representation includes data obtained by operating the microscope system to image a reference mask having essentially no defects.

57. A system for producing an image of an information-bearing region, with reduced sensitivity to motion of a substance containing the information-bearing region, the system comprising:
   (a) a support structure supporting the substance;
   (b) a microscope system for imaging the information-bearing region, the microscope system including
      (1) means for producing a probe beam and a reference beam from a wideband point radiation source,
      (2) means for producing an in-focus reference beam,
      (3) means for producing antisymmetric spatial properties in the in-focus reference beam,
      (4) means for converting the probe beam to a beam focused to a target line in the information-bearing region,
      (5) means for producing an in-focus return probe beam,
      (6) means for producing antisymmetric spatial properties in the in-focus return probe beam,
      (7) means for spatially filtering the in-focus return probe beam,
      (8) means for converting the spatially filtered in-focus return probe beam to a beam focused to a line in a detector plane of a detector,
      (9) means for spatially filtering the in-focus reference beam,
      (10) means for converting the spatially filtered in-focus reference beam to a beam focused to the line in the detector plane,
      (11) means for spatially filtering a beam from a plurality of out-of-focus image points,
      (12) means for interfering the converted spatially filtered in-focus reference beam with the spatially filtered beam from the plurality of out-of-focus image points,
      (13) means for interfering the converted spatially filtered in-focus reference beam with the converted spatially filtered in-focus return probe beam, and
      (14) means for reducing errors in data produced by the detector to represent information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam, wherein a predetermined one-dimensional or two-dimensional section of the information-bearing region produced by the microscope system is substantially independent of motion of the substance relative to the microscope system.

58. The system of claim 57 wherein all of the image points of a predetermined one-dimensional or two-dimensional section of the information-bearing region are acquired substantially simultaneously.

59. A system for producing an image of an information surface of a substance having an external surface to control a spatial relationship between the system and the external surface, the system comprising;

a) a support structure supporting the substance;
b) a microscope system for imaging the profile of the external surface and determining the spatial relationship between the external surface and the system, the microscope system including
   (1) means for producing a probe beam and a reference beam from a wideband point radiation source,
   (2) means for producing an in-focus reference beam,
   (3) means for producing antisymmetric spatial properties in the in-focus reference beam,
   (4) means for converting the probe beam to a beam focused to a target line in the information-bearing region,
   (5) means for producing an in-focus return probe beam,
   (6) means for producing antisymmetric spatial properties in the in-focus return probe beam,
   (7) means for spatially filtering the in-focus return probe beam,
   (8) means for converting the spatially filtered in-focus return probe beam to a beam focused to a line in a detector plane of a detector,
   (9) means for spatially filtering the in-focus reference beam,
   (10) means for converting the spatially filtered in-focus reference beam to a beam focused to the line in the detector plane,
   (11) means for spatially filtering a beam from a plurality of out-of-focus image points,
   (12) means for interfering the converted spatially filtered in-focus reference beam with the spatially filtered beam from the plurality of out-of-focus image points,
   (13) means for interfering the converted spatially filtered in-focus reference beam with the converted spatially filtered in-focus return probe beam, and
   (14) means for reducing errors in data produced by the detector to represent information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam; and
c) a processor controlling the location of the microscope system relative to the external surface in accordance with the determined spatial relationship to prevent physical contact of the microscope system with the external surface.

60. The system of claim 59 wherein the processor controls the location of the microscope system on a real time basis.

61. The system of claim 60 wherein the processor operates to maintain the microscope system at least a predetermined distance from the external surface.

62. The method of claim 4 including providing relative mechanical translation between in situ tissue of a human or animal subject and the probe be to allow steps (b) through (h) to be performed for other portions of the in situ tissue at the in-focus image points.

63. The method of claim 5 including providing relative mechanical translation between excise biopsy tissue of a human or animal subject and the probe beam to allow steps (b) through (h) to be performed for other portions of the in situ tissue at the in-focus image points.

64. The method of claim 13 including providing relative mechanical translation between the in situ tissue and the probe beam to allow steps (b) through (o) to be performed for other portions of the in situ tissue at the target line.

65. The method of claim 14 including providing relative mechanical translation between the excised biopsy tissue and the probe beam to allow steps (b) through (o) to be performed for other portions of the excised biopsy tissue at the target line.

66. The method of claim 13 wherein step (d) includes passing the probe beam through at least one grating wherein the target line is substantially parallel to a major surface of the in situ tissue.

67. The method of claim 14 wherein step (d) includes passing the probe beam through at least one grating wherein the target line is substantially parallel to a major surface of the excised biopsy tissue.

68. The method of claim 13 wherein the target line of step (d) is substantially perpendicular to a major surface of the in situ tissue.

69. The method of claim 14 wherein the target line of step (d) is substantially perpendicular to a major surface of the excised biopsy tissue.

70. The method of claim 21 including providing a substance, wherein the target line is in and/or on the substance.

71. The method of claim 70 wherein step (d) includes passing the probe beam through at least one grating, wherein the target line is substantially parallel to a major surface of the substance.

72. The method of claim 70 wherein the target line is substantially perpendicular to a major surface of the substance.

73. The method of claim 72 wherein the substance includes one of the group including an optical disk, in situ tissue of a human or animal subject, and excised biopsy tissue of a human or animal subject.

74. A method for discriminating an in-focus image of an information-bearing region in and/or on a substance from an out-of-focus image so as to reduce errors in determining information represented by the information-bearing region in and/or on the substance, comprising the steps of:
   (a) producing a probe beam and a reference beam from an array of monochromatic point radiation sources;
   (b) producing an in-focus return probe beam by directing the probe beam to an array of in-focus image points;
   (c) producing antisymmetric spatial properties in the in-focus return probe beam;
   (d) producing an in-focus reference beam;
   (e) producing antisymmetric spatial properties in the in-focus reference beam;
   (f) interfering the in-focus reference beam with a beam from a plurality of out-of-focus image points;
   (g) interfering the in-focus reference beam with the in-focus return probe beam;
   (h) reducing systematic and statistical errors in data produced by a detector to represent the information being determined by detecting the complex amplitude of the in-focus return probe beam as interference data by means of detector elements of the detector wherein the interference data comprises an interference term between the in-focus reference beam and the in-focus return probe beam and another interference term of substantially reduced amplitude between the out-of-focus image beams associated with out-of-focus image points and corresponding portions of the in-focus reference beam.

75. A method for discriminating an in-focus image of an information-bearing region in and/or on a substance from an out-of-focus image so as to reduce errors in determining information represented by the information-bearing region in and/or on the substance, comprising the steps of:

(a) producing a probe beam and a reference beam from a wideband point radiation source;
(b) producing an in-focus reference beam;
(c) producing antisymmetric spatial properties in the in-focus reference beam;
(d) passing the probe beam through a dispersal element to convert the probe beam to a beam focused to a target line in the information-bearing region;
(e) producing an in-focus return probe beam;
(f) producing antisymmetric spatial properties in the in-focus return probe beam;
(g) spatially filtering the in-focus return probe beam;
(h) passing the spatially filtered in-focus return probe beam through a dispersal element to convert it to a beam focused to a line in a detector plane of a detector;
(i) spatially filtering the in-focus reference beam;
(j) passing the spatially filtered in-focus reference beam through a dispersal element to convert it to a beam focused to the line in the detector plane;
(k) spatially filtering a beam from a plurality of out-of-focus image points;
(l) passing the spatially filtered beam from the plurality of out-of-focus image points through a dispersal element;
(m) interfering the spatially filtered in-focus reference beam with the spatially filtered beam from the out-of-focus image points;
(n) interfering the spatially filtered in-focus reference beam with the spatially filtered in-focus return probe beam; and
(o) reducing systematic and statistical errors in data produced by a detector to represent the information being determined by detecting the complex amplitude of the spatially filtered in-focus return probe beam as interference data by means of detector elements of the detector wherein the interference data comprises an interference term between the spatially filtered in-focus reference beam and the spatially filtered in-focus return probe beam and another interference term of a substantially reduced amplitude between the spatially filtered beam from the plurality of out-of-focus image points and the spatially filtered in-focus reference beam.

76. A method for discriminating an in-focus image of an information-bearing region in and/or on a substance from an out-of-focus image so as to reduce errors in determining information represented by the information-bearing region in and/or on the substance, comprising the steps of:

(a) producing a probe beam and a reference beam from a wideband point radiation source;
(b) producing an in-focus reference beam;
(c) producing antisymmetric spatial properties in the in-focus reference beam;
(d) converting the probe beam to a beam focused to a target line in the information-bearing region;
(e) producing an in-focus return probe beam;
(f) producing antisymmetric spatial properties in the in-focus return probe beam;
(g) spatially filtering the in-focus return probe beam;
(h) converting the spatially filtered in-focus return probe beam to a beam focused to a line in a detector plane of a detector;
(i) spatially filtering the in-focus reference beam;
(j) converting the spatially filtered in-focus reference beam to a beam focused to the line in the detector plane;
(k) spatially filtering a beam from a plurality of out-of-focus image points;
(l) interfering the converted spatially filtered in-focus reference beam with the spatially filtered beam from the plurality of out-of-focus image points;
(m) interfering the converted spatially filtered in-focus reference beam with the converted spatially filtered in-focus return probe beam; and
(n) reducing errors in data produced by the detector to represent the information being determined by detecting by means of the detector the spatially filtered in-focus return probe beam as interference data comprising an interference term between the converted spatially filtered in-focus reference beam and the converted spatially filtered in-focus return probe beam and another interference term of substantially reduced amplitude between the spatially filtered beam from the plurality of out-of-focus image points and the converted spatially filtered in-focus reference beam.

77. The method of claim 1 including providing a substance, wherein the array of in-focus image points is in and/or on the substance.

78. The method of claim 10 including providing a substance, wherein the target line is in and/or on the substance.

79. The method of claim 10 wherein step (a) includes producing the probe beam and the reference beam from a linear array of wideband point radiation sources, wherein step (d) includes converting the probe beam to a plurality of beams focused to a plurality of target lines, respectively, the plurality of beams corresponding to the wideband point radiation sources, respectively, wherein step (h) includes converting the spatially filtered in-focus return probe beam to a plurality of beams corresponding to the wideband point radiation sources, respectively, focused to a plurality of lines, respectively, in the detector plane, and wherein step (j) includes converting the spatially filtered in-focus reference beam to a plurality of beams focused to the plurality of lines, respectively, in the detector plane.

80. The method of claim 21 wherein step (a) includes producing the probe beam and the reference beam from a linear array of wideband point radiation sources, wherein step (d) includes converting the probe beam to a plurality of beams focused to a plurality of target lines, respectively, the plurality of beams corresponding to the wideband point radiation sources, respectively, wherein step (h) includes converting the spatially filtered in-focus return probe beam to a plurality of beams corresponding to the wideband point radiation sources, respectively, focused to a plurality of lines, respectively, in the detector plane, and wherein step (j) includes converting the spatially filtered in-focus reference beam to a plurality of beams focused to the plurality of lines, respectively, in the detector plane.

81. The system of claim 42 wherein element (e)(1) includes means for producing the probe beam and the reference beam from a linear array of wideband point radiation sources, wherein element (e)(4) includes means for converting the probe beam to a plurality of beams focused to a plurality of target lines, respectively, in the information-bearing region, the plurality of beams corresponding to the wideband point radiation sources, respectively, wherein element (e)(8) includes means for converting the spatially filtered in-focus return probe beam to a plurality of beams corresponding to the wideband point radiation sources, respectively, focused to a plurality of lines, respectively, in the detector plane, and wherein element (e)(10) includes means for converting the spatially filtered in-focus reference beam to a plurality of beams focused to the plurality of lines, respectively, in the detector plane.

82. The metrology system of claim 43 wherein element (c)(1) includes means for producing the probe beam and the reference beam from a linear array of wideband point radiation sources, wherein element (c)(4) includes means for converting the probe beam to a plurality of beams focused to a plurality of target lines, respectively, in the information-bearing region, the plurality of beams corresponding to the wideband point radiation sources, respectively, wherein element (c)(8) includes means for converting the spatially filtered in-focus return probe beam to a plurality of beams corresponding to the wideband point radiation sources, respectively, focused to a plurality of lines, respectively, in the detector plane, and wherein element (c)(10) includes means for converting the spatially filtered in-focus reference beam to a plurality of beams focused to the plurality of lines, respectively, in the detector plane.

83. The metrology system of claim 44 wherein element (b)(1) includes means for producing the probe beam and the reference beam from a linear array of wideband point radiation sources, wherein element (b)(4) includes means for converting the probe beam to a plurality of beams focused to a plurality of target lines, respectively, in the information-bearing region, the plurality of beams corresponding to the wideband point radiation sources, respectively, wherein element (b)(8) includes means for converting the spatially filtered in-focus return probe beam to a plurality of beams corresponding to the wideband point radiation sources, respectively, focused to a plurality of lines, respectively, in the detector plane, and wherein element (b)(10) includes means for converting the spatially filtered in-focus reference beam to a plurality of beams focused to the plurality of lines, respectively, in the detector plane.

84. The system of claim 47 wherein element (b)(1) includes means for producing the probe beam and the reference beam from a linear array of wideband point radiation sources, wherein element (b)(4) includes means for converting the probe beam to a plurality of beams focused to a plurality of target lines, respectively, in the information-bearing region, the plurality of beams corresponding to the wideband point radiation sources, respectively, wherein element (b)(8) includes means for converting the spatially filtered in-focus return probe beam to a plurality of beams corresponding to the wideband point radiation sources, respectively, focused to a plurality of lines, respectively, in the detector plane, and wherein element (b)(10) includes means for converting the spatially filtered in-focus reference beam to a plurality of beams focused to the plurality of lines, respectively, in the detector plane.

85. The system of claim 49 wherein element (b)(1) includes means for producing the probe beam and the reference beam from a linear array of wideband point radiation sources, wherein element (b)(4) includes means for converting the probe beam to a plurality of beams focused to a plurality of target lines, respectively, in the information-bearing region, the plurality of beams corresponding to the wideband point radiation sources, respectively, wherein element (b)(8) includes means for converting the spatially filtered in-focus return probe beam to a plurality of beams corresponding to the wideband point radiation sources, respectively, focused to a plurality of lines, respectively, in the detector plane, and wherein element (b)(10) includes means for converting the spatially filtered in-focus reference beam to a plurality of beams focused to the plurality of lines, respectively, in the detector plane.

86. The system of claim 52 wherein element (e)(1) includes means for producing the probe beam and the reference beam from a linear array of wideband point radiation sources, wherein element (e)(4) includes means for converting the probe beam to a plurality of beams focused to a plurality of target lines, respectively, in the information-bearing region, the plurality of beams corresponding to the wideband point radiation sources, respectively, wherein element (e)(8) includes means for converting the spatially filtered in-focus return probe beam to a plurality of beams corresponding to the wideband point radiation sources, respectively, focused to a plurality of lines, respectively, in the detector plane, and wherein element (e)(10) includes means for converting the spatially filtered in-focus reference beam to a plurality of beams focused to the plurality of lines, respectively, in the detector plane.

87. The metrology system of claim 53 wherein element (c)(1) includes means for producing the probe beam and the reference beam from a linear array of wideband point radiation sources, wherein element (c)(4) includes means for converting the probe beam to a plurality of beams focused to a plurality of target lines, respectively, in the information-bearing region, the plurality of beams corresponding to the wideband point radiation sources, respectively, wherein element (c)(8) includes means for converting the spatially filtered in-focus return probe beam to a plurality of beams corresponding to the wideband point radiation sources, respectively, focused to a plurality of lines, respectively, in the detector plane, and wherein element (c)(10) includes means for converting the spatially filtered in-focus reference beam to a plurality of beams focused to the plurality of lines, respectively, in the detector plane.

88. The metrology system of claim 54 wherein element (b)(1) includes means for producing the probe beam and the reference beam from a linear array of wideband point radiation sources, wherein element (b)(4) includes means for converting the probe beam to a plurality of beams focused to a plurality of target lines, respectively, in the information-bearing region, the plurality of beams corresponding to the wideband point radiation sources, respectively, wherein element (b)(8) includes means for converting the spatially filtered in-focus return probe beam to a plurality of beams corresponding to the wideband point radiation sources, respectively, focused to a plurality of lines, respectively, in the detector plane, and wherein element (b)(10) includes means for converting the spatially filtered in-focus reference beam to a plurality of beams focused to the plurality of lines, respectively, in the detector plane.

89. The system of claim 57 wherein element (b)(1) includes means for producing the probe beam and the reference beam from a linear array of wideband point radiation sources, wherein element (b)(4) includes means for converting the probe beam to a plurality of beams focused to a plurality of target lines, respectively, in the information-bearing region, the plurality of beams corresponding to the wideband point radiation sources, respectively, wherein element (b)(8) includes means for converting the spatially filtered in-focus return probe beam to a plurality of beams corresponding to the wideband point radiation sources, respectively, focused to a plurality of lines, respectively, in the detector plane, and wherein element (b)(10) includes means for converting the spatially filtered in-focus reference beam to a plurality of beams focused to the plurality of lines, respectively, in the detector plane.

90. The system of claim 59 wherein element (b)(1) includes means for producing the probe beam and the reference beam from a linear array of wideband point radiation sources, wherein element (b)(4) includes means for converting the probe beam to a plurality of beams focused to a plurality of target lines, respectively, in the information-bearing region, the plurality of beams corresponding to the wideband point radiation sources, respectively, wherein element (b)(8) includes means for converting the spatially filtered in-focus return probe beam to a plurality of beams corresponding to the wideband point radiation sources, respectively, focused to a plurality of lines, respectively, in the detector plane, and wherein element (b)(10) includes means for converting the spatially filtered in-focus reference beam to a plurality of beams focused to the plurality of lines, respectively, in the detector plane.

91. The method of claim 75 wherein step (a) includes producing the probe beam and the reference beam from a linear array of wideband point radiation sources, wherein step (d) includes converting the probe beam to a plurality of beams focused to a plurality of target lines, respectively, the plurality of beams corresponding to the wideband point radiation sources, respectively, wherein step (h) includes converting the spatially filtered in-focus return probe beam to a plurality of beams corresponding to the wideband point radiation sources, respectively, focused to a plurality of lines, respectively, in the detector plane, and wherein step (j) includes converting the spatially filtered in-focus reference beam to a plurality of beams focused to the plurality of lines, respectively, in the detector plane.

92. The method of claim 76 wherein step (a) includes producing the probe beam and the reference beam from a linear array of wideband point radiation sources, wherein step (d) includes converting the probe beam to a plurality of beams focused to a plurality of target lines, respectively, in the information-bearing region, the plurality of beams corresponding to the wideband point radiation sources, respectively, wherein step (h) includes converting the spatially filtered in-focus return probe beam to a plurality of beams corresponding to the wideband point radiation sources, respectively, focused to a plurality of lines, respectively, in the detector plane, and wherein step (j) includes converting the spatially filtered in-focus reference beam to a plurality of beams focused to the plurality of lines, respectively, in the detector plane.

* * * * *